US009056584B2

(12) United States Patent
Fish, Jr. et al.

(10) Patent No.: US 9,056,584 B2
(45) Date of Patent: Jun. 16, 2015

(54) REARVIEW ASSEMBLY FOR A VEHICLE

(75) Inventors: Richard T Fish, Jr., Jenison, MI (US);
Danny L Minikey, Jr., Fenwick, MI (US); Mark R Roth, Coloma, MI (US);
David J Cammenga, Zeeland, MI (US);
George A Neuman, Holland, MI (US);
William L Tonar, Holland, MI (US);
Gary J Dozeman, Zeeland, MI (US);
Joel A Stray, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 352 days.

(21) Appl. No.: 13/470,147

(22) Filed: May 11, 2012

(65) Prior Publication Data
US 2012/0229882 A1  Sep. 13, 2012

Related U.S. Application Data

(63) Continuation-in-part of application No. 13/395,069, filed as application No. PCT/US2011/043191 on Jul. 7, 2011, which is a continuation of application No. 12/832,838, filed on Jul. 8, 2010, now Pat. No.
(Continued)

(51) Int. Cl.
*G02F 1/153* (2006.01)
*B60R 1/02* (2006.01)
(Continued)

(52) U.S. Cl.
CPC ............... *B60R 1/025* (2013.01); *G02F 1/153* (2013.01); *B60R 1/06* (2013.01); *B60R 1/12* (2013.01)

(58) Field of Classification Search
CPC ....... G02F 1/155; G02F 1/153; G02F 1/1533; G02F 1/163; G02F 1/15; G02F 1/157; G02F 1/161; G02F 1/13338; G02F 1/167; G02F 2001/1515; G02F 2001/1536; G02F 2001/1552; G02F 2001/1512; G02F 2001/1519; B60R 1/088; B60R 1/0612
USPC ..................... 359/265–276, 838–884; 701/49
See application file for complete search history.

(56) References Cited

U.S. PATENT DOCUMENTS 3,280,701 A   10/1966   Donnelly et al.
3,837,129 A   9/1974   Losell
(Continued)

FOREIGN PATENT DOCUMENTS

WO   WO 01/01192       1/2001
WO   WO 2011/044312    4/2011
WO   WO 2012/051500    4/2012

OTHER PUBLICATIONS

EPO, European Search Report and Written Opinion in European Patent Application No. EP 10184089.0, dated Mar. 31, 2011; 11 pages.
(Continued)

*Primary Examiner* — Thomas K Pham
*Assistant Examiner* — Sharrief Broome
(74) *Attorney, Agent, or Firm* — Price Heneveld LLP; Scott P. Ryan

(57) ABSTRACT

A vehicular rearview assembly with a mirror element having a curved or rounded edge on the first surface that is fully observable from the front of the assembly, a complex peripheral ring, and a user interface with switches and sensors that activate and configure pre-defined function(s) or device(s) of the assembly in response to the user input applied to the user interface. The mirror element is supported by a hybrid carrier co-molded of at least two materials, a portion of which is compressible between the housing shell and an edge of the mirror element. The peripheral ring may include multiple bands. Electrical communications between the electronic circuitry, the mirror element, and the user interface utilize connectors configured to exert a low contact force, onto the mirror element, limited in part by the strength of adhesive affixing the EC element to an element of the housing of the assembly.

58 Claims, 99 Drawing Sheets

Related U.S. Application Data 8,169,684.

(60) Provisional application No. 61/450,888, filed on Mar. 9, 2011, provisional application No. 61/467,832, filed on Mar. 25, 2011, provisional application No. 61/618,987, filed on Apr. 2, 2012, provisional application No. 61/510,405, filed on Jul. 21, 2011, provisional application No. 61/515,190, filed on Aug. 4, 2011, provisional application No. 61/590,259, filed on Jan. 24, 2012.

(51) Int. Cl.
*B60R 1/06* (2006.01)
*B60R 1/12* (2006.01)

(56) References Cited

U.S. PATENT DOCUMENTS

| | | |
|---|---|---|
| 4,902,108 A | 2/1990 | Byker |
| 5,052,163 A | 10/1991 | Czekala |
| 5,066,112 A | 11/1991 | Lynam et al. |
| 5,069,535 A | 12/1991 | Baucke et al. |
| 5,073,012 A | 12/1991 | Lynam |
| 5,076,673 A | 12/1991 | Lynam et al. |
| 5,115,346 A | 5/1992 | Lynam |
| 5,128,799 A | 7/1992 | Byker |
| 5,151,824 A | 9/1992 | O'Farrell |
| 5,158,638 A | 10/1992 | Osanami et al. |
| 5,253,109 A | 10/1993 | O'Farrell et al. |
| 5,278,693 A | 1/1994 | Theiste |
| 5,280,380 A | 1/1994 | Byker |
| 5,282,077 A | 1/1994 | Byker |
| 5,294,376 A | 3/1994 | Byker |
| 5,336,448 A | 8/1994 | Byker |
| 5,379,146 A | 1/1995 | Defendini |
| 5,421,940 A | 6/1995 | Cornils et al. |
| 5,448,397 A | 9/1995 | Tonar |
| 5,649,756 A | 7/1997 | Adams et al. |
| 5,679,283 A | 10/1997 | Tonar |
| 5,682,267 A | 10/1997 | Tonar |
| 5,689,370 A | 11/1997 | Tonar |
| 5,742,026 A | 4/1998 | Dickinson |
| 5,790,298 A | 8/1998 | Tonar |
| 5,803,579 A | 9/1998 | Turnbull |
| 5,808,778 A | 9/1998 | Bauer et al. |
| 5,818,625 A | 10/1998 | Forgette et al. |
| 5,825,527 A | 10/1998 | Forgette et al. |
| 5,837,994 A | 11/1998 | Stam |
| 5,888,431 A | 3/1999 | Tonar et al. |
| D410,607 S | 6/1999 | Carter |
| 5,923,027 A | 7/1999 | Stam |
| 5,923,457 A | 7/1999 | Byker et al. |
| 5,928,572 A | 7/1999 | Tonar et al. |
| 5,940,201 A | 8/1999 | Ash et al. |
| 5,956,012 A | 9/1999 | Turnbull et al. |
| 5,990,469 A | 11/1999 | Bechtel |
| 5,998,617 A | 12/1999 | Srinivasa |
| 6,002,511 A | 12/1999 | Varaprasad |
| 6,008,486 A | 12/1999 | Stam |
| 6,020,987 A | 2/2000 | Baumann |
| 6,023,040 A | 2/2000 | Zahavi |
| 6,023,229 A | 2/2000 | Bugno et al. |
| 6,037,471 A | 3/2000 | Srinivasa |
| 6,043,452 A | 3/2000 | Bestenlehrer |
| 6,049,171 A | 4/2000 | Stam |
| 6,051,956 A | 4/2000 | Nakashimo |
| 6,062,920 A | 5/2000 | Jordan |
| 6,064,508 A | 5/2000 | Forgette et al. |
| 6,064,509 A | 5/2000 | Tonar et al. |
| 6,068,380 A | 5/2000 | Lynn et al. |
| 6,084,700 A | 7/2000 | Knapp |
| 6,102,546 A | 8/2000 | Carter |
| 6,111,683 A | 8/2000 | Cammenga |
| 6,111,684 A | 8/2000 | Forgette |
| 6,130,421 A | 10/2000 | Bechtel |
| 6,130,448 A | 10/2000 | Bauer et al. |
| 6,132,072 A | 10/2000 | Turnbull |
| 6,140,933 A | 10/2000 | Bugno |
| 6,166,848 A | 12/2000 | Cammenga et al. |
| 6,170,956 B1 | 1/2001 | Rumsey et al. |
| 6,188,505 B1 | 2/2001 | Lomprey |
| 6,193,378 B1 | 2/2001 | Tonar et al. |
| 6,193,912 B1 | 2/2001 | Thieste |
| 6,195,194 B1 | 2/2001 | Roberts et al. |
| 6,222,177 B1 | 4/2001 | Bechtel |
| 6,224,716 B1 | 5/2001 | Yoder |
| 6,229,435 B1 | 5/2001 | Knapp |
| 6,239,898 B1 | 5/2001 | Byker |
| 6,239,899 B1 | 5/2001 | DeVries et al. |
| 6,244,716 B1 | 6/2001 | Steenwyk |
| 6,246,507 B1 | 6/2001 | Bauer |
| 6,247,819 B1 | 6/2001 | Turnbull |
| 6,249,369 B1 | 6/2001 | Theiste et al. |
| 6,255,639 B1 | 7/2001 | Stam |
| 6,262,831 B1 | 7/2001 | Bauer |
| 6,262,832 B1 | 7/2001 | Lomprey |
| 6,268,950 B1 | 7/2001 | Ash |
| 6,281,632 B1 | 8/2001 | Stam |
| 6,291,812 B1 | 9/2001 | Bechtel |
| 6,313,457 B1 | 11/2001 | Bauer |
| 6,317,248 B1 | 11/2001 | Agrawal et al. |
| 6,335,548 B1 | 1/2002 | Roberts |
| 6,356,376 B1 | 3/2002 | Tonar |
| 6,359,274 B1 | 3/2002 | Nixon |
| 6,379,013 B1 | 4/2002 | Bechtel |
| 6,392,783 B1 | 5/2002 | Lomprey |
| 6,402,328 B1 | 6/2002 | Bechtel |
| 6,403,942 B1 | 6/2002 | Stam |
| 6,407,468 B1 | 6/2002 | LeVesque et al. |
| 6,407,847 B1 | 6/2002 | Poll et al. |
| 6,420,800 B1 | 7/2002 | LeVesque |
| 6,426,485 B1 | 7/2002 | Bulgajewski |
| 6,429,594 B1 | 8/2002 | Stam |
| 6,441,943 B1 | 8/2002 | Roberts |
| 6,465,963 B1 | 10/2002 | Turnbull |
| 6,469,739 B1 | 10/2002 | Bechtel |
| 6,471,362 B1 | 10/2002 | Carter |
| 6,504,142 B2 | 1/2003 | Nixon |
| 6,512,624 B2 | 1/2003 | Tonar |
| 6,521,916 B2 | 2/2003 | Roberts |
| 6,523,976 B1 | 2/2003 | Turnbull |
| 6,545,794 B2 | 4/2003 | Ash |
| 6,587,573 B1 | 7/2003 | Stam |
| 6,606,183 B2 | 8/2003 | Ikai et al. |
| 6,614,579 B2 | 9/2003 | Roberts et al. |
| 6,635,194 B2 | 10/2003 | Kloeppner |
| 6,650,457 B2 | 11/2003 | Busscher et al. |
| 6,657,767 B2 | 12/2003 | Bonardi |
| 6,700,692 B2 | 3/2004 | Tonar |
| 6,774,988 B2 | 8/2004 | Stam |
| 6,781,738 B2 | 8/2004 | Kikuchi et al. |
| 6,816,297 B1 | 11/2004 | Tonar |
| 6,861,809 B2 | 3/2005 | Stam |
| 6,870,656 B2 | 3/2005 | Tonar |
| 6,968,273 B2 | 11/2005 | Ockerse |
| 7,042,616 B2 | 5/2006 | Tonar et al. |
| 7,064,882 B2 | 6/2006 | Tonar |
| 7,287,868 B2 | 10/2007 | Carter |
| 7,324,261 B2 | 1/2008 | Tonar et al. |
| 7,342,707 B2 | 3/2008 | Roberts |
| 7,417,717 B2 | 8/2008 | Pack |
| 7,592,563 B2 | 9/2009 | Wissenbach |
| 7,612,929 B2 * | 11/2009 | Tonar et al. .......... 359/267 |
| 7,663,798 B2 | 2/2010 | Tonar |
| 7,688,495 B2 | 3/2010 | Tonar et al. |
| 7,706,046 B2 | 4/2010 | Bauer et al. |
| 7,746,534 B2 | 6/2010 | Tonar et al. |
| 7,817,020 B2 | 10/2010 | Turnbull et al. |
| 7,830,583 B2 | 11/2010 | Neuman et al. |
| 7,864,399 B2 | 1/2011 | McCabe et al. |
| 7,978,393 B2 | 7/2011 | Tonar et al. |
| 8,035,881 B2 | 10/2011 | Luten et al. |
| 2002/0021481 A1 | 2/2002 | Lin et al. |

(56) References Cited

U.S. PATENT DOCUMENTS

| | | |
|---|---|---|
| 2008/0297879 A1 | 12/2008 | Tonar et al. |
| 2008/0302657 A1 | 12/2008 | Luten et al. |
| 2009/0296190 A1 | 12/2009 | Anderson et al. |
| 2010/0110553 A1 | 5/2010 | Anderson et al. |
| 2010/0277786 A1 | 11/2010 | Anderson et al. |
| 2011/0168687 A1 | 7/2011 | Door |
| 2011/0176323 A1 | 7/2011 | Skiver et al. |
| 2011/0181727 A1 | 7/2011 | Weller et al. |
| 2012/0038964 A1 | 2/2012 | De Wind et al. |
| 2012/0069444 A1 | 3/2012 | Campbell et al. |

OTHER PUBLICATIONS

European Patent Office, Wahl Supplementary European Search Report, in a related application EP 05714035.2-2205, dated Apr. 3, 2009; 6 pages.

European Patent Office, Communication pursuant to Article 94(3) EPC, in a related application EP 05714035.2-2205, dated Nov. 19, 2009; 6 pages.

Gentex Corporation, Image of carrier #1 for use with rearview assembly; 1 page.

Gentex Corporation, Image of carrier #2 for use with rearview assembly; 1 page.

Gentex Corporation, Another image of carrier #2 for use with rearview assembly; 1 page.

Creative Materials, Inc., Description of Pressure Sensitive Tape, series 300-01; available at http://creativematerials.com; 1 page.

3M, Inc., Brochure; Reliable Tapes for the Solar Industry; 8 pages; available at the web-site of 3M, Inc.

3M, Inc., Brochure; Adhesive Transfer Tape with 300LSE Adhesive; 4 pages; available at web-site of 3M, Inc.

3M, Inc., Brochure; Double Coated Polyethylene Foam Tapes; 4 pages; available at web-site of 3M, Inc.

\* cited by examiner

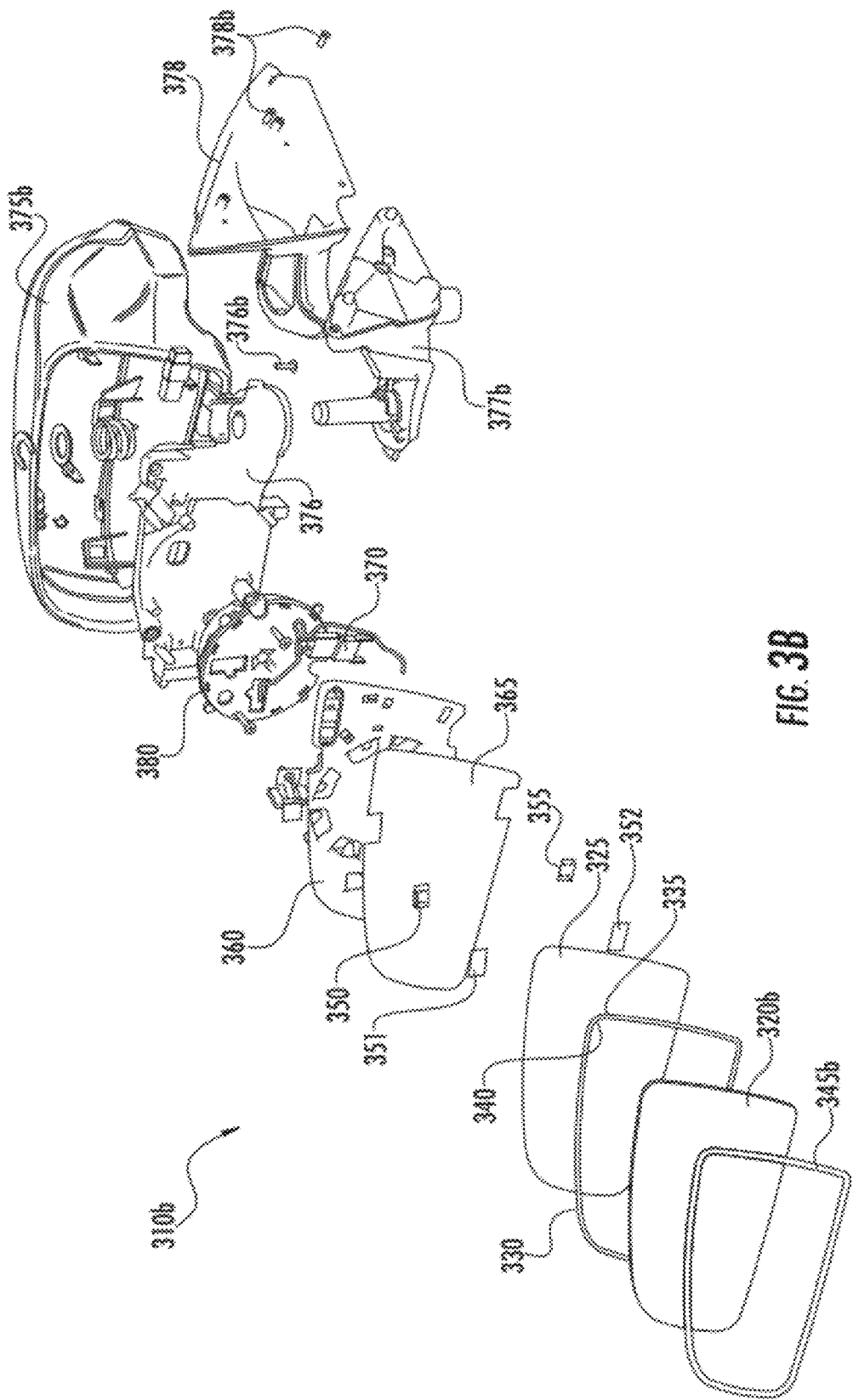

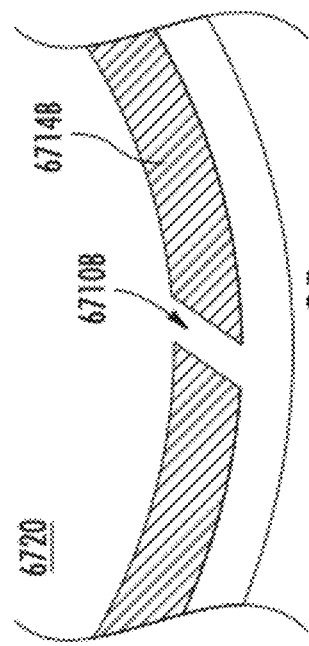
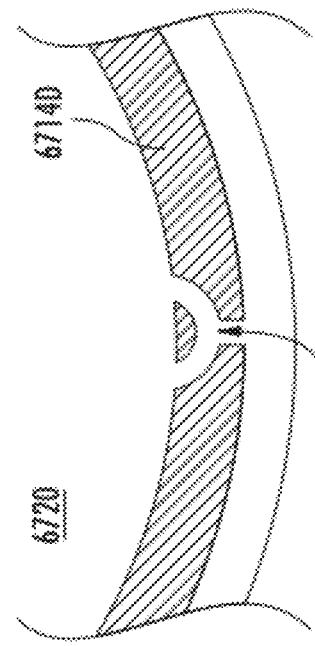
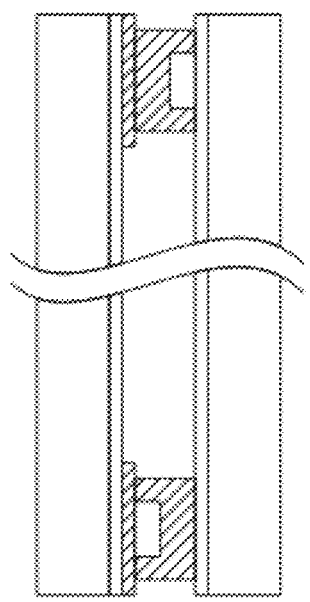
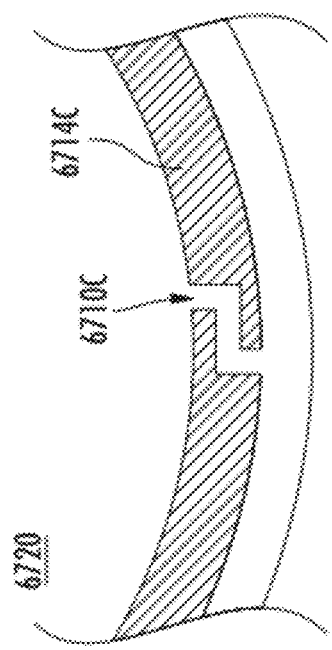

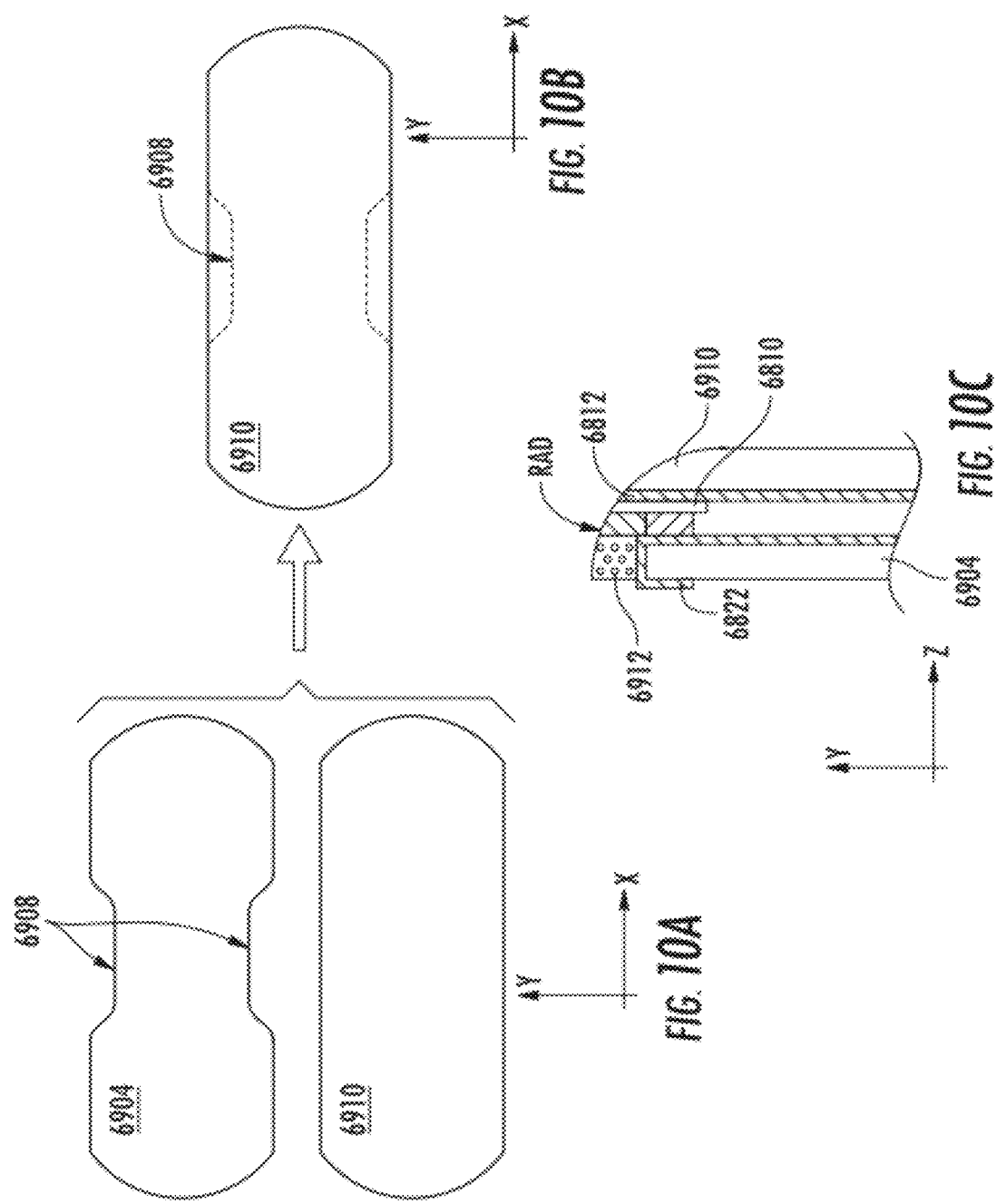

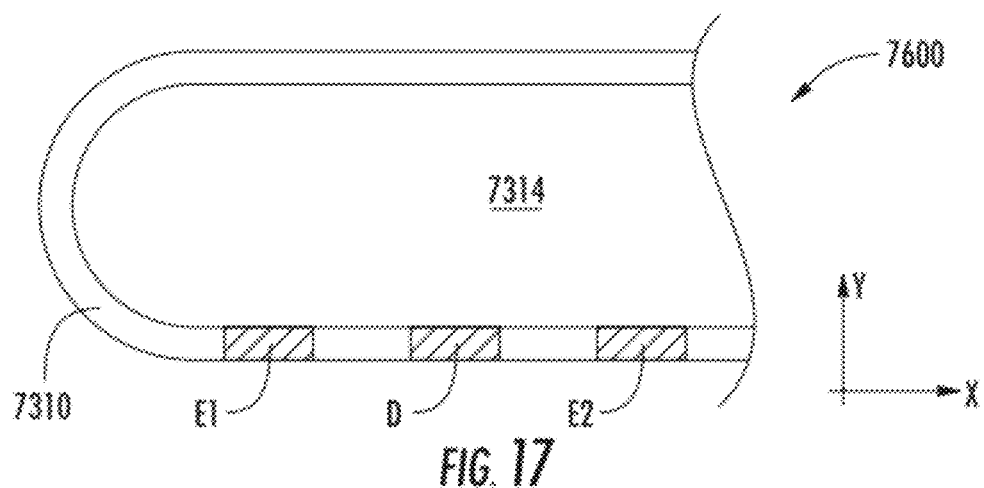
FIG. 17
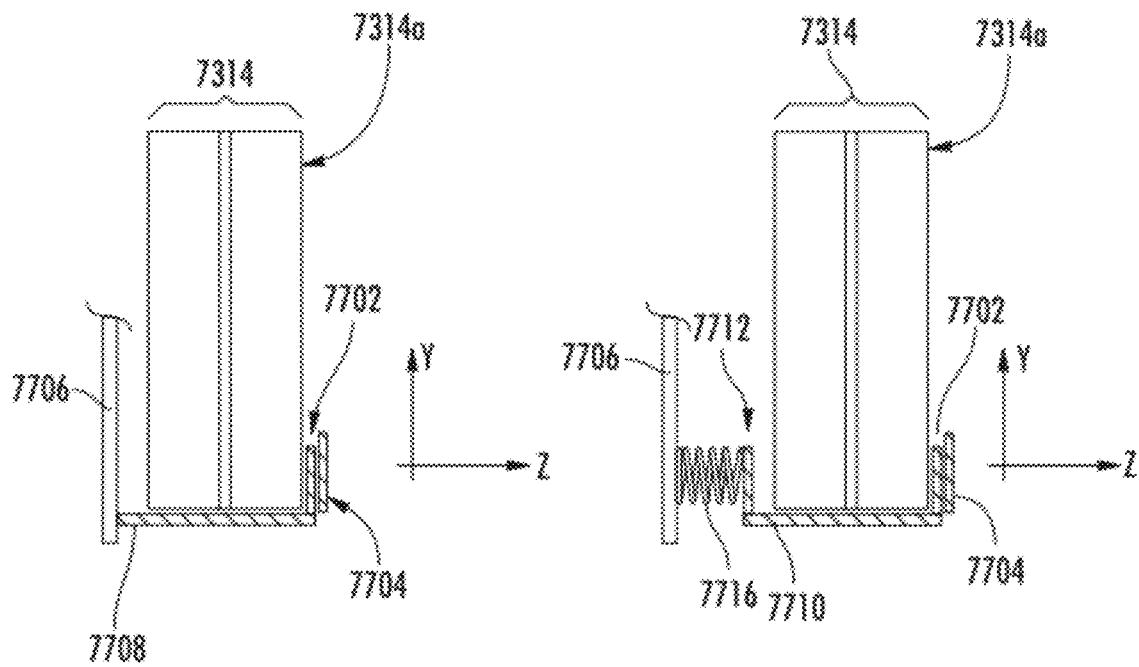
FIG. 18A
FIG. 18B

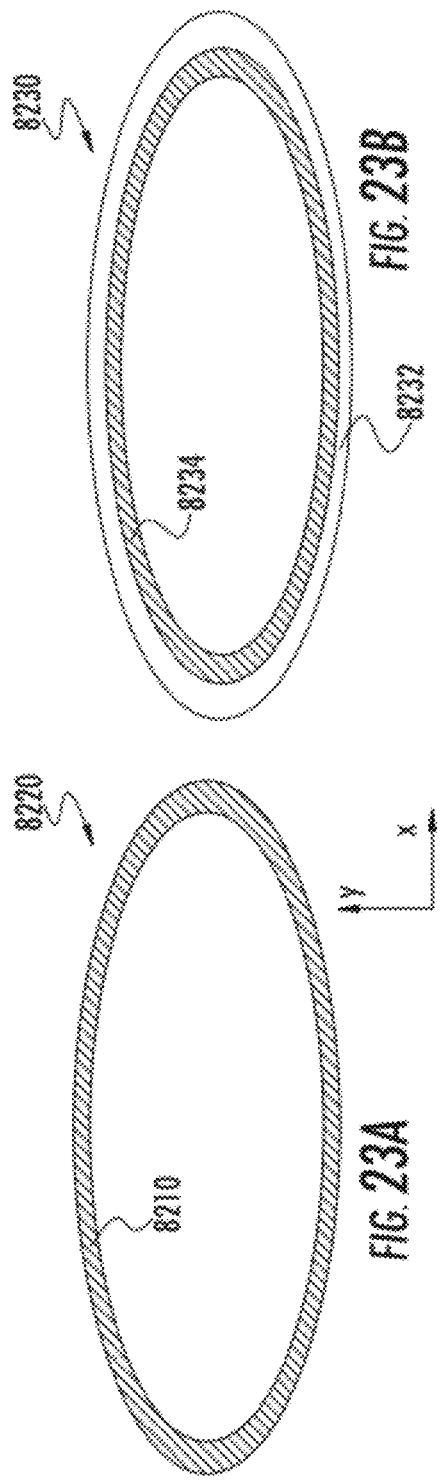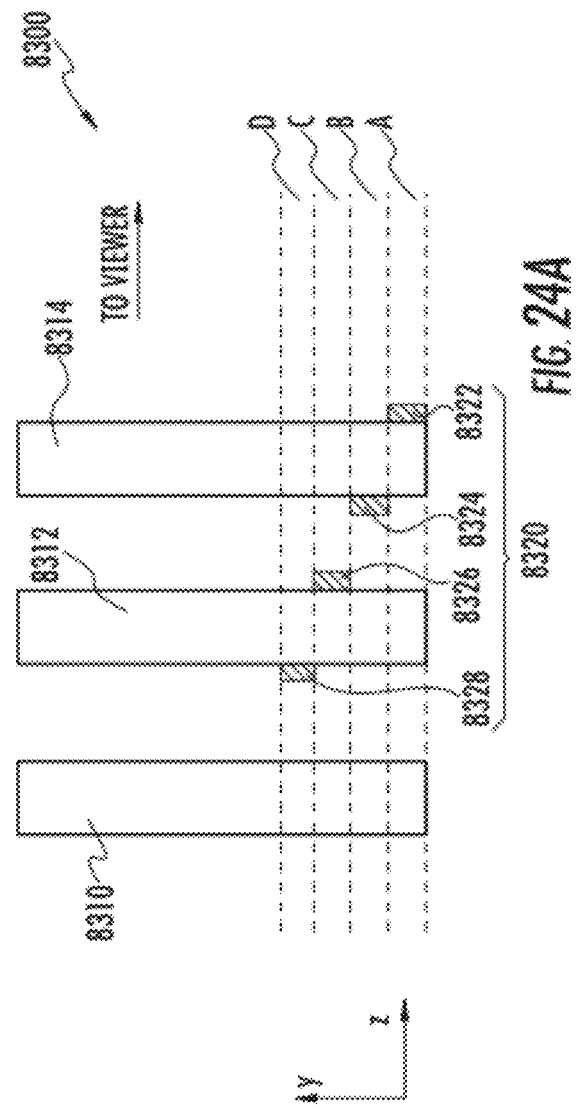

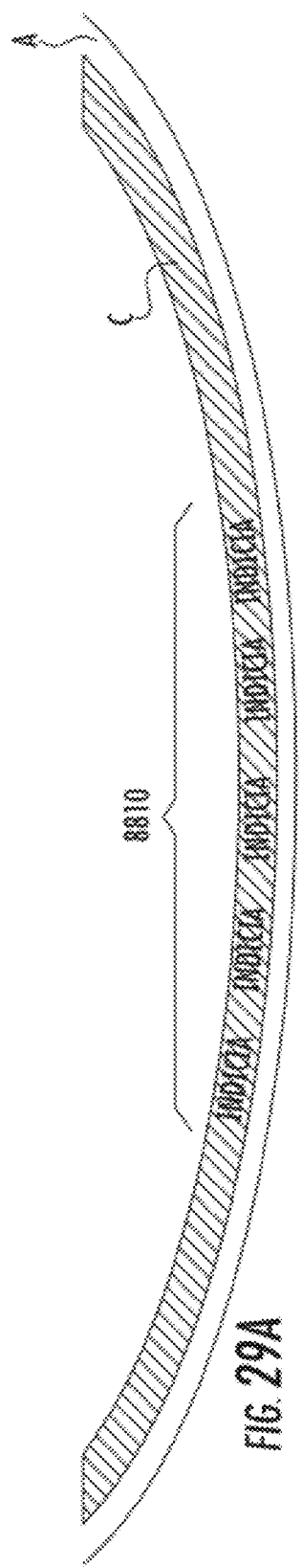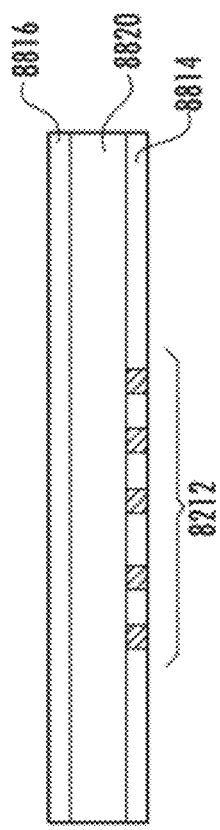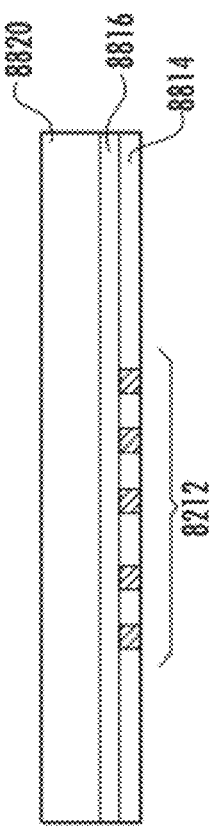

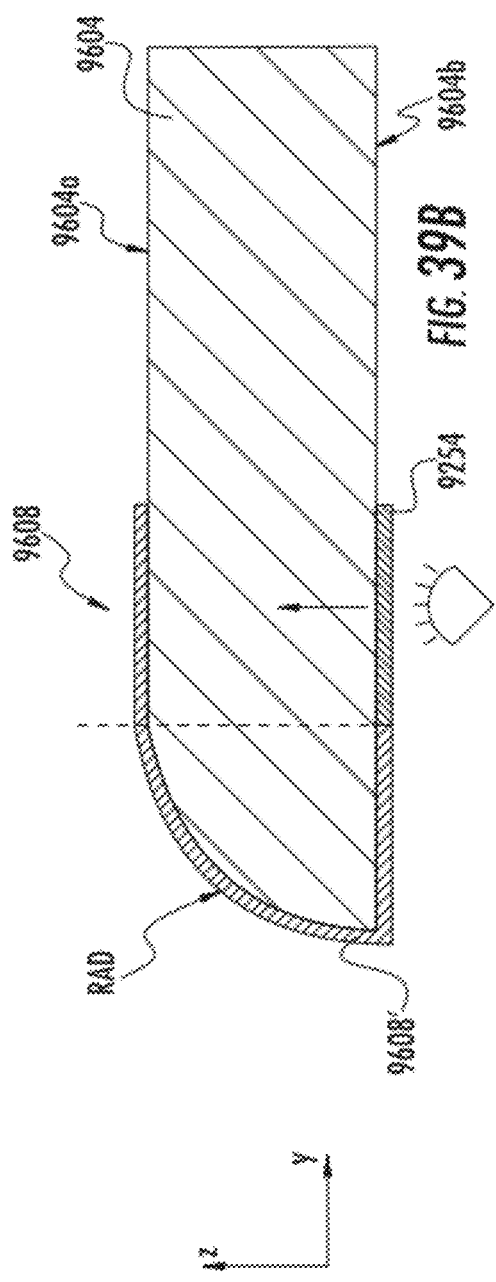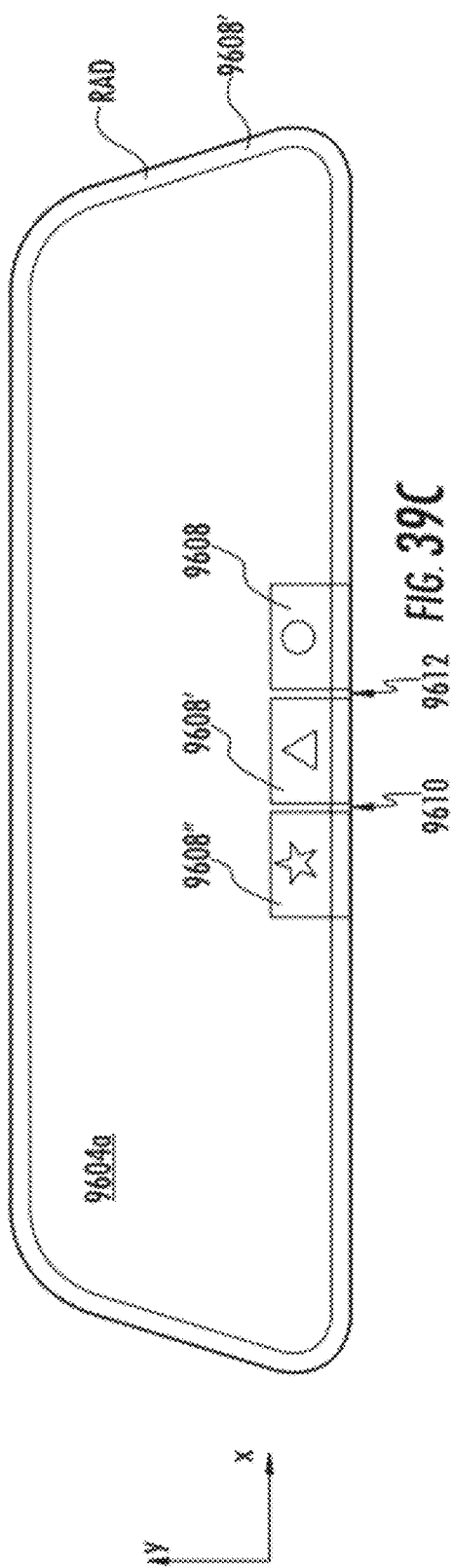

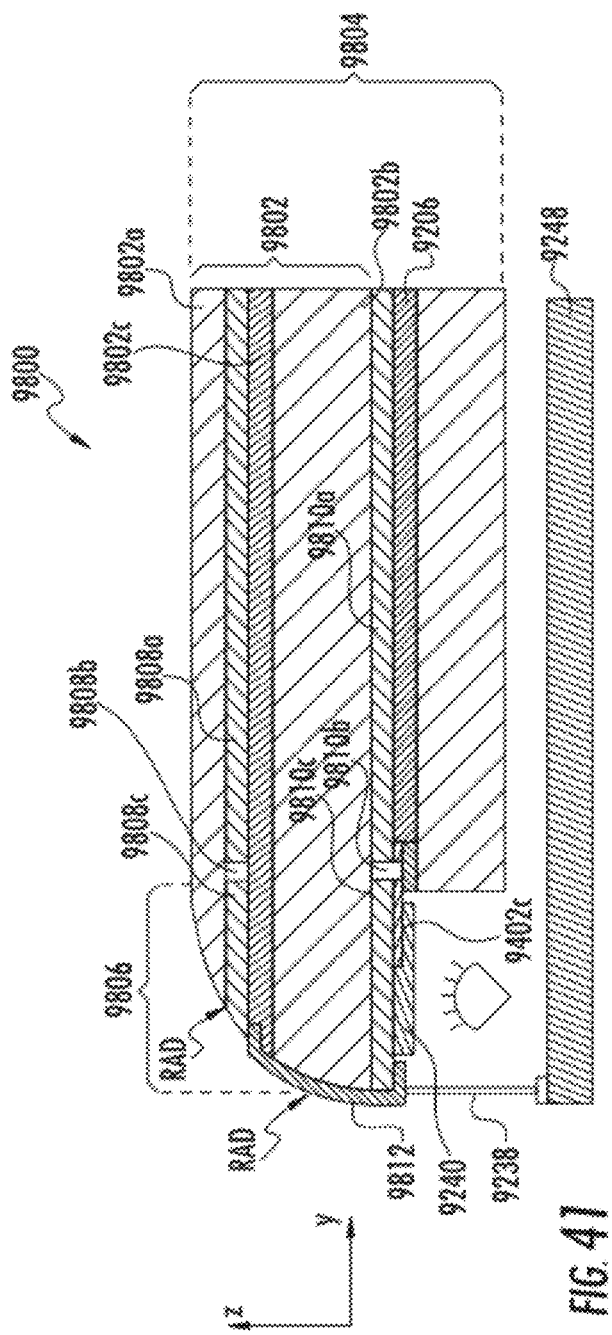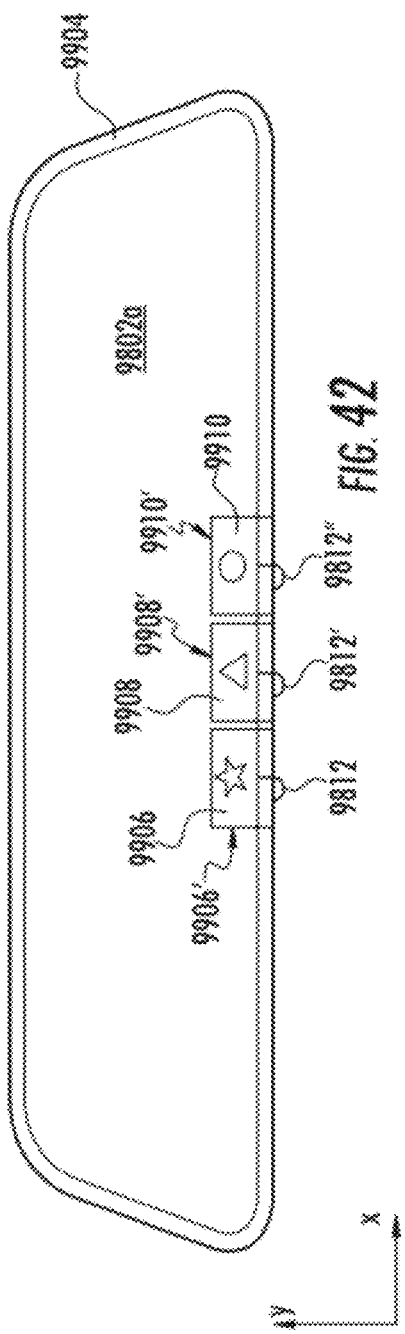

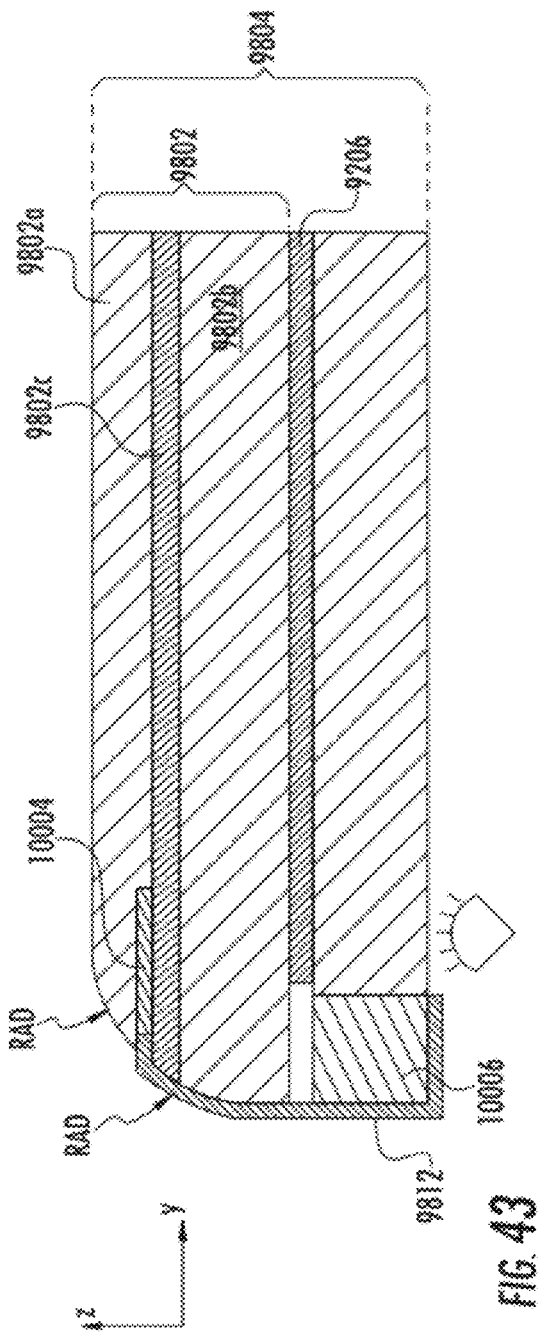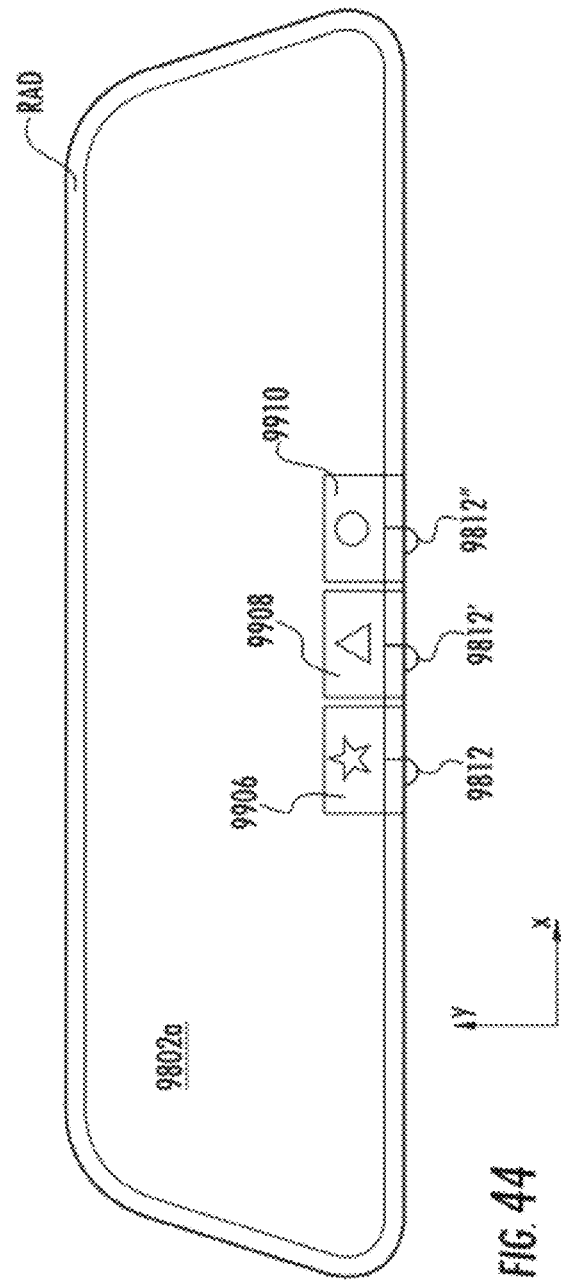

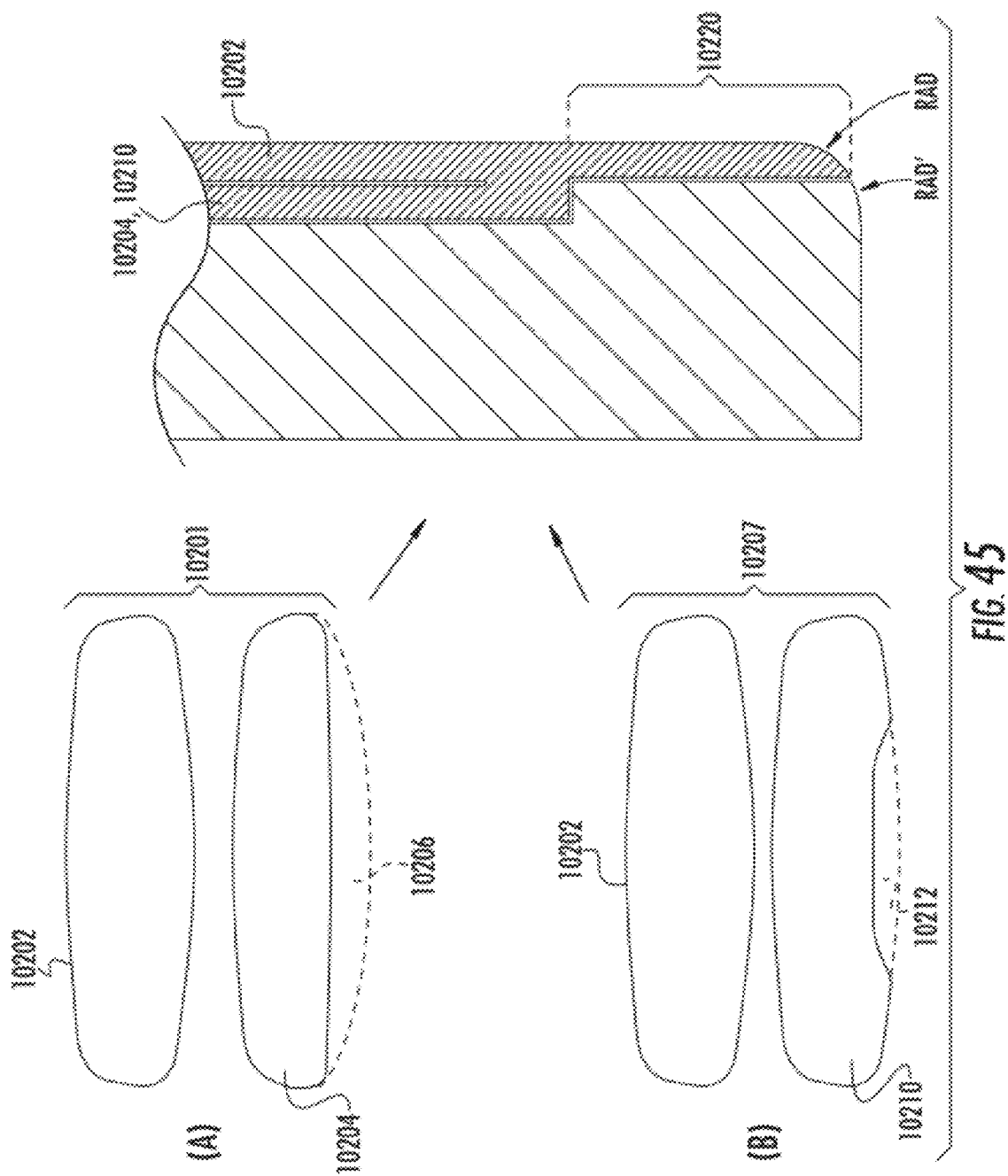

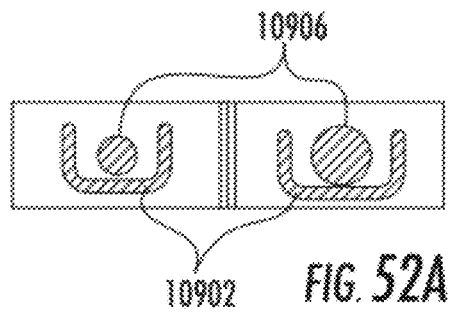
FIG. 52A
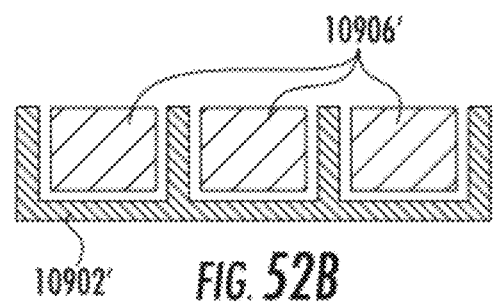
FIG. 52B
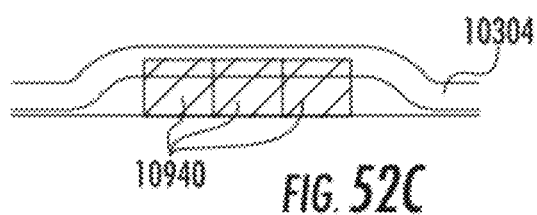
FIG. 52C
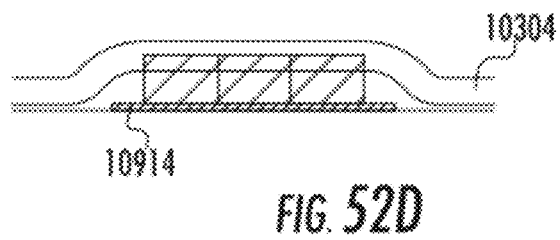
FIG. 52D
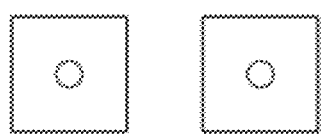
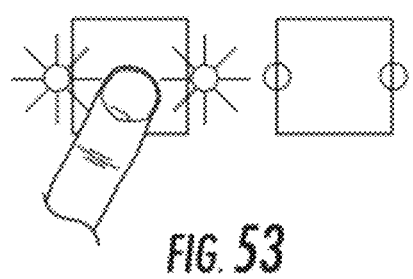
FIG. 53

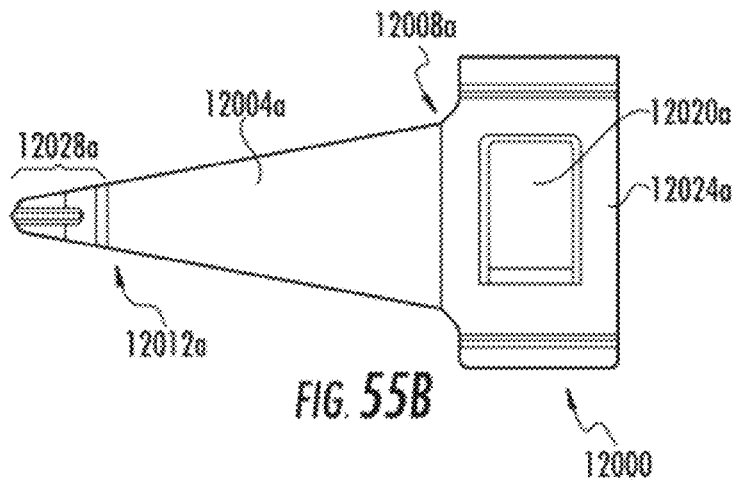
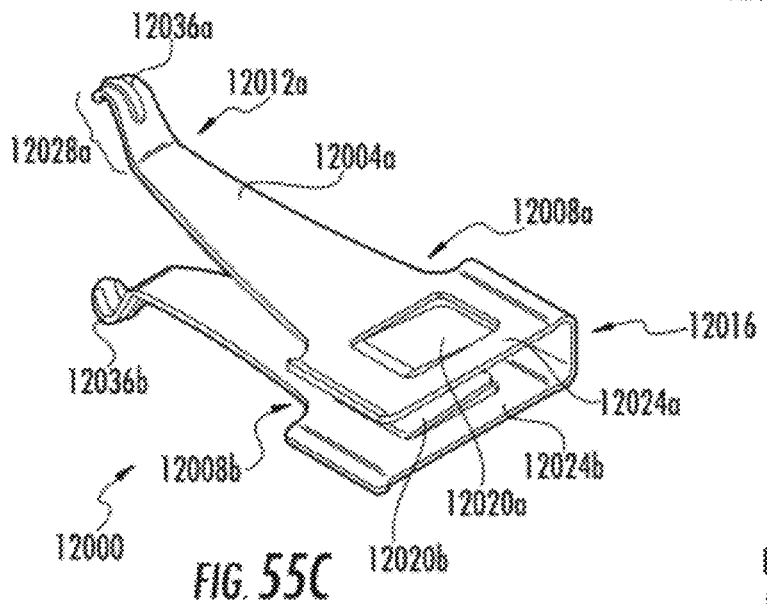
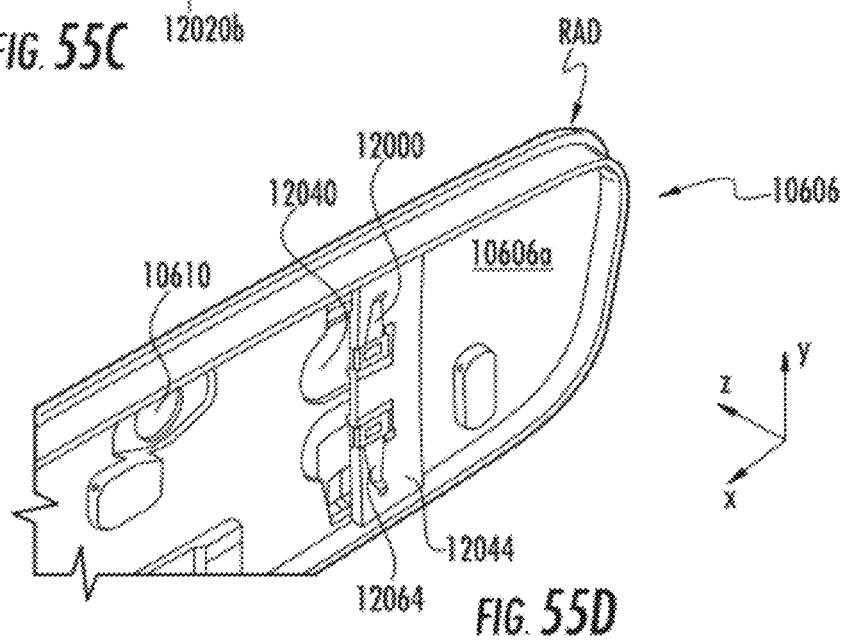

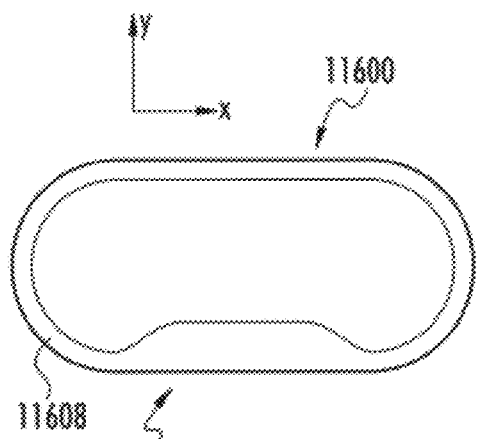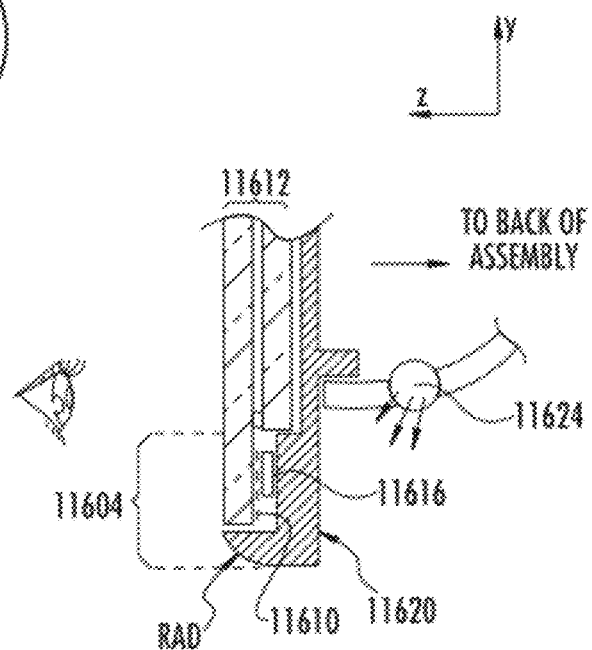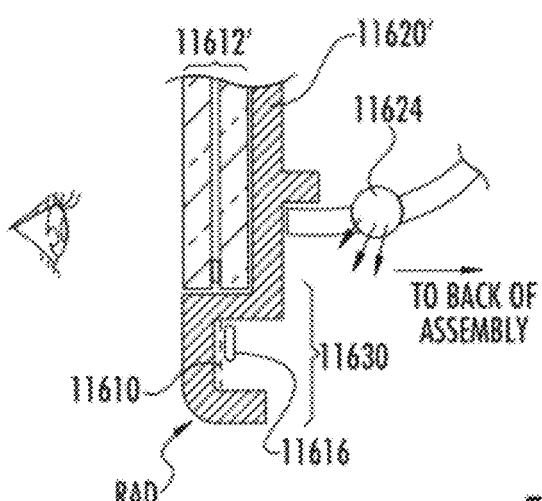

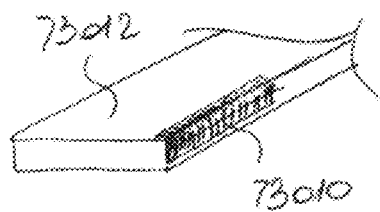
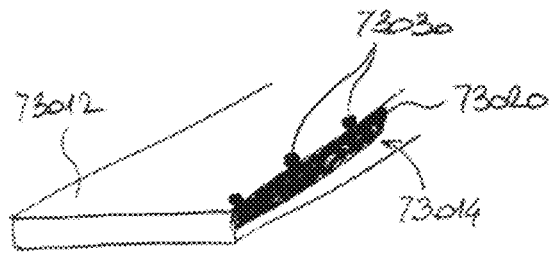
FIG. 73A  FIG. 73B
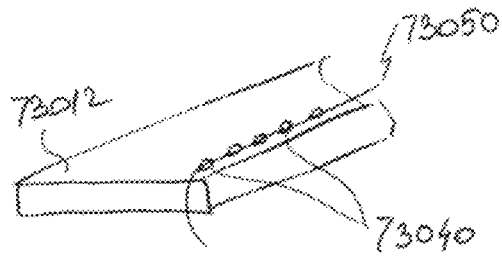
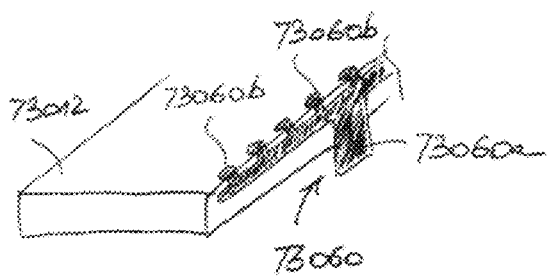
FIG. 73C  FIG. 73D
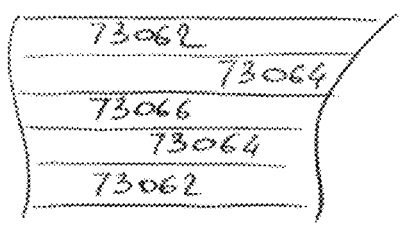
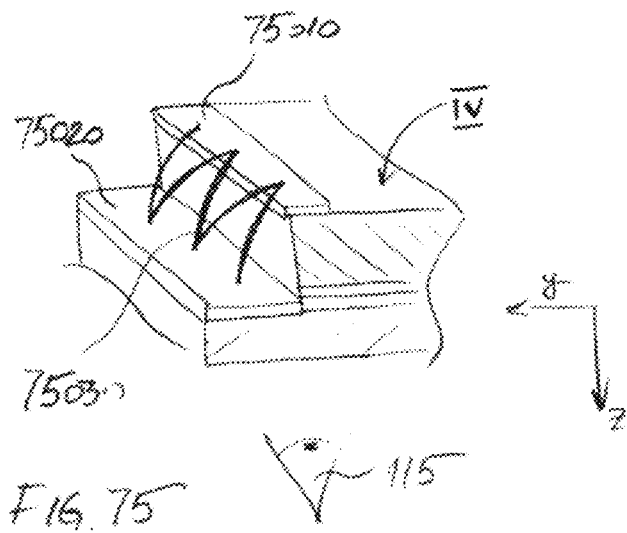
FIG. 74  FIG. 75

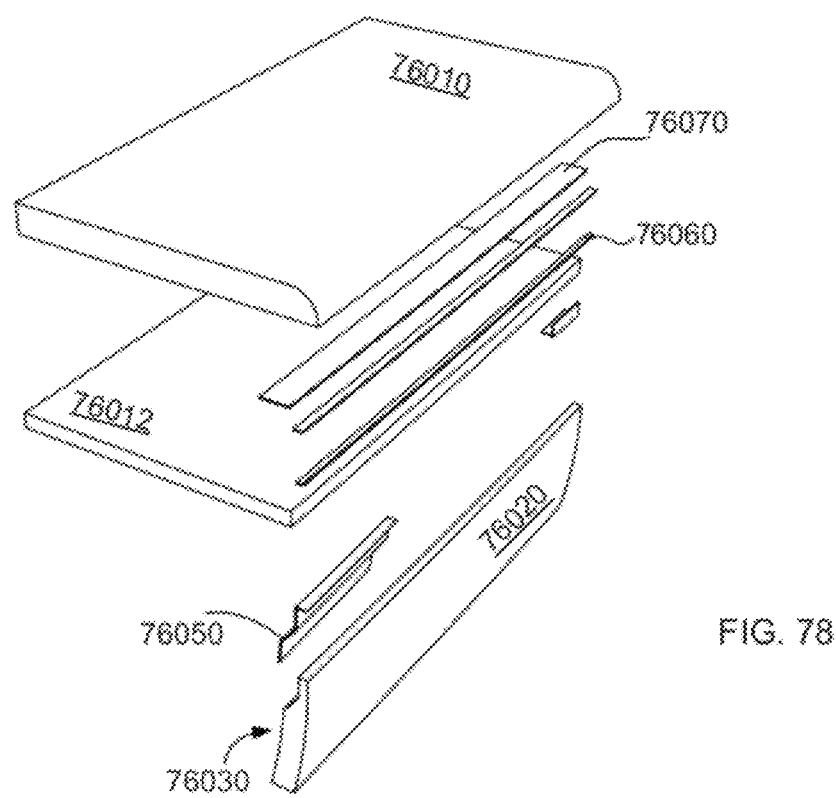
FIG. 78
FIG. 79
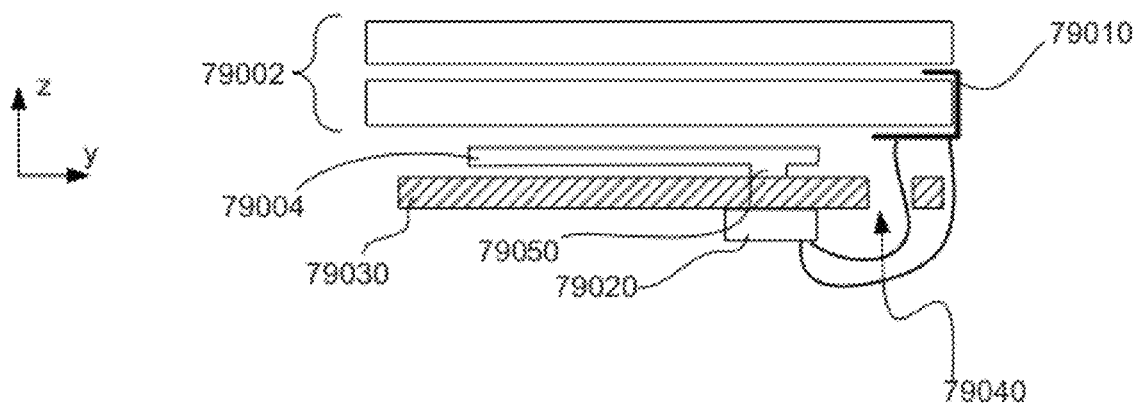

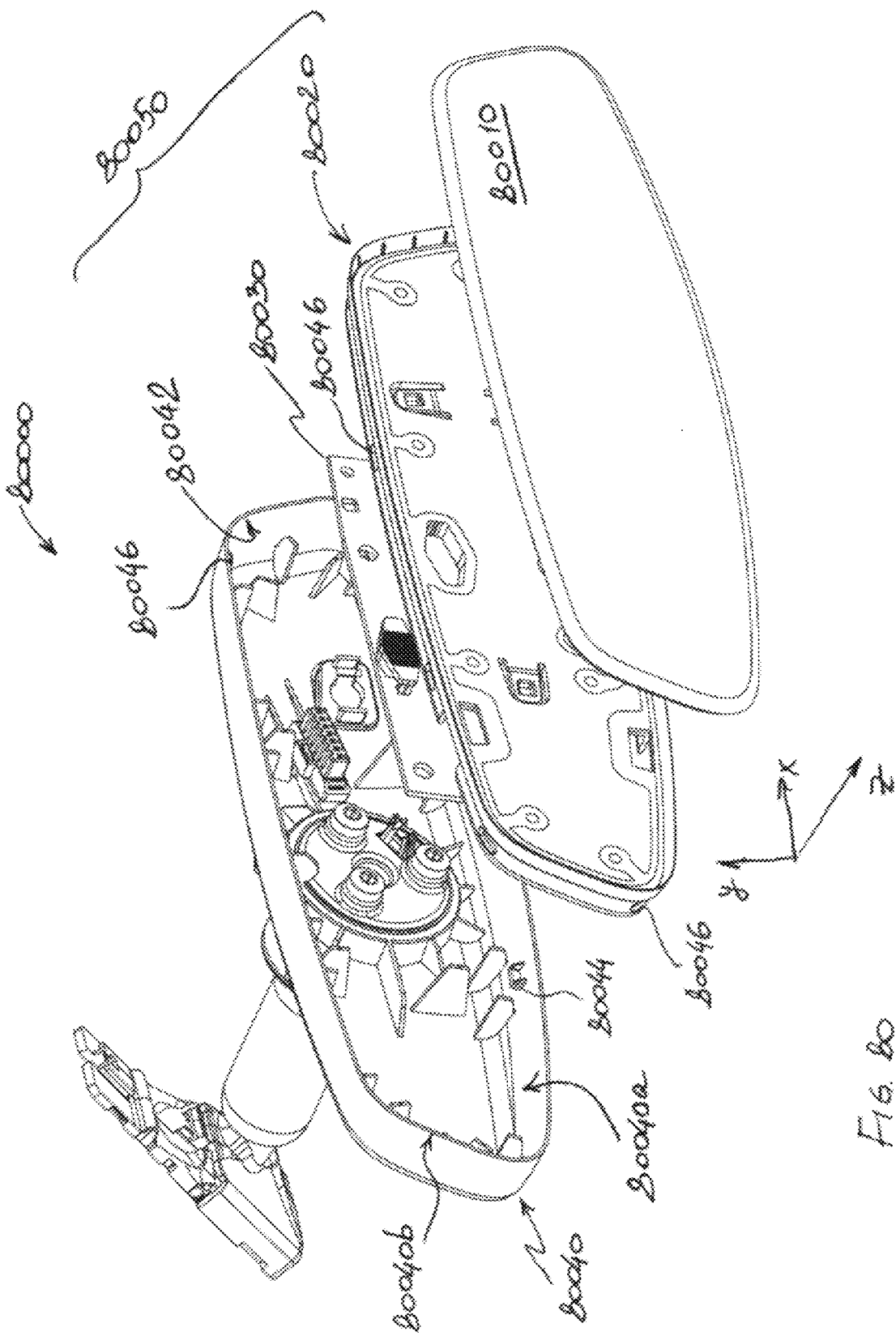

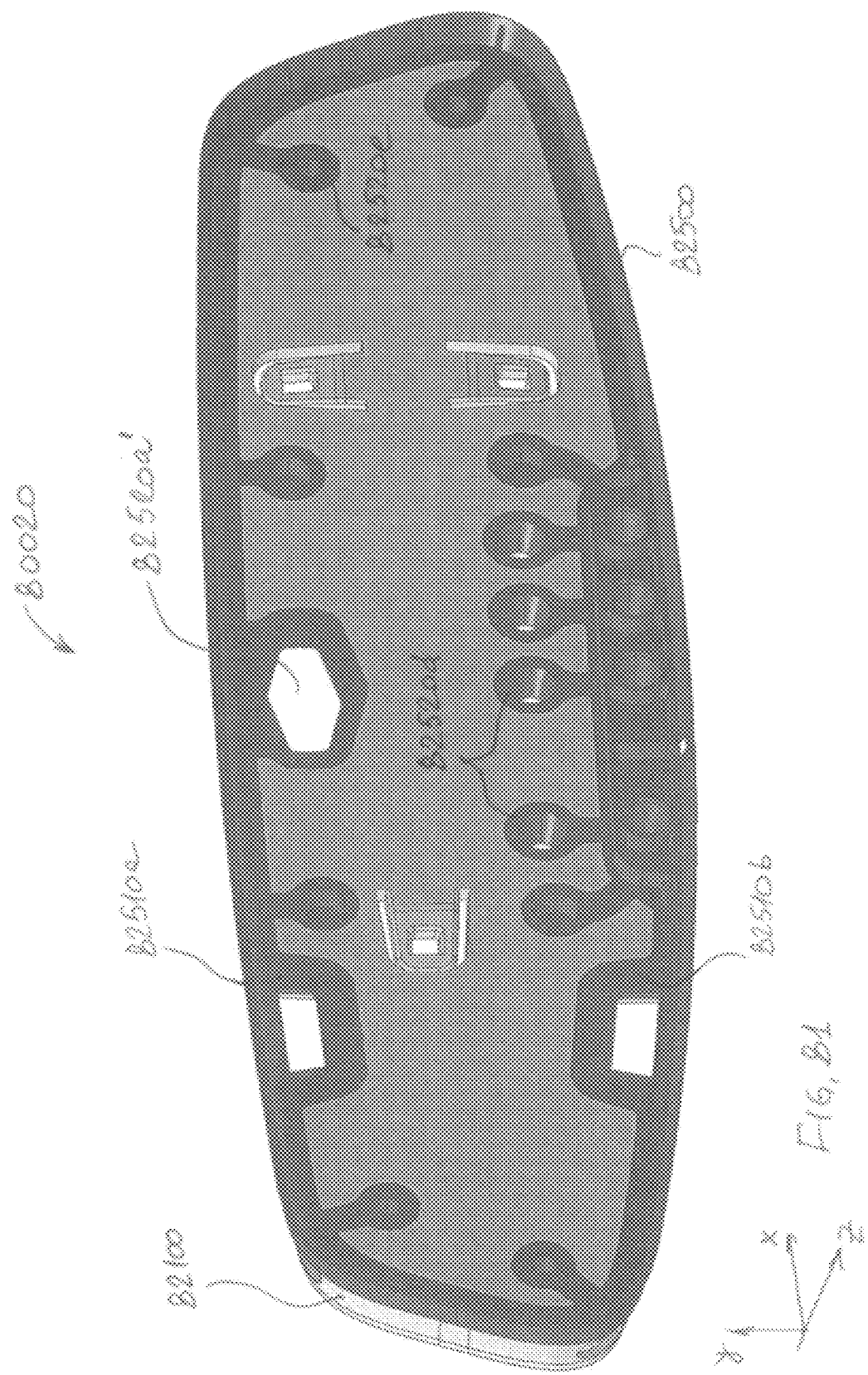

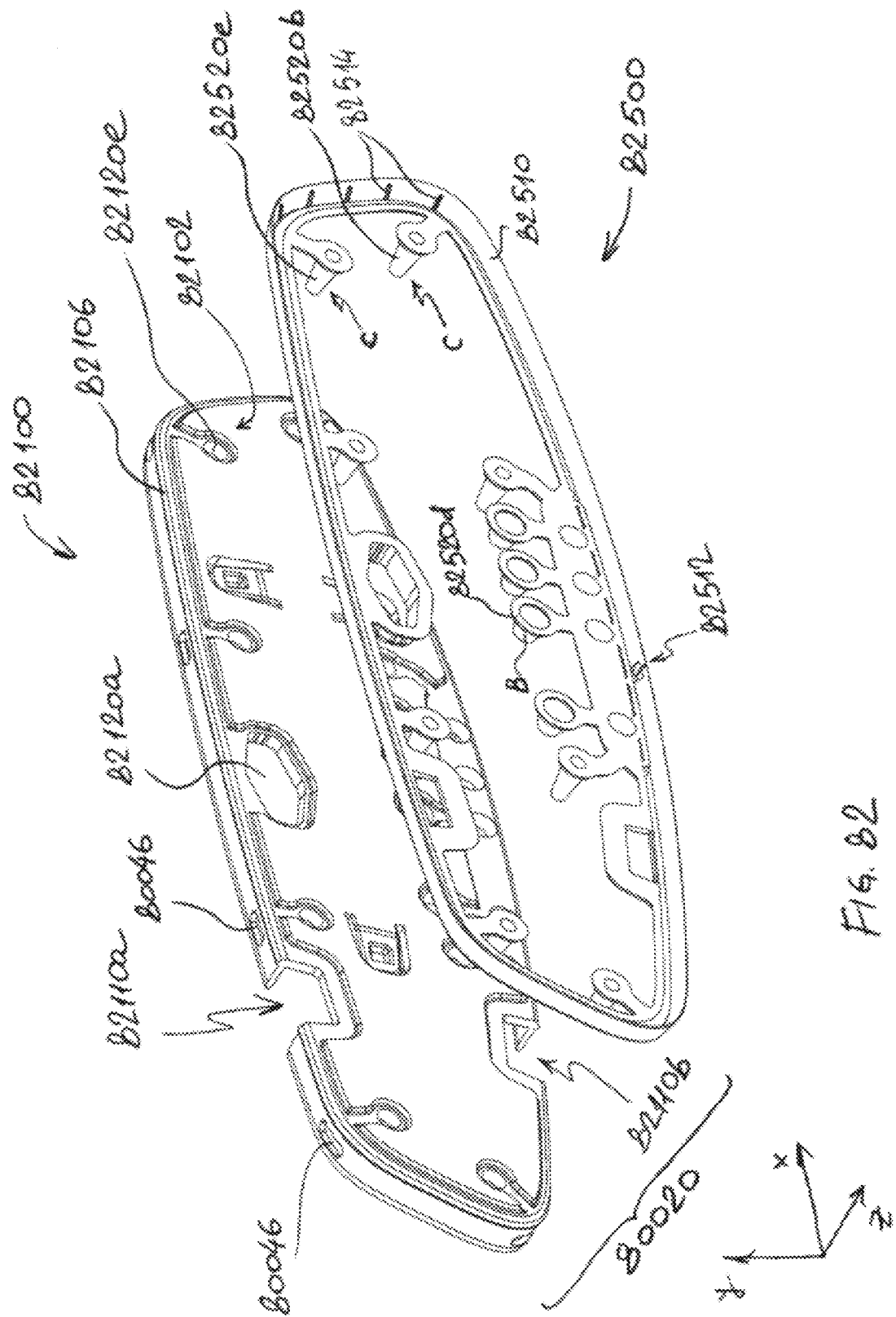

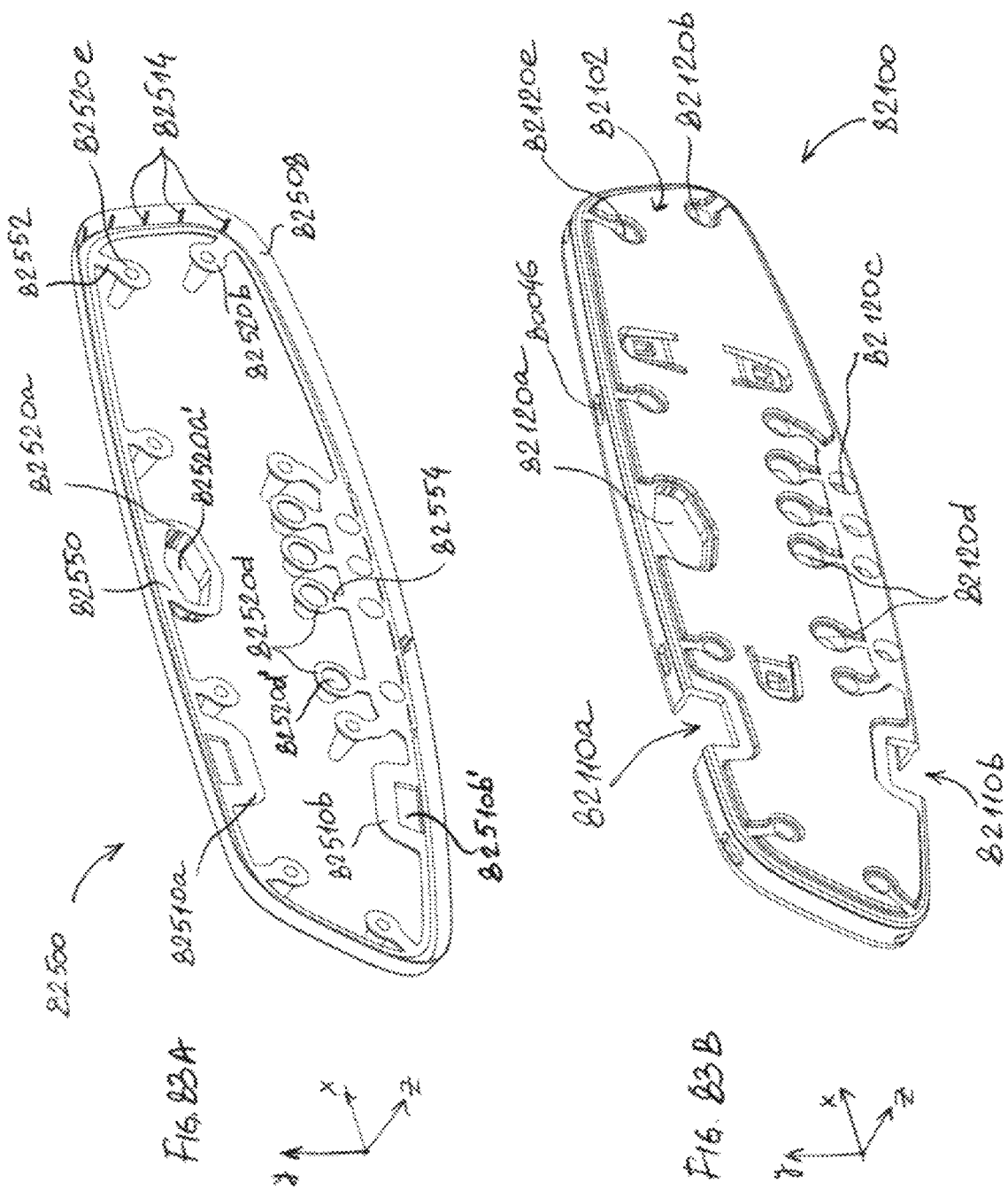

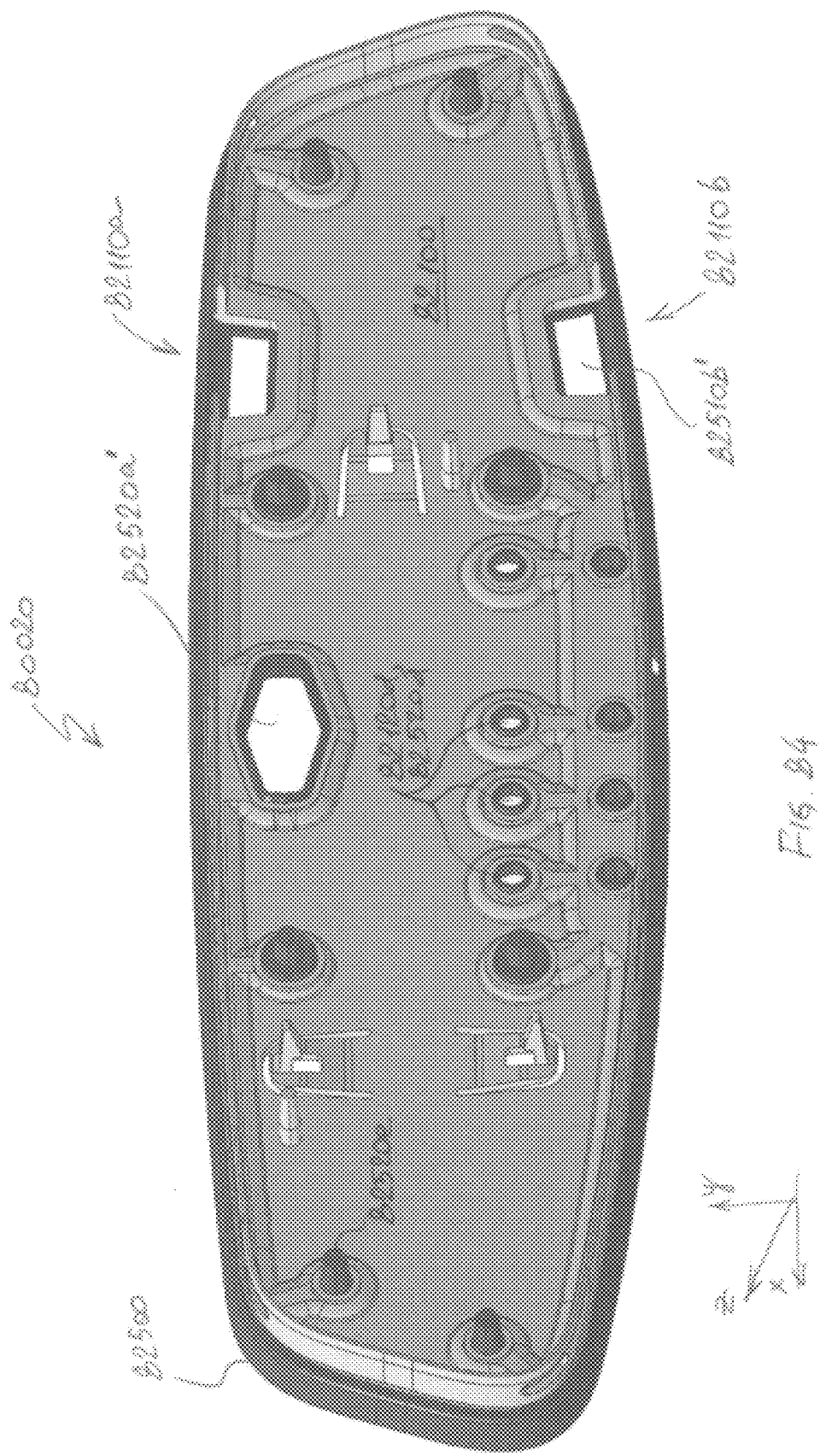

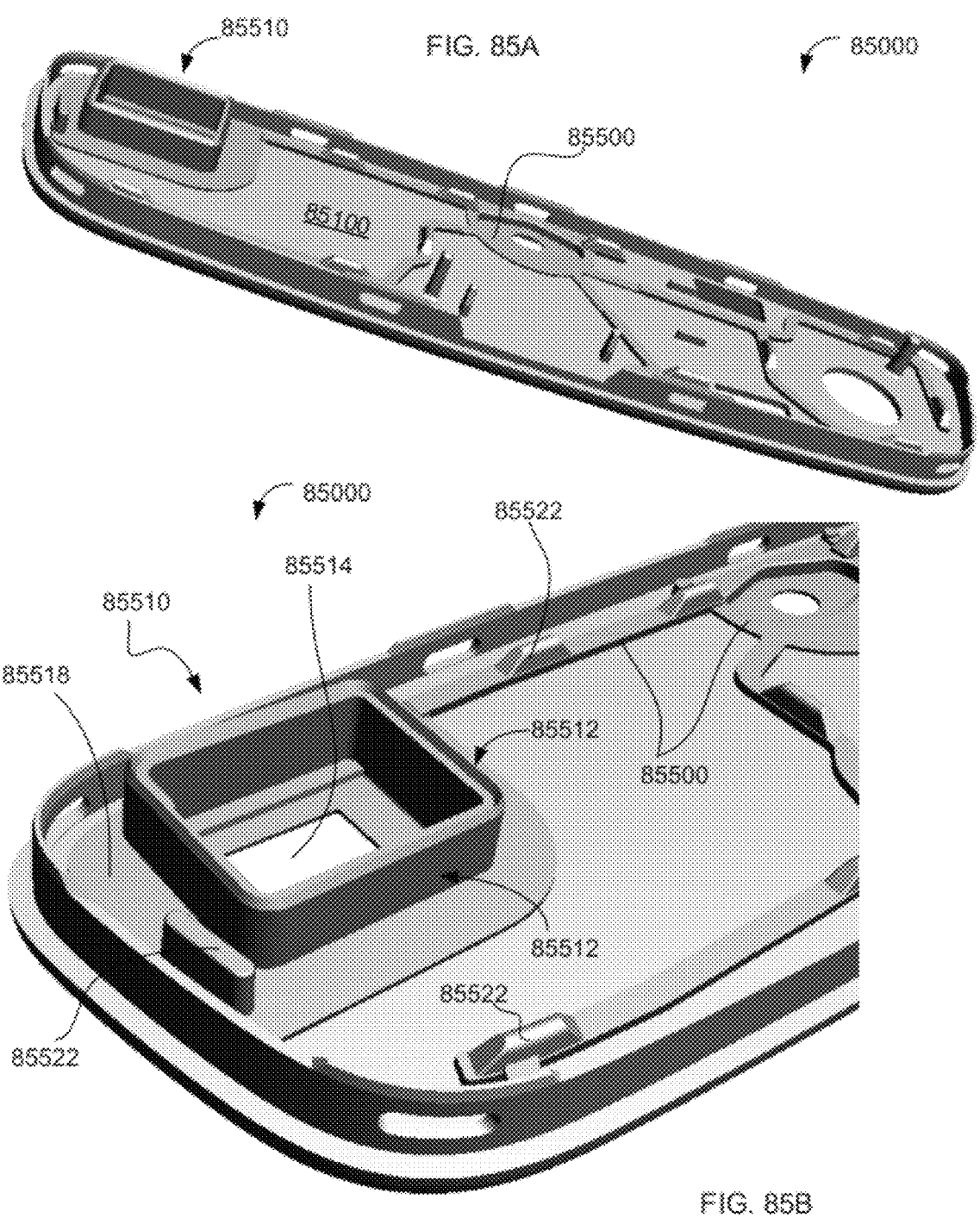

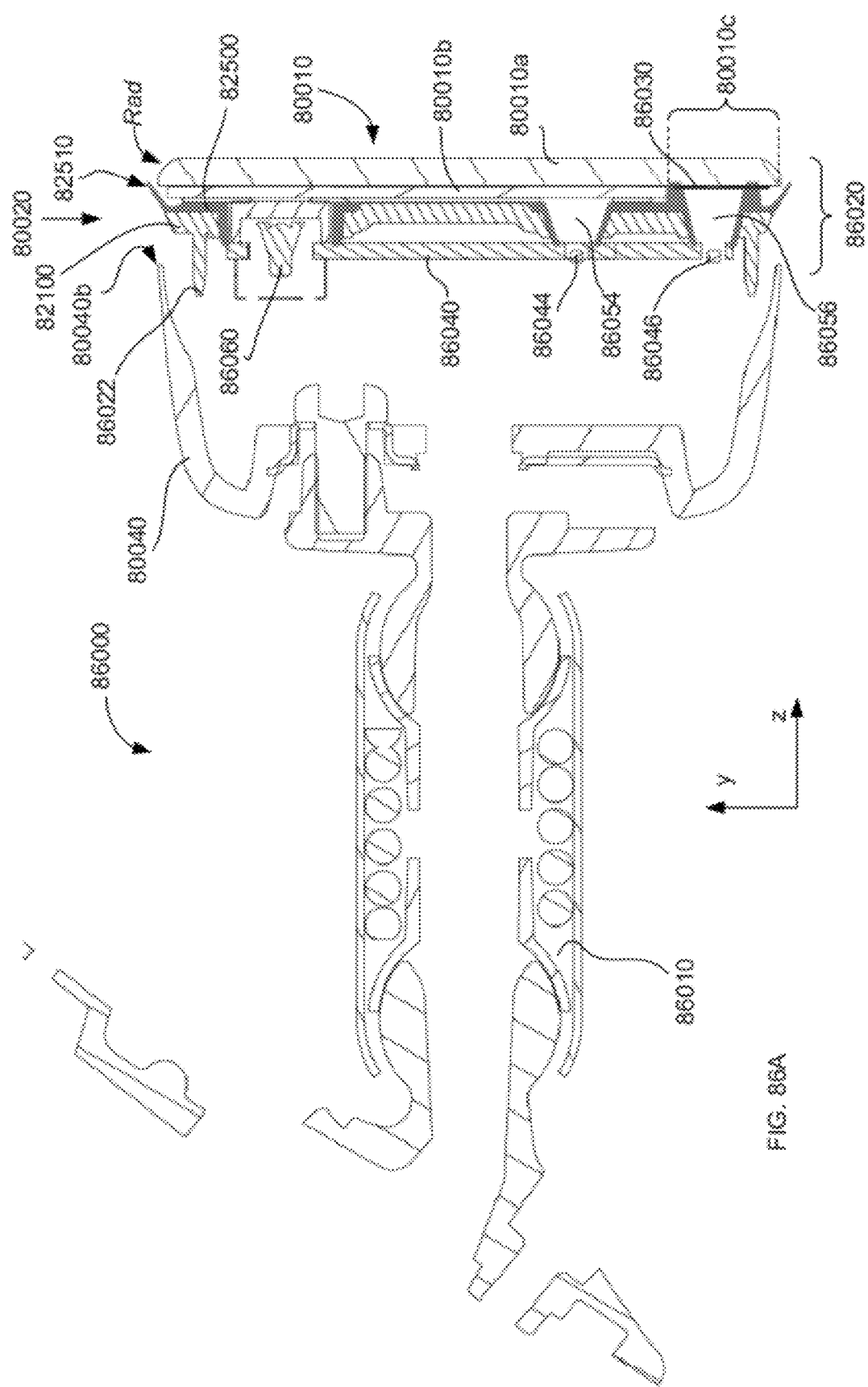

REARVIEW ASSEMBLY FOR A VEHICLE

CROSS-REFERENCE TO RELATED APPLICATIONS

The present application is a continuation-in-part of the U.S. patent application Ser. No. 13/395,069 filed on Mar. 8, 2012 and titled "Automotive Rearview Mirror With Capacitive Switches", which is a national phase filing of an international application no. PCT/US2011/043191 filed on Jul. 7, 2011, which, in turn, claims the benefit of and priority from: the U.S. patent application Ser. No. 12/832,838 filed on Jul. 8, 2010 and titled "Vehicular Rearview Mirror Elements and Assemblies Incorporating These Elements", now U.S. Pat. No. 8,169,684; the U.S. Provisional Patent Application No. 61/450,888 filed on Mar. 9, 2011 and titled "Automotive Rearview Mirror With Capacitive Switches"; the U.S. Provisional Patent Application No. 61/467,832 filed on Mar. 25, 2011 and titled "Automotive Rearview Mirror with Capacitive Switches".

The present application also claims the benefit of and priority from the U.S. Provisional Patent Applications Nos. 61/618,987 filed on Apr. 2, 2012 and titled "Carrier Module With integrated Display Boot for Use in a Rearview Assembly"; 61/510,405 filed on Jul. 21, 2011 and titled "Automotive Rearview Mirror with Capacitive Switches"; 61/515,190 filed on Aug. 4, 2011 and titled "Rearview Assembly for a Vehicle"; and the U.S. Provisional Patent Application No. 61/590,259 filed on Jan. 24, 2012 and titled "Rearview Mirror Assembly With Interchangeable Rearward Viewing Device".

The disclosure of each of the above-mentioned patent documents is hereby incorporated by reference in its entirety.

TECHNICAL FIELD

The invention relates to vehicular rearview assemblies and, in particular, to a rearview assembly employing a mirror element with a curved peripheral area, a user interface, and a hybrid carrier plate.

BACKGROUND

The present invention generally relates to electro-optic (EO) devices and apparatus incorporating such devices. In particular, the invention relates to electro-optic devices used in vehicular rearview mirror elements and/or architectural windows.

Electro-optic rearview mirror elements are becoming more common in vehicular applications with regard to both inside and outside rearview mirrors and mirror assemblies, whether on the driver's or the passenger's side. Such electro-optic rearview mirrors are automatically controlled to vary the reflectivity of the mirror in response to rearward and forward aimed light sensors so as to reduce the glare of headlamps in the image reflected to the driver's eyes. Typical electro-optic elements, when incorporated in vehicular rearview mirror assemblies, will have an effective field of view (as defined by relevant laws, codes and specifications) that is less than the area defined by the perimeter of the element itself. Often, the effective field of view of the element is limited, at least in part, by the construction of the element itself and/or an associated bezel.

Typically, a vehicular rearview assembly (for example, an autodimming assembly such as, generally, EO mirror assembly and, in particular, an electrochromic, EC, assembly, or an assembly including a prismatic element) includes a mirror element that is at least partially encased in a casing or housing element, sometimes with a bezel portion of the housing element that encompasses at least a portion of the edge surface of the mirror element and that mechanically cooperates (via snapping elements or other integration mechanism) with the remaining portion of the housing element. Typically, either the mirror element or the assembly itself is spatially (for example, angularly) alterable by the driver (for example, via a pivot assembly) to adjust a rearward field of view associated with the rearview assembly.

Various attempts have been made to provide a mirror element having an effective field of view substantially equal to the area defined by its perimeter. As shown in FIG. 1, depicting a cross-sectional portion of a typical rearview assembly employing an EC element, the subassembly 100 includes an EC mirror element 110, a bezel 112, and a carrier plate 117. The subassembly may further include gaskets 120 and 122 that are placed on either side of the EC element 110 to form a secondary seal around the periphery of the element 110. The EC element 110 includes a front substantially transparent element or substrate 130 typically formed of glass and having a front surface 130a and a rear surface 130b. The EC element 110 further includes a rear element 140, which is spaced slightly apart from the element 130. A seal 146 is formed between elements 130 and 140 about their periphery so as to define a sealed chamber 147 therebetween, in which an EC medium is provided. As known in the art, elements 130 and 140 preferably have electrically conductive layers (serving as electrodes, not shown) on the surfaces facing the chamber such that an electrical potential may be applied across the EC medium. These electrodes are electrically isolated from one another and are separately coupled to a power source (not shown) by means of corresponding bus connectors (connector 148b is shown in a specific implementation, as an electrically-conducting clip). To facilitate attachment of bus connectors to corresponding electrically-conducting layers, elements 130 and 140 are typically mutually offset so that one bus connector may be secured along a bottom edge of one of the elements and another bus connector may be secured to the top edge of the other element. The bus connectors (such as the connector 148b) may be spring clips (similar to those disclosed in commonly-assigned U.S. Pat. Nos. 6,064,509 and 6,062,920) and are configured to ensure that they remain physically and electrically coupled to the electrode layers on the inward-facing surfaces of elements 130 and 140. Alternatively, the bus connectors may include an electrically-conductive member such as a thin-film or foil that electrically extends a corresponding conductive layer to the back of the assembly over an edge surface of at least one of the elements 130, 140 (as discussed, for example, in commonly-assigned U.S. patent application Ser. Nos. 12/505,458, 12/563,917). In a specific implementation, such electrical extension may include a portion that wraps around an edge of a corresponding substrate. Once the EC element 110 has been manufactured and bus connectors have been configures, then the mirror subassembly 100 may be formed. As shown in FIG. 1, a bezel 112, the function of which is to mechanically support the element retained by the bezel, may include a front lip 151 extending over a portion of the front surface 130a of the front element 130. While the width $D_1$ of such lip may vary, it typically extends over a sufficient portion such as 5 mm, for example, of the front surface 130a to obscure a person's view of the seal 146 and protect the seal 146 from possible degradation caused by ambient UV light.

Prior to inserting the electrochromic mirror element 110 in the bezel 115, an optional front gasket 120 may be provided behind the front lip 151 so as to be pressed between the front surface 130a of the front element 130 and the inner surface of the front lip 151 of bezel 112. The mirror element 110 is then placed in bezel 112 and an optional rear gasket 122 may be provided along the periphery of the back surface of element 140. In lieu of, or in addition to front and/or rear gaskets 120, 122 the bezel/mirror interface area may be filled or potted with a sealing material such as urethane, silicone, or epoxy. A carrier plate 117, which is typically formed of an engineering grade rigid plastic or a similar material as used for bezel 112, is then pressed against the rear surface of element 140 with the gasket 122 compressed therebetween. A plurality of tabs (not shown) may be formed inside of the bezel such that carrier plate 117 is snapped in place so as to secure mirror element 110 within the bezel. The carrier plate 117 is typically used to mount the mirror subassembly within an exterior mirror housing. More specifically, a specific positioner (not shown) may also be mounted within the mirror housing and mechanically coupled to the carrier plate 117 for enabling remote adjustment of the position of the mirror subassembly within the housing. Various embodiments with reduced lip of the bezel has been also discussed in prior art.

While the above-described structures are readily manufacturable, various styling concerns have arisen that often require not only elimination of a conventional bezel but addressing various structural and functional problems generated by such change.

SUMMARY OF THE INVENTION

Embodiments of the invention provide vehicular rearview assemblies including electrochromic (EC) elements at least a portion of which is defined by the EC cell. Generally, the front outer peripheral portion of an assembly defines an annulus region having a curvature with a radius of at least 2.5 mm. The EC cell has first and second optically transparent substrates and a seal configured to bound a cavity of said EC cell that contains EC medium. The first substrate of an EC cell a first surface corresponds to a front of the EC element and a second surface has a peripheral ring of material disposed thereon, which peripheral ring conceals the seal from being observed from the front and from being exposed to at least UV light incident through the first substrate. In one embodiment, the first and second substrate cooperate such as to establish a ledge along at least a part of a perimeter of the EC cell. In a specific case, the second substrate has an area that is smaller than the area of the first substrate. An embodiment of the assembly also includes a conductive pad of a capacitive switch disposed on the second surface adjacent to said EC cell. A conductive pad of a capacitive switch may have an opening defined throughout the pad. The EC element further includes an electrically-conductive thin-film layer (such as a TCO layer) disposed over the peripheral ring and a thin-film stack containing a second electrically-conductive layer. In a specific embodiment, the annulus region of the assembly is located along a perimeter of the first surface and has an optically diffusive surface. In a related embodiment, the seal of the EC cell includes a non-conductive portion disposed circumferentially around a perimeter of the EC cell such as to face the EC medium and a conductive portion disposed outside of said non-conductive portion.

Embodiments of the invention additionally provide an EC element for use in a vehicular rearview assembly that includes a first optically transparent substrate (having a first surface corresponding to a front of the EC element, a second surfaces opposite the first surface, and a first edge surface connecting said first and second surfaces); a second optically transparent substrate (having a third surface, a fourth surface, and a second edge surface connecting said second and third surfaces); and a seal sealably affixing the second and third surfaces to one another and defining a perimeter of a cavity containing an EC medium between said surfaces. Embodiments additionally include a transparent electrode layer on the second surface of the EC element (including a first layer of electrically-conductive material and a ring-shaped layer of a spectral filter material disposed along a perimeter of the cavity and adjoining the first layer of electrically-conductive material and configured to substantially block the seal from at least visible and UV light incident through the first surface); and a reflective electrode layer including a second layer of electrically-conductive material on the third surface. Furthermore, embodiments additionally include a third layer of electrically-conductive material carried on at least one of the second, third, and fourth surfaces such as to have a projection, onto the second surface, that is adjacent to either of normal projections of the transparent electrode layer or the reflective electrode layer onto the second surface. Optionally, the second substrate may have an area that is smaller than an area of the first substrate, the first substrate may be configured to transversely extend beyond the second substrate such as to define a ledge along at least a portion of a perimeter of the second substrate, and the third electrically-conductive layer may be disposed on the ledge and include a layer of the ring-shaped spectral filter material. In a specific embodiment, the layer of the spectral material of the third electrically-conductive layer contains openings therethrough, and the third electrically-conductive layer additionally includes a layer of transparent electrically-conductive material. In particular, the layer of transparent electrically-conductive material of the third electrically conductive layer may include a TCO layer that is substantially co-extensive with the spectral filter material of the third electrically-conductive layer. In another specific embodiment, the EC element has an annulus region having a curvature with a radius of at least 2.5 mm and located along a perimeter of the first surface. Optionally, the annulus region has an optically diffusive surface.

Any embodiment of the EC element is generally configured in a vehicular rearview assembly that additionally contains a carrier having an extended portion disposed along the fourth surface of the EC element and a ridge portion extending substantially transversely to the extended portion along a perimeter thereof. In a specific embodiment, the ridge portion is characterized by a radius of curvature of at least 2.5 mm. The carrier may also include a step portion having a step surface configured to extend along the second surface of the EC element, where the step surface carries a fourth electrically-conductive layer disposed thereon and having a normal projection onto the second surface that is adjacent to either of normal projections of the transparent electrode or the reflective electrode onto the second surface. The step surface additionally carries a graphical layer disposed on top of the fourth electrically-conductive layer and including graphical indicia. The assembly additionally includes an auxiliary device selected from the group consisting of an illumination assembly, a display, a voice activated system, a compass system, a telephone system, a highway toll booth interface, a telemetry system, a headlight controller, a rain sensor, a tire pressure monitoring system, a navigation system, a lane departure warning system, and an adaptive cruise control system. A portion of the illumination assembly is configured to highlight the graphical layer and transmit light through the graphical indicia towards a field of view at the front of the assembly. In a specific embodiment, the second substrate has an area that is smaller than an area of the first substrate, the first substrate is configured to transversely extend beyond the second substrate such as to define a ledge along at least a portion of a perimeter of the second substrate, and the third electrically-conductive layer is disposed on said ledge. Moreover, the fourth electrically-conductive layer is, optionally, electrically extended, through a passage in the extended portion of the carrier to a circuitry at a back of the assembly so as to define a capacitive switch adapted to operate in response to an input applied to a front of the assembly.

Embodiments of the invention additionally provide a vehicular rearview assembly including (i) an electrochromic (EC) element (having first and second substrates where the first substrate includes first and second mutually opposing surfaces, corresponds to a front of the rearview assembly, and has a profile that is graded, in a peripheral region along a circumference of the first surface, with a radius of at least 2.5 mm); (ii) a second substrate (having third and fourth surfaces, the third surface having a reflective electrode thereon, the fourth surface corresponding to the back of the assembly, the second and third surfaces facing each other and mutually secured with a ring of seal material so as to define a cavity hosting an EC medium); and (iii) a carrier configured to support the EC element from its back and having an extended portion disposed along the fourth surface and a peripheral portion adapted to protrude transversely from the extended portion so as to accommodate said second substrate on an inboard side of the peripheral portion. The second surface of the EC element generally carries a thin-film stack that includes a transparent electrode and a peripheral ring of material configured to substantially conceal the seal from being visible from the front. In a specific embodiment, a transparent electrode include a TCO layer disposed on top of the peripheral ring. In a related specific embodiment, the second surface additionally includes a second layer of TCO disposed adjacently to the transparent electrode layer along a portion of a periphery of said second surface. At least one of the transparent and reflective electrodes is electrically extended to the back of the assembly through a conductive member. The peripheral portion defines a step that is substantially parallel to the second surface and that carries a patch of electrically-conductive layer electrically extended, through a passage in the extended portion, to a circuitry at the back of the assembly so as to define a capacitive switch adapted to operate in response to an input applied to the front of the assembly. The patch of the electrically-conductive material has a normal projection onto the second surface that is adjacent to either of normal projections of the transparent electrode or the reflective electrode on the same second surface. In one embodiment, the normal projection of the patch onto the second surface overlaps with the second layer of TCO. Optionally, the second layer of the TCO may be larger than an area of the patch of electrically-conductive material.

An embodiment of the assembly may additionally include (iv) a graphical layer carrying graphical indicia therein and disposed on top of the patch of electrically-conductive material; and (v) a source of light configured to highlight the graphical layer and transmit light through the graphical indicia towards a field of view at the front of the assembly. Additionally, an area of the first substrate may be larger than an area of the second substrate, and the first substrate may extend transversely beyond the second substrate such as to define a ledge, the light transmitted through said graphical indicia being observable through the ledge.

Embodiments of the invention also provide a vehicular rearview assembly having a front surface and including a housing system (with a casing defining an inner volume and an aperture, the aperture corresponding to the front of the assembly), an optical system (with a (i) mirror system having a substrate with a first surface and a transflective element disposed behind the first surface with respect to the front of the assembly; (ii) a first source of light positioned behind the transflective element and adapted to transmit light through the transflective element, the aperture of the casing, and the first surface to a field-of-view (FOV) at the front of the assembly), and first and second sensors. The optical system is structurally supported by the housing and at least partially disposed within the volume of the casing such as to have the first surface be unobstructingly observable from the front of the assembly. The first sensor is configured to activate, in response to a first user input, at least one auxiliary device chosen from a group consisting of an interior illumination assembly, a digital voice processing system, a power supply, a global positioning system, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a GPS device, a telecommunication system, a navigation aid, a lane departure warning system, an adaptive cruise control, a vision system, a rear vision system and a tunnel detection system of the assembly. The second sensor is configured to cause, in response to a second user input, locking of the operation of the first sensor.

In one embodiment, the first sensor includes a capacitive sensor having a first electrically-conductive pad disposed on a portion of the optical system. In a related embodiment, the second sensor includes a capacitive sensor having an electrically-conductive pad disposed on a surface of said casing behind said first surface. In particular, the first sensor may include a capacitive sensor having a first electrically-conductive pad disposed on a surface of the optical system, and the second sensor may includes a capacitive sensor having an electrically-conductive pad disposed on the same surface on a side of the first electrically-conductive pad. In one embodiment, the electrically-conductive pad of the second switch is spatially distributed on an inner portion of the housing system in electrical cooperation with electronic circuitry at the back of the assembly such as to cause locking of the operation of the first sensor in response to change in angular position of the assembly. In a specific embodiment, the second user input is configured to simultaneously activate said first and second sensors. In one embodiment, the second sensor includes an optical sensor.

In one embodiment, the optical system further includes an indicator configured to produce, in response to activation of the at least one auxiliary, an optical output observable from the front of the assembly; and optical means for backlighting said indicator with light from a second source of light within the assembly. Optionally, the optical means includes a light-pipe having input and output lightpipe ends, the output end adapted to couple light from the second source of light into the indicator. Optionally, the mirror system includes an optically-transparent ledge defined by two substrates that sandwich said transflective element therebetween, and optical system further includes optical indicia configured to be illuminated from a back of the assembly through the ledge and thereby uniquely identify the first sensor.

In one embodiment, the housing structure is characterized by an annular region around the perimeter thereof, the annular region having a radius of no less than 2.5 mm. Optionally, this annular region is an annular region around the perimeter of the first substrate.

In a specific embodiment, the first substrate of the mirror system includes a laminate of two lites of glass, and the first sensor includes an electrically-conductive pad between said two lites of glass, the electrically-conductive pad being electrically-extended through a connector to an electrical circuitry at a back of the assembly. An outer edge of the laminate is curved at a radius of no less than 2.5 mm around a perimeter of the laminate, and said connector adjoins the curved outer edge.

Embodiments of the invention further provide a vehicular rearview assembly having a front surface and including A housing system including a casing defining an inner volume and an aperture, the aperture corresponding to the front of the assembly;

An optical system having a mirror system (including (i) a substrate with a first surface and a transflective element disposed behind the first surface with respect to the front of the assembly, where the transflective element is characterized by transmittance that is variable in response to voltage applied to the transflective element; (ii) a reflective optical polarizer disposed across a surface of the transflective element; and (iii) a first source of light positioned behind the transflective element and adapted to transmit light through the transflective element, said reflective optical polarizer, the aperture, and the first surface to a field-of-view (FOV) at the front of the assembly. The reflective optical polarizer may include an optically-anisotropic plastic layer. The optical system is generally structurally supported by the housing and is at least partially disposed within the volume of the housing such as to have the first surface be unobstructingly observable from the front of the assembly; and First and second sensors, the first sensor configured to activate (in response to a first user input) an auxiliary device of the assembly, while the second sensor is configured to cause (in response to a second user input) locking of the operation of the first sensor for a period of time defined by the second user input.

In a specific embodiment, the mirror system of the assembly is configured to reflect ambient light, incident from said FOV, with efficiency of at least 55 percent. In a specific embodiment, the optical system of the assembly further comprises a second substrate having an extent smaller than that of the first substrate and coordinated with the first substrate such as to define a ledge a conductive layer disposed behind a pad of the first sensor.

Embodiments of the invention additionally provide a vehicular rearview assembly having a front and including (i) a housing shell having inner and outer surfaces, a rim defining an aperture of the housing shell, and an inner volume, (ii) a mirror element having an edge, and (iii) a mounting element. The mounting element is configured to cooperate with the mirror element to support the mirror element in the aperture and be mechanically engaged with the inner surface of the housing shell. The mounting element includes a plate portion made of a first material and substantially co-extensive with the mirror element, where the plate portion having through-openings and an edge surface; and a skirt portion made of a first elastic material and associated with the plate portion along a perimeter of the plate portion such as to define a band extending from the plate portion towards the mirror element. The band has a cross-sectional profile that provides flexibility such that, when the mounting element is mechanically engaged with the inner surface of the housing shell, the skirt portion is in contact with the inner surface of the housing shell and encircles at least a portion of the edge of the mirror element. The skirt portion is adapted to be compressed between the inner surface of the housing shell and the edge of the mirror element, and the plate portion includes first and second sections with a gap between these sections. The gap is spanned with a spring element made of at least one of the first material and a second elastic material. The mounting element additionally includes a first plug element made of a third elastic material and molded to the plate portion to block at least a portion of the opening through the plate portion. The mirror element of the assembly has a first surface unobstructingly observable from the front of the assembly. Such first surface optionally has an annular peripheral region having a curvature that is defined by a curvature radius. In one implementation, the curvature radius is at least 2.5 mm. Moreover, the mirror element contains a first thin-film stack on its second surface that is located behind the first surface as viewed from the front. Such first thin-film stack has an opaque optical thin-film ring of material that is disposed along a perimeter of said second surface and that has a peripheral ring width. An orthogonal projection of the curved annular peripheral region onto the second surface defines a projected area having a projected width. Generally, the projected with is larger than the peripheral ring width.

In a related embodiment, the mirror element includes an electrochromic (EC) element. Such EC element contains a second substrate having third and fourth surfaces and an edge surface connecting third and fourth surfaces. The second substrate is usually smaller than and disposed in a parallel and spaced-apart relationships with respect to the first substrate such as (i) to define a gap between the second and third surfaces; (ii) to define a transverse offset between the first and second substrates along at least a portion of perimeter of the EC mirror element, and (iii) to conceal a perimeter of the second substrate behind the first substrate as viewed from the front. The second substrate carries at least partially reflective coating on its surface. The EC element further includes a primary sealing material affixing the first and second substrate together along the perimeter of the EC mirror element, and an EC medium in the gap. In one embodiment, the edge of the EC element encircled by the skirt portion is an edge of the second substrate. Any implementation of the vehicular rearview assembly optionally contains a capacitive switch having a sensing electrode disposed behind or on said first substrate and adapted to be activated from the front of the assembly.

Embodiments further provide a vehicular rearview assembly that includes (i) a housing shell having inner and outer surfaces, a rim defining an aperture of the housing shell, and an inner volume (ii) a mirror element having a first substrate defined by a first surface corresponding to the front of the assembly and a second surface opposite the first surface. Here, the first surface is unobstructingly observable from the front of the assembly, and includes an annular peripheral region that has a curvature defined by a curvature radius (in one implementation, is at least 2.5 mm and, in another implementation, varies as a function of position across the annular peripheral region). The second surface contains a first thin-film stack that includes an opaque optical thin-film ring of material that is disposed along a perimeter of the second surface. The assembly further includes a mounting element configured to cooperate with the mirror element to support the mirror element in the aperture of the housing shell. The mounting element is additionally configured to be mechanically engaged with the inner surface of the housing shell, for example with the use of snap-on elements. The assembly additionally includes electronic circuitry disposed behind the mirror element in said assembly and a user interface operably connected to the electronic circuitry and containing indicia observable from the front of the assembly. The indicia is associated with at least one auxiliary device, and the electronic circuitry is operable to trigger, in response to an input applied to the user interface, such at least one auxiliary device. Furthermore, an orthogonal projection of the curved annular peripheral region of the first surface onto the second surface defines an annulus a width of which is larger than a width of the opaque thin-film ring. said ring width. Optionally, a ratio of the width of the opaque ring to the width of the annulus is at least about 0.6; preferably at least about 0.75; and even more preferably at least 0.9. In a specific embodiment, the width of the opaque ring is about 3.0 mm and said width of the annulus is about 3.5 mm.

Embodiments of the invention additionally provide a vehicular rearview assembly that includes a housing shell having inner and outer surfaces, a rim defining an aperture of the housing shell, and an inner volume and an electrochromic (EC) element. The EC element contains first and second substrates defining a gap (where the first substrate is larger than the second substrate and disposed in front it to define a ledge, with respect to the second substrate, that extends along a perimeter of the EC element). The second substrate has an edge surface. The EC element further includes first and second electrically-conductive layers disposed respectively on the first and second substrates to define corresponding electrodes of the EC element. Additionally, the assembly includes an electrical bus made, at least in part, of a conductive material adhered to an edge of a substrate of the EC element. The bus has a thickness between about 0.5 micron and 1,000 microns and a resistance, along a length of the bus, of less than about 5 Ohms. The bus is further electrically connected to the second electrically-conductive layer and a contact area that is associated with a surface of the second substrate that faces away from the front. The assembly further includes a circuit board with electronic circuitry thereon disposed behind the EC element and connected, through the electrical bus, with an electrode of the EC element. In such assembly, the first substrate has a first surface unobstructingly observable from the front of the assembly and a second surface opposite to the first surface. The first substrate is characterized by a curved annular peripheral region, observable from the front and having a curvature defined by a curvature radius of at least 2.5 mm. The first substrate further contains a thin-films stack, on its surface, and the stack includes an opaque thin-film ring of material disposed along a perimeter of the first substrate and having a ring width of no greater than about 5 mm. The EC element of such assembly is secured in the aperture of the housing shell.

In a specific implementation, such assembly may additionally include a mounting element configured to cooperate with said EC element to support the mirror element and to be mechanically engaged with the inner surface of the housing shell. The mounting element contains, in turn, (i) a plate portion made of a first material, which is substantially coextensive with the mirror element and which has throughout openings, and (ii) a skirt portion made of a first elastic material and associated with the plate portion along a perimeter thereof to define a band extending from the plate portion towards the mirror element. The band of the skirt portion has an (optionally non-uniform) cross-sectional profile that provides flexibility such that, when the mounting element is mechanically engaged with the inner surface of the housing shell, the skirt portion is in contact with the inner surface of the housing shell and encircles at least a portion of an edge of the EC element.

In a specific implementation, such assembly additionally includes a capacitive switch having a sensing electrode disposed behind or on said first substrate and adapted to be activated from the front, and at least one of a source of light, an illumination assembly, a digital voice processing system, a power supply, a global positioning system, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a telecommunication system, a navigation aid, a lane departure warning system, an adaptive cruise control, a vision system, a rear vision system, and a tunnel detection system.

Embodiments of the invention additionally provide a mounting element for mounting a mirror element in a vehicular rearview assembly having a housing shell (which housing shell includes a rim defining an aperture and an inner volume). The mounting element includes a first plate-like portion made of a first material (with an opening therethrough and an outer edge). Such portion is adapted to be mechanically engaged with the housing shell. The mounting element additionally includes a second portion made of a second material (which second portion contains a compressible band integrated with and around the outer edge to protrude therefrom, and at least one plug filling at least a portion of the opening through the first plate-like portion). The compressible band optionally has a non-uniform cross-section, and the second portion optionally includes a bridge connecting the pad and the band.

Embodiments additionally provide a mounting element for use with a vehicular rearview assembly (which assembly includes a mirror element having an electrically-conductive layer on its surface and electronic circuitry behind the mirror element as viewed from the front). Such mounting element contains at least (i) a housing shell having inner and outer surfaces, a rim defining an aperture of the housing shell corresponding to a front of the vehicular rearview assembly, and an inner volume, where the housing shell is configured to support the mirror element in said aperture; and (ii) an electrically-conductive member carried on the inner surface of the housing shell along the rim. The inner surface of the housing shell is configured to bring the electrically-conductive member into a contact with the electrically-conductive layer of the mirror element (optionally, along or even around the perimeter of the mirror element) when the housing shell and the mirror element are mated. The electrically-conductive member may include a tubular member. In a specific embodiment, the mirror element includes an electrochromic (EC) element having a first substrate and a second substrate disposed behind the first substrate such that a perimeter of the second substrate is not observable from the front of the assembly. The first substrate of the EC element may have, in its an annular peripheral region, an edge rounded a with a radius of at least 2.5 mm. The electrically-conductive member is optionally electrically extended, along the inner surface of the housing shell, to the electronic circuitry to define an electrical connection between the electronic circuitry and the electrically-conductive layer of the mirror element.

BRIEF DESCRIPTION OF THE DRAWINGS

FIG. 3B depicts an exploded view of an outside rearview mirror;

FIGS. 8(A-D) illustrate various modalities pertaining to embodiments of the invention.

FIG. 8A: electrical contacting modalities; FIGS. 8(B-D): embodiments of plug configurations.

FIGS. 10(A-C) provide illustrations related to another embodiment having an EC-element based mirror system with a rounded edge.

FIG. 17 illustrates an alternative embodiment with a user interface employing an optical reflective sensor.

FIGS. 18(A, B) show embodiments employing a user interface having an "on-glass" type of capacitive sensor.

FIGS. 20(C-G) show embodiments employing a user interface having a "through-bezel" type of a capacitive sensor or a field sensor.

FIG. 23 illustrates embodiments of a peripheral ring used with rearview assembly of the present invention. FIG. 23A: a single-band peripheral ring; FIG. 23B: a multi-band peripheral ring.

FIG. 24A shows a specific embodiment of a mirror system of the invention including a multi-band peripheral ring.

FIGS. 41 and 42 illustrate alternative embodiments implementing a capacitive switch in coordination with a composite substrate of the mirror system.

FIGS. 43 and 44 illustrate additional embodiments implementing a capacitive switch in coordination with a composite substrate of the mirror system.

FIGS. 45(A, B) show pairs of substrates cooperated to implement corresponding embodiments of the invention.

FIGS. 46(E-J) shows embodiments implementing capacitive switches and corresponding optical indicators.

FIGS. 52(A-D) illustrate several implementations of a lock-out switch.

FIG. 53 schematically shows positioning of optical indicators operably coordinated with a capacitive switch of an embodiment of the invention.

FIGS. 55(F, G) show an alternative embodiment of an electrical interconnect.

FIGS. 59(A-C) show schematically embodiments having transparent switch and/or switch area.

FIGS. 73A through 73D are diagrams depicting different embodiments of establishing an electrical communication with an electrode layer of an EC mirror element.

FIG. 74 is a diagram representing a layered structure of an embodiment of an electrical clip.

FIG. 75 is a diagram illustrating an embodiment of the electrical communication between components of the assembly.

FIG. 78 shows an exploded perspective view of portions of some of the elements of the embodiment of FIGS. 76, 77.

FIG. 79 is a diagrammatical cross-sectional view of an embodiment of the invention illustrating paths for electrical connectors.

FIG. 80 shows schematically an exploded view of an embodiment of an interior rearview assembly.

FIG. 81 shows a front perspective view of an embodiment of the hybrid carrier of the invention.

FIG. 82 is a front exploded view illustrating artificially separated co-molded components of the hybrid carrier of FIG. 81.

FIGS. 83A, 83B are exploded views illustrating artificially separated co-molded components of the hybrid carrier of FIG. 81.

FIG. 84 shows a back perspective view of an embodiment of the hybrid carrier of the invention.

FIGS. 85A, 85B are diagrams schematically illustrating another embodiment of a hybrid carrier of the invention containing a display boot.

FIG. 86A is a simplified exploded cross-sectional view of the assembly depicting the cooperation among some of the assembly components.

DETAILED DESCRIPTION

Figure 1:
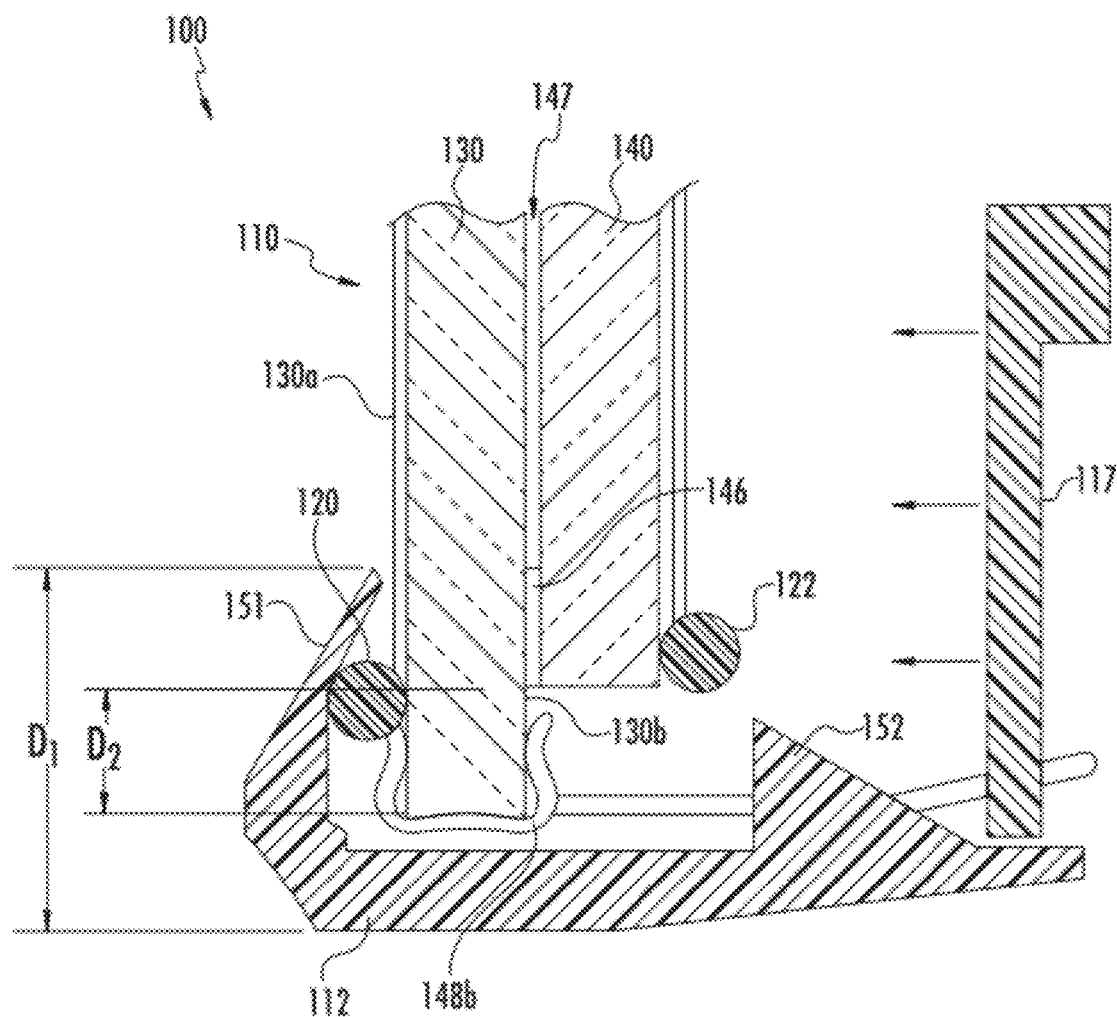
FIG. 1 is an enlarged cross-sectional view of a portion of the conventional EO mirror assembly.

As used in this description and the accompanying claims, the following terms shall have the meanings indicated, unless the context otherwise requires:

"Transflective" describes an optical element or component that has a useful non-zero level of transmittance and also has a useful, non-zero level of reflectance in a specified spectral region. For example, in the context of an image-forming reflector, such as a mirror for viewing reflected images, for example, the viewer in front of the mirror may not only observe an image of the ambient objects, formed in reflection from such transflective area but also receive information contained in the displayed image delivered with light from the light source located behind the transflective area of the mirror.

The spectrum of light reflected (and that of light transmitted) by an embodiment of the mirror system of the invention can be tuned or modified by adjusting the thickness of the reflectance-enhancing layers. The peak reflectance will vary with an optical design wavelength and this will result in a change in color gamut of the reflected (and transmitted) light. In discussing color distributions (i.e., spectra of light), it is useful to refer to the Commission Internationale de l'Eclairage's (CIE) 1976 CIELAB Chromaticity Diagram (commonly referred to the L*a*b* chart or quantification scheme). The technology of color is relatively complex, but a fairly comprehensive discussion is given by F. W. Billmeyer and M. Saltzman in *Principles of Color Technology, 2nd* Edition, J. Wiley and Sons Inc. (1981). The present disclosure, as it relates to color technology and uses appropriate terminology, generally follows that discussion. As used in this application, Y (sometimes also referred to as Cap Y), represents either the overall reflectance or the overall transmittance, depending on context. L*, a*, and b* can be used to characterize parameters of light in either transmission or reflection. According to the L*a*b* quantification scheme, L* represents brightness and is related to the eye-weighted value of either reflectance or transmittance (also known as normalized Y Tristimulus value) by the Y Tristimulus value of a white reference, Yref: $L^*=116^*(Y/Yref)-16$. The a*-parameter is a color coordinate that denotes the color gamut ranging from red (positive a*) to green (negative a*), and b* is a color coordinate that denotes the color gamut ranging from yellow and blue (positive and negative values of b*, respectively). For example, absorption spectra of an electrochromic medium, as measured at any particular voltage applied to the medium, may be converted to a three-number designation corresponding to a set of L*a*b* values. To calculate a set of color coordinates, such as L*a*b* values, from the spectral transmission or reflectance, two additional parameters are required. One is the spectral power distribution of the source or illuminant. The present disclosure uses CIE Standard Illuminant A to simulate light from automobile headlamps and uses CIE Standard Illuminant $D_{65}$ to simulate daylight. The second parameter is the spectral response of the observer. Many of the examples below refer to a (reflectance) value Y from the 1931 CIE Standard since it corresponds more closely to the spectral reflectance than L*. The value of "color magnitude", or C*, is defined as $C^*=\sqrt{(a^*)^2+(b^*)^2}$ and provides a measure for quantifying color neutrality. The metric of "color difference", or ΔC*, is defined as $\Delta C^*=\sqrt{(a^*-a^{*'})^2+(b^*-b^{*'})^2}$, where (a*, b*) and (a*',b*') describe color of light obtained in two different measurements. An additional CIELAB metric is defined as $\Delta E^*=(\Delta a^{*2}+\Delta b^{*2}+\Delta L^{*2})^{1/2}$. The color values described herein are based, unless stated otherwise, on the CIE Standard D65 illuminant and the 10-degree observer.

An optical element such as a mirror is said to be relatively color neutral in reflected light if the reflecting element is configured to have a corresponding C* less than, generally, 20. Preferably, however, a color-neutral optical element is characterized by the C* value of less than 15, and more preferably of less than about 10.

As broadly used and described herein, the reference to an electrode or a material layer as being "carried" on a surface of an element refers to such an electrode or layer that is disposed either directly on the surface of an underlying element or on another coating, layer or layers that are disposed directly on the surface of the element.

The terms "adjacent" and "adjacently" are generally defined as "being in close proximity to but without actually touching", in comparison with the terms "adjoining" and "adjoiningly" that are defined as "located next to another and being in contact at some point or line".

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and/or in reference to a figure, is intended to provide a complete description of all features of the invention.

In addition, the following disclosure may describe features of the invention with reference to corresponding drawings, in which like numbers represent the same or similar elements wherever possible. In the drawings, the depicted structural elements are generally not to scale, and certain components are enlarged relative to the other components for purposes of emphasis and understanding. The technically involved and detailed nature of vehicular rearview assembly and its subsystems, to which the present invention pertains, is such that reference to every and all elements of the assembly of it sub-system in each and every portion of the description is simply not possible. Accordingly, it is to be understood that no single drawing an no single, separately considered portion of the disclosure is intended to support a complete account and/or explanation of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, single features, structures, or characteristics of the invention described in reference to different drawings may be and are intended to be combined, within the scope of the invention, in any suitable manner in one or more embodiments.

For example, to simplify a particular drawing of an electro-optical device of the invention not all thin-film coatings or layers (whether electrically conductive, polarizing, reflective, or absorptive or other functional coatings such as alignment coatings or passivation coatings), electrical interconnections between or among various elements or coating layers, elements of structural support (such as holders, clips, supporting plates, or elements of housing, for example), or auxiliary devices (such as sensors or light sources, for example) may be depicted in a single drawing. It is understood, however, that practical implementations of discussed embodiments may contain some or all of these features and, therefore, such coatings, interconnections, structural support elements, or auxiliary devices are implied in a particular drawing, unless stated otherwise, as they may be required for proper operation of the particular embodiment.

Moreover, if the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown.

The invention as recited in claims appended to this disclosure is intended to be assessed in light of the disclosure as a whole, including features disclosed in prior art to which reference is made.

Numbering of Structural Surfaces.

In describing the order of elements or components in embodiments of a vehicular rearview assembly or a sub-set of a vehicular rearview assembly, the following convention will be generally followed herein, unless stated otherwise. The order in which the surfaces of sequentially positioned structural elements of the assembly (such as substrates made of glass or other translucent material) are viewed is the order in which these surfaces are referred to as the first surface (or surface I), the second surface (or surface II), the third surface (or surface III), and other surfaces (IV, V and so on), if present, are referred to in ascending order. Generally, therefore, surfaces of the structural elements (such as substrates) of an embodiment of the invention are numerically labeled starting with a surface that corresponds to the front portion of a rearview assembly and that is proximal to the observer or user of the assembly and ending with a surface that corresponds to the back portion of an assembly and that is distal to the user. Accordingly, the term "behind" refers to a position, in space, following something else and suggests that one element or thing is at the back of another as viewed from the front of the rearview assembly. Similarly, the term "in front of" refers to a forward place or position, with respect to a particular element as viewed from the front of the assembly.

The present disclosure refers to U.S. Pat. Nos. 4,902,108; 5,128,799; 5,151,824; 5,278,693; 5,280,380; 5,282,077; 5,294,376; 5,336,448; 5,448,397; 5,679,283; 5,682,267; 5,689,370; 5,742,026; 5,803,579; 5,808,778; 5,818,625; 5,825,527; 5,837,994; 5,888,431; 5,923,027; 5,923,457; 5,928,572; 5,940,201; 5,956,012; 5,990,469; 5,998,617; 6,002,511; 6,008,486; 6,020,987; 6,023,040; 6,023,229; 6,037,471; 6,043,452; 6,049,171; 6,057,956; 6,062,920; 6,064,509; 6,084,700; 6,102,546; 6,111,683; 6,111,684; 6,129,507; 6,130,421; 6,130,448; 6,132,072; 6,140,933; 6,166,848; 6,170,956; 6,188,505; 6,193,378; 6,193,912; 6,195,194; 6,222,177; 6,224,716; 6,229,435; 6,238,898; 6,239,898; 6,244,716; 6,246,507; 6,247,819; 6,249,369; 6,255,639; 6,262,831; 6,262,832; 6,268,950; 6,281,632; 6,291,812; 6,313,457; 6,335,548; 6,356,376; 6,359,274; 6,379,013; 6,392,783; 6,399,049; 6,402,328; 6,403,942; 6,407,468; 6,420,800; 6,426,485; 6,429,594; 6,441,943; 6,465,963; 6,469,739; 6,471,362; 6,504,142; 6,512,624; 6,521,916; 6,523,976; 6,471,362; 6,477,123; 6,521,916; 6,545,794; 6,587,573; 6,614,579; 6,635,194; 6,650,457; 6,657,767; 6,774,988; 6,816,297; 6,861,809; 6,968,273; 6,700,692; 7,064,882; 7,287,868; 7,324,261; 7,342,707; 7,417,717; 7,592,563; 7,663,798; 7,688,495; 7,706,046; 7,817,020 and D410,607. The present application also refers to the International Patent Applications Nos. PCT/WO97/EP498; PCT/WO98/EP3862, U.S. Patent Applications Nos. 60/360,723; 60/404,879; Ser. Nos. 11/682,121; 11/713,849; 11/833,701; 12/138,206; 12/154,824; 12/370,909; 12/563,917; 12/496,620; 12/629,757; 12/686,019; 12/774,721; 13/271,745; and U.S. Provisional Patent Applications Nos. 61/392,119 filed on Oct. 12, 2010, 61/510,405 filed on Jul. 21, 2012, 61/515,190 filed on Aug. 4, 2011, and 61/590,259 filed on Jan. 24, 2012. The disclosure of each of the abovementioned patent documents is incorporated herein by reference in its entirety. These patent documents may be referred to herein as "Our Prior applications".

Figure 2:
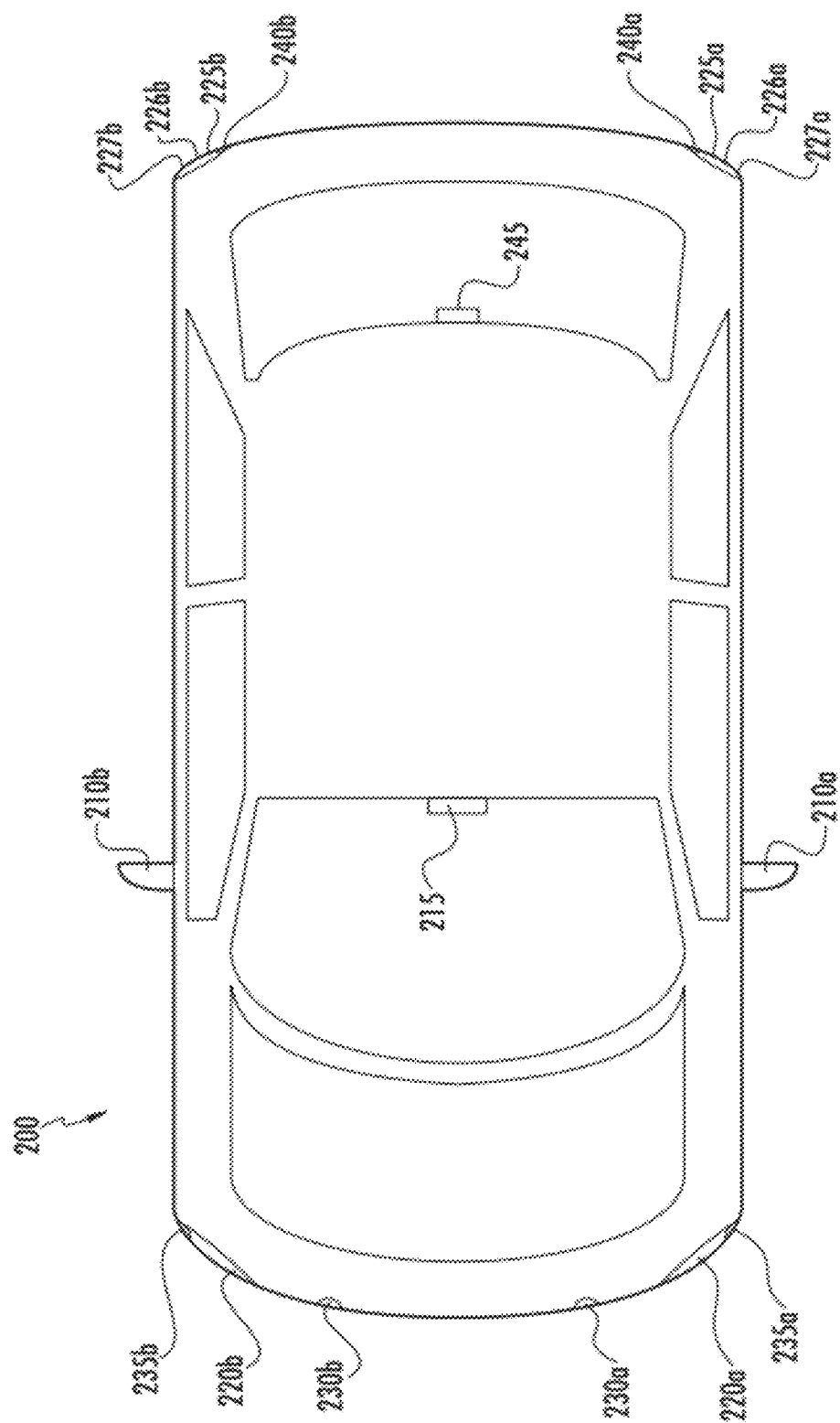
FIG. 2 depicts a controlled vehicle.

Although EC-elements for use in vehicular mirror systems and rearview assemblies incorporating such elements and systems have been taught in detail in Our Prior applications, the following provides an overview of subject matter sufficient to build upon when considering embodiments of the present invention. Referring initially to FIG. 2, there is shown a controlled vehicle 200 having a driver's side outside rearview mirror 210a, a passenger's side outside rearview mirror 210b and an inside rearview mirror 215. Details of these and other features will be described herein. Preferably, the controlled vehicle comprises an inside rearview mirror of unit magnification. A unit magnification mirror, as used herein, refers to a mirror with a plane or flat reflective element producing an image having perceived angular and linear sizes equal to those of the object. Deviations from unit magnification resulting from conventional processing of components of an inside rearview mirror and ways of reducing or eliminating such deviations have been addressed, e.g., in U.S. U.S. Pat. No. 7,688,495, the teachings of which include modified thin-film deposition techniques resulting in reduced warp of a mirror substrate upon a surface of which a transparent layer of conductive oxide has been disposed. A prismatic day-night adjustment rearview mirror which in at least one associated position provides unit magnification is considered to be a unit magnification mirror. Preferably, each outside mirror comprises not less than 126 cm of reflective surface and is located so as to provide the driver a view to the rear along an associated side of the controlled vehicle. Preferably, the average reflectance of any mirror, as determined in accordance with SAE Recommended Practice J964, OCT84, is at least 35 percent (40 percent for many European Countries). In embodiments where the mirror element is capable of operating at multiple reflectance levels, the minimum reflectance level in the day mode shall be at least 35 percent (40 percent when mirror is fabricated according to European standards) and the minimum reflectance level in the night mode shall be at least 4 percent.

With further reference to FIG. 2, the controlled vehicle 200 may comprise a variety of exterior lights, such as, headlight assemblies 220a, 220b; foul condition lights 230a, 230b; front turn-signal indicators 235a, 235b; taillight assembly 225a, 225b; rear turn signal indicators 226a, 226b; rear emergency flashers 227a, 227b; backup lights 240a, 240b and center high-mounted stop light (CHMSL) 245.

As described in detail herein, the controlled vehicle may comprise at least one control system incorporating various components that provide and/or perform shared functions with other vehicle equipment. For example of one control system described herein integrates various components associated with automatic control of the reflectivity of at least one rearview mirror element and automatic control of at least one exterior light. Such systems may comprise at least one image sensor within a rearview mirror, an A-pillar, a B-pillar, a C-pillar, a CHMSL or elsewhere within or upon the controlled vehicle. Images acquired, or portions thereof, by a sensor may be used for automatic vehicle equipment control. Images, or portions thereof, may alternatively or additionally be displayed on one or more displays. At least one display may be covertly positioned behind a transflective, or at least partially transmissive, electro-optic element. A common controller may be configured to generate at least one mirror element drive signal and at least one other equipment control signal.

Exterior and Interior Rearview Assemblies.

Figure 3A:
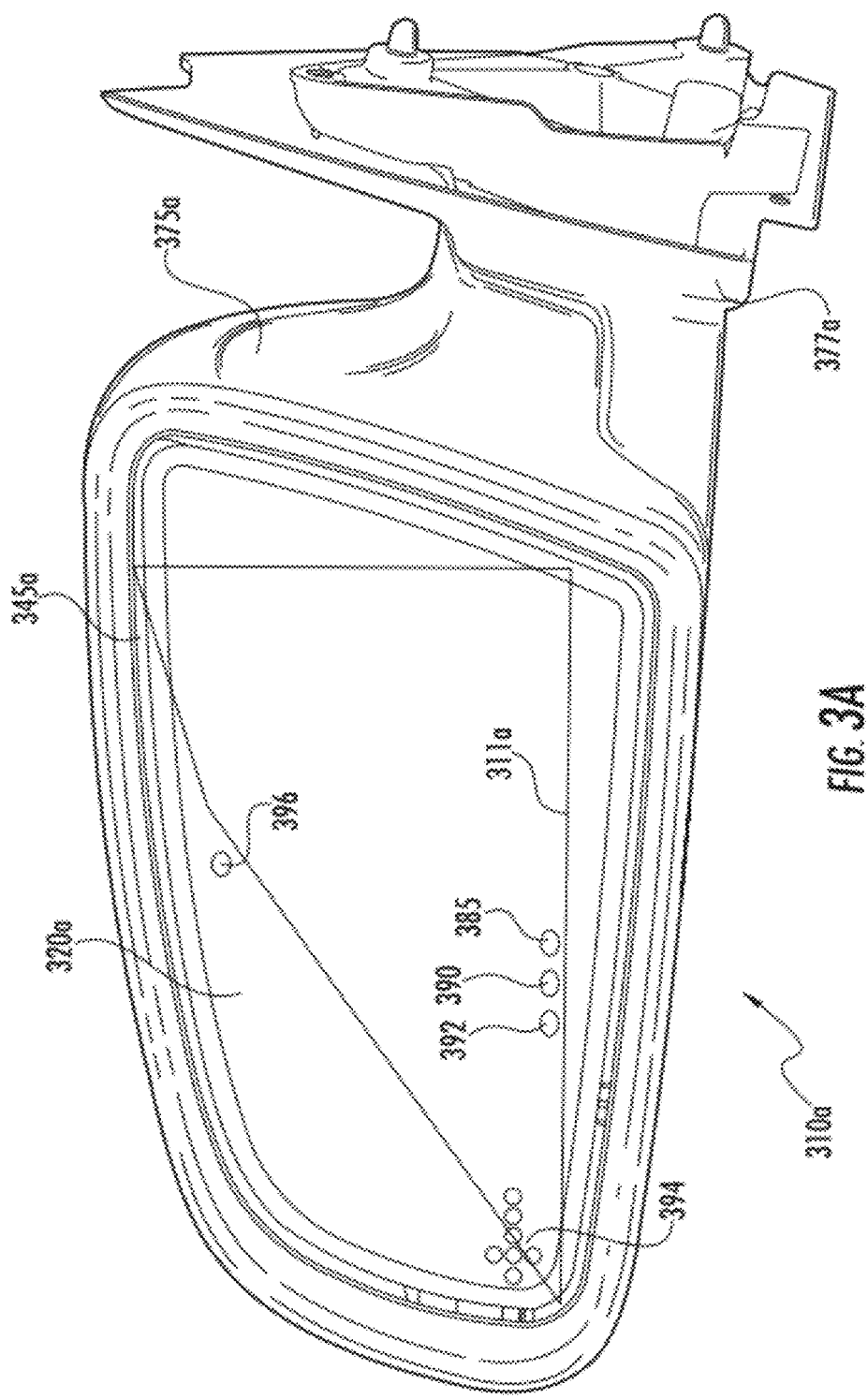
FIG. 3A depicts an assembly incorporating an electro-optic element.

Turning now to FIGS. 3a and 3b, various components of a typical outside (or exterior) rearview mirror assembly 310a, 310b are depicted. An EO mirror element may comprise a first substrate 320a, 320b secured in a spaced apart relationship with a second substrate 325 via a primary seal 330 to form a chamber there between. At least a portion of the primary seal is left void to form at least one chamber fill port 335. An EO medium is enclosed in the chamber and the fill port(s) are sealingly closed via a plug material 340. Preferably, the plug material is a UV-curable epoxy or acrylic material. Also shown is a spectral filter material 345a, 345b located near the periphery of the element. Generally, this optical thin-film spectral filter material 345a, 345b is circumferentially disposed in a peripheral area, next to a corresponding perimeter-defining edge, of either of the first and the second surface of the system, and is configured as a ring. Such ring of the spectral filter material is interchangeably referred to herein as a peripheral ring. The electrical clips 350, 355 are preferably secured to the element, respectively, via first adhesive material 351, 352. The element is secured to a carrier plate 360 via second adhesive material 365. Electrical connections from the outside rearview mirror to other components of the controlled vehicle are preferably made via a connector 370. The carrier is attached to an associated housing mount 376 via a positioner 380. Preferably, the housing mount is engaged with a housing 375a, 375b and secured via at least one fastener 376b. Preferably, the housing mount comprises a swivel portion configured to engage a swivel mount 377a, 377b. The swivel mount is preferably configured to engage a vehicle mount 378 via at least one fastener 378b. Additional details of these components, additional components, their interconnections and operation are discussed below.

With further reference to FIG. 3a, the outside rearview mirror assembly 310a is oriented such that a view of the first substrate 320a is shown with the spectral filter material 345a positioned between the viewer and the primary seal material (not shown). A blind spot indicator 385, a keyhole illuminator 390, a puddle light 392, a turn signal 394, a photo sensor 396, any one thereof, a subcombination thereof or a combination thereof may be incorporated within the rearview mirror assembly such that they are positioned behind the mirror element with respect to the viewer. Preferably, the devices 385, 390, 392, 394, 396 are configured in combination with the mirror element to be at least partially covert as discussed in detail within various references incorporated by reference herein. Additional details of these components, additional components, their interconnections and operation are further discussed in reference to FIG. 65, below.

Figure 4:
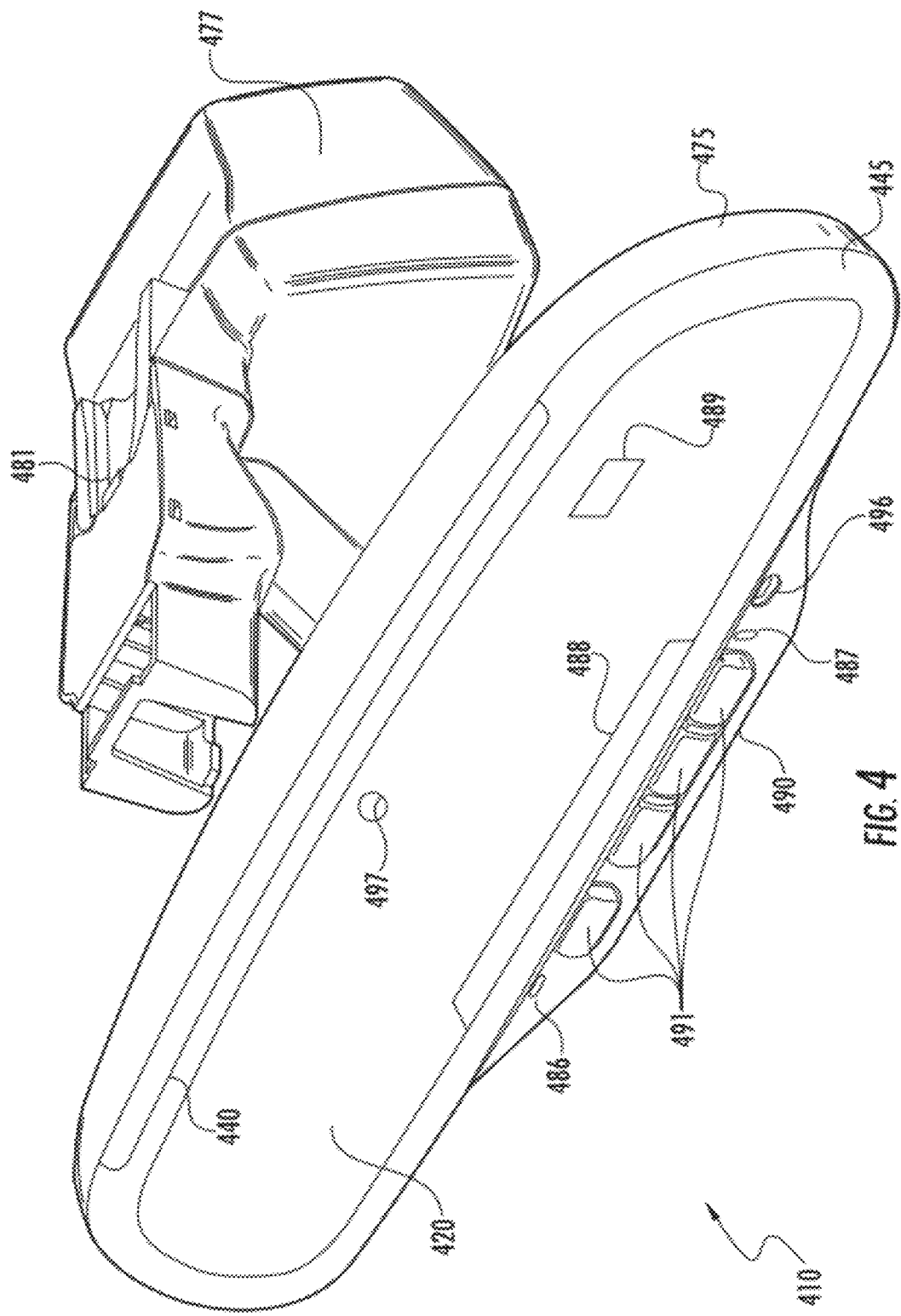
FIG. 4 depicts an inside rearview mirror assembly incorporating an electro-optic element.

Turning now to FIG. 4, there is shown an inside (or interior) rearview mirror assembly 410, as viewed when looking at the first substrate 420, with a spectral filter material or peripheral ring 445 positioned between the viewer and a primary seal material (not shown). The mirror element is shown to be positioned within a movable housing 475 and combined with a stationary housing 477 on a mounting structure 481. The mirror housing 477 (which may include a bezel portion) supports not only opto-electronic components and devices such as a reflective element and an information display, but various assembly function actuators such as button and keys. Commonly assigned U.S. Pat. Nos. 6,102,546; D 410,607; 6,407,468; 6,420,800; and U.S. patent application Ser. No. 09/687,743, the disclosures of which are incorporated in their entireties herein by reference, describe various bezels, cases, and associated button constructions for use with the present invention. Examples of mounting structures such as structures having means for angular alignment of the mirror element with respect to the viewer (such as a ball-and-socket pivoting mechanism) are disclosed in, for example, the commonly-assigned U.S. patent application Ser. No. 12/832,838.

A first indicator 486, a second indicator 487, operator interfaces 491 and a first photo sensor 496 are positioned in a chin portion 490 of the movable housing. Operator interfaces 491 are configured to control any of functional systems or modalities of the assembly such as, for example, an illumination assembly, a display, mirror reflectivity, a voice-activated system, a compass system, a telephone system, a highway toll booth interface, a telemetry system, a headlight controller, and a rain sensor, to name just a few. Generally, however, operator interfaces 491 can be incorporated anywhere in the associated vehicle, for example, in the mirror case, accessory module, instrument panel, overhead console, dashboard, seats, center console. Some of the operator interfaces 491 may include a switch (not shown) such as a proximity switch, for example. Suitable switches for use with the present invention are described in detail in commonly assigned U.S. Pat. Nos. 6,407,468 and 6,420,800, 6,471,362, 6,614,579, 6,614,579, the disclosures of which are incorporated in their entireties herein by reference. Various indicators for use with the present invention that attest to the status of any of the functional systems or modalities of the assembly are described in commonly assigned U.S. Pat. Nos. 5,803, 579, 6,335,548, and 6,521,916, the disclosures of which are incorporated in their entireties herein by reference.

A first information display 488, a second information display 489 and a second photo sensor 497 are incorporated within the assembly behind the mirror element with respect to the viewer. As described with regard to the outside rearview mirror assembly, it is preferable to have devices 488, 489, 497 at least partially covert. For example, a "window" may be formed in third and/or fourth surface coatings of the associated mirror element and configured to provide a layer of a platinum group metal (PGM) (i.e. iridium, osmium, palladium, platinum, rhodium, and ruthenium) only on the third surface. Thereby, light rays impinging upon the associated "covert" photo sensor "glare" will first pass through the first surface stack, if any, the first substrate, the second surface stack, the electro-optic medium, the platinum group metal and, finally, the second substrate. The platinum group metal functions to impart continuity in the third surface conductive electrode, thereby reducing electro-optic medium coloring variations associated with the window.

The rearview assembly 410 may additionally include at least one illumination assembly (not shown) that preferably comprises a reflector, a lens, and an illuminator (not shown). Most preferably there are two illumination assemblies with one generally positioned to illuminate a front passenger seat area and the second generally positioned to illuminate a driver seat area. There may be only one or may be additional illuminator assemblies such as one to illuminate a center console area, overhead console area, or an area between the front seats, for example. Various illumination assemblies and illuminators for use with the present invention are described in commonly assigned U.S. Pat. Nos. 5,803,579, 6,335,548, and 6,521,916, the disclosures of which are incorporated in their entireties herein by reference.

The rearview assembly 410 may additionally include at least one or more light sensors, the preferred embodiments of which are described in detail in commonly assigned U.S. Pat. Nos. 5,923,027 and 6,313,457, the disclosures of which are incorporated in their entireties herein by reference. For example, the glare sensor and/or ambient sensor automatically control the reflectivity of a self-dimming reflective element as well as the intensity of information displays and/or backlighting. The glare sensor is used to sense headlights of trailing vehicles and the ambient sensor is used to detect the ambient lighting conditions that the system is operating within. In another embodiment, a sky sensor may be incorporated positioned to detect light levels generally above and in front of an associated vehicle, the sky sensor may be used to automatically control the reflectivity of a self-dimming element, the exterior lights of a controlled vehicle and/or the intensity of information displays.

Figure 5:
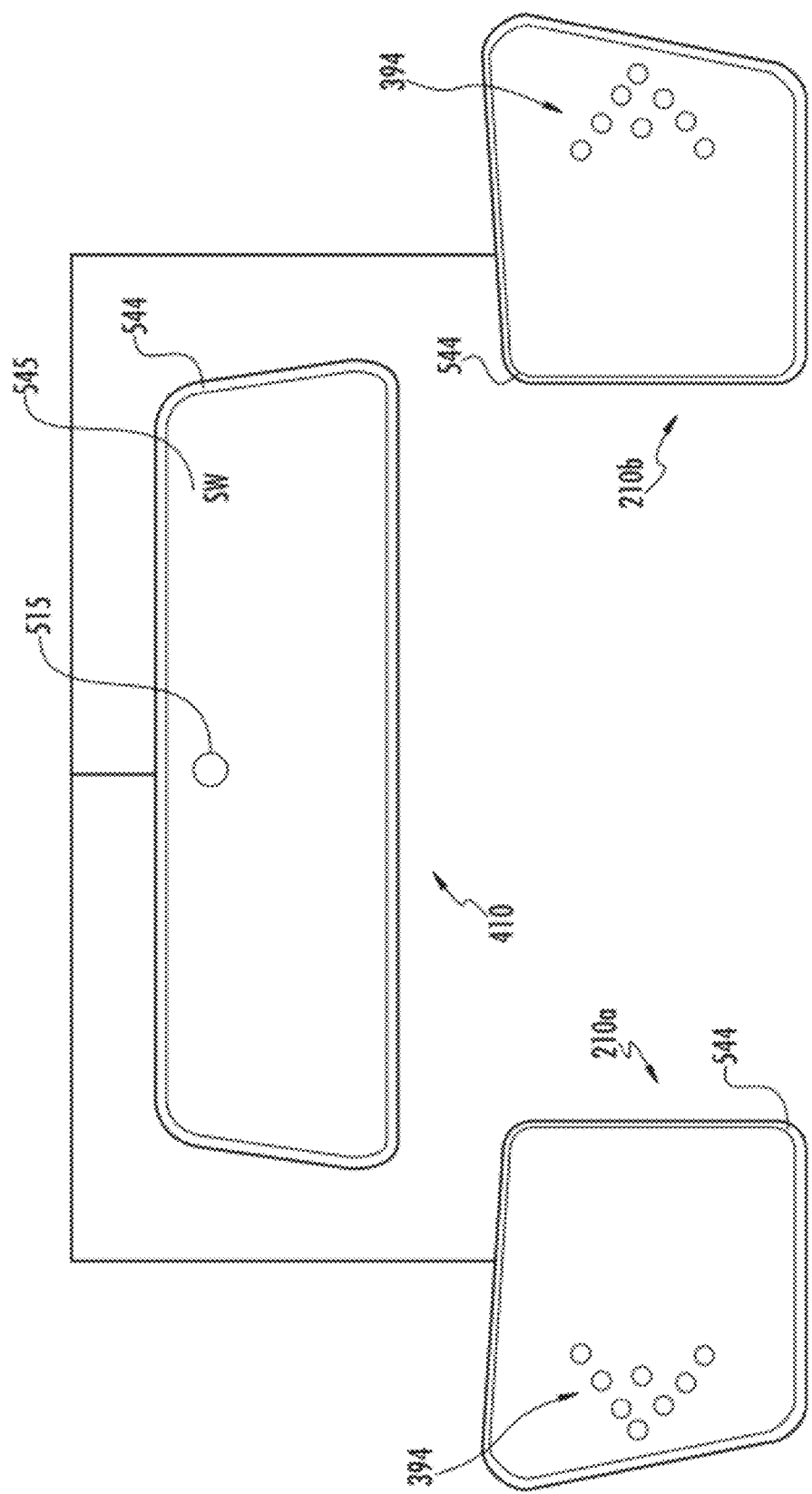
FIG. 5 is a front elevational view schematically illustrating a rearview mirror system constructed in accordance with the present invention.

FIG. 5 shows a front elevational view schematically illustrating an interior mirror assembly 510 and two exterior rearview mirror assemblies 210a and 210b for the driver side and passenger side, respectively, all of which are adapted to be installed on a motor vehicle in a conventional manner to face the rear of the vehicle and can be viewed by the driver of the vehicle to provide a rearward view. As mentioned above, the interior rearview assembly 410 and exterior rearview assemblies 210a and 210b may incorporate light-sensing electronic circuitry of the type illustrated and described in the Canadian Patent No. 1,300,945, U.S. Pat. No. 5,204,778, U.S. Pat. No. 5,451,822, U.S. Pat. No. 6,402,328, or U.S. Pat. No. 6,386,713 and other circuits capable of sensing glare and ambient light and supplying a drive voltage to the electro-optic element. The disclosure of each of these patent documents is incorporated herein by reference in its entirety.

Rearview assemblies 410, 210a, and 210b are essentially similar in that like numbers identify components of the inside and outside mirrors. These components may be slightly different in configuration, but they function in substantially the same manner and obtain substantially the same results as similarly numbered components. For example, f the front glass element of inside rearview assembly 410 is generally longer and narrower than outside rearview assemblies 210a and 210b. There are also some different performance standards that apply to inside assembly 410 as compared with outside assemblies 210a and 210b. For example, a mirror of the inside assembly 410 generally, when fully cleared, should have a reflectance value of about 55 percent to about 85 percent or even higher, whereas the outside mirrors often have a reflectance of about 40 percent to about 65 percent. Also, in the United States (as supplied by the automobile manufacturers), a mirror of the passenger-side assembly 210b typically has a spherically bent or convex shape, whereas a mirror of the driver-side assembly 210a and a mirror of the inside assembly 410 are presently required to be flat. In Europe, a mirror of the driver-side assembly 210a is commonly flat or aspheric, whereas a mirror of the passenger-side assembly 210b has a convex shape. In Japan, both outside mirrors typically have a convex shape. While the focus of the invention is generally towards exterior mirrors, the following description is generally applicable to all mirror assemblies of the present invention including inside mirror assemblies. Moreover, certain aspects of the present invention may be implemented in electro-optic elements used in other applications such as architectural windows, or the like, or even in other forms of electro-optic devices.

An embodiment of a rearview mirror of the present invention may include a housing having a bezel 544, which extends around the entire periphery of each of individual assemblies 410, 210a, and/or 210b (or at least a portion of the periphery) and structurally supports an edge surface of an optical element of a corresponding assembly. However, as discussed below, the scope of the present invention also includes embodiments having no bezel. When present, a front lip of the bezel 544 that extends onto the first surface of the optical element visually conceals and protects the bus connector and the seal. A wide variety of bezel designs are well known in the art, such as, for example, the bezel taught and claimed in above-referenced U.S. Pat. No. 5,448,397.

Figure 6:
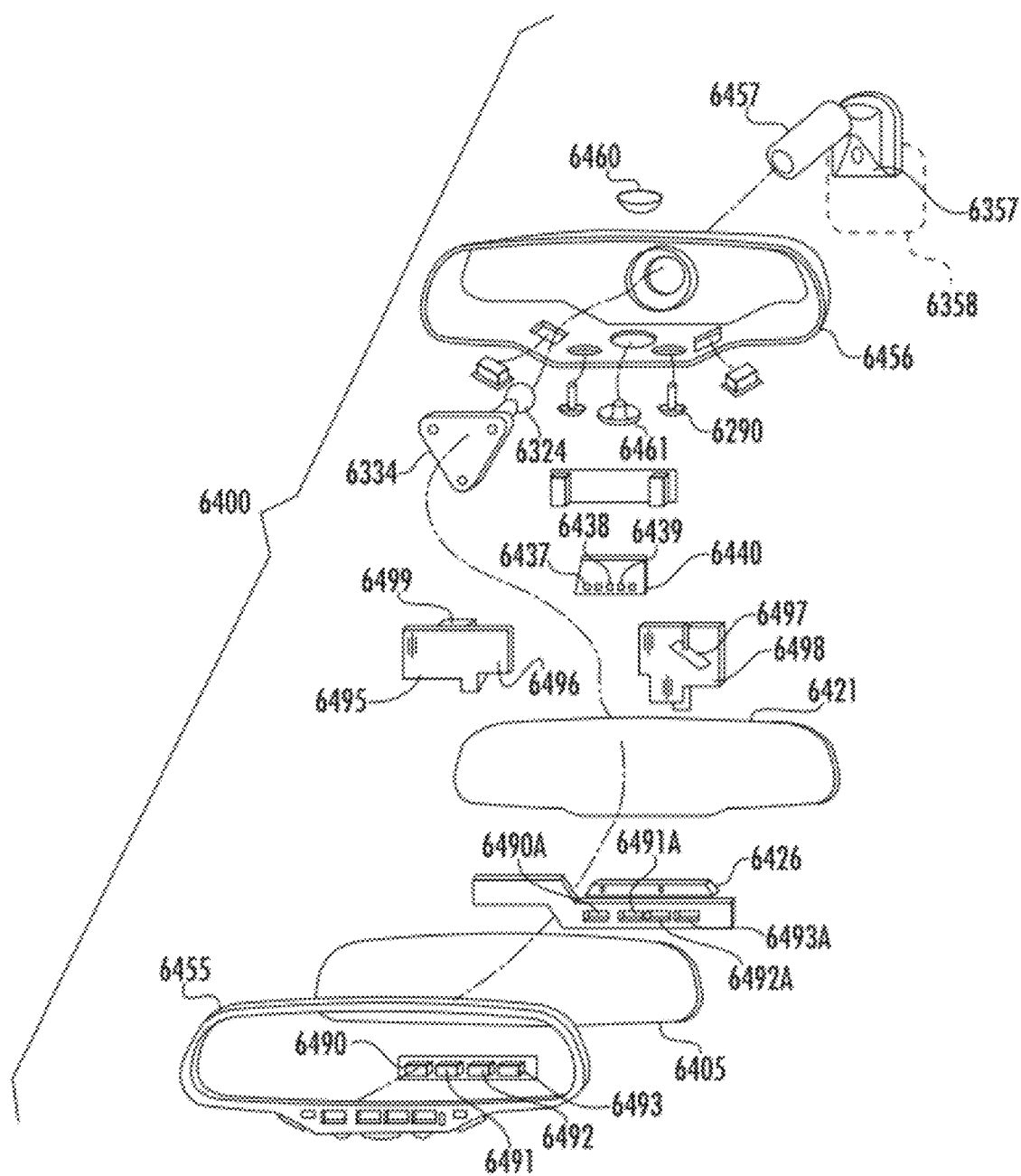
FIG. 6 depicts an exploded view of an interior rearview mirror assembly.

FIG. 6 illustrates, as an example, an exploded view 6400 of the interior rearview assembly. As shown, the mirror assembly comprises a reflective element 6405 within a bezel 6455 and a mirror casing 6456. Bezel 6455 can be adapted to be like any of bezels taught in Our Prior applications, for example in U.S. patent Ser. Nos. 11/066,903 and 10/430,885. A mirror mount 6457 is included for mounting the mirror assembly within a vehicle. It should be understood that a host of accessories may be incorporated into the mount 6457 and/or onto the plate frame carrier 6421 in addition to a power pack adjuster, such as a rain sensor, a camera, a headlight control, an additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays.

The mirror assembly is shown in FIG. 6 to further comprise third information display 6426 with a third information display backlighting elements 6437, 6438, 6439; first and second microphones 6460, 6461; and includes other known options and elements such as a first reflector with a first lens; a second reflector with a second lens; a glare sensor; an ambient light sensor; first, second, third, and fourth operator interfaces 6490, 6491, 6492, 6493 with first, second, third, and fourth operator interface backlighting 6490a, 6491a, 6492a, 6493a; a circuit board 6495 having a compass sensor module 6499; and a daughter board 6498 with an input/output bus interface 6497.

Preferably, the illumination assemblies with associated light source(s) of the assembly are constructed in accordance with the teachings of commonly assigned U.S. Pat. Nos. 5,803,579 and 6,335,548, as well as U.S. patent application Ser. No. 09/835,278, the disclosures of which are incorporated in their entireties herein by reference.

Preferably, the glare light sensor and the ambient light sensor are active light sensors as described in commonly assigned U.S. Pat. Nos. 6,359,274 and 6,402,328, the disclosures of which are incorporated in their entireties herein by reference. The electrical output signal from either or both of the sensors may be used as inputs to a controller on the circuit board 6440 or 6495 to control the reflectivity of reflective element 6405 and/or the intensity of third information display backlighting. The details of various control circuits for use herewith are described in commonly assigned U.S. Pat. Nos. 5,956,012; 6,084,700; 6,222,177; 6,224,716; 6,247,819; 6,249,369; 6,392,783; and 6,402,328, the disclosures of which are incorporated in their entireties herein by reference.

Although the compass (sensor) module 6499 of the embodiment 6505 is shown to be mounted circuit board 6495 in FIG. 6, it should be understood that the sensor module may be located within mount 6457, an accessory module 6458 positioned proximate mirror assembly 6400 or at any location within an associated vehicle such as under a dashboard, in an overhead console, a center console, a trunk, an engine compartment, etc. Commonly assigned U.S. Pat. Nos. 6,023,229, 6,140,933, and 6,968,273 as well as a commonly assigned U.S. Patent Application 60/360,723, the disclosure of each of which is incorporated in its entirety herein by reference, described in detail various compass systems for use with the present invention.

Daughter board 6498 is in operational communication with the circuit board 6495. The circuit board 6495 may comprise a controller 6496, such as a microprocessor, and a daughter board 6498 may comprise an information display. The microprocessor may be programmed, for example, to receive signal(s) from the compass sensor module 6499 and process the signal(s) and transmit signal(s) to the daughter board to control a display to indicate the corresponding vehicle heading. As described herein and within documents incorporated by reference herein, the controller may be adapted to receive signal(s) from light sensor(s), rains sensor(s) (not shown), automatic vehicle exterior light controller(s) (not shown), microphone(s), global positioning systems (not shown), telecommunication systems (not shown), operator interface(s), and a host of other devices, and control the information display(s) to provide appropriate visual indications.

The controller 6496 (or controllers) may be adapted, at least in part, control the mirror reflectivity, exterior lights, rain sensor, compass, information displays, windshield wipers, heater, defroster, defogger, air conditioning, telemetry systems, voice recognition systems such as digital signal processor-based voice-actuation systems, and vehicle speed. The controller 6496 (or controllers) may receive signals from switches and/or sensors associated with any of the devices described herein and in the references incorporated by reference herein to automatically manipulate any other device described herein or described in the references included by reference. The controller 6496 may be, at least in part, located outside of the mirror assembly, or may include a second controller elsewhere in the vehicle or additional controllers throughout the vehicle. The individual processors may be configured to communicate serially, in parallel, via Bluetooth protocol, wireless communication, over the vehicle bus, over a CAN bus or any other suitable communication.

Exterior light control systems as described in commonly assigned U.S. Pat. Nos. 5,990,469; 6,008,486; 6,130,421; 6,130,448; 6,255,639; 6,049,171; 5,837,994; 6,403,942; 6,281,632; 6,291,812; 6,469,739; 6,399,049; 6,465,963; 6,587,573; 6,429,594; 6,379,013; 6,871,809; 6,774,988 and U.S. patent application Ser. Nos. 09/847,197; and 60/404,879, the disclosures of which are incorporated in their entireties herein by reference, may be incorporated in accordance with the present invention.

Moisture sensors and windshield fog detector systems are described in commonly assigned U.S. Pat. Nos. 5,923,027 and 6,313,457, the disclosures of which are incorporated in their entireties herein by reference. Commonly assigned U.S. Pat. No. 6,262,831, the disclosure of which is incorporated herein by reference in its entirety, describes power supplies for use with the present invention.

It is contemplated that the present invention would be useful in inside or outside rearview mirrors having electro-optic mirror elements, prismatic elements, convex mirror elements, aspheric mirror elements, planar mirror elements, non-planar mirror elements, hydrophilic mirror elements, hydrophobic mirror elements, and mirror elements having third surface and fourth surface reflectors. It is further contemplated that the present invention will be useful with mirrors that are transflective, or that have a third or fourth surface mirror element with patterns of lines (sometimes referred to as "jail bars") thereon to optimize the effect of visible light. Further, the present invention is useful with mirrors having first surface or fourth surface heaters, anti-scratch layers, and circuit boards including flexible circuit boards, and circuit board and heater combinations, such as heaters having embedded or integrated non-heater functions such as signal ellipses and signal diffusants, locating holes or windows for light pass-through. The present invention is also useful with potted or snap-attached or elastomeric bezels, and useful with carriers having an ultra-flat front surface. Also, additional options can be integrated into the mirrors including signal lighting, key lights, radar distance detectors, puddle lights, information displays, light sensors and indicator and warning lighting, retainers with living hinges, and integrated housings for receiving and supporting said components. Still further, it is conceived that the mirror of an embodiment of the invention can include a manually folding or power folding mirrors, extendable mirrors, and mirrors with a wide field of view, and with information on the mirror such as "object in mirror is closer than may appear" or other indicia, such as "heated" or "auto-dim". Still further, the present invention is useful with a blue glass mirror or "blue chemical" darkening mirror. Still further, in some circumstances as discussed below it can be advantageous to employ, in specific implementations of the invention, an electrochromic mirror subassembly with front and rear glass mirror elements with edges having a "zero offset" (such as, for example, a transverse offset between the front and rear substrates of a mirror element—that includes spatial deviation from perfect alignment of edges of the substrates—of less than an average of about 1 mm, and more preferably less than about 0.5 mm), an edge seal, including clear reflective or opaque edge seals, and/or second surface chrome or a chrome bezel. Generally, however, the rear glass element of an EC mirror subassembly is be smaller than the front glass element and disposed such as to be concealed behind the front element as viewed from the front of the assembly and/or from the first surface of the mirror subassembly. In a specific embodiment, the circumference of the rear glass element is smaller than that of the front glass element. In another specific case, the bigger front glass substrate of the mirror element forms a ledge over an edge of the smaller rear substrate positioned behind the front substrate.

Although the present invention is further generally described as being used in connection with EC devices such as mirrors and architectural windows, those skilled in the art will understand that various aspects of the present invention may be employed in the construction of other electro-optic devices or devices including a prismatic element.

It is appreciated that a typical exterior rearview assembly (such as that of FIGS. 3A, 3B) may contain substantially the same auxiliary devices as those described in reference to FIGS. 4 and 6. Details of the housing/casing of an example of exterior rearview assembly are taught in, for example, U.S. patent application Ser. No. 12/832,838 and may comprise an attachment member and a telescoping extension having a single arm with a linear actuator for extending and retracting the telescoping extension from within the associated vehicle. The telescoping extension may be additionally configured such that the housing may be folded inward toward the associated vehicle and outward away from the associated vehicle. Various positioners and carriers that providing a secure structure for supporting and moving of the associated reflective element are described in U.S. Pat. Nos. 6,195,194 and 6,239,899, the disclosures of which are incorporated herein in their entireties by reference. In at least one embodiment, an exterior rearview mirror assembly is provided with a heater for improving the operation of the device and for melting frozen precipitation that may be present. Examples of various heaters are disclosed in U.S. Pat. Nos. 5,151,824, 6,244,716, 6,426,485, 6,441,943 and 6,356,376, the disclosures of each of these patents are incorporated in their entireties herein by reference.

In at least one embodiment, either an external or an internal rearview assembly is equipped with an electrical circuitry comprising a light source such as a turn signal light, a keyhole illuminator, or an outside door area illuminator, as taught in U.S. Pat. No. 6,441,943, the entire disclosure of which is incorporated in its entirety herein by reference, an information display, an antenna, a transceiver, a reflective element control, an outside mirror communication system, a remote keyless entry system, proximity sensors, and interfaces for other apparatus described herein. U.S. Pat. Nos. 6,244,716, 6,523,976, 6,521,916, 6,441,943, 6,335,548, 6,132,072, 5,803,579, 6,229,435, 6,504,142, 6,402,328, 6,379,013, and 6,359,274 disclose various electrical components and electrical circuit boards that may be employed in one or more embodiments. A disclosure of each of these U.S. patents is incorporated herein in its entirety by reference.

In at least one embodiment, the reflectivity of the reflective element of either the exterior or interior rearview assembly can be varied (for example, via autodimming). Such variable-reflectivity or reflectance reflective element may be configured to define a convex element, an aspheric element, a planar element, a non-planar element, a wide field of view element, or a combination of these various configurations in different areas to define a complex mirror element shape. The front surface of the first substrate of the reflective element, that corresponds to the front of the assembly, may comprise a hydrophilic or hydrophobic coating to improve the operation. The reflective element may have transflective properties such that a light source, or information display, may be positioned behind the element and project light rays therethrough. Attachment of the reflective element to a carrier/portion of the housing structure is arranged, in at least one embodiment, via a double-sided adhesive tape. The reflective element may comprise an anti-scratch layer, or layers, on the exposed surfaces of the first and, or, second substrates. The reflective element may comprise area(s) that are devoid of reflective material, such as etched in bars or words, or be patterned otherwise to define information display area(s). Examples of various reflective elements are described in U.S. Pat. Nos. 5,682,267, 5,689,370, 6,064,509, 6,062,920, 6,268,950, 6,195,194, 5,940,201, 6,246,507, 6,057,956, 6,512,624, 6356,376, 6,166,848, 6,111,684, 6,193,378, 6,239,898, 6,441,943, 6,037,471, 6,020,987, 5,825,527, 6,111,684 and 5,998,617. A disclosure of each of these patent documents is incorporated by reference in its entirety.

Plethora of teachings describing various configurations of an EC element or a prismatic element for use in a vehicular rearview assembly is provided in Our Prior applications. U.S. 2010/0321758, for example (in reference to FIGS. 6A through 16 therein), teaches different implementations of electrically-conductive layers (such as, e.g., a layer of transparent conductive oxide performing as a transparent electrode preferably disposed on the second surface of the EC-cell, and a thin-film stack including reflective and conductive layers aggregately performing as a reflecting electrode of the third surface of the EC-cell). U.S. 2010/0321758 also discusses numerous incarnations of electrical interconnects between the electrically-conductive layers (such as TCO layers, or IMI layers, or combinations thereof, for example) and the electrical circuitry of the assembly (see, e.g. FIGS. 6-16, 22-34 and associated descriptions in U.S. 2010/0321758), EC-cavity perimeter sealing members, and means for concealing such electrical interconnects and sealing members from being optically accessible from the front of the assembly.

As another example, the commonly-assigned U.S. Pat. No. 7,372,611 and the U.S. 2010/0321758 discuss (in reference to Tables 3F and 3G contained therein, for example) various thin-film structures configured on the second surface of an EC-element of the rearview assembly to provide a peripheral ring that not only has high reflectance but also ensures color matching between the peripheral area of the rearview mirror and the major portion of the viewing area (located within the peripheral area of the mirror). In particular, the taught structures include a thin-film stack in which a dielectric layer is sandwiched between the metallic thin-film and the layer of the TCO, such as, for example, (i) a sequence of a metallic thin-film, a film made of a low-index material, and a film of the TCO; and (ii) a thin-film stack containing a metallic thin film, a high/low/high index dielectric stack, and a layer of TCO. However, the optical properties of the peripheral ring may benefit from a different positioning of the dielectric layers. For example, in a basic case where the second surface of the EC element carries, in a peripheral region, a layer of chrome (500 Å) and a layer of ITO (1490 Å) on top of the chrome layer, the resulting Cr/ITO stack has a reflectance of 56.0% (a*=−1.6, b*=−3.0). However, the addition of high- and low-index dielectric layers between the second surface of the front glass substrate and the Cr-layer (thus yielding the following enhanced structure: Glass/$TiO_2$ (534 Å, index of 2.45)/$SiO_2$ (848 Å)/Cr (500 Å)/ITO, increases the reflectance to 79.2% (a*=−3.4, b*=1.6). The achieved reflectance enhancement is further tunable by increasing the index contrast between the high- and low-index layers. (Decreasing the index contrast achieves the opposite effect). For instance, in the previous example of the enhanced structure, the replacement of the $TiO_2$ layer with $SnO_2$ (601 A) and the $SiO_2$ layer with $Al_2O_3$ (741 A) yields an overall reflectance of the peripheral area of 66.2% (a*=−4.8, b*=1.4). In addition, the thickness of the high- and low-index layers can be used to tune the color to yield an improved color match between the peripheral ring area and to the rest of the mirror element. For example, if a bluer hue is preferred in light reflected by the above-defined enhanced structure (Glass/$TiO_2$/$SiO_2$/Cr/ITO), the thickness of the $TiO_2$ layer can be reduced to 506 Å and the thickness of the $SiO_2$ layer can be reduced to 801 Å to yield a 78.9% reflectance with an a* value of −3.3 and a b* value of −0.6. Generally, a reduction of reflectance value of the peripheral ring is be observed for significant deviation of the dielectric layers from nominal quarter-wave thickness. The choice of the dielectric layers may be based on a variety of properties including, but not limited to, conductivity, index of refraction, extinction coefficient, UV cutoff, chemical durability and environmental stability.

As yet another example, the transparent conductive material (TCO) used in various embodiments may include fluorine-doped tin oxide, doped zinc oxide, indium zinc oxide (IZO), indium tin oxide (ITO), ITO/metal/ITO or insulator/metal/insulator (IMI) stacks and may further include materials described in above-referenced U.S. Pat. No. 5,202,787, such as TEC 20 or TEC 15, available from Libbey Owens-Ford Co. of Toledo, Ohio. Material compositions of a transparent electrode and its opto-electronic characteristics such as sheet resistance affecting the speed and uniformity of coloration (or darkening) of the EC-medium of the EC element of the assembly are discussed in details in U.S. 2010/0321758 and other patent documents from Our Prior applications.

A resistive heater may be disposed in the back of the mirror element to heat the mirror and thereby clear the mirror of ice, snow, fog, or mist. The resistive heater may optionally be a layer of ITO, fluorine-doped tin oxide or may be other heater layers or structures known in the art. Examples of the mirror heater are taught, for example, in U.S. patent application Ser. No. 12/686,019.

Examples of various electrical circuits are taught in the above-referenced Canadian Patent No. 1,300,945 and U.S. Pat. Nos. 5,204,778, 5,434,407, 5,451,822, 6,402,328, and 6,386,713.

Optical concealment of the sealing material and electrical interconnects affixed to electrically-conductive layers of the EC-element may be ensured by appropriate shaping of an edge of the first surface of the EC-element, or by configuring a peripheral ring of spectral filter material, as discussed in Our Prior applications (see, e.g., FIGS. 14-16B of U.S. 2010/0321758). Yet another way to conceal the seal is to use a seal material that is transparent as disclosed in commonly assigned U.S. Pat. No. 5,790,298, the entire disclosure of which is incorporated herein by reference.

It is appreciated that embodiments of the present invention draw on the teachings in our Prior Applications and that any of the features of a rearview assembly described in Our Prior applications can be used with embodiments of the present invention as long as operability of these embodiments is preserved.

Peripheral Ring and Sealing Material.

U.S. Patent Application Publication No. 2010/0321758 offered (in reference to FIGS. 17, 18, and 21 therein), a detailed discussion of structural and operational coordination of various features of a typical EC-element based mirror and rearview assembly containing such a mirror. The discussion included a description of disposition of a spectral filter material (referred to as a peripheral ring) that is configured to obstruct a sealing material, a plugging material, and/or electrical connections associated with the EC-element from being optically accessible from the front of the assembly, as well as harmonious configuration of various thin-film layers (such as electrically-conductive and reflective layers on the second and third surfaces of the EC-element facilitating fabrication of the EC-element. The discussion additionally included descriptions of methods of fabrication of the EC-element incorporating various notches, cuts-out and "windows" in optical thin-film layers of the EC element in a rearview assembly containing a source of light in order to accommodate a light source, information display, a photo sensor, or a combination thereof in the assembly to selectively transmit a particular spectral band or bands of wavelengths towards the field of view (FOV) in the front of the assembly to provide required information to the user. To this end, U.S. Patent Application Publication No. 2010/0321758 discussed (in reference to FIGS. 19 and Tables 1-4 therein) considerations related to structural elements of the EC-element and the assembly (in particular, thin-film optical structures and related methods of fabrication) that define spectral characteristics of ambient light reflected by the optical system of the assembly and light transmitted through the EC-element-based mirror system of the assembly from a generalized light source (such as a display behind said mirror system) towards the FOV in the front of the assembly, and provided various examples of optical structures for use in such mirror elements that possess the required spectral and dimensional characteristics.

Considerations of Aesthetic Appearance and Styling.

As discussed in Our Prior applications, in configuring a rearview assembly—whether the issue concerns coating a surface of an EC-element or a prismatic element (either of which may be forming a basis for a mirror element of the assembly), or formation of a peripheral ring on the first or second surface to mask the seal and/or plug material and contact areas, or whether the issue concerns shaping a perimeter of the mirror element—the aesthetics of appearance of the resulting assembly product plays a critical role in how successful the product is on the market. While the aesthetics of the rearview assembly is not a tangible concept and is generally guided or defined by customer preferences, satisfying these preferences is not a trivial task, and devising satisfactory solutions often involves non-trivial balancing of design and functionality of the resulting embodiments. Such balancing, in turn, poses manufacturing problems that have to be addressed.

Various examples of such problems involving operational coordination of structural elements of a rearview assembly (such as housing, casing, mounting elements, including as well as devoid of bezels) addressing the aesthetic concerns were discussed in reference to FIGS. 39, 40, 42-61 of U.S. 2010/0321758, for example.

As another example, appearance of the front edge of the assembly plays a special role in assuring that the user's perception of the mirror is satisfying. Following practical considerations and current trend in users' preferences as to appearance of the vehicular rearview assemblies, the edge of the first substrate should be configured to be optically diffusive for at least two reasons.

1) In majority of cases, glass substrates of a mirror element of a rearview assembly are produced through scribing and breaking process that generally results in a reflective perimeter edge having specular reflective properties and reflecting about 4 percent of the incident light. (It is understood that this reflectivity level is inevitably increased if the specularly reflecting edge is overcoated with a peripheral ring of material such as Chrome.) The smooth specular reflective edge can give a bright or shiny appearance to the glass edge in many ambient light conditions, which is generally aesthetically objectionable.

1) Moreover, if the edge of a mirror element is chipped or cracked and is overcoated with a reflective peripheral ring of spectral filter material (such as chromium, for example), the chipping becomes extremely visible and stands out like a beacon scattering incident light in all different directions. This shortcoming becomes particularly aggravated if a chip or a crack extends onto the perimeter of the first or second surface. Similarly, if the perimeter and/or edge is chipped after the chrome peripheral ring coating is applied, the chip visually stands out in reflected light as a dark void on otherwise a smooth bright surface.

It is appreciated that both the specularly reflecting edge and imperfections associated with chipping of the edge of the mirror element become especially problematic in embodiments having either a narrow bezel or no bezel at all, because in such embodiments the chipped areas are not concealed. At least for the reasons discussed above it is preferred, therefore, to configure the first substrate so as to improve both the mechanical quality and the visual appearance of the edge of the mirror element in order to produce a high quality mirror. Both of these goals may be achieved by modifying the surface properties of the edge of the first substrate. Required modifications are produced, for example, by re-shaping the edge either after the coating has been applied to the edge or, preferably, right after the mirror substrates are cut to shape. Reshaping may be performed by grinding, sanding, or seaming the edge with flat or contoured wheels containing abrasive particles or with a moving belt coated with abrasive particles. Depending on a configuration of the carrier and whether or not a bezel component extends onto the first surface of the mirror element, a light edge treatment that removes as little as 0.005"—or as much as 0.010" to 0.075"—of the front edge of the first may be all that is necessary to achieve a desired result.

Abrasive materials include but are not limited to diamond, silicon carbide or oxides of aluminum, cerium, zirconium and iron in the size range of about 100 to 1-200 mesh. The size of the particles used affects the roughness of the finished glass edge. The larger the abrasive particle the rougher the surface that is created. Generally 80 to 120 mesh size abrasive particles produce a very rough surface, 300 to 500 mesh size particles produce a smooth surface and 600 mesh and above produce a near polished finish. The abrasive particles can be embedded in a metal, resin or rubber medium. An example of abrasives loaded in metal or resin binder are diamond wheels available from GlassLine Corp., 28905 Glenwood Rd., Perrysburg, Ohio 43551 or Salem Corp., 5901 Gun Club Rd., Winston-Salem, N.C. 27103. An example of abrasives loaded in a rubber binder are Cratex M or Cratex F wheels available from Cratex/Brightboy Abrasives Co., 328 Encinitas Blvd. Suite 200, Encinitas, Calif. 92024. Abrasive coated belts are available from 3M Corp., St. Paul, Minn. 55144. Modification of the surface properties of the edge not only increases the mechanical durability of the edge by removing the microcracks but also makes the edge optically diffusive. The reshaping is generally done in the presence of a coolant to remove the heat generated during grinding or seaming. The edge can also be reshaped by rubbing the glass against a substrate flooded with an abrasive slurry loaded with particles such as diamond, silicon carbide or oxides of aluminum, cerium, zirconium and iron. Equipment for edge polishing using the abrasive slurry method is available from SpeedFam Co., Kanagawa, Japan. Alternatively, the edge can be reshaped by cutting or blasting the edge with a high pressure liquid containing abrasive particles of diamond, silicon carbide or oxides of aluminum, cerium, zirconium and iron. Equipment for frosting glass using this method is available from Bystronic, 185 Commerce Dr., Hauppauge, N.Y. 11788. Alternative way of reshaping the edge may include blasting the edge with abrasive particles of diamond, silicon carbide or oxides of aluminum, cerium, zirconium and iron carried by a high velocity gas stream. A modified glass edge can also be produced by chemically etching the glass with a chemical solution designed to leave a frosty surface such as Superfine Glass Frosting Powder which a mixture of ammonium hydrogen fluoride and barium sulfate that is mixed with HCl available from Above Glass Corp., 18341 4$^{th}$ Ct., Miami, Fla. 33179. A modified glass edge can also be produced by coating the glass edge with a diffuse or pigmented paint such as 935 UV Series available from Ruco, Wood Dale, Ill. or UV 420 Series available from Fluorital Italy, Italy or Ultraglass UVGO Series available from Marabu, Germany or Crystal GLS Series available from Sun Chemical, Parsippany, N.J. or SpecTruLite UV Series available from Ferro Corp., Cleveland, Ohio.

A polished appearance of an edge of the device (such as a peripheral edge of the front substrate of a mirror element of the assembly) can be provided by laser polishing, utilized on its own or added as an edge treatment step after the edge has been treated cut and/or ground and/or etched, or in between these processing steps. U.S. Pat. Nos. 5,742,026, 6,023,040, 6,043,452, and 7,592,563, the disclosure of each of which is incorporated herein by reference in its entirety, provide examples of available edge treatment techniques. Discussion of solution to other practical problems posed by addressing the aesthetics of appearance of vehicular rearview assemblies is presented below.

Modifications, Auxiliary and Alternative Embodiments.

As discussed above and in Our Prior applications, an embodiment of a rearview mirror system employing an EC-element and a source of light behind the EC-element preferably includes a ring (peripheral ring) of an optical thin-film spectral filter material that is circumferentially disposed in a peripheral area, next to a corresponding perimeter-defining edge, of either the first or the second surface of the system. It is recognized that the use of the peripheral ring is partly directed to configuring an overall mirror system in such a fashion as to make the system as aesthetically appealing to the user as possible. For example, one purpose of this thin-film ring is to hide the seal, the plug material, and, optionally, the electrical connectors of the EC-element from being visually discernable by the user through the first substrate. As such, this peripheral ring of material is usually opaque in at least a portion of visible spectrum of electromagnetic radiation and may be sufficiently wide, up to 6.5 mm in some cases. It has also been discussed in this application that such a peripheral ring, in some embodiments, may facilitate matching of spectral characteristics of ambient light reflected from the periphery of the mirror system, which includes such a ring, with those of ambient light reflected from a central area inside the periphery of the mirror system where the ring is not present. The better the spectral matching, e.g., matching of reflectance and/or color gamut, the less discernable is the area of the peripheral ring to the viewer when the EC-element is switched "off" and the rearview assembly of the invention operates purely as a mirror. Solutions to achieving various degrees of spectral matching between the ring-containing portion of the mirror and the central, at least in part transflective portion of the mirror have already been discussed in this application and included judicious thin-film designs of the peripheral ring with the use of such materials as chromium, nickel, stainless steel, molybdenum, silicon, platinum group metals, aluminum, silver, copper, gold or various alloys of these metals.

Also discussed was another, more tangible purpose of utilizing a peripherally deposited thin-film ring—to reduce exposure of the seal, disposed between the substrates forming an EC-cavity, to UV light that causes degradation of the seal. Clearly, then, such UV-protection measure is of particular importance in an outside rearview assembly (see, e.g., FIGS. 3 and 5) that is fully exposed to sunlight, while requirements to UV-properties of a ring of an EC-element employed within an inside rearview assembly (see, e.g., FIGS. 4 and 5) may be not as stringent.

It is recognized that the use of a peripheral ring entails certain shortcomings. For example, it must be realized that, in operation, the peripheral area of a mirror system of the assembly containing the peripheral ring does not darken, unlike the central portion of the mirror, when the voltage is applied to the electrodes of the EC-element (or other electrically darkening technology) in order to reduce the light-glare blinding the user. As a result, the difference in appearances of the peripheral ring and the central portion of the mirror when the EC-element is "on" may be quite significant, in particular in inside rearview assemblies that typically employ higher reflectance levels. Consequently, not only the size of the central portion of the mirror is accordingly smaller, as compared to the overall front surface of the mirror element, by a width of the peripheral ring but the peripheral ring continues producing the undesired glare even when the EC-element is "on". Another problem arises from the fact that a typical mirror system of an inside rearview assembly contains an eye-hole (such as the elements 497 and 515 of FIGS. 4 and 5) behind which corresponding sensors (such as the sensor 396 of FIG. 3) may be positioned. When the eyehole is used in combination with a peripheral ring, appropriate positioning of the eye-hole may not be straightforward. For example, if the eye-hole is formed by creating an opening in a coating stack of the third surface, then locating such an opening within the peripheral area of the mirror element may disrupt the visual continuity of the mirror and be perceived as aesthetically unpleasing, particularly in an embodiment where the height of the mirror is not significant. It is appreciated that, although in description of the embodiments below descriptions of mounting elements (e.g., carrier, bezel, and housing elements) as well as electrical connectors may be omitted, all or some of these elements are implied and the described alternative and modified embodiments may be used with any combination of the mounting and electrical elements discussed in this application.

Eye-Hole Openings.

Common embodiments of automotive electrochromic mirrors generally include light sensors for measuring glare and ambient light levels. In certain embodiments the glare sensor is positioned behind the EC mirror element and views glare light levels through an aperture in the reflective coating. Prior art embodiments of eyehole openings for light sensors comprise single continuous openings. These openings in the reflective layer may comprise a TCO or a transflective metal layer for conductivity. In general, these openings can be several millimeters wide and are often round or elliptical in shape. The aperture must be large enough to allow glare light entering the vehicle to adequately illuminate the glare sensor for accurate light level measurement. A single, hard edged eyehole might be considered aesthetically less than optimum by certain observers. Some prior art embodiments utilize a transflective opening that is effectively stealthy and non-obvious to an observer. For certain other embodiments discussed herein, the use of a cluster of multiple, smaller openings instead one large opening may have aesthetic and/or manufacturing advantages. Non-limiting embodiments of multi-opening eyeholes are shown in FIGS. 7(A-E). These examples comprise reflective regions 6620 (reflective material present) and areas 6610 that are patterned to be essentially devoid of reflective material. As shown in FIGS. 7(A-E), these patterns may be essentially circular, rectangular or line-like and may have a regular or irregular spacing. In general, an optimized pattern of reflective and essentially non-reflective regions within the geometric boundaries of an eyehole can be less noticeable and therefore less aesthetically objectionable. The size and spacing of the openings, as they contribute to percent open area in the eyehole region, determine the transmittance of light to the glare sensor. Because the eyehole is part of the EC element, it darkens when the element is energized resulting in a change of light intensity measured by the glare sensor. It is preferable that the eyehole clear as quickly as the rest of the EC mirror element so that the measured light intensity is accurately indicative of the glare observed by the driver. If the eyehole clears slower than the rest of the mirror element then it is possible that the EC mirror will not respond to changing glare situations as intended.

Figure 7A:
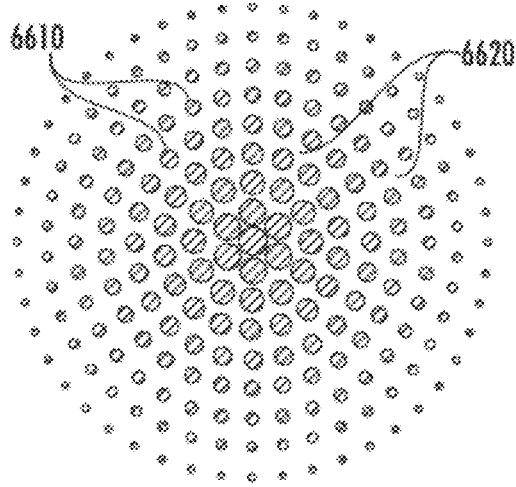
FIGS. 7(A-E) illustrate embodiments of patterning of an eye-hole of a rearview assembly.
FIG. 7F provides illustration to segregation effects in an EC element.
FIG. 7G shows examples of transmittance changes for EC elements with and without segregation.
FIG. 7H provides examples of % full scale behavior of the EC element during clearing.
Figure 7B:
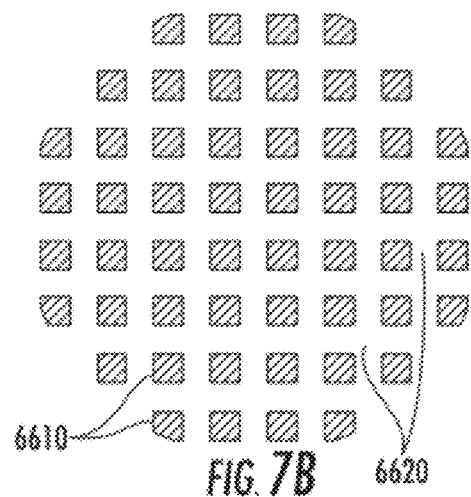
Figure 7C:
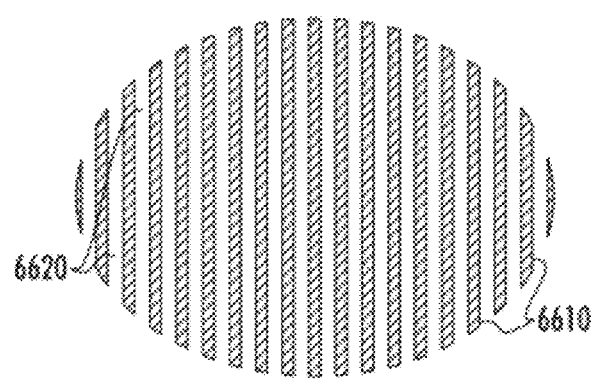
Figure 7D:
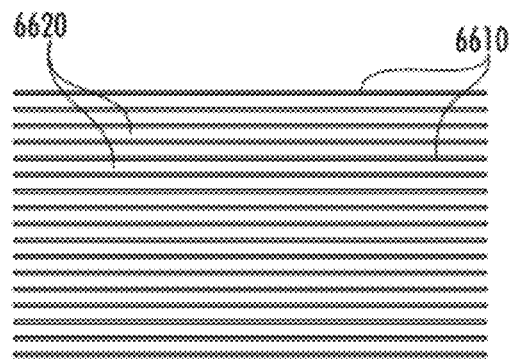
Figure 7E:
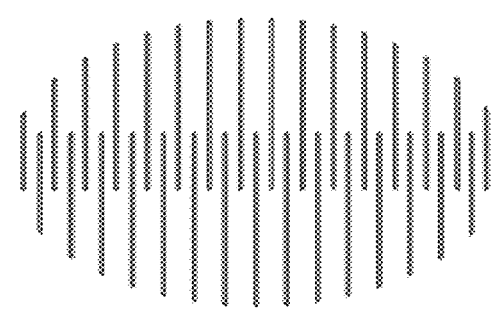
Figure 7F:
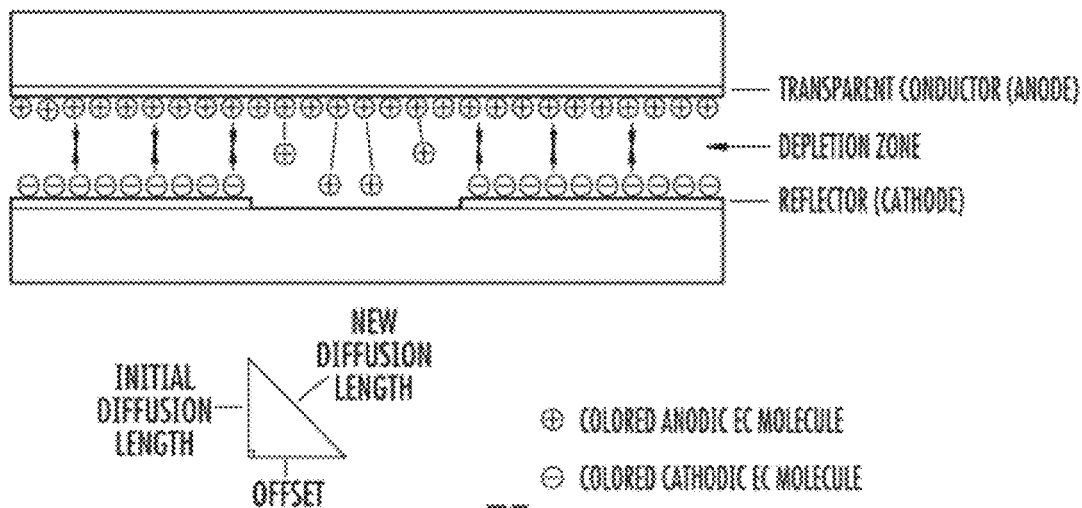

There can be negative impacts on EC mirror element aesthetics and function caused by essentially non-conductive regions of the electrode. In the currently described electrochromic (EC) cell embodiments, the EC fluid comprises two primary coloring compounds, an anodic material, which is bleached in its normal state and becomes oxidized at the anode when the cell is energized, and a cathodic material, which is bleached in its normal state and becomes reduced at the cathode when the cell is energized. In one embodiment the anodic material is yellow/green in its colored state and the cathodic material is violet in its colored state. Because these two EC materials are dissolved in the EC fluid, they are free to diffuse through the cell. Therefore, when the operating potential is applied between the anode and cathode, the two EC active compounds proximate to the proper electrode surface are converted to their colored states. The colored state compounds diffuse away from the electrode surfaces where they were created and are replaced by more bleached state compounds which are subsequently colored. When a molecule of oxidized (colored) anodic material diffuses proximate to a molecule of reduced (colored) cathodic material, there is some probability that a charge transfer reaction will occur, converting both molecules back into their bleached state. A second potential route to bleaching of a colored state molecule is diffusion to the opposite electrode from which it was created. A molecule of anodic material that has been oxidized at the anode has some probability of diffusing proximate to the cathode surface. Once this occurs it is likely that the anodic material will be reduced back to its bleached state. Likewise, the same effect can apply to reduced cathodic material that diffuses to the anode. In this way, some time after the initial activation of the EC cell, steady state equilibrium is reached between the creation of colored state compounds and the bleaching of colored state compounds by intermolecular charge exchange and diffusion to the opposite electrode. In the equilibrium state, colored EC molecules have the highest probability of bleaching through intermolecular charge transfer with the opposite species in a depletion zone between the two electrodes where the concentration of colored species approaches zero. As described elsewhere, in a standard EC mirror cell design, surface 2 of the EC element comprises a transparent electrode which is commonly configured as the anode. Surface 3 of the EC element comprises a conductive, reflective layer which is commonly configured as the cathode. Considering the equilibrium described above, if one considers the EC cell in cross-section, there will be a somewhat higher concentration of colored anodic material proximate the anode surface and a somewhat higher concentration of colored cathodic material proximate the cathode surface. Nearer the center of the cell (in cross-section), the concentrations of the colored anodic and cathodic materials will be more similar until the concentrations fall to near zero in the depletion zone. To an observer viewing the reflective element from a position normal to its first surface, the stratification of the colored species is not apparent since the layered colors are blended by the path the light takes to the observer. Consequently, if there is a gap in one of the conductive layers generating a non-conductive or significantly less conductive region (for example, an area 6610), a localized imbalance can be caused in the equilibrium. The side of the cell still having a functional electrode will generate colored material as described above. The side of the cell with the compromised electrode will not generate colored material or will do so at a significantly reduced rate. Therefore if there is a gap in the cathode of the above described embodiment, yellow/green material will be produced at the anode without commensurate violet material being product at the opposing cathode location. This imbalance can lead to a net yellow/green appearance at the location of the compromised cathode. This color imbalance is here and elsewhere (U.S. Pat. Nos. 4,902,108 and 5,679,283 herein incorporated by reference in their entirety) referred to as segregation. This effect can lead to less than optimum aesthetics when the mirror element has been in the dark state for several minutes. The size or area of the compromised zone of the electrode affects the degree of segregation due to its effect on the diffusion length required to reach the other electrode. For example, in a non-compromised system with two parallel electrodes separated by 140 microns, the shortest diffusion path length at any position in the system must be less than or equal to 140 microns. If a segment of an electrode 500 microns wide is removed then the shortest diffusion path length can be as high as 287 microns in the compromised segment, describing the hypotenuse of the triangle running from the center of the compromised segment to its edge then across to the other electrode of the EC cell. Increasing the shortest path length will increase the effects of segregation. These effects are illustrated in FIG. 7F.

A common method of clearing the EC element involves removal of the driving potential and electrical shorting of the anode to the cathode. At this point no new EC molecules are being converted to their colored states and diffusion takes over. The high concentration of oxidized anodic species proximate the anode and reduced cathodic species proximate the cathode result in a chemical potential similar to a battery. Shorting the electrodes allows the species proximate to the electrode surfaces to rapidly return to their bleached state. Diffusion across the cell allows the remaining oxidized anodic molecules to bleach through charge transfer reactions with reduced cathodic molecules. Again, as described above, a non- or partially-conductive area of one of the electrodes means that the bleaching of one of the EC species cannot occur at the compromised electrode surface resulting in diffusion being the only route to bleaching. If only one electrode, cathode or anode, is compromised then one species may bleach more quickly than the other resulting in a color imbalance and slower than normal clearing of that species which is herein also considered a form of segregation. The sum effect of one electrode having a non- or partially-conductive region is that in the driven (darkened) state, one colored EC species increases in concentration in the compromised zone, due to lack of depletion by the opposite EC species, until it dominates the color. This dominate color persists for some time after clearing of the EC element by the method described above due to diffusion being the only route to bleaching in the compromised region. Depending on the size and shape of the compromised zone, it is possible, due to the chemical potential present during clearing, to see a small amount of the violet color, for the above described embodiment, proximate the perimeter of the compromised zone during clearing. As described above, the colored EC species persisting in the eyehole zone longer than the clearing time for the rest of the element may lead to less than optimum performance of the glare sensor.

As alluded to above, one route to minimizing the segregation effects is to compromise both the anode and cathode electrodes. So if the intent is to create openings or essentially non-conductive zones in the third surface reflector layer to enhance transmission or create a conductance break, creating an essentially equivalent opening or essentially non-conductive zone in the opposing region of the second surface conductive layer will have roughly equivalent, offsetting effects, resulting in less segregation effects. This is due to the effect that both electrodes are compromised meaning that neither EC material effectively dominates in the compromised zone. This may significantly reduce the color bias in the activated (dark) state as well as during clearing. This may also reduce the lag in clearing time but will not necessarily eliminate it.

EXAMPLES

Figure 7G:
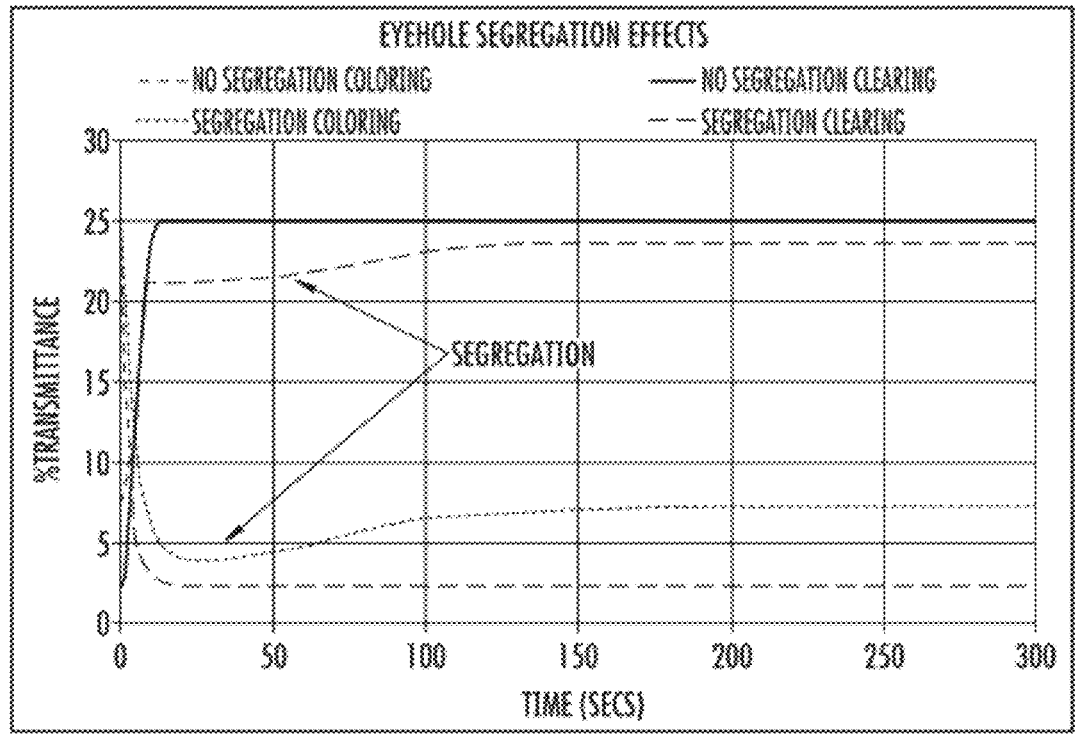
Figure 7H:
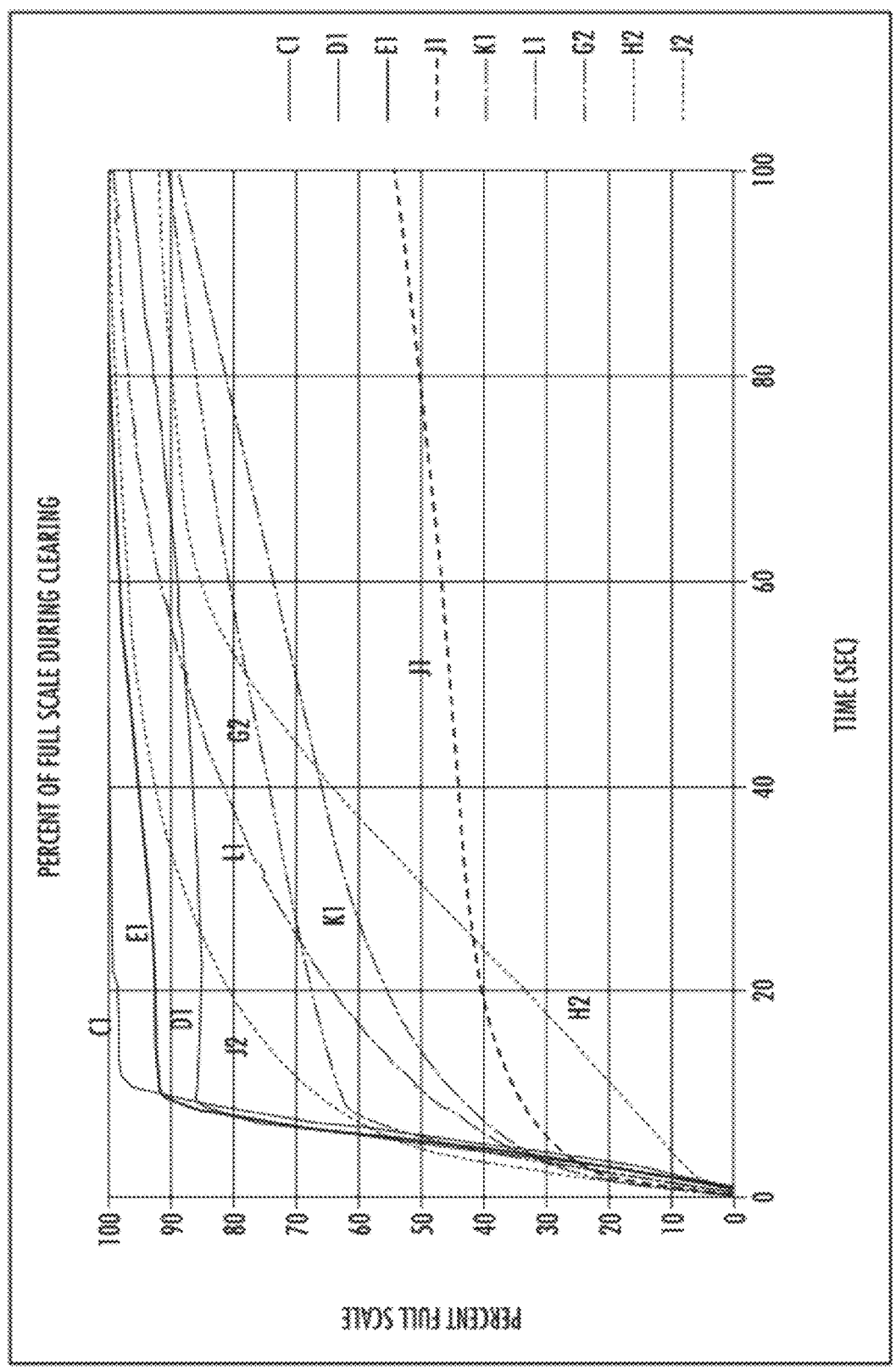

EC-mirror elements were fabricated with nominal cell spacing of approximately 140 microns. The eyeholes in these devices were configured by patterning the third surface metal reflector (cathode) with vertical lines created by laser ablation in a fashion similar to that of FIG. 7C. The perimeter of the ablated area approximated an oval with a length of about 5 mm and a width of about 7 mm. The width of the remaining metal traces and the width of the ablated openings in the eyehole area are shown in Table 1. Each of the samples was activated (darkened) for 10 minutes and then shorted (cleared). During the coloring and clearing phases the eyehole region was observed by transmittance spectroscopy to track the change in transmittance versus time. Examples A1-L1 represent openings in the surface 3 reflective layer without a corresponding "opening" in the surface 2 TCO. Examples A2-L2 represent openings in surface 2 plus corresponding essentially equivalent "openings" in the surface 2 TCO. FIG. 7G demonstrates the change in transmittance at the eyehole during coloring and clearing for both an element showing segregation effects and an element not showing segregation. As can be seen from FIG. 7G, a non-compromised EC element shows relatively monotonic change between the bright and dark states while an EC element with a compromised electrode in the region of the eyehole shows a non-monotonic change both for coloring and clearing. The secondary, slow change identified as segregation in FIG. 7G is due to the slow diffusion of colored state EC molecules into and out of the compromised zone/s of the eyehole. A time measure, $t_1$, was assigned for the time at which the primary rapid clearing step transitioned to the slow segregation clearing step. A second time measure, $t_2$, was assigned to the point at which the clearing reached essentially a steady state transmittance. The difference between $t_2$ and $t_1$ was defined as the Clearing Time Delay, Delta-t. The transmittance at time $t_1$ was defined as % $T_1$. Similarly the transmittance at time $t_2$ was defined as % $T_2$. The value of % $T_2$ represents the transmittance of the eyehole in its essentially fully clear state. The attenuation of light at time $t_1$ relative to $t_2$ was defined as Delta-% I which represents the loss of light intensity reaching the glare sensor at time $t_1$ relative to the intensity of light reaching the glare sensor in the fully clear state; in other words, the attenuation of the glare sensor response due to segregation. Table 1 lists the properties of the example surface 3 eyehole ablations including whether surface 2 was also ablated, the width of the metal traces, the width of the ablated spaces, the clear state transmittance, the dark state transmittance and the variables listed above. To minimize the effects of segregation on the performance of the glare sensor it is preferable to minimize either the clearing time delay, Delta-t, or the attenuation of the glare sensor, Delta-% I. Minimizing both measures will result in a preferable embodiment however; the minimization of either measure reduces the impact of the other measure.

TABLE 1

| Label | Surf2 Ablation | Traces (um) | Ablations (um) | % Open | % T | Darkened % T | t1 sec | t2 sec | Delta-t | % T1 | % T2 | Delta-% T | Delta-% I |
|---|---|---|---|---|---|---|---|---|---|---|---|---|---|
| A1 | N | 54 | 50 | 48 | 22.1 | 4.7 | 17 | 113 | 96 | 20.7 | 22.1 | 1.4 | 6.4 |
| B1 | N | 123 | 50 | 29 | 14.1 | 2.7 | 13 | 68 | 55 | 13.6 | 14.1 | 0.5 | 3.9 |

TABLE 1-continued

| Label | Surf2 Ablation | Traces (um) | Ablations (um) | % Open | % T | Darkened % T | t1 sec | t2 sec | Delta-t | % T1 | % T2 | Delta-% T | Delta-% I |
|---|---|---|---|---|---|---|---|---|---|---|---|---|---|
| C1 | N | 210 | 50 | 19 | 9.2 | 1.8 | 16 | 42 | 26 | 9.1 | 9.2 | 0.1 | 0.8 |
| D1 | N | 81 | 75 | 48 | 23.6 | 7.5 | 20 | 130 | 110 | 21.2 | 23.6 | 2.4 | 10.2 |
| E1 | N | 185 | 75 | 29 | 13.8 | 4.4 | 13 | 72 | 59 | 13.1 | 13.8 | 0.7 | 5.2 |
| F1 | N | 315 | 75 | 19 | 10.1 | 3.4 | 16 | 50 | 34 | 9.8 | 10.1 | 0.3 | 2.8 |
| J1 | N | 217 | 200 | 48 | 25.4 | 16.5 | 2 | 265 | 263 | 18.8 | 25.3 | 6.5 | 25.6 |
| K1 | N | 490 | 200 | 29 | 16.1 | 10.5 | 3 | 164 | 161 | 12.2 | 16.0 | 3.8 | 23.6 |
| L1 | N | 853 | 200 | 19 | 9.4 | 6.1 | 3 | 97 | 94 | 7.1 | 9.4 | 2.3 | 24.5 |
| A2 | Y | 54 | 50 | 48 | 21.3 | 4.1 | 17 | 62 | 45 | 20.7 | 21.3 | 0.6 | 2.7 |
| B2 | Y | 123 | 50 | 29 | 13.6 | 2.4 | 20 | 42 | 22 | 13.5 | 13.6 | 0.1 | 0.9 |
| C2 | Y | 210 | 50 | 19 | 9.0 | 1.7 | 23 | 28 | 5 | 8.9 | 9.0 | 0.1 | 0.6 |
| D2 | Y | 81 | 75 | 48 | 23.8 | 6.2 | 20 | 70 | 50 | 23.3 | 23.8 | 0.5 | 2.3 |
| E2 | Y | 185 | 75 | 29 | 13.6 | 4.2 | 20 | 42 | 22 | 13.6 | 13.6 | 0.0 | 0.3 |
| F2 | Y | 315 | 75 | 19 | 9.6 | 3.1 | 18 | 22 | 4 | 9.6 | 9.6 | 0.0 | 0.4 |
| G2 | Y | 69 | 251 | 78 | 40.6 | 29.8 | 9 | 229 | 220 | 36.6 | 40.5 | 3.9 | 9.6 |
| H2 | Y | 158 | 481 | 75 | 38.9 | 25.0 | 4 | 324 | 320 | 26.6 | 38.9 | 12.3 | 31.6 |
| J2 | Y | 217 | 200 | 48 | 25.6 | 16.9 | 7 | 109 | 102 | 22.3 | 25.6 | 3.3 | 12.9 |
| K2 | Y | 490 | 200 | 29 | 15.8 | 11.2 | 9 | 109 | 100 | 14.3 | 15.7 | 1.4 | 8.9 |
| L2 | Y | 853 | 200 | 19 | 11.1 | 7.8 | 10 | 109 | 99 | 10.1 | 11.1 | 1.0 | 9.0 |

Another approach to quantifying the effects of segregation on the glare sensor response is to consider the lag between initiation of clearing the EC element and the time at which the eyehole transmittance reaches a predetermined value. For this purpose it is convenient to consider a normalized Percent Full Scale (% FS) transmittance scale for the eyehole. The actual transmittance of the eyehole at any time t is normalized and scaled such that the minimum transmittance of the eyehole in the fully darkened state becomes 0% FS and the maximum transmittance of the eyehole in the fully cleared state becomes 100% FS. The behavior of this measure for the clearing of selected examples is given in FIG. 7H. This normalized scale is convenient because it more accurately describes the effects of the segregation on the actual response range of the glare sensor. It is preferable that the eyehole reach a % FS value of greater than 75% within 20 seconds of the initiation of clearing. It is more preferable that the eyehole reach a % FS value of greater than 80% within 20 seconds of the initiation of clearing. It is most preferable that the eyehole reach a % FS value of greater than 90% within 20 seconds of the initiation of clearing. The Percent Full Scale transmittance data for the examples described above is given in Table 2. Tuning of the clearing speed and optical properties of the eyehole, as described above, is controlled by the conductivity of the surface 2 and surface 3 electrodes as well as the fraction open area in the surface 3 electrode within the boundaries of the eyehole zone and the selection of a metal trace (area 6620 of FIGS. 7A through 7E) and open area (area 6610 of FIGS. 7A through 7E) dimensions and geometry. It is therefore preferable that the fraction of open area in the eyehole zone be between 5 and 75 percent. It is more preferable that the fraction of open area in the eyehole zone be between 10 and 60 percent. It is most preferable that the fraction of open area in the eyehole zone be between 15 and 50 percent. It is preferable that the minimum dimension of the metal traces be between 1 and 1000 microns. It is more preferable that the minimum dimension of the metal traces be between 10 and 500 microns. It is most preferable that the minimum dimension of the metal traces be between 20 and 250 microns. It is preferable that the maximum dimension of the openings be between 1 and 1000 microns. It is more preferable that the maximum dimension of the openings be between 10 and 500 microns. It is most preferable that the maximum dimension of the openings be between 20 and 250 microns.

It is appreciated that the dimension of the remaining metal traces (areas 6620) in the eyehole zone may affect the performance of the glare sensor. If the traces are not small compared to the dimensions of the glare sensor, or its optics, then the shadowing of the sensor by the metal traces might result in the response of the glare sensor being non-uniform with respect to the angle of incidence of the light. For this reason the dimension and spacing of the metal traces may require optimization beyond the requirements of the segregation effects described above. Eyeholes comprising multiple smaller apertures may be considered less obtrusive and therefore more aesthetically pleasing than larger, single aperture eyeholes. The use of laser ablation to form the above described apertures/ablations is one example of a potential manufacturing advantage over common methods used to generate conductive, single aperture eyeholes in a reflective conductive layer stack.

TABLE 2

Percent of Full Scale Transmittance.

| | | | Time (sec) | | | | | | | | | | | | | | |
|---|---|---|---|---|---|---|---|---|---|---|---|---|---|---|---|---|---|
| | % Tmin | % Tmax | 0 | 1 | 2 | 3 | 4 | 5 | 6 | 7 | 8 | 9 | 10 | 15 | 20 | 25 | 30 |
| A1 | 4.7 | 22.1 | 0 | 0.5 | 3.6 | 11.0 | 20.7 | 44.7 | 57.7 | 70.4 | 81.9 | 89.1 | 89.8 | 89.6 | 89.7 | 89.9 | 90.3 |
| B1 | 2.7 | 14.1 | 0 | 0.8 | 5.3 | 12.4 | 21.3 | 42.6 | 54.0 | 65.4 | 76.1 | 85.8 | 93.0 | 95.1 | 95.4 | 96.1 | 96.7 |
| C1 | 1.8 | 9.2 | 0 | 1.0 | 5.9 | 13.5 | 22.9 | 44.6 | 56.0 | 66.9 | 76.9 | 85.6 | 92.8 | 98.3 | 98.7 | 99.1 | 99.4 |
| D1 | 7.5 | 23.6 | 0 | 1.2 | 7.4 | 16.7 | 27.7 | 52.1 | 64.3 | 75.5 | 82.9 | 85.8 | 85.9 | 85.3 | 85.3 | 85.4 | 85.7 |
| E1 | 4.4 | 13.8 | 0 | 1.6 | 7.9 | 17.1 | 27.8 | 50.7 | 62.2 | 72.9 | 82.1 | 88.5 | 91.5 | 92.0 | 92.2 | 92.8 | 93.4 |
| F1 | 3.4 | 10.1 | 0 | 1.1 | 7.3 | 17.3 | 29.0 | 53.6 | 65.2 | 75.9 | 84.9 | 91.0 | 94.3 | 96.2 | 96.9 | 97.6 | 98.4 |
| J1 | 16.6 | 25.4 | 0 | 10.3 | 19.9 | 24.2 | 26.6 | 28.5 | 30.2 | 31.5 | 32.7 | 33.9 | 34.8 | 38.3 | 40.5 | 41.8 | 42.8 |
| K1 | 10.5 | 16.1 | 0 | 12.6 | 23.4 | 28.6 | 32.3 | 34.8 | 37.2 | 39.3 | 41.2 | 43.0 | 44.7 | 51.1 | 55.7 | 59.2 | 61.9 |
| L1 | 6.1 | 9.4 | 0 | 12.7 | 23.5 | 29.4 | 33.5 | 36.7 | 39.4 | 42.0 | 44.4 | 47.3 | 49.2 | 57.5 | 64.0 | 69.2 | 74.0 |

TABLE 2-continued

Percent of Full Scale Transmittance.

| | % Tmin | % Tmax | 0 | 1 | 2 | 3 | 4 | 5 | 6 | 7 | 8 | 9 | 10 | 15 | 20 | 25 | 30 |
|---|---|---|---|---|---|---|---|---|---|---|---|---|---|---|---|---|---|
| | | | | | | | | | Time (sec) | | | | | | | | |
| A2 | 4.1 | 21.3 | 0 | 0.2 | 4.0 | 11.1 | 20.2 | 43.7 | 53.5 | 64.7 | 75.1 | 84.1 | 91.3 | 96.6 | 97.1 | 97.7 | 98.1 |
| B2 | 2.4 | 13.6 | 0 | 0.3 | 3.2 | 8.9 | 16.3 | 34.5 | 44.5 | 54.6 | 64.2 | 73.1 | 80.9 | 98.9 | 99.3 | 99.6 | 99.8 |
| C2 | 1.7 | 9.0 | 0 | 0.5 | 3.7 | 9.8 | 17.7 | 36.9 | 47.1 | 56.9 | 66.3 | 74.7 | 81.9 | 99.6 | 99.9 | 99.9 | 100.0 |
| D2 | 6.2 | 23.8 | 0 | 0.6 | 4.3 | 10.5 | 18.2 | 35.5 | 44.7 | 53.9 | 62.8 | 71.2 | 78.9 | 97.0 | 97.2 | 97.6 | 98.0 |
| E2 | 4.2 | 13.6 | 0 | 1.4 | 6.8 | 14.9 | 24.4 | 44.5 | 54.3 | 63.4 | 71.8 | 79.4 | 85.7 | 99.1 | 99.3 | 99.5 | 99.6 |
| F2 | 3.1 | 9.6 | 0 | 1.2 | 6.1 | 14.1 | 23.6 | 44.1 | 54.0 | 63.5 | 71.9 | 79.5 | 85.7 | 99.0 | 99.6 | 99.6 | 99.9 |
| G2 | 30.0 | 40.6 | 0 | 5.8 | 15.4 | 26.3 | 37.5 | 45.6 | 51.9 | 57.0 | 60.8 | 62.2 | 62.7 | 65.0 | 67.2 | 69.0 | 70.9 |
| H2 | 25.1 | 38.9 | 0 | 3.3 | 6.3 | 8.5 | 10.2 | 11.4 | 12.7 | 14.0 | 15.4 | 16.7 | 18.1 | 25.4 | 33.2 | 41.1 | 49.0 |
| J2 | 16.9 | 25.6 | 0 | 13.0 | 25.8 | 37.0 | 45.9 | 51.9 | 56.4 | 59.6 | 62.3 | 64.5 | 66.7 | 75.1 | 80.7 | 84.9 | 88.0 |
| K2 | 11.2 | 15.8 | 0 | 7.0 | 17.4 | 28.6 | 39.2 | 46.7 | 53.7 | 59.4 | 64.0 | 67.3 | 69.1 | 74.3 | 78.2 | 81.6 | 84.1 |
| L2 | 7.8 | 11.1 | 0 | 5.7 | 15.4 | 26.4 | 37.6 | 45.6 | 52.6 | 58.4 | 63.0 | 66.1 | 68.6 | 74.0 | 77.9 | 81.1 | 84.1 |

Another approach to making the eyehole less noticeable is to locate at least part of the light sensor behind the peripheral ring of spectral filter material and, correspondingly, the eye-hole itself within the area defined by the width of the peripheral ring. In such a configuration, the area where the reflector of the rear substrate of the EC-element is removed to form an eye-hole will be hidden from the viewer by the peripheral ring. This configuration, however, requires the peripheral ring to be sufficiently transmitting in the visible portion of the spectrum so that the light sensor could function properly. It is understood, that sufficient transmittance of a peripheral ring at a wavelength of interest may be achieved by making the ring transflective as well as by ablating a portion of the ring material or depositing the ring with the use of masking means. A transmission level of 3% to about 50% in visible light is preferred in such an application, while in the UV portion of the spectrum the peripheral ring may still be configured to remain opaque for protection of the seal and plug materials.

Similarly, mutual positioning of the light sensor and the associated eye-hole with respect to the seal is also important. For example, if the seal material is essentially opaque in visible light it should not obstruct the light that the sensor detects. On the other hand, if the seal is sufficiently translucent, the sensor can be placed behind the seal area and the associated eye-hole area may overlap with the area occupied by the sealing material. The combination of the seal and the spectral filter material should have an overall visible light transmission of 3% to 50% for the same reasons as described above.

Yet another approach to configuring the eye-hole area is to simply position the light sensor behind a rear substrate with a non-patterned reflector that is sufficiently transmissive (between 3% and 50%) as is. This level of light transmittance can be obtained through the coating directly or with a combination of light passing through the coating and through openings in the coating.

To eliminate the requirement for an eye-hole altogether, the light-glare sensor can be repositioned so that it is not screened from the viewer by the EC-element. This type of construction is known in the art. Often the eyehole is placed in an area just above or below the mirror or anywhere along the periphery. The placement of the light sensor could be in any number of locations including in the mirror mount, in the headliner of the vehicle, near to or attached to the rear window, on the side mirror, or on the rear of the vehicle. The sensor could be a simple photo-optic sensor or a more complex camera or multiple camera system.

Some drivers of vehicles equipped with an automatically dimming mirror may not be aware that they have the dimming mirror or, in some cases, they simply don't know when the device is working. To some automobile manufacturers this reduces the value of the mirror. At times indicator lights have been added to the autodimming mirror to indicate that the device is powered. Still, this indicator light does not demonstrate the function of the device. In self-dimming mirrors comprising a reflective peripheral ring, the darkening of the center of the mirror is highlighted by the contrast to the reflective peripheral ring. Alternatively, configuring the mirror to have an area that does not darken or that darkens or clears at a different rate as compared to the remaining portion of the mirror may also put the user on notice about the operation of the auto-dimming mirror.

Reduction of Width of a Peripheral Ring.

Reduction of width of a peripheral ring may alleviate a problem of residual glare produced by the non-dimming peripheral area of the mirror even when the EC-element of the EC-mirror is activated. If the ring is narrowed, then the total amount of light reflected from it in the direction of the user is reduced. Preferably, the width of the peripheral ring should be less than 4 mm, more preferably less than 3 mm, and most preferably less than 2 mm.

When the peripheral ring as narrow as 2 mm, a portion of the wide seal may become visible from the front of the rearview assembly. The visibility of the seal may be reduced or eliminated if the seal is made of clear epoxy or a sealing material the color and index of refraction of which match those of the EC-medium sufficiently enough to remove the optical interface between the seal and the EC-medium upon wetting. As a result, the "exposed" to viewing portion of the seal will be effectively hidden from view in the "clear" mode of the EC-element. When the EC-element operates in the "dark" mode, the exposed portion of the seal just as the peripheral ring itself will not color or dim, thereby improving the appearance of the mirror element.

Alternatively, the reduction in width of the ring may require an appropriate reduction of the width of the seal, dimensions of a plug in the seal, and even dimensions of bus contacts located behind and protected by the ring from UV-exposure, especially in embodiments of an outside rearview mirror. The widths of the seal, bus can be optimized as follows:

1) Keeping the seal width to a minimum required to pass the environmental durability tests;

2) Judiciously selecting conductive bus materials possessing such properties (of adhesion, low gas permeation, and others) that would the bus to either function as part of the seal or to simultaneously function as the bus and the seal;

3) Use electrical contacting modalities and methods that allow for incorporation of the electrical contacts within or under the seal (nanoparticle inks based on silver, nickel, copper; patterned metallic traces formed by metal deposition such as from metallo-organic systems, electroplating, or electroless plating; wire bonding of gold or aluminum wires or ribbons, as schematically shown in FIG. 8A);

4) Positioning the bus conductor primarily on the edge surface of the mirror element;

5) Optimizing or eliminating at least one of transverse offsets between the substrates of the EC-element thereby providing for extending position of the seal towards the outside edge of the peripheral ring.

The plug area can be optimized as follows:

1) Assuring that the size of the plug opening is no greater than the width of the seal, thereby enabling a controlled injection of a reduced amount of plug material;

2) Appropriately shaping a plug opening 6710*b*, 6710*c*, 6710*d* to assure that one dimension of the plug is greater than the width 6712*b*, 6712*c*, 6712*d* of the seal 6714*b*, 6714*c*, 6714*d* as shown in top view of a substrate 6720 of an EC-element in FIGS. 8(B-D);

3) Adhering a low-gas-permeability thin metal foil, plastic foil, or glass/ceramic, or adhesive along the edge surface of the EC-element or soldering metal to the edge surface to cover the fill-port opening.

Rounded Ground Edge for Internal EC-mirrors.

European regulations of automotive design require that a non-recessed hard edge of any element have a radius of at least 2.5 mm, as a safety measure. (See, in particular, the U.N. Economic Commission for Europe Vehicle Regulation No. 46, commonly referred to as ECE Reg. 46). In response to such a requirement, a non-recessed perimeter edge of an inside automotive mirror may be covered with an appropriate bezel (and multiple embodiments of a combination of a bezel with a mirror element have been discussed in this application, e.g., in reference to FIGS. 42-54 and 58, 59 of U.S. 2010/0321758). To satisfy the European regulations, a front lip of a bezel extending over the perimeter edge of the mirror element is designed with an outer radius of at least 2.5 mm. For aesthetic reasons it is often desirable to either not have a perimeter bezel or have a bezel that surrounds the perimeter edge of the mirror and is substantially leveled with the front mirror element. According to an embodiment of the invention, a mirror that has an about 5-mm-wide peripheral ring covering the seal from exposure to light (such as a chrome ring, for example) may be devoid of a bezel that extends out onto the first surface of the mirror. To meet the European edge design requirements and to be substantially flush with the front surface of the mirror, the bezel must be configured to have an at least 2.5 mm radius curvature, which means that the overall transverse dimensions of the rearview assembly as viewed from the front of it are at least 5 mm larger than the transverse dimensions of the mirror element. Neither this rounded bezel nor a peripheral ring contributes to the auto-dimming reflective portion of the mirror and, together, the rounded bezel and the ring add an at least 7.5 mm wide non-dimmable ring around the mirror element. Moreover, the addition of a wide bezel also detracts from the sleek appearance of the mirror assembly.

Figure 9:
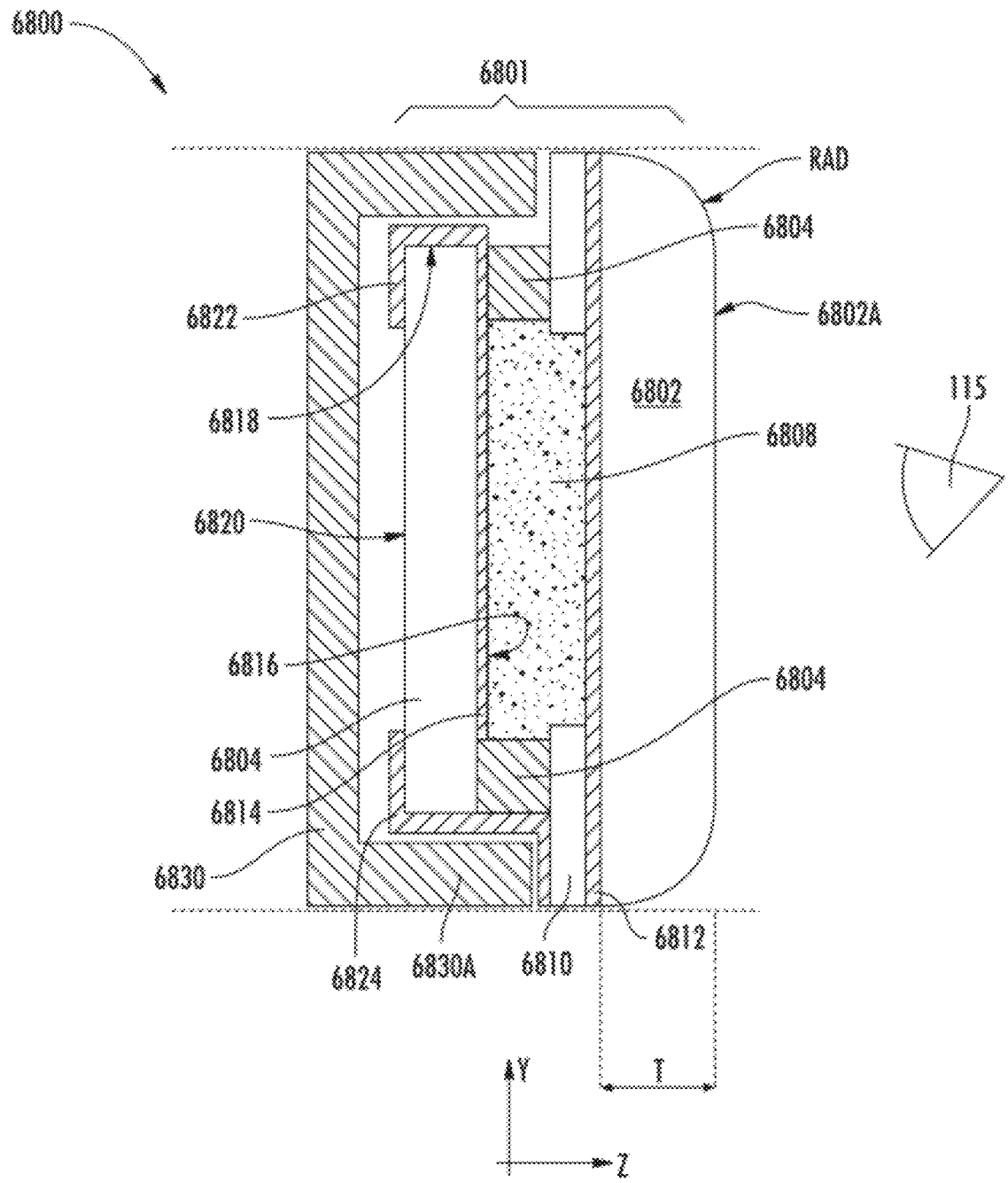
FIG. 9 shows a bezel-less embodiment having an EC-element based mirror system with a rounded edge.

One bezel-less embodiment 6800 meeting the European edge requirement and providing for a durable edge of the mirror is schematically illustrated in FIG. 9. As shown, a mirror element 6701 includes a front substrate 6802 having a thickness of t 2.5 mm and a rear substrate 6804 that are positioned in spaced-apart and parallel relationship with respect to one another, a seal 6806 disposed around the perimeter of the element 6801 so as to sealably bond the front and rear substrates 6802, 6804 and to form a cavity 6808 therebetween. A peripheral portion of the front substrate 6802 is configured by, e.g., grinding to form a curvature, around the front edge of the front surface 6802*a*, with a radius Rad=2.5 mm or bigger. The rear substrate 6804 is smaller than the front substrate 6802 and is transversely offset with respect to the front substrate 6802 along most of the perimeter of the mirror element 6801. As shown, a dimension of the rear substrate 6804 along at least the y-axis is smaller than a corresponding dimension of the front substrate 6802. Optionally, dimensions of the rear substrate along both x- and y-axes are smaller than corresponding dimensions of the front substrate 6802. In some embodiments, the area of the rear substrate is smaller than that of the front substrate. As shown, a peripheral ring 6810 is disposed circumferentially in a peripheral area of the second surface of the element 6801 on top of a transparent TCO-electrode 6812 in such a fashion as to substantially block visible and/or UV light incident onto the first surface 6802*a* from illuminating the seal 6804. (It is appreciated, however, that in a related embodiment the TCO-electrode can be deposited on top of the peripheral ring, instead.) A generally multi-layer thin-film stack 6814, disposed on a third surface 6816, includes at least one electrically conductive layer that is electrically extended over an edge surface 6818 of the rear substrate 6804 to the back of the element 6801 (as shown, a fourth surface 6820) through a conductive section 6822. In a specific embodiment, a multi-layer thin-film stack may be a reflective electrode at least one electrically conductive layer of which is configured to be in electrically communication with the back of the mirror element. Another bus connection, 6824, provides for an electrical communication between the transparent electrode 6812 and the fourth surface 6820. This recessed back substrate design would provide for uninterrupted electrical contact from the back of the embodiment to the front and/or rear electrode(s). The mirror-holding system could be designed such that the mirror element 6801 is supported by a carrier 6830 having a judiciously formatted perimeter lip or wall that is flush with an edge of the front glass substrate 6802 and that covers the perimeter edge 6818 of the second glass substrate 6804 hiding it from view. A ground or frosted appearance on all visible glass edges may be aesthetically preferred. If, however, a polished look is desired, the ground edge may be optionally treated with clear coating layer to fill in the microcracks and/or rough spots defined by the grinding wheel. In addition to creating a more polished look, a clear coat on the edge may also increase the edge strength of the glass and reduce the likelihood that the edge will be chipped or scratched. The overcoating of a rounded edge of glass may be preferred to polishing such rounded edge given that the polishing process can be time consuming. The clear coat may include various materials such as, for instance, polyurethane, acrylic, urethane acrylate, silicone, laquer, and epoxy. It could be applied via brush, roller, spray, ultrasonic spray, jet pump, pad print, or inkjet. The clear coat may be cured by UV exposure, heat, evaporation or moisture cured. In such case, a thin clear coating is preferred to the thick coating from an aesthetics point of view because variation in thickness of the coating (typically found in thicker coatings) creates optical distortion(s). Additionally, a thinner coating feels more like glass to the touch. In one example a clear coat from Direct Color Systems was applied to the rounded edge of a 2.9 mm thick piece of glass with a quarter round grind. The wheel used to grind the glass included an abrasive of approximately 275 mesh. The clear coat was applied and allowed to flow for about 30 seconds before UV curing, resulting in a "polished" appearance of the glass edge.

It would be appreciated that the use of a front substrate 6804 that is at least 2.5 mm thick will increase the overall weight of the mirror element 6801. Therefore, using glass plate that is 2.2 mm or less in thickness may be preferred. Using glass plate that is 1.6 mm thick or thinner is most preferred. In such preferred cases of thinner substrates, the edge surface of the overall mirror element could be rounded to a radius of at least 2.5 mm to meet European specifications. It will be understood that, unless precautions are taken, a process of straightforward rounding of a substrate edge that modifies the shape of both the front and the rear substrates of the assembled EC-element results can expose the electrodes and/or an electrical connector (for example, an electrical clip) that provides for electrical communications between the electrodes and the back of the mirror element, and make it visible from the front of the mirror element.

One solution to this unexpected "visibility" problem, in reference to FIG. 10A, is to configure the second substrate 6904 of the mirror element 6906 with a recess or indentation 6908 in which an electrical bus (clip of electrically conductive section) is fit over the edge surface of the rear substrate 6904. FIG. 10B demonstrates a front view of a stack of the first substrate 6910 and the second substrate 6904. FIG. 10C schematically shows the rounded profile added to the edge surface of an assembled mirror element in the area of the recess 6908. As shown, post assembly, the recessed area 6908 of the substrate 6904 can be filled with a material 6912 that simulates the look of ground glass (such as a UV-curable acrylic resin filled with glass flakes) or the look of polished glass. The assembled mirror element is then shaped to a rounded profile, Rad, as described above, around a perimeter of the mirror element.

A specific curving or rounding of a peripheral portion of a substrate of the mirror element offers an advantage of concealing the peripheral ring sufficiently enough to reduce or even eliminate the glare produced by the peripheral ring (in light incident from behind the driver) when the EC mirror element is fully darkened. To optimize the glare elimination, the rounded edge of the mirror element could be grinded, and the ground portion of the rounded edge should be about as wide as the peripheral ring itself. An orthogonal projection of an element onto a projection plane is defined as parallel projection, where all the projection lines are orthogonal to the projection plane. Using these terms, an orthogonal projection of the curved peripheral portion of the first substrate of the mirror element onto a surface where the peripheral ring is deposited (in one example—onto the second substrate) should be approximately as wide as the peripheral ring. A projection of the curved peripheral portion of the first substrate onto the second substrate defines, generally, an annulus or a ring-shaped band. A distance between a first point (defining an orthogonal projection, onto the second surface, of a point corresponding to the inboard end of the curved peripheral region) and a second point (corresponding to the closet point at the edge of the second surface) is, accordingly, a width of such annulus. In one example, the width of such ring-shaped band or annulus (or, alternatively, the width of the curved or rounded edge of the first substrate as seen from the front) can be about 0.6 times the width of the peripheral ring or wider, more preferably at least about 0.75 times the width of the peripheral ring, and most preferably 0.9 times the width of the peripheral ring or wider. Generally, an area of the second surface corresponding to the peripheral ring is contained within an area corresponding to the orthogonal projection of the curved annular peripheral region of the first substrate onto the second surface. Generally, the preferred width of the peripheral ring is less than about 5 mm. In one combination, the peripheral ring is about 3.0 mm wide while the width of the rounded peripheral region of the first substrate as seen from the front of the assembly (or, alternatively, the width of an orthogonal projection of such region onto the second surface), is about 3.5 mm. The ground edge may have a textured (generally, optically diffusive) surface. In the alternative, when the curved or rounded edge is not textured or optically diffusive but is transparent and/or has polished surface, the curvature of the rounded surface would affect by how much the visibility of the glare off from the peripheral ring through the rounded edge is reduced as compared to the non-rounded edge. Generally, the flatter the curved surface of the rounded, the smaller the reduction of glare. In one embodiment, for example, a curvature of the curved surface of the rounded edge of a peripheral portion of a front substrate of the EC-mirror element has a variable radius.

Various implementations of a mirror element having a front edge rounded around the perimeter of the element are further discussed below, often in combination with other features facilitating the operation of embodiments of the invention.

Rounded Carrier/Bezel Edge.

Alternative solutions addressing the European requirements of safety may be based on configuring a frame of the mirror without a lip extending onto the first surface of the mirror and with a rounded edge. Aesthetic requirements currently dictating a color match between the rearview assembly and a vehicular dash board would be met if the mirror frame had a metallic appearance. Several embodiments implementing such solutions are schematically shown in FIGS. 11-13.

Figure 11A:
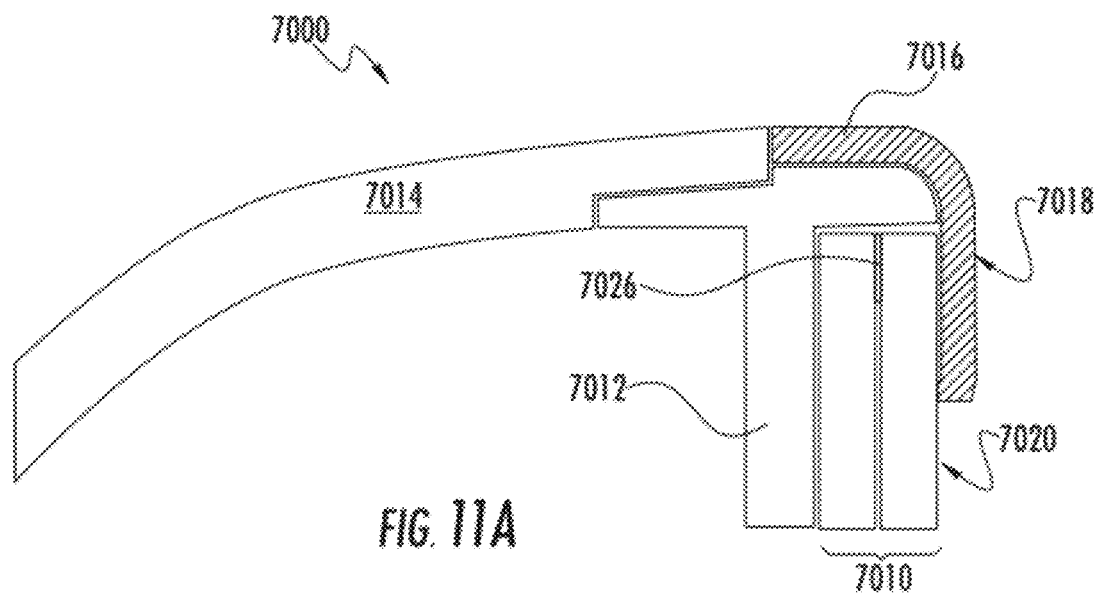
FIGS. 11-13 show embodiments of invention having a lipless frame of the mirror system.
Figure 11B:
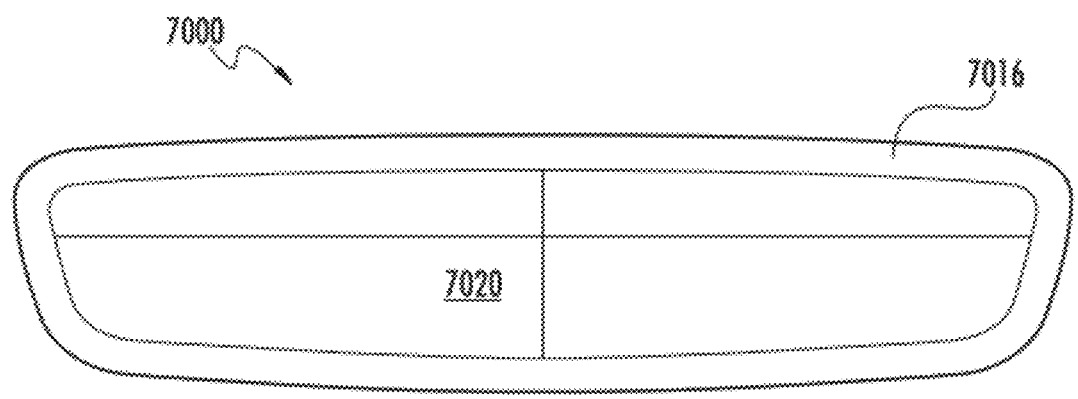

As shown in a partial side view and a front view in FIGS. 11(A, B), an embodiment 7000 of a multi-piece frame construction of the mirror element 7010 of the invention includes a carrier 7012 supporting the mirror element 7010 and attached to a housing 7014 and a bezel 7016 stamped of metal and attached to the carrier 7012 with adhesive. In a related embodiment, the metallic bezel 7016 may be snapped or insert-molded into the carrier 7012. As shown, the embodiment of the bezel 7016 has a front lip 7018 extending over the first surface 7020 of the mirror element 7010. In a specific embodiment, the bezel 7016 may be molded out of plastic and plated with metal. It is appreciated that, optionally, no peripheral ring may be required within the mirror element 7010 because a seal 7026 of the mirror element is protected from light exposure by the lip 7018.

Figure 12A:
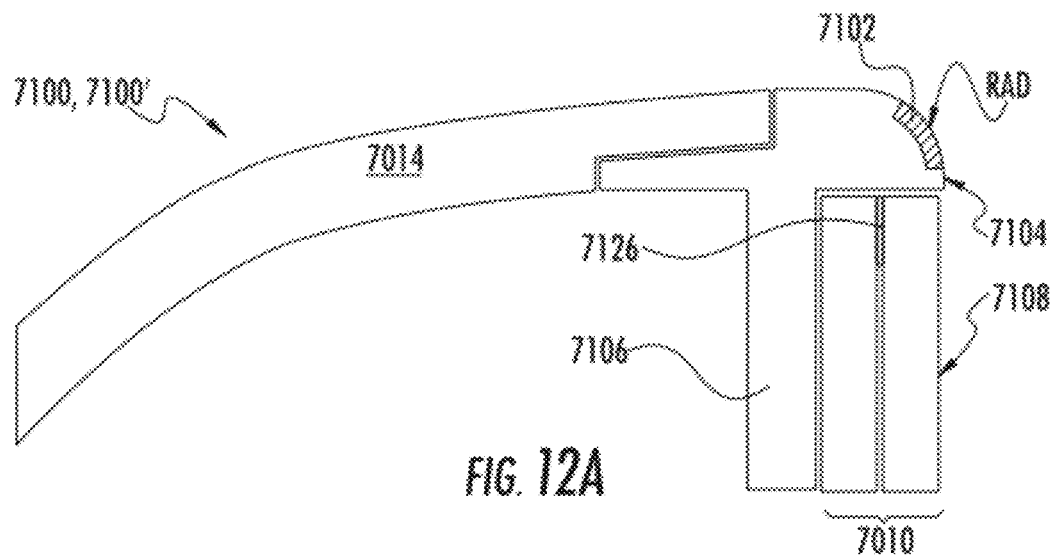
Figure 12B:
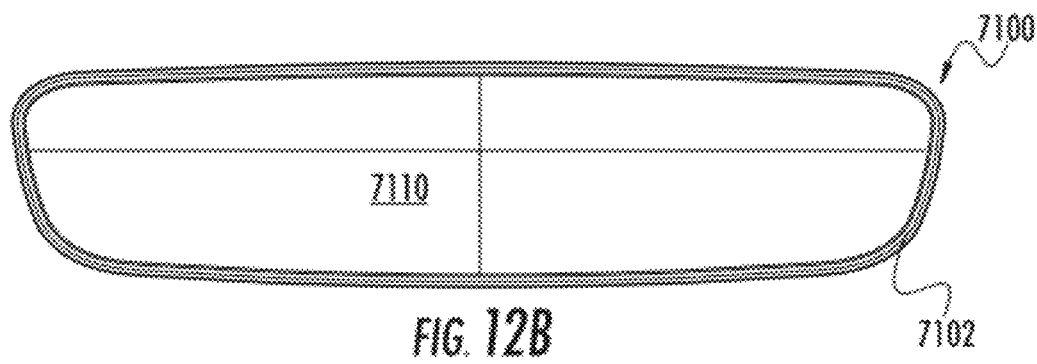
Figure 12C:
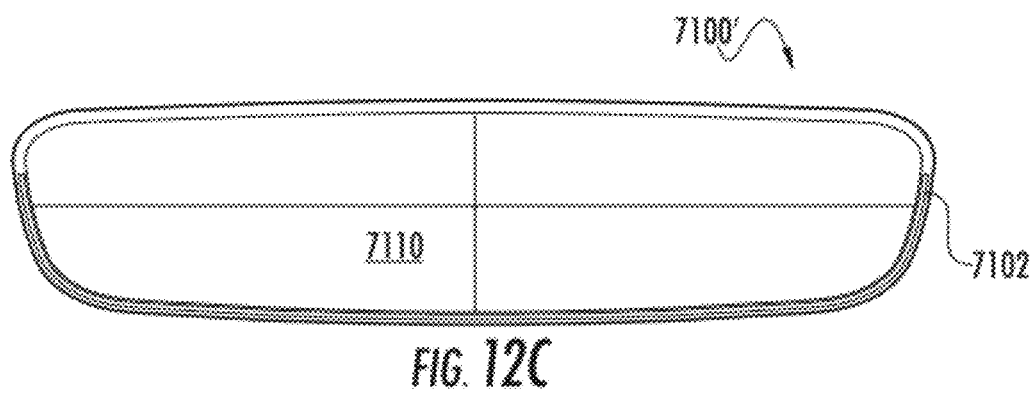

A partial side view and two different front views of an alternative bezel-less embodiment 7100, 7100' of a mirror frame are presented in FIGS. 12(A-C). As shown, a decorative inlay 7102 is inserted into a front surface 7104 of a carrier 7106 having a rounded bound, Rad≥2.5 mm, that levels the front surface 7104 with the first surface 7108 of the mirror element 7110. In this configuration, the frame 7100 does not obstruct the front surface of the mirror element. The decorative inlay 7102 may be stamped of metal or extruded from plastic and plated with metal, and attached to the carrier 7106 with adhesive, by snapping, or insert molding. It is appreciated that, to be used with this embodiment of the frame, the mirror element should incorporate a peripheral ring (not shown) to protect a seal 7126 from exposure to light. The front views of FIGS. 12B and 12C illustrate, respectively, that the inlay 7102 may or may not be present around the entire perimeter of the mirror element 7110.

Figure 13A:
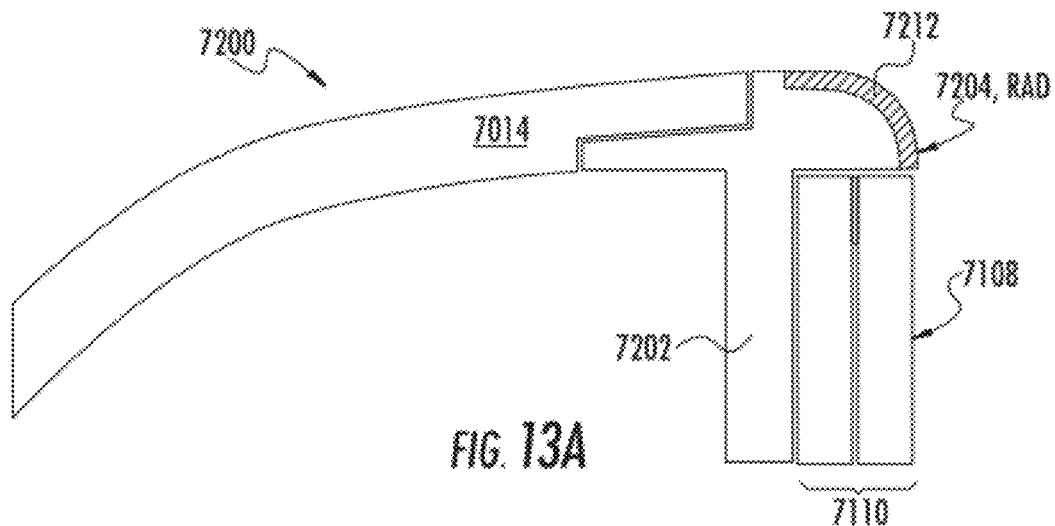
Figure 13B:
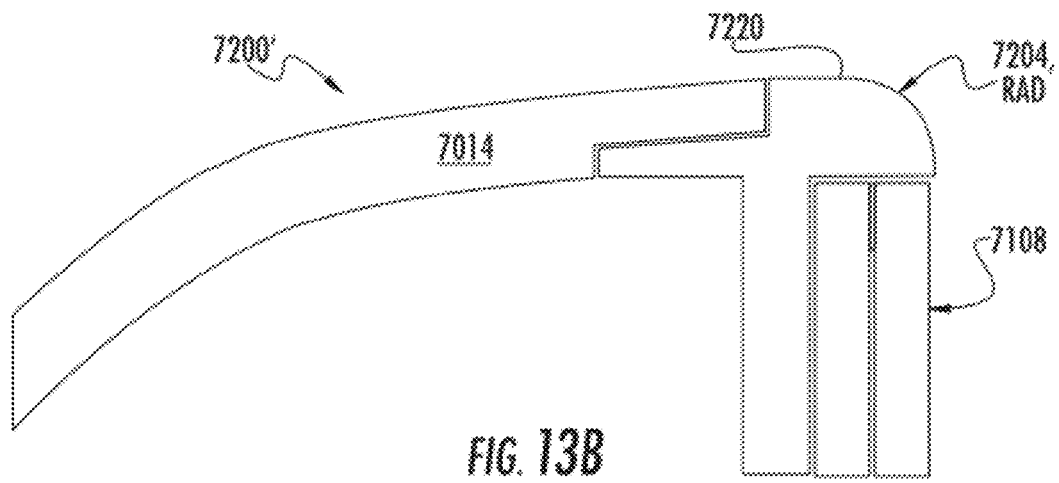
Figure 13C:
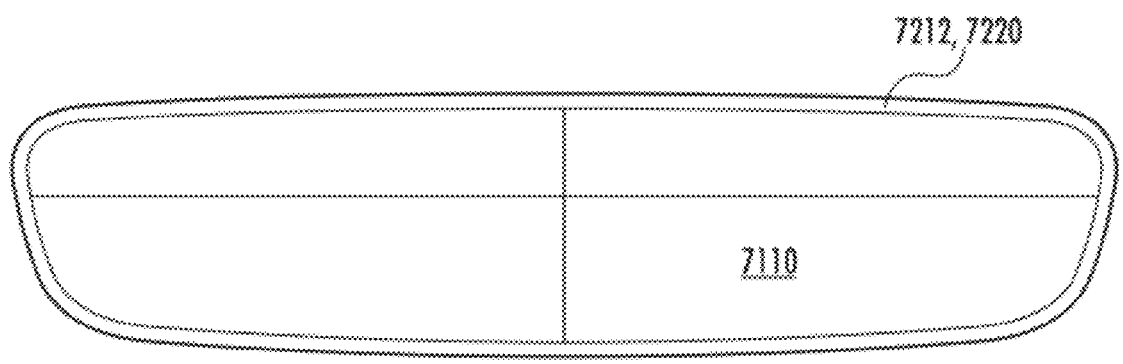

FIGS. 13(A-C) show, in side views and in front view, two more alternative bezel-less embodiments 7200, 7200' satisfying the European safety and aesthetic requirements. As shown in a multi-piece embodiment 7200, a carrier plate 7202 has a front surface 7204 rounded with a radius Rad≥2.5 mm and leveled with the front surface 7108 of the mirror element 7110. A decorative insert 7212 of the embodiment 7200 is similar to the insert 7102 if the embodiment 7100, but extends further towards the housing 7014 of the assembly thereby providing for an uninterrupted metallic appearance of the frame in the front view, FIG. 13C. A specific single-piece embodiment 7200' of FIG. 13B provides for metal-plating, painting, pad-printing or hydrographic decorating 7220 of the front surface of the carrier 7202.

Auxiliary embodiments of a multi-piece frame construction that include a carrier supporting a mirror element from the back and having an optically transparent bulbous peripheral part (which is adjacent at least a portion of an edge surface of the mirror element or even surrounds such portion around its entire perimeter and that is devoid of any extension onto the first surface of the mirror element), have been discussed in U.S. Provisional Patent Application No. 61/392, 119, which is incorporated herein by reference.

User Interface.

As was discussed herein and in Our Prior applications, various operator interface elements including buttons have been conventionally positioned in a housing or a mounting element that wraps around the edge surface of the mirror system (such as a bezel with a lip extending onto the first surface). To accommodate the interface modalities, the mounting element has to possess sufficient width. For example, a chin of the bezel containing buttons and switches of the user interface typically has to be wider than the remaining portion of the bezel including a lip that extends onto the first surface of the mirror system. Some practical systems, e.g., employ a bezel with a chin portion that may be as wide as 20 mm. Incorporating of the user-interface components into such wide mounting element causes several problems. Firstly, the presence of a mounting element with mirror having a surface of a given size increases the overall width of the rearview assembly by the width of the mounting element, thereby blocking the front view of the road to such a degree that a driver may experience discomfort. Secondly, a risk of misplacing or tilting the rearview assembly when pressing a mechanical user-interface button positioned near the edge of the assembly, in the chin of the mounting element, is increased, which causes the driver to restore the rear field of view by manually re-adjusting the assembly. Understandably, this re-adjustment may be a source of distraction to a driver. In addition, disposing movable parts such as buttons within the mounting element without additional precautions is recognized to increase the level of noise such as rattling or squeaking, which may reduce the driver's comfort on the road.

The first of the abovementioned problems, related to increasing the effective area of the mirror system perceivable by the user without necessarily increasing the overall size of the rearview assembly, has been already discussed in this application. Solutions proposed herein include the use of a lip-less bezel (or a bezel with reduced width, or no bezel at all) in combination with the use of a peripheral ring the visual appearance of which satisfies the auto-manufacturer's requirements (e.g., substantially matches the appearance of the central portion of the mirror, both in terms of color and irradiance of reflected light; or has a different aesthetics and/or provides a multi-band appearance). Such "reduced bezel approach", however, begs a question of how to re-configure the mirror system in order to not sacrifice any of the interface and/or indicator modalities that have been conventionally housed within the wide portion of the mounting element of the mirror.

Embodiments of a user interface (UI) of a rearview assembly addressing this question and discussed below can be enabled in combination with any embodiment of the rearview assembly including that employing a prismatic element; or that employing a peripheral ring; and with any configuration of the mounting element (including mounting with a bezel; bezel-less mounting; various embodiments of a carrier, housing, or casing,) discussed elsewhere in this application, in particular with those discussed in reference to FIGS. 42-54 and 58, 59 of U.S. 2010/0321758 and FIGS. 9-13 and 32-39 of the present application. In particular, references made specifically to EC-elements are made for convenience and illustration purposes only: the scope of invention also includes rearview assemblies employing prismatic elements or plane-parallel mirror elements even if no corresponding drawings are provided.

According to embodiments discussed below, elements of the UI include various functional elements such as switches, sensors, and other actuators of the rearview assembly that may be operated with no mechanical activation. Such switching elements or sensors are activated by a user input that may include placing a driver's finger in close proximity to the switching element or sensor. Alternatively, the functional element is activated when the user slightly touches on a component including the functional element in question such as, for example, a conductive pad. In response to such user input, the switching element activates, triggers, or switches one of auxiliary devices that are located inside the assembly and that may exchange visual or audio information with the user. For example, an auxiliary device may be a display that forms an image to be observed by the user through the mirror element of the assembly. In another example, an auxiliary device may include a voice activated system that will await for an audio input from the user to perform a required operation.

In addition or alternatively, proposed implementations of the UI facilitate reduction of size or, in specific embodiments, even elimination of a rim-like portion of the mounting element (and, in particular, a bezel that structurally supports the mirror system) conventionally extending around the edge surface of the mirror system of the invention. Embodiments of the user interface of the invention include switches that are labeled, for identification purposes only, as an optical switch, a capacitive on-glass switch, a capacitive through-glass switch, a capacitive in-glass switch, a capacitive glass-edge switch, a capacitive through-bezel switch, a capacitive conductive bezel switch, a conventional capacitive or a resistive touch-screen-based switch, or a waveguide-based sensor. The terms "switch" and "sensor" in the context of UI embodiments discussed herein are used interchangeably. According to the embodiments discussed below, either positioning the user's finger in proximity of a sensor or a switch of an embodiment or a gentle touch on a sensing pad located next to or on the surface of the mirror system induces the rearview assembly to activate a required function such as, e.g., illumination of a portion of a display, or dimming or clearing of an electro-optic element of the assembly. Because the operation of the user-interface embodiments of the invention may include touching an area of the first surface of the mirror element, this surface may be appropriately treated with a finger-print dissipating (smudge-resistant) coating such as the Opcuity film provided by Uni-Pixel Inc. (Clear View™).

If an input area is configured outside of the primary reflective area of the mirror, a matte finish and/or surface treatment resulting in textured surface may be used to resist fingerprints. For example, a portion of the peripheral area of the first glass surface corresponding to a peripheral ring of the mirror may be roughened (via laser ablation, for example) to produce a region that lacks specular reflective characteristics and reflect incident light in a diffusive fashion and has hazy appearance. Due to the surface structure, the visibility of a fingerprint left by the user on such surface will be reduced as compared to a glass surface characterized by specular reflection. Alternatively or in addition, a surface of the assembly can be treated with Aquapel (an oleophonic product by Pittsburgh Glass Works) to minimize the transfer and/or appearance of fingerprints.

In describing embodiments of a non-mechanically activated UI of the invention, references are made to a legend, or indicia, corresponding to a particular sensor, or a switch, or an actuator. In this context, a legend refers to a physical marking or an indication, disposed on one of the surfaces of an embodiment in such a fashion as to be perceived to correspond to a given sensor that provides identification of the given sensor and its function to the user activating this sensor. Generally, a legend or its equivalents may be configured in an opaque, transflective or translucent layer deposited on or inserted into a surface (by, e.g., masking out a portion of the layer during deposition or by pre-molding an inlay that is further implanted into a component) to form a required graphical or textual identifier that is appropriately made visible to the user, from the front of the assembly. For example, as will be discussed below, a legend may configured in an overlay patch disposed on a first surface of the mirror system or on a mounting element; in a thin-film stack of either the second or third surfaces of the mirror system; or in a surface of the mounting element that is visually accessible by the user from the front of the assembly. According to present embodiments, the most common way of causing a legend to be visible is to highlight the legend with a source of light located behind the legend with respect to the user. It is understood that even when only a particular implementation of a legend is referred to in a description of an embodiment, other appropriate implementations are considered to be within the scope of the invention and are implied.

Optical-switch-based embodiments of the user interface may include at least one of a line-of-sight sensor (interrupter) and a reflective sensor. FIGS. 14(A-C), e.g., illustrates an optical interrupter that is employed in an interface of an embodiment 7300 of the rearview assembly and that includes an IR photodiode and an LED pair (although multiple pairs may be present, corresponding to multiple interrupters). A shown, an emitter 7302 and a receiver (detector) 7304 form a line-of-sight sensor and are respectively disposed in opposing (as shown, top and bottom) portions of a mounting element 7310 that surrounds an edge surface 7312a mirror element 7314 and slightly protrudes over a first surface 7314a toward an outside portion of the rearview assembly. In one embodiment, the mounting element 7310 may be either a bezel or a carrier of the mirror system supporting the system in the assembly. When the user interrupts an optical connection established between the emitter and detector and shown with an arrow (optical path) 7320 in FIG. 14B by placing a finger across this optical path, the detector is caused to lose the reception of optical signal, which in turn triggers the sensor's response to this user input. To increase a signal-to-noise ratio of the embodiment and to reduce or reject signal interference from ambient lighting, the operation of the emitter 7302 may be modulated at a high frequency allowing the detector 7304 to be AC-coupled.

A rearview assembly function to be initiated by the user input through activation of the line-of-sight sensor 7302, 7304 may be indicated with a use of a graphic- or text-based legend 7322 associated with a display of the rearview assembly and located, e.g., within the boundaries of the mounting element 7310 on the first surface 7314a of the mirror element 7314. (It is appreciated that, in a related embodiment, when the rearview assembly contains transflective coatings such legend may be appropriately formatted in a coating disposed on either a second or a third surface, e.g., by judiciously masking a legend portion of the coating during the deposition process). In a specific embodiment, the legend 7322 may be made visible by backlighting when required. Backlighting of the legend may be provided by a simple LED, optionally with appropriate masking, or with the use of an illuminated LCD or an OLED-display from behind the element 7314. Alternatively, the legend may be incorporated in the assembly as a permanently visible graphic.

In one embodiment, the optical communication 7320 between the emitter and detector of a line-of-sight sensor of the embodiment 7300 is established through optical windows (not shown) covering the emitter and detector. Such windows may be fabricated from IR-grade transparent or translucent plastics that in the visible portion of the spectrum are perceived as being almost black and, therefore, may be color-matched with the dark mounting element 7310 to disguise the sensor areas. In a specific embodiment, the emitter/detector pair(s) may also be mounted in the mounting element in such a way as to provide a small gap near the glass that is covered in front by IR-light-transmitting plastic. Alternatively, as shown in FIG. 14C, the detector 7304' may be disposed in the back of the mirror system 7314 and light pipes 7326 may be configured to deliver IR-light 7320 to the detector 7304'. Similarly, in a related embodiment (not shown), the emitter 7302 may be disposed in the back of the mirror system, delivering light towards the front of the mirror system via another light pipe. Optionally, the hard edge of the mounting element 7310 may be rounded, preferably with a radius Rad of at least 2.5 mm, as illustrated in FIG. 14C and discussed in reference to FIGS. 11-13.

Figure 14A:
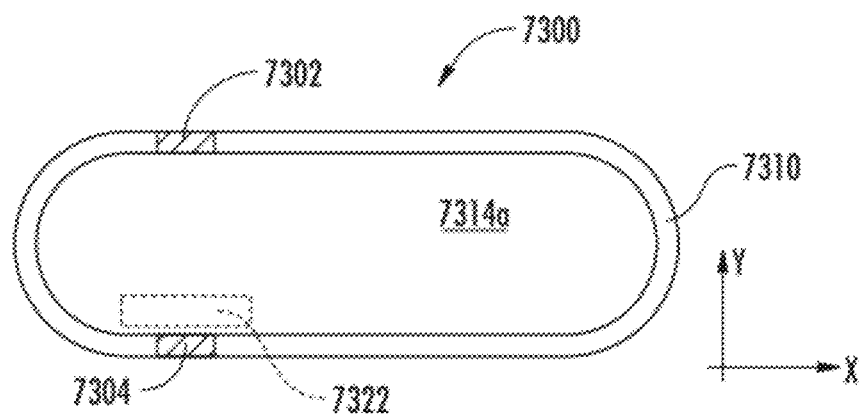
FIGS. 14(A-C) illustrate embodiments with a user interface including an optical interrupter.
Figure 14B:
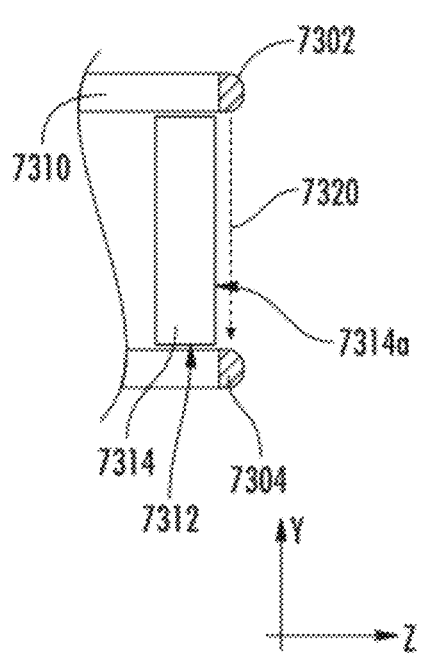
Figure 14C:
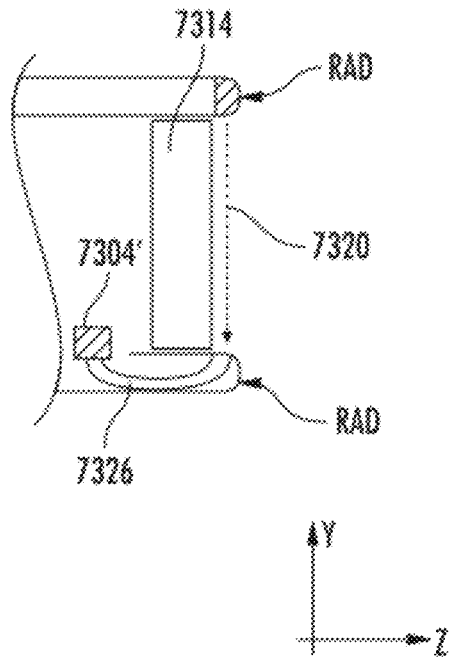
Figure 15:
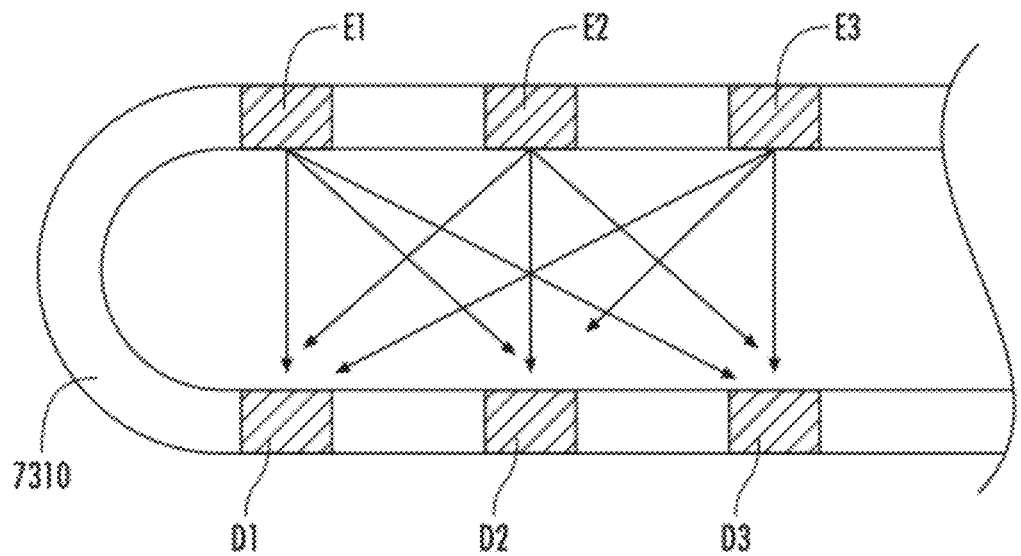
FIG. 15 schematically shows an embodiment with a user interface having three line-of-sight sensors.

Although only a single emitter/detector pair is shown in FIG. 14A, generally a plurality of such pairs may be employed. To this end, FIG. 15 schematically illustrates a specific embodiment including 3 line-of-sight sensors (3 pairs of emitters/detectors (E1, D1), (E2, D2), and (E3, D3)). In such a multi-sensor case, a process of identification of which line-of-sight among those connecting the emitters and the detector is interrupted by the user may be facilitated by operating the emitters E1, E2, and E3 in an alternating fashion. In one embodiment, the emitters are turned "on" one at a time. Once a given emitter is switched "on", all receivers are tested for signal. Based on which light path is blocked by the user's finger, six operational modes can be identified, as shown in Table 3 corresponding to the embodiment of FIG. 15. These modes allow the electronic circuitry of the rearview assembly system to decide which light-path connecting which pair of the emitter/detector has been blocked by a user (based on, e.g., a look-up table) and, consequently, to activate a corresponding function of the rearview assembly:

TABLE 3

| \multicolumn{9}{c|}{Emitter/Detector (0 = blocked, 1 = signal)} | |
|---|---|---|---|---|---|---|---|---|---|
| E1/D1 | E1/D2 | E1/D3 | E2/D1 | E2/D2 | E2/D3 | E3/D1 | E3/D2 | E3/D3 | Zone |
| 0 | 0 | 0 | 1 | 1 | 1 | 1 | 1 | 1 | 1 |
| 1 | 1 | 1 | 0 | 0 | 0 | 1 | 1 | 1 | 2 |
| 1 | 1 | 1 | 1 | 1 | 1 | 0 | 0 | 0 | 3 |
| 0 | 1 | 1 | 0 | 1 | 1 | 0 | 1 | 1 | 4 |
| 1 | 0 | 1 | 1 | 0 | 1 | 1 | 0 | 1 | 5 |
| 1 | 1 | 0 | 1 | 1 | 0 | 1 | 1 | 0 | 6 |

An indicia or legend employed with this embodiment may be dynamic and configured to be perceived as located on a surface of the mirror element. For example, a legend may be formatted as an options menu that is not highlighted from behind (not visible to the user) during normal operation of the rearview assembly. However, activation of a UI by any user input triggers highlighting of the indicia. The highlighting of the indicia may also be enabled automatically at vehicle ignition on. In various embodiments, the indicia are configured with a bitmapped display, or with a segmented displays or with masked backlit regions. Additionally, information contained in the legend may also be expressed through brightness of a legend-highlight or color (e.g., green or bright to indicate that a function is enabled and red or dim to indicate that a function is disabled).

Figure 16:
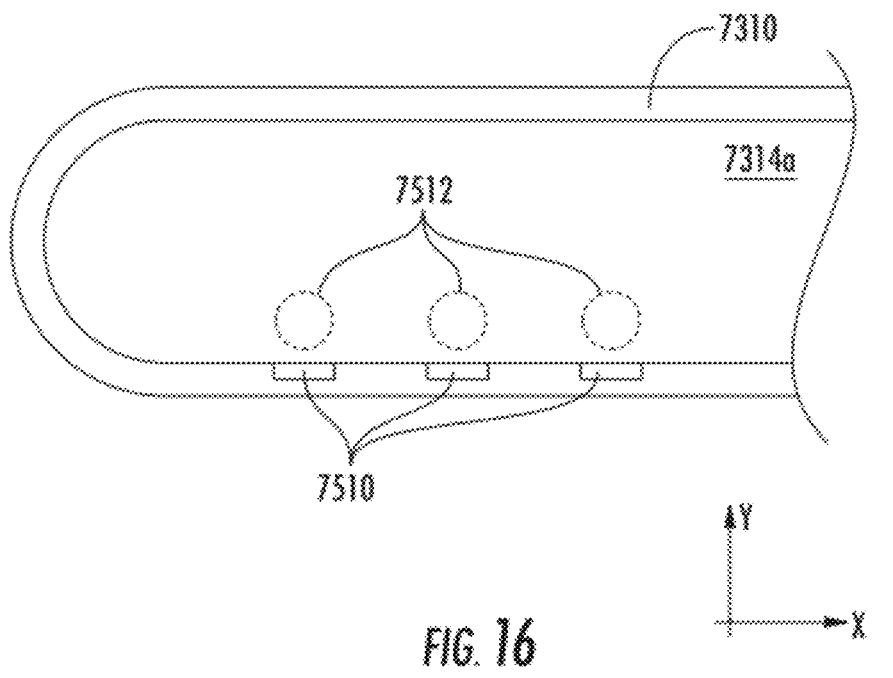
FIG. 16 illustrates an embodiment with a user interface employing an optical reflective sensor.

An embodiment of user interface of the invention employing optical reflective sensors operating in, e.g., IR-light is schematically shown in FIG. 16. As shown, the emitters and detectors of the "reflective" embodiments are disposed on the same side of the mirror element, side-by-side. A group 7510 of emitters disposed in the mounting element 7310 of the assembly, while a group of detectors is positioned at a back portion of the mirror element 7314 so as to be aligned with eye-hole openings 7512. The sensor system of either embodiment is then triggered when light emitted by an emitter reflects from the user's finger and is detected by a detector of the group through an eye-hole opening. The use of a visible-light reflective sensor instead of the IR-light-based sensor may provide an additional advantage of illuminating an area of interest for the user. In such an embodiment, operation of the emitter may also be modulated at a high frequency to increase a signal-to-noise ratio and reject interference due to ambient light. To minimize direct coupling of light from the emitter to the detector in the absence of the triggering action by the user, an appropriate optical blocking barrier (not shown) may be disposed between the emitter and the detector. A legend (not shown) can be combined with an optical opening (e.g., overlaid upon it or be formed in one of the thin-film coatings that are internal to the EC-cell, as discussed above) to convey the information about the purpose of a switch to the user.

FIG. 17 illustrates an alternative embodiment 7600 operating in a reflective mode that, in addition to detecting the user input, is capable of providing positional information in a touch-type sensor application with the use in a vehicular rearview assembly. As shown, a pair of IR emitters E1, E2 is used in conjunction with a single receiver D disposed between the emitters. It is understood that lines-of-sight corresponding to the optical devices E1, E2, and D are directed along the first surface 7314a of the mirror element 7314. In operation, the emitters are alternately enabled, and the user establishes optical connections between the emitters and a detector by placing a finger ("reflector") in a proximity of the detectors thereby reflecting portions of light, emanating from each of the emitters, towards the detector. Resulting optical signals are measured by the photodiode D. The ratio of the signals associated with the emitters provides the system with positional information about a location of the "reflector" (i.e., left or right with respect to the detector D). The sum of the two signals provides vertical position information. As a result, a rearview assembly employing the embodiment 7600 is capable of sensing and spatially resolving multiple positions, across the surface of the mirror element, at which the user communicates with the user interface of the assembly. At these positions, virtual "touching pads" of a touch-screen sensor or switch may be deployed. A legend for such a sensor can be provided in a fashion similar to that described in reference to FIG. 15. In a specific embodiment, a touch-sensor system such as that provided by the QuickSense product line of the Silicon Labs (Austin, Tex.; www.siliconlabs.com) can be used. Because the described system can resolve both X and Y positional information, multiple user-interface options are enabled. In one embodiment, virtual touch pads are configured with the use of a programmable LCD or OLED-display located behind the mirror element. Pressing these virtual touch pads causes the activation of corresponding functions. The X/Y position information can also be used to control a cursor, similar to that of a personal computer. Tapping or pressing various regions of the display would act like a mouse click on a computer. Dragging a finger across the display surface can also act like a 'drag' function, and is useful for actions such as scrolling a map in a navigation display, or to switch between menu pages.

Capacitive sensors that detect finger pressure applied to a particular sensing pad are generally known. Various capacitive sensors are available from the Silicon Labs, TouchSensor (Wheaton, Ill.; www.touchsensor.com), AlSentis (Holland, Mich.; www.alsentis.com), and Microchip (Chandler, Ariz.; www.microchip.com). Some of capacitive sensors operate on the basis of a field effect and are structured to include a conductive sensor area surrounded with a conducting ring. Capacitive coupling between these two conductors is increased when the user places his finger in close proximity.

According to an alternative embodiment of the present invention, a capacitive sensor of the user interface of the rearview assembly is configured in an "on-glass" fashion and has a sensing area, on the first surface of the mirror element, that is in electrical communication with an electronic circuit board disposed at the back of the assembly. (If multiple sensing areas are present, these areas are electrically isolated from each other). As shown in a cross-sectional view of in FIGS. 18(A, B), a layer of electrically-conductive material 7702 forming a front sensing area (or front sensing pad) is disposed on the first surface 7314a of the mirror element 7314. The front conductive pad 7702 is electrically extended through a connector 7708 to the back of the mirror element. In one embodiment, FIG. 18A, such electrical extension assures a direct electrical connection with control electronics on a PCB 7706, in which case the connector 7708 may be a pin. An alternative embodiment shown in FIG. 18B employs an electrically-conductive bridge 7710, fabricated of metal or carbon-loaded ink, between the front conductive pad 7702 and a back conductive pad 7712 positioned at the back of the mirror element 7314 (on the fourth surface of the mirror element or on a different element in the back of the mirror). The back contact area 7712 can then be further connected to the PCB 7706 by a spring contact or other well-known contacting means 7716. In a specific embodiment, a conductive elastomer may be used instead of the spring contact. It has been unexpectedly discovered that configuring the back conductive pad 7712 to have a smaller lateral extent than that of the front conductive pad 7702 facilitates the increase of signal-to-noise ratio of operating sensor by reducing offset capacitance to the ground of the system. Therefore, in a preferred embodiment the back conductive pad has a smaller lateral extent as compared to the front conductive pad.

An alternative version of the front-to-back electrical connection of a capacitive sensor may use a conductive adhesive tape or a flex circuit leading from the first surface to the controlling PCB. The top surface of the flex circuit could also include the indicia, finger print resistant coatings, a metallic or reflective cosmetic layer, and an insulating layer (such as a non-conductive layer 7704) reducing a static spark during the operation of the embodiment and increasing the electrostatic discharge (ESD) tolerance of the system.

Suitable top conductive areas or pads may be produced by metallic coatings manufactured with electroplating, vacuum deposition, or adhesive-based conductors, metallic or carbon based conductive inks The electrically-conductive coatings may employ copper nickel, stainless steel, or transparent coatings such as ITO. Non-transparent coatings can be patterned in a way such as to allow light form a backlight to pass through and illuminate the top cosmetic overlay 7704 or a legend (not shown) that may include information indicia for the convenience of the user. In the alternative, the conductive pad 7702 itself may be patterned and used as a legend for the corresponding switch. If desired, conductors such as carbon ink can be used as an underlayment color for a legend on the first surface of the mirror element. It is appreciated that the hard edge of the mounting element (if present) may be rounded, preferably with a radius Rad of at least 2.5 mm, as discussed in reference to FIGS. 11-13. Alternatively, if embodiments of FIGS. 18(A,B) are configured to be bezel-less, the front glass component may be appropriately rounded in a fashion similar to that discussed in reference to FIG. 9.

Figure 19A:
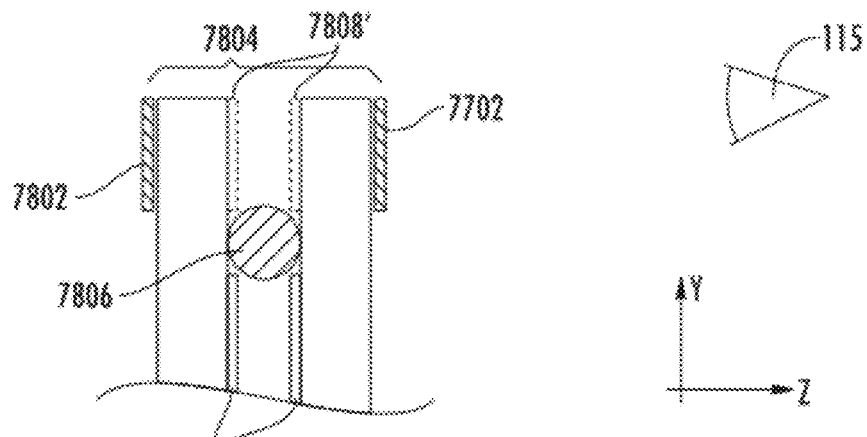
FIGS. 19(A-C) show embodiments employing a user interface having a "through-glass" type of capacitive sensor.
Figure 19B:
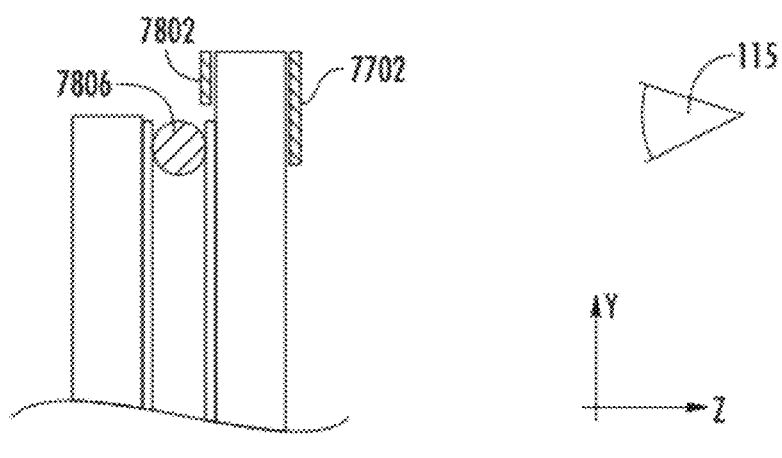

Embodiments of capacitive and field effect-based sensors for use with embodiments of rearview assembly of the invention can also be configured in a "through-the-glass" fashion. This requires that the sensor area be not shielded by a conductive layer, or at least that any present conductive shielding layer is small and electrically isolated from other parts of the circuit. Several alternative configurations of the invention employing a through-the-glass capacitive or field-effect based sensor 7802 are shown in FIGS. 19(A-C). FIG. 19A demonstrates an embodiment in which the two substrates of an EC-element 7804 are not transversely offset with respect to one another, while FIG. 19B shows an embodiment with a transverse offset between the substrates of the EC-element. Various mounting elements and housing, electrical connectors, auxiliary thin-film coatings are not shown in FIGS. 19(A-C) for simplicity of illustrations.

As shown in FIGS. 19A and 19B, both a seal 7806 and electrically-conductive coatings 7808 of the EC-element 7804 are placed far enough inboard of the EC-element with respect to a seal 7806 to keep the EC-medium from shielding the front and back sensor pads 7702, 7802 and/or providing electrical interference with its operation. (Optionally, the transflective conductive coatings of the EC-element may have external portions 7808' as shown in a dashed line in FIG. 19A. A PCB or flex circuit is located at the back side of the element. The front sensing pad 7702 may have an insulating overlay and a legend (not shown) carried thereon, and the circuitry may optionally contain LEDs to illuminate a touch pad area (corresponding to the overlay 7704) employed by the user to activate the sensor.

Figure 19C:
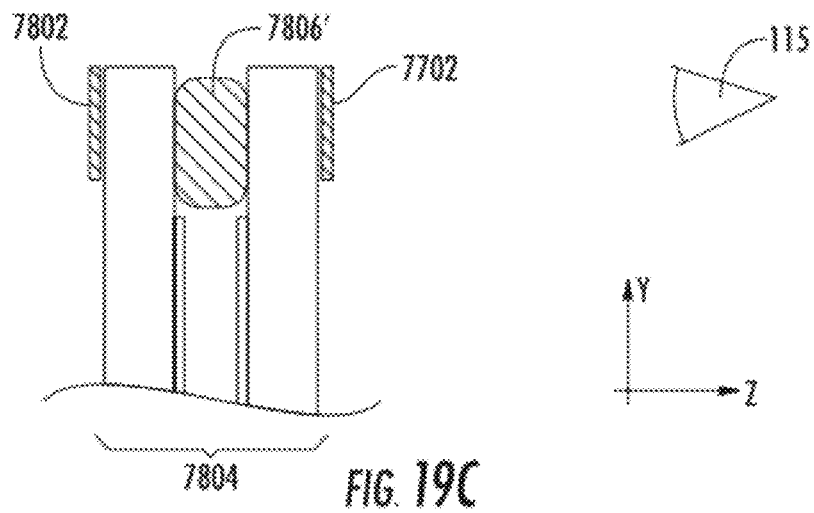

In comparison with FIGS. 19A and 19B, where the seal 7806 is configured to be narrow and transversely offset with respect to the sensor pads, the embodiment of FIG. 19C illustrates a situation where the seal 7806' is configured to be wide and placed in the area of the sensor (between the front and back conductive pads 7702, 7802). This embodiment may require a use of wide peripheral ring configured to extend over the seal 7806'. Here, the seal is made of material that is transparent or at least translucent at the wavelengths of light used to backlight the indicia/legend on the front of the mirror element through the mirror element. In addition, the seal material can also be adapted to optically diffuse light to provide for optically diffusive appearance of the first surface indicia. "Through-the-glass" sensing embodiments of user interface for use with rearview assembly additionally improve the ESD protection of the sensor electronics. It is appreciated that the hard edge of the mounting element (not shown) may be rounded, preferably with a radius Rad of at least 2.5 mm, as discussed in reference to FIGS. 11-13. Alternatively, if embodiments of FIGS. 19(A,B) are configured to be bezel-less, the front glass component may be appropriately rounded in a fashion similar to that discussed in reference to FIG. 9.

Figure 20A:
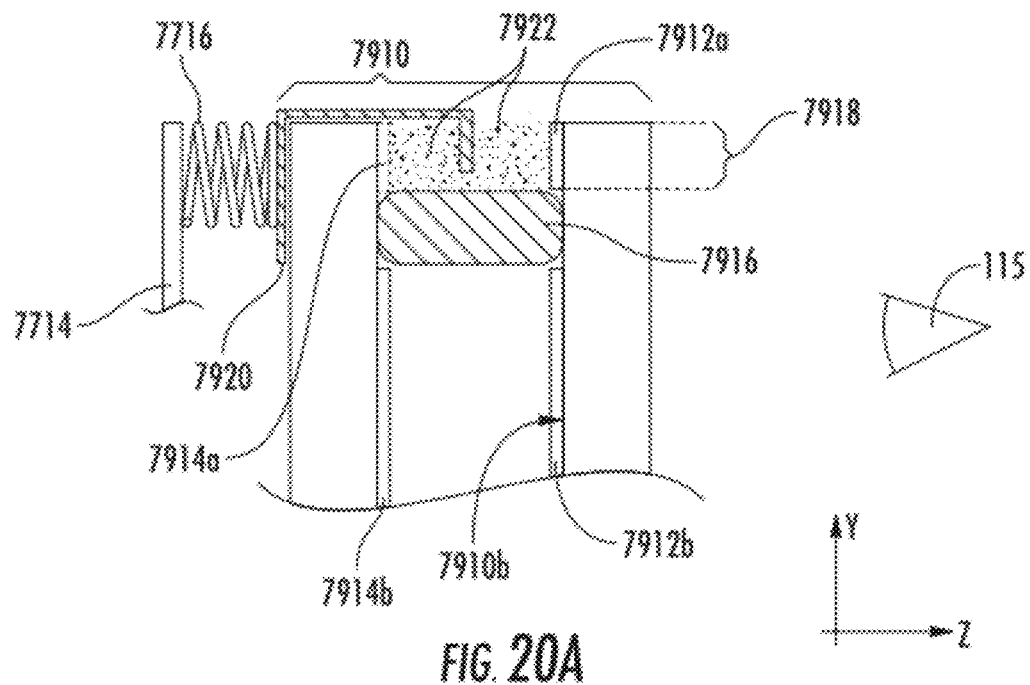
FIGS. 20(A, B) show an embodiment employing a user interface having an "in-glass" type of capacitive sensor.
Figure 20B:
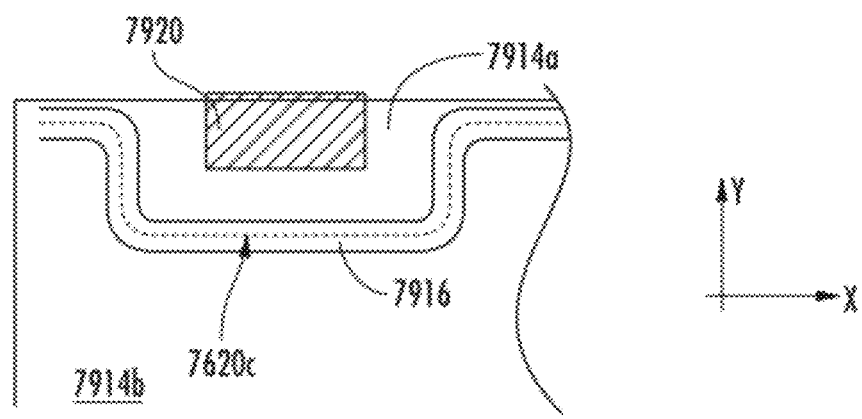
Figure 20C:
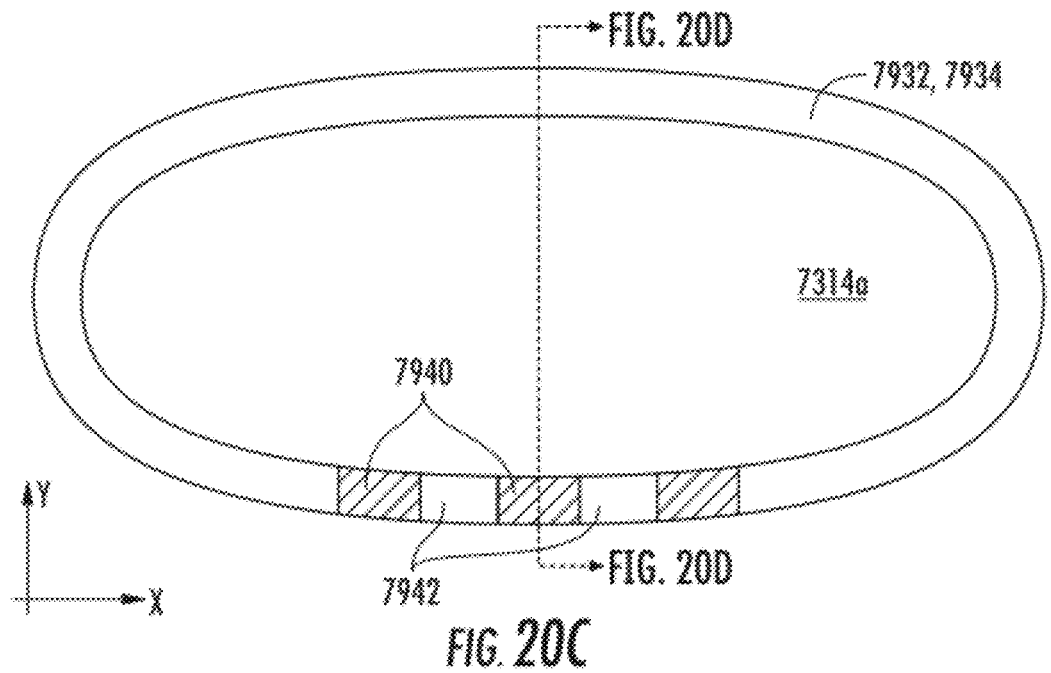
Figure 20D:
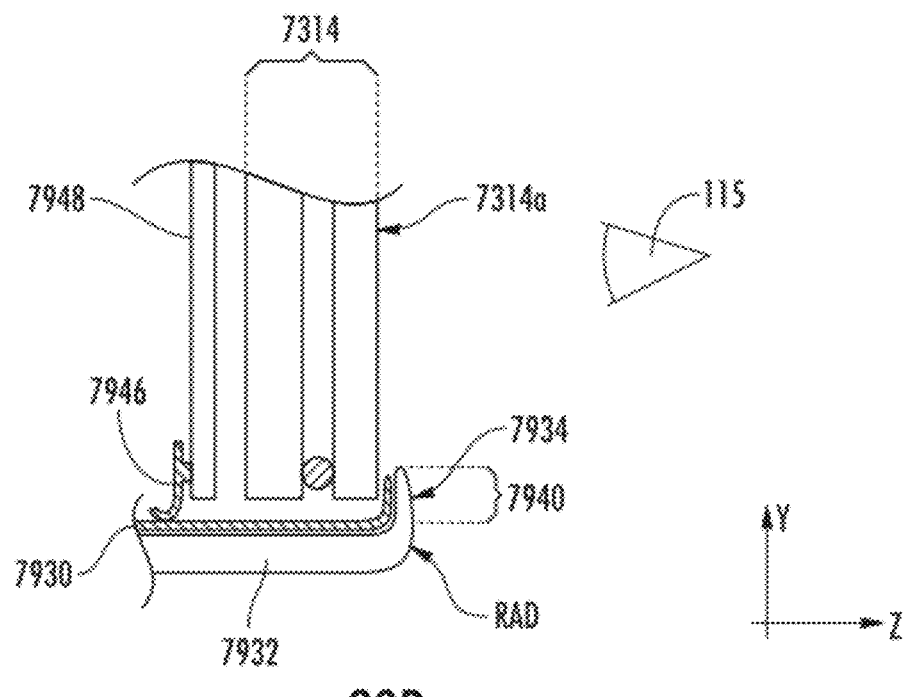
Figure 20E:
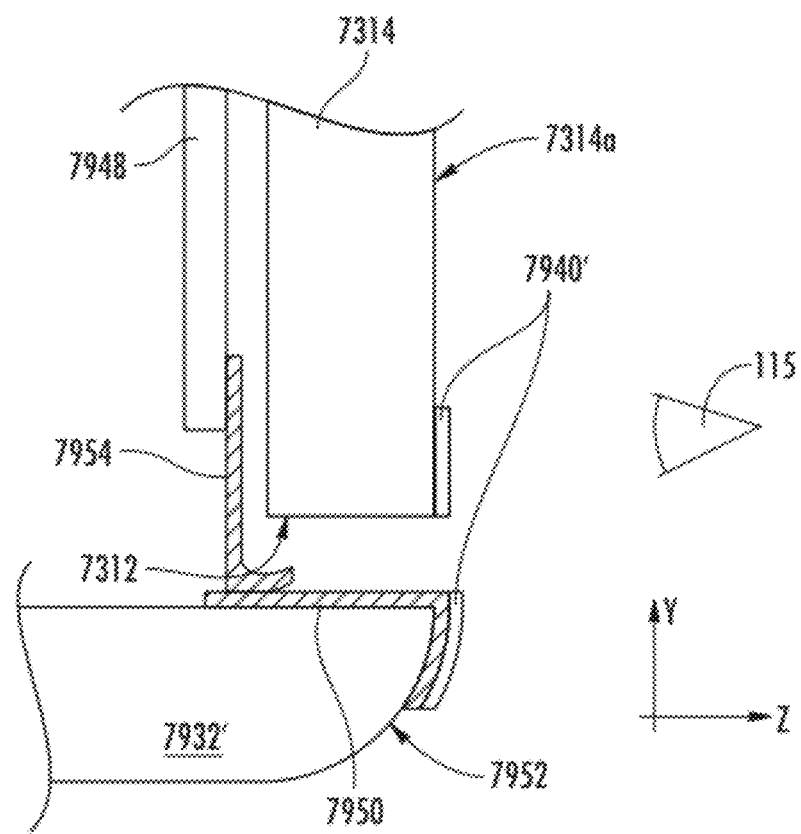

In embodiments of the user interface of the present invention that utilize capacitive "in-glass" based sensors, the electrically conductive layers and connectors positioned internally with respect to the EC-element are configured to serve as sensor areas. In one embodiment, schematically shown in FIGS. 20(A, B), a transparent electrode 7912 of the EC-element 7910 (located, as discussed, on the second surface 7910b of the element) is configured to have electrically independent portions 7912a, 7912b, where the portion 7912a forms a sensing area. The reflective electrode 7914 of the third surface of the EC-element is preferably isolated into portions 7914a and 7914b, where the outer portion 7914a corresponds to the sensor area 7819 and is optional (as indicated by a dashed line). When the two portions 7914a, 7914b are electrically connected and form a single electrically-conductive coating (not shown), it is preferred to keep the reflective electrode at or near a ground potential. As shown, the seal 7916 is appropriately positioned in-board with respect to the sensor area 7918 to prevent electrical interaction between the sensor area and the electrochromic gel (not shown). In a related embodiment (not shown), where the sealing material may be extended into the sensing area 7918, the seal 7916 is configured to be translucent (either clear or optically diffusing) to allow for backlighting of a legend (not shown) corresponding to the sensor. (As in any of the user interface embodiments discussed in this application, a legend may be located on the first surface of the embodiment or, alternatively, in a non-transparent inner layer of the EC-element, or may be backlit by masking or programmable display.) FIG. 20B illustrates a front view of the embodiment of FIG. 20A, where the reflective electrode 7914 includes two portions—the outer portion 7914a corresponding to the sensor area 7918 and the inner portion 7914b corresponding to the central area of the mirror system of the rearview assembly. The portions

7914*a* and 7914*b* are then electrically isolated from one another with an isolation trench or area 620*c* created in the reflective electrode as discussed elsewhere herein. FIG. 20B schematically illustrates, in top view, one possible way to dispose the seal 7916 around the electrical connector 7920 submerged in epoxy 7922. In one embodiment, the epoxy may be non-conductive. Although neither a mounting element nor auxiliary electrical connectors have been shown in FIGS. 20(A, B), it is appreciated that, in a specific embodiment, the mounting element including a bezel may be present. In this case, the hard edge of such mounting element is preferably rounded with a radius Rad of at least 2.5 mm, as illustrated in FIG. 14C and discussed in reference to FIGS. 11-13. Alternatively, if embodiments of FIGS. 19(A,B) are configured to be bezel-less, the edge of glass component may be appropriately rounded in a fashion similar to that discussed in reference to FIG. 8.

In a capacitive glass-edge embodiment of the user interface (not shown), spatially isolated electrically-conductive connectors such as metallic tabs or conductive coatings are added to the edge of the glass or on the inner surface of the mounting element. In a specific embodiment, such a connector may extend inboard with respect to the edge surface of the EC-element. The conductive epoxy currently being used may be segmented, and separate segments are then electrically contacted to the PCB.

A capacitive through-bezel type of interface sensor embodiment, schematically shown in FIGS. 20(C, D), a flex circuit or an electrical conductor 7930 is placed behind and underneath the mounting element 7932 having a front lip 7934 extending onto the first surface 7314*a* of the mirror EC-element 7314 and, preferably, having a rounded profile with a radius of at least 2.5 mm. The embodiment of the sensor or switch is activated when the user touches a front pad 7940 configured on a front surface of the mounting element 7932 to carry a legend or indicia. In another embodiment, where several front pads 7940 are present that are made electrically conductive, these pads separated by corresponding non-conductive areas 7942. (If front pads are made electrically conductive by appropriate deposition of an electrically conductive film or by use of an electrically-conductive insert as described elsewhere herein, the separating areas 7942 are made non-conductive.) The flex circuit 7930 may have several extensions behind the lip 7934, with each extension positioned to correspond to a different front pad. Alternatively, several individual flex circuits could be used for each of the sensors corresponding to each of the front pads 7940. Flex circuit may optionally contain the sensing electronics and LEDs. A leaf-spring contact 7946 to the main board 7948 could be used instead of a wire to establish a required electrical connection. It is appreciated that a sensor legend (not shown) may be disposed on a surface of the front lip 7914 visible to the viewer 115, and the mounting element may be made of translucent material, in which case the legend is highlighted, e.g., by light channeled by the mounting element from a light source (such as LED, not shown) at the back of the system. In a related embodiment, the element 7930 may be a simple contacting electrically-conductive layer such as a foil, a mesh, or a thin-film layer establishing the electrical communication with the main board at the back of the system. A related alternative embodiment is schematically illustrated in FIG. 20E, where an electrical conductor 7950 is disposed on the inner surface of a lip-less mounting element 7932' substantially surrounding the edge surface 7312 and partially extends to a front, outer surface 7952 of the mounting element A second electrical conductor 7954 such as a leaf-spring is adapted to provide electrical connection between a conductive pad (not shown) of a main board 7948 and the front surface 7952 of the mounting element 7932'. In this embodiment, a front pad 7940' carrying a legend may be configured on either both the front surface 7952 of the mounting element and a peripheral portion of the first surface 7314*a* of the mirror element 7314 as shown, or, alternatively, only on the front surface 7952 of the mounting element.

Figure 20F:
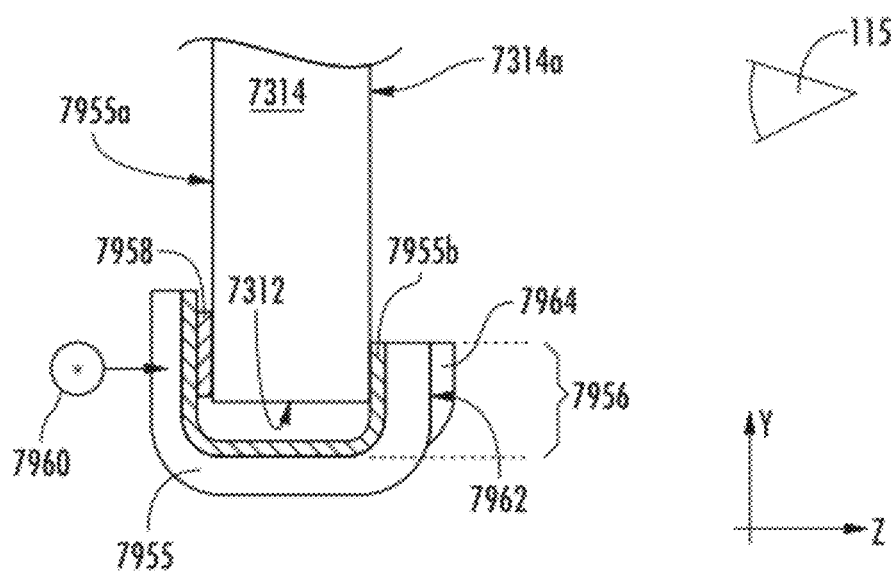
Figure 20G:
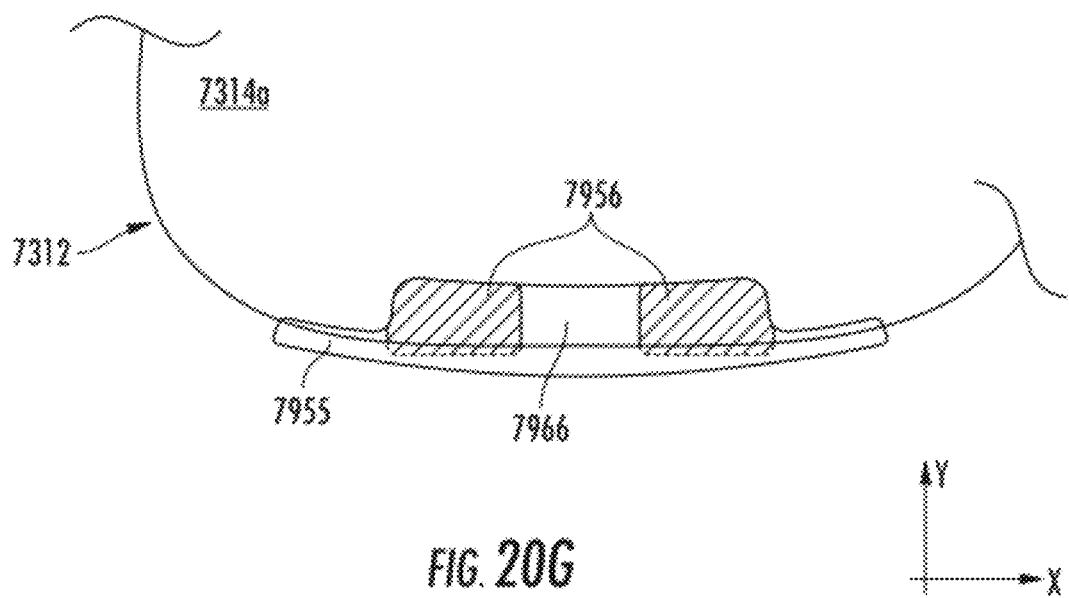

Another alternative embodiment of a component of a user-interface sensor (such as a capacitive sensor or a field sensor) of the invention operating as a switch for an auxiliary device located inside the assembly is shown in cross-sectional and front views in FIGS. 20F and 20G, where a plastic cap 7955, providing a tray-like covering for a peripheral portion of the mirror element 7314, is used to configure the component in issue. An inner surface of the removable cap 7955, which is appropriately sized to assure a close fitting around the edge surface 7312 of the mirror element 7314 and is appropriately shaped to sufficiently extend onto and both the first surface 7314*a* and over the back 7955*a* of the mirror element, is overlayed with an electrically-conductive covering 7955*b* forming a thin-film layer, a foil, or a mesh. In one embodiment, the inner surface of the cap 7955 is in physical contact with both the first surface 7314*a* and the back of the mirror element. A front portion 7956 of the covering 7955*b* corresponding to a front portion of the rearview assembly acts as a front electrically-conductive pad of a sensing element. A portion of the covering 7955*b* that wraps around the edge surface 7312 to extend onto the back 7955*a* of the mirror element establishes an electrical contact between the electrically-conductive portion 7956 and a back conductive pad 7958 (such as a thin-film layer) disposed at the back of the mirror element. The cap 7955 may be configured from a plate of translucent plastic-based material bent so as to fit around the mirror element of the rearview assembly and to allow for light channeling, within the thickness of the cap, from a light source 7960 in the back of the assembly towards an indicia/legend carried on an outer surface 7962 of the cap. The legend (not shown) may be disposed within the surface 7962 (by imprinting, for example) or in a legend-layer 7964 carried on the surface 7962 so as to overlap with the pad 7956, when viewed from the first surface 7314*a*. It is appreciated that a front portion of the cap that extends over the first surface 7314*a* provides the embodiment with a reliable ESD protection due to a finite thickness of the cap, which may be anywhere from several hundreds of microns to a few millimeters. In an embodiment having several sensors, the electrically-conductive covering is adapted to include several sub-coverings electrically insulated from one another, along the inner surface of the cap 7950, with non-conducting areas 7966. In operation, the cap 7955 is removably put on over the edge surface of the mirror element.

Figure 21A:
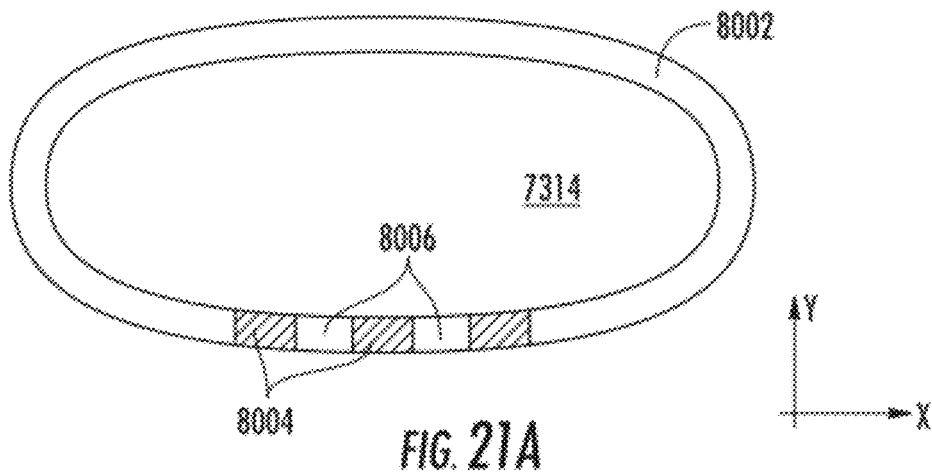
FIGS. 21(A-C) illustrate embodiment having a "capacitive conductive bezel" type of user interface.
Figure 21B:
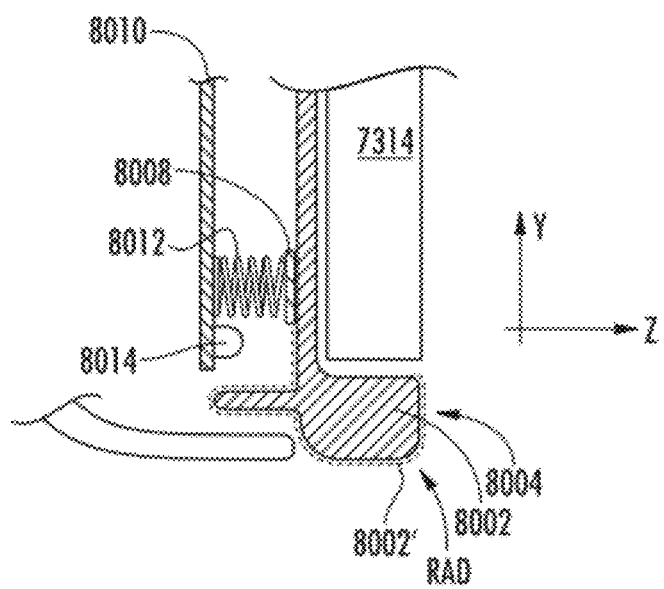
Figure 21C:
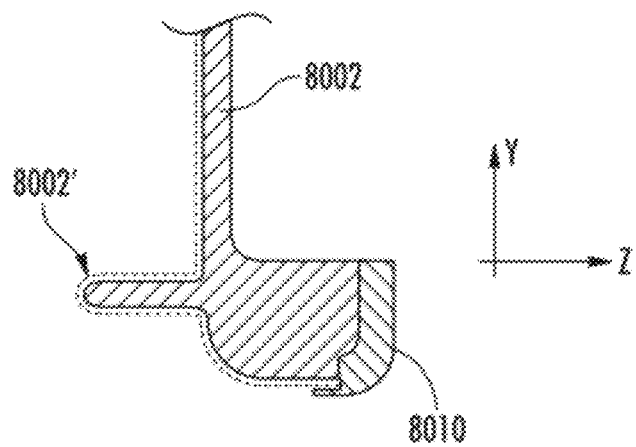
Figure 22:
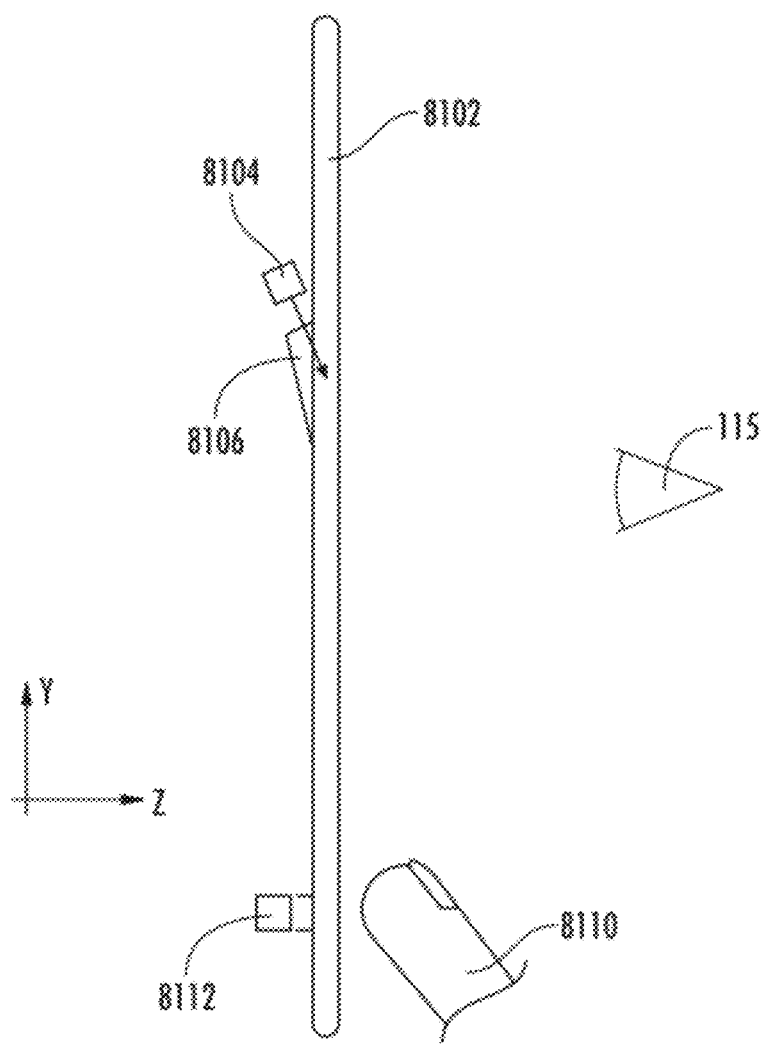
FIG. 22 shows an embodiment where a user interface employs an optical waveguide element.

In a "capacitive conductive bezel" type interface, an embodiment of which is schematically shown in FIGS. 21A and 21B, a plastic mounting element 8002 (such as a carrier extending around an edge surface of the mirror element 7314) having metallic coating, deposited on a portion of the outer surface of the mounting element 8002 and shown with a dashed line 8002', is spatially segmented with electrically-isolated areas 8006 thereby forming electrically conducting pad areas 8004 that the user will touch to activate a corresponding switch. The mounting element 8002 may also be used as a combination element/PCB holder. The isolation pattern 8006 may be defined by laser treatment, CNC, etching, or masking during deposition of the pattern to separate pads corresponding to different switches so as to provide for independent electrical communication between each of the front pad areas 8004 and a corresponding conductive pad (shown as 8008) on the back of the mirror system. A rear electrical pad area 8008 can be further electrically connected to a PCB 8010 through a spring or an elastomeric contact 8012. For the convenience of the user, a legend or other graphics (not shown) identifying a particular pad and a corresponding switch can be incorporated by inscription into the metallic coating 8002' in the area 8004. In this case, to facilitate backlighting of the legend by an optional light source 8014 such as an LED disposed in the back of the mirror system, the element 8002 may be made of transparent or translucent material. Coupling of light from the source 8014 to the translucent mounting element 8002 can be configured directly or with the use of an auxiliary optical component (not shown), and the mounting element will channel the coupled light towards the indicia at area 8004. Alternatively, indicative graphics/legends can be placed on the first surface (or formed in thin-film layers located within the EC-element) adjacent to corresponding switch areas 8004, or backlit by LCD or masked LED graphics. In addition, the conductive coating 8002' may be overcoated with a clear insulating coating layer to protect the finish, or may alternatively be painted to color-match the vehicle interior or some other components, as instructed by the auto-manufacturer. In a specific embodiment the front conducting areas 8004 of the mounting element 8002, a portion of which is shown in FIG. 21C, can be configured as separate inlays 8010 that are inserted within the mounting element 8002 in a fashion similar to that described in reference to FIGS. 11-13.

In addition or alternatively, various already existing and commercially used (e.g., in cell phones, PDAs, navigation systems) capacitive or resistive touch screen systems may be used as part of a user interface in a rearview assembly of the invention.

Various modifications of the embodiments are contemplated within the scope of the invention so as to optimize the performance of the user interface. For example, in any of the embodiments of a mirror system that includes legend/graphics on the first surface and a mounting element having a lip extending onto the first surface, the mounting element may be raised slightly above the glass surface so as to reduce or prevent the wearing off of the graphics during handling (such as during loading into a shipping box and rattling or vibrating in the box during shipment). For the same reason, if a legend is placed onto a lip of a mounting element, the legend may be recessed slightly into the surface of the lip. In a different example, with any of the embodiments that use capacitive or field effect sensors, an additional optical emitter/detector pair may be used to detect that the user's finger is approaching an interface. Such additional optical sensing pair can act as a 'gate' for the computer program product that enables the capacitive or field effect sensors, thereby increasing the sensitivity of the embodiment by rejecting spurious electrical noise events that may occur during the time intervals when the user is not using the interface. Increase in sensitivity of detection in this way may facilitate the use of the user interface by a driver wearing gloves, where otherwise the gloves reduce the electrical effect that a finger would have on the sensor. In another embodiment, an electronic circuitry of the rearview assembly may be configured to utilize the increased sensitivity of a sensor in such a fashion as to provide for a time-period, after the sensor of the interface has been activated, during which the legend/indicia of the sensor remains lit and visible. In a related embodiment, the legend may be kept lit dimly (to minimize visual distraction of the driver), but be illuminated more intensely when the driver's hand is sensed to be reaching for the legend.

In one embodiment of the invention, an area of the first surface corresponding to a virtual button of a switch (whether an optical switch or a capacitive switch) of the UI of the embodiment is appropriately adapted to enhance tactility associated with the virtual button and to facilitate a touch-based identification of the button's location. In particular, a region of the first surface approximately corresponding to a boundary of a virtual button is structured to include a textured patch or a surface relief that can be easily identified by touch on the background of the smooth surface of glass surrounding the area of the textured patch or surface relief. In a simple case, a region of the first surface corresponding to the switch button can be simply roughened/ground (and, optionally, coated with a colored layer), or textured with abrasive blasting or laser ablation, or formed by epoxy deposition or by adhering a textured appliqué. If a virtual button is formed in a mounting element such as a portion of a carrier protruding towards the first surface, the recessed or raised areas may be molded into such portion of a carrier.) A textured/roughened/ ground area of glass corresponding to a virtual button of a switch positioned in a peripheral ring area of the mirror element (especially when the thin-film coatings of the peripheral ring include metallic layers) facilitates, on one hand, the reduction of glare experienced at night in reflection of the peripheral portion of the mirror element of the rearview assembly and, on the other hand, conceals electrical contact associated with the button. In another example, such a region can be carved out (or ground out, for example) to form a recess or indentation in the glass surface that facilitates a palpable sensation of presence of the button area. A boundary of the carved-out area may be generally chosen to be of any desired shape (such as circular, oval, rectangular, and the like). The indented/recessed surface of the relief area can be either ground, roughened or smooth. A like recess area can also be formed on a second surface of the front substrate in an embodiment where the legend of the switch button is positioned behind the second surface. In this case it may be preferred to assure that the recessed surface is smoothed or even polished: An effective lens defined by the portions of the flat first surface and the recessed (curved) second surface associated with the button area will facilitate the visual perception of the button indicia/legend located behind the curved second surface.

While direct electrical connections have been discussed in reference to FIGS. 18-21, such direct connections are not always required. A flexible conductor insulated on both sides can wrap from the front surface to the back (similar to the on-glass solutions above). Having both sides insulated allows a protective cosmetic layer on the visible surface, but also allows the back side of the conductor to avoid short circuits to the exposed conductors at the edge of the element. A larger area spring contact to the electronics can compensate for an indirect connection, as this will form a capacitive coupling to the sensor.

In all optical or capacitive sensor based systems it is preferred to have a direct feedback that the sensor has been activated. Appropriate feedback can be provided for the user using optical, audible, or haptic mechanisms. An optical feedback mechanism may include a change of brightness or color of back-lit indicator(s) associated with the activated sensing area of the user interface. An audible feedback mechanism may employ a speaker or a piezoelectric device as part of the rearview assembly, or a direct connection or a network connection to an audio device already present in the vehicle. A haptic feedback mechanism can mechanically indicate (by, e.g., initiating a slight vibration of the mirror using offset weight electric motors or an electromagnetic actuator) to the user that a given function/device has been activated. For example, a sensation of "friction" (tactile feedback through electrovibration, haptic response) can be created in an finger placed in a proximity of the surface, to simulate a perception "touching" the surface via electrical pulses sent to the conductive material of a switch pad. In one example, the conductive pad of a switch located on the first surface is coated with an insulating material. By applying periodic voltage to the conductive pad from a specific control circuit via appropriately adapted electrical connectors, an effective electrical charge is induced in a finger proximal to the conductive pad. By changing the amplitude and/or the frequency of the applied voltage, the surface of the insulating cover of the switch pad can be made, without creating a mechanical vibration, to feel as though it is bumpy, sticky, rough, or vibrating. It is appreciated that in a related embodiment the control circuit can be adapted to supply different driving set of voltage signals to different switch pads to generate different sensations that respectively correspond to switches of different rearview assembly functions that the user can trigger.

In an embodiment employing a user interface of the invention in conjunction with a mirror element having a rounded edge (such as embodiments of FIGS. 9, 10), the first surface overlay of the user interface may be wrapped around the rounded edge of the mirror element to create a continuous surface appearance. This may be done with pad printing, or adhesive overlay. Electrical isolation among the sensing areas of the embodiment discussed in reference to FIGS. 14-21 should be equivalent to a resistive separation of at least 10 kOhms, and, preferably, 100 kOhms or greater. Levels of ESD, measured according to industry standards, should be on the order of at least several keV, for example 4 keV, preferably 15 keV, more preferably 20 keV.

It will be appreciated that in another alternative embodiment a sensing/switching element of the user interface of the rearview assembly may be configured with the use of waveguide optics. In particular, the first surface of the mirror element may be appropriately overcoated with a slab waveguide layer 8102, as shown schematically in FIG. 22, guiding the light coupled from a light source 8104 through a coupling means 8106. The coupling means 8106 may be configured as any appropriate coupling means used in waveguide optics (a diffractive element, for example). When an external object 8110 such as a user's finger makes optical contact with the surface of the waveguide layer 8102, the waveguiding is frustrated and light leaks from the waveguide thereby scattering around the point of contact. The scattered light is further detected by an optical detector 8112 (an optical diode, CMOS or other sensor). While light in different spectral regions can be generally used for the purposes of the user interface in a rearview assembly of the invention, a narrow band light source 8104 preferred to reduce potential interference with ambient light and increase signal-to-noise ratio of the operating embodiment. Other techniques, such as pulsing of the light source to differentiate a touch response from ambient light levels through comparison of source on, to source off detected light levels can be used to actively correct for background and/or stray light and prevent false responses.

Yet another alternative implementation (not shown) a sensing/switching element may employ an acoustic wave source in optional cooperation with an information display, as part of the rearview assembly. In this acoustic-sensor implementation, a display is positioned outside of the EC-cell of the mirror element of the assembly and behind a glass substrate (as viewed from the front of the assembly). Acoustic waves are transmitted from the acoustic wave source across the surface of the glass substrate (or through the glass substrate itself), and are absorbed by a finger of the user placed in proximity to the glass surface. An electronic controller that drives the acoustic wave source is configured to determine coordinates of the "touch" across the display by registering a change in the wave frequency at the touch location. Advantages of this embodiment include unsusceptibility of the performance of the switch to scratches and other damage of the surfaces of the embodiment.

Another embodiment of the switching element may use force sensing technology, where pressure from touching the surface of the information display is registered by strain sensors mounted at corners of a rigid piece of glass. The different strain levels recorded by the sensors are used to determine touch location. By identifying (with indicia) different virtual switch buttons at different locations across the front surface, the force-sensing switch can, therefore, be implemented with an embodiment of the rearview assembly of the invention.

An embodiment of a resistive switch may also be used with an embodiment of the invention. The resistive touch screen includes a transparent, flexible membrane layer and a transparent static layer. The flexible layer may contain polyester with a conductive coating, while the static layer can be made of rigid polyester or other rigid transparent material. When pressed (for example, with a user's finger), the conductive coating effectuates ohmic contact with a conductive coating on the static layer. Adhesives that keep the layers aligned and in close proximity to one another are located only on the periphery of the transparent area. However, small insulator elements are interdispersed between the layers across the display area to control actuation force and prevent the layers from making contact when the screen is not being touched. It is appreciated that a top layer of this structure is a continuous film, which simplifies sealing of the structure against harsh environmental conditions.

In fabrication of the above-discussed embodiments of the user interface, a conductive capacitive or resistive switch pattern can be fabricated on or in a pattern-carrier (that may be a mounting element such as the element 7310 of FIG. 14, for example, or the surface of the mirror element) as follows:

The pattern carrier can be coated with a metal or conductive metal oxide, sulfide, carbide or nitride by vacuum evaporation, sputtering or other PVD processes. The pattern carrier can be plated with metal. Metal containing or metalorganic inks can be applied to the pattern carrier. A conductive polymer such as polyanaline can be used to form the conductive pattern on or in the pattern carrier. Other techniques for applying and patterning conductive materials on substrates (such as those as described in U.S. Patent Application Publication U.S. 2007/0201122 A1 that is incorporated herein by reference in its entirety) may also be applied. Conductive coatings can be applied in a pattern or patterned or segmented in a secondary operation using a laser, chemical etch, water jet, sand blasting or mechanical cutting, milling or scoring.

Conductive metal or conductive plastic inserts can be molded or fashioned and then incorporated into the molded mounting element during the injection molding process or placed or pressed into or onto the mounting element after the molding process. A two-step injection molding process could be used with a first step involving molding of conductive portions of the mounting element from electrically-conductive plastic and another step involving molding non-conductive portions of the bezel using a non-conductive plastic. A contact point that engages the switch could also be a plastic or metal form or tape that contains the switch conductor or pattern that is adhered to the mounting element or a surface of the mirror element, preferably in a periphery of the mirror substrate.

A thin metal film, or metal tape, or conductive resin could be affixed to the inside or outside surface of the mounting element or the first surface of the mirror element to form the switch contact point. Segmented conductive switch patterns could be formatted on such a film or tape prior to adhering it to the pattern carrier.

A conductive paint such as a graphite, carbon nanotube, or carbon black filled resin, or a resin that is filled with a transparent or translucent conductive metal oxide particle (antimony doped tin oxide, aluminum doped zinc oxide, tin doped Indium oxide, indium oxide, zinc oxide or indium zinc oxide, for example) can be used for form conductive switch patterns on the surface of the pattern carrier. An opaque film such as a carbon-loaded paint can be applied over a translucent or transparent substrate and patterned to create an icon that could be backlit by light illuminating such a substrate. The opaque paint or film could be conductive, or, alternatively, the substrate could be coated with a transparent conductive material such as a TCO (transparent conductive oxide), a thin conductive polymer such as polyanaline. In a specific embodiment, the substrate could be filled with transparent conductive particles such as indium oxide, indium tin oxide, zinc oxide, tin oxide, or low concentration levels of carbon nanotubes or metal fibers or transparent particles or fibers coated with a transparent conductive material such as antimony doped tin oxide or indium tin oxide.

In embodiment employing a capacitive type switch, it is desirable to protect the conductor and electronic circuitry from static discharge. Such protection is provided by overcoating the conductor with an insulating layer of plastic, ceramic, paint or lacquer or recessing the conductor in such a way as to avoid contact with potential static generating items (like the human hand or finger).

It is understood that at least one of the transparent and reflective electrodes of surfaces II and III, respectively, could be segmented or patterned with an icon/legend in an area corresponding to the area of the conductive switch or sensor. A peripheral ring could also be segmented and if desired patterned with an icon with or with out a backlight into a conductive switch contact area.

The icon and/or switch circuitry and/or backlight illuminator can be entirely contained in and/or behind the mirror element, in and/or behind the bezel element or a combination of the bezel and mirror area. A flush bezel could extend a minimum of 2.5 mm around the perimeter of the mirror and still meet European minimum edge radius requirements. A typical perimeter ring is about 5 mm wide. Unless the ring or the bezel is made wider in the switch area, which may be aesthetically undesirable, a 2.5 mm or 5 mm switch/icon area may not be easily discernable by the driver and a 2.5 mm or 5 mm touch landing pad area may be difficult to accurately locate and touch. Combining both the bezel area and the chrome ring area to enable an enlarged switch area for the icons, backlight and circuitry enable a more user friendly and functional switch system. The icon symbols and backlight could be positioned in the mirror area and the bezel could have a continuation of the icon, or the bezel could be a different color in the icon area and/or the bezel could be raised in the icon area to enhance switch location visibility and functionality. Since finger prints are more readily visible on a smooth glass surface than on most bezel surfaces, it may be desirable to attract direct finger contact primarily to the bezel area. It is also desirable to cover the contacted area of the bezel and/or glass area with an anti-finger print layer or coating to avoid the visually objectionable accumulation of dirt and finger oils.

User Interface: Mirror Elements With a Cut-Out Substrate Design And With a Substantially Co-Extensive Substrates Design.

Implementation of UI in some cases may potentially present problems with operation of EC-element-based rearview assemblies. One of the problems that can easily escape attention is the problem of electromagnetic interference caused by contemporaneous operation of a capacitive switch of the UI and the EC-element, which detrimentally affects the performance of the assembly as a whole. To reduce or even eliminate such interference, some embodiments of the present invention that utilize an EC-element may require the use of appropriately and non-trivially reshaped optical elements defining the EC-cavity.

One purpose of such reshaping is to spatially separate an area occupied by a conductive pad of a switch of the UI from that of the EC-portion of the EC-element such as to minimized electromagnetic coupling between the two. To this end, a mirror element may be configured such as to have the foot-print of the switch and that of the EC medium onto the first surface of the mirror element of the assembly not overlap. For example, an embodiment of the invention may include an EC element having a substrate that supports both an EC-cell and a conductive pad of a switch, which is located adjacently and peripherally with respect to the EC-cell, and another substrate cooperating with the first substrate such as to establish a ledge extending along a portion of the perimeter of the EC element. A portion of the ledge is used to configure an embodiment of the switch of the UI of the invention and to establish the associated electrical connections between the components of the switch and an electrical circuitry at the back of the EC-element.

Figure 32A:
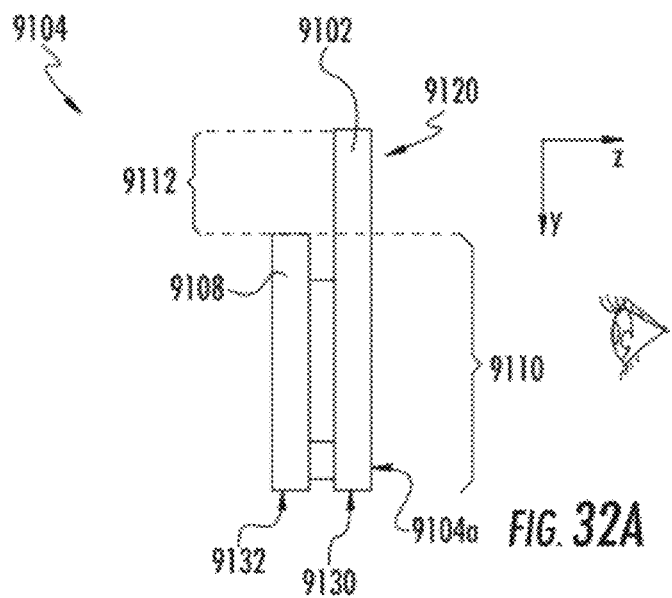
FIG. 32A depicts an EC-element structure having a ledge defined by the optical substrates.
Figure 32B:
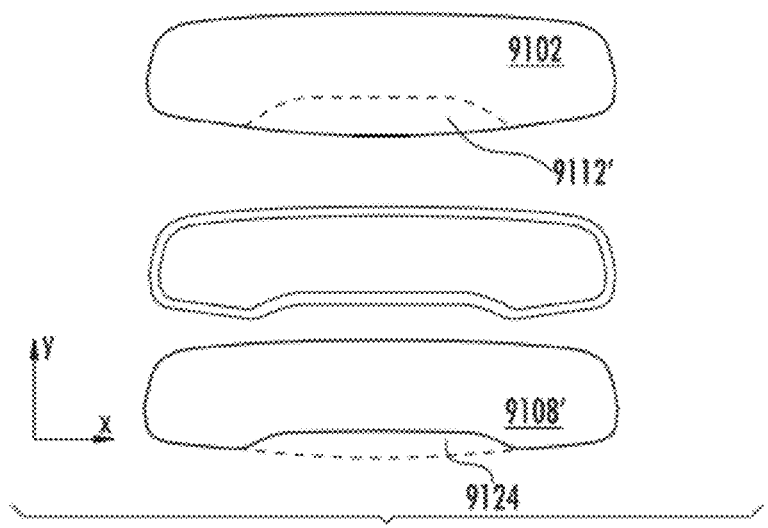
FIGS. 32B and 32C illustrate substrate pairs usable to define an EC-element of FIG. 32A.
Figure 32C:
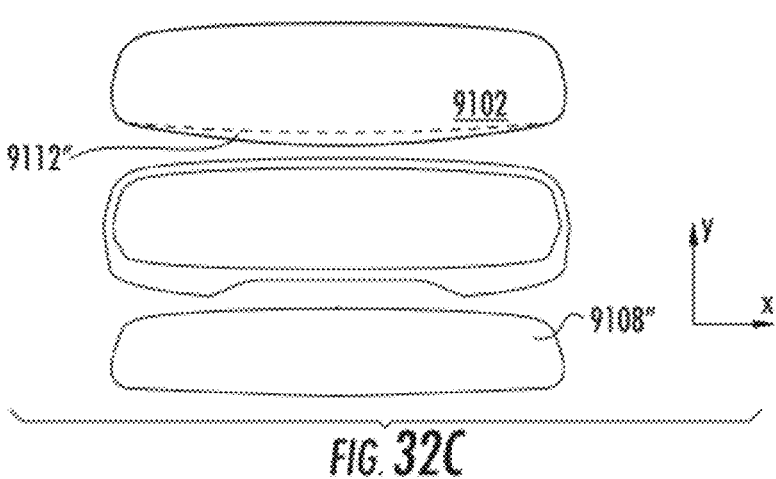

FIGS. 32(A-C) schematically illustrate the above concept. As shown in side view of FIG. 32A, a first substrate 9102 of the EC element 9104 has larger area than a second substrate 9108, and the two substrates 9102, 9108 in cooperation establish an EC cell 9110 and a ledge 9112 that is formed by a portion 9120 of the first substrate that extends transversely beyond the geometrical boundaries of the second substrate. As shown, the EC element 9104 has a first surface 9104*a*. FIGS. 32(B, C) offer two examples of sets of the first and second substrates of an EC element to illustrate the way the substrates can be reshaped to achieve the cooperation shown in FIG. 32A. The second substrate 9108' is reshaped by carving out a portion 9124 (as compared to a fully-sized first substrate 9102) to create a spatially-extended notch or recess. FIG. 32B, on the other hand, illustrates an embodiment where the second substrate 9108" does not have any carved-out portion but simply has a smaller area (or transverse extent) than that of the first substrate 9102. As a result, when the first and second substrates are spaced apart parallel to each other such that there edge surfaces 9130 and 9132 are aligned, the corresponding ledge portion 9112' (or 9112") is formed. However, it is understood that generally the second substrate may be smaller than the first substrate and disposed such as to have at least a portion of an edge of the second substrate be concealed by and is not observable from behind the first substrate when viewed from the front of the EC element and/or the front of the rearview assembly.

Figure 33A:
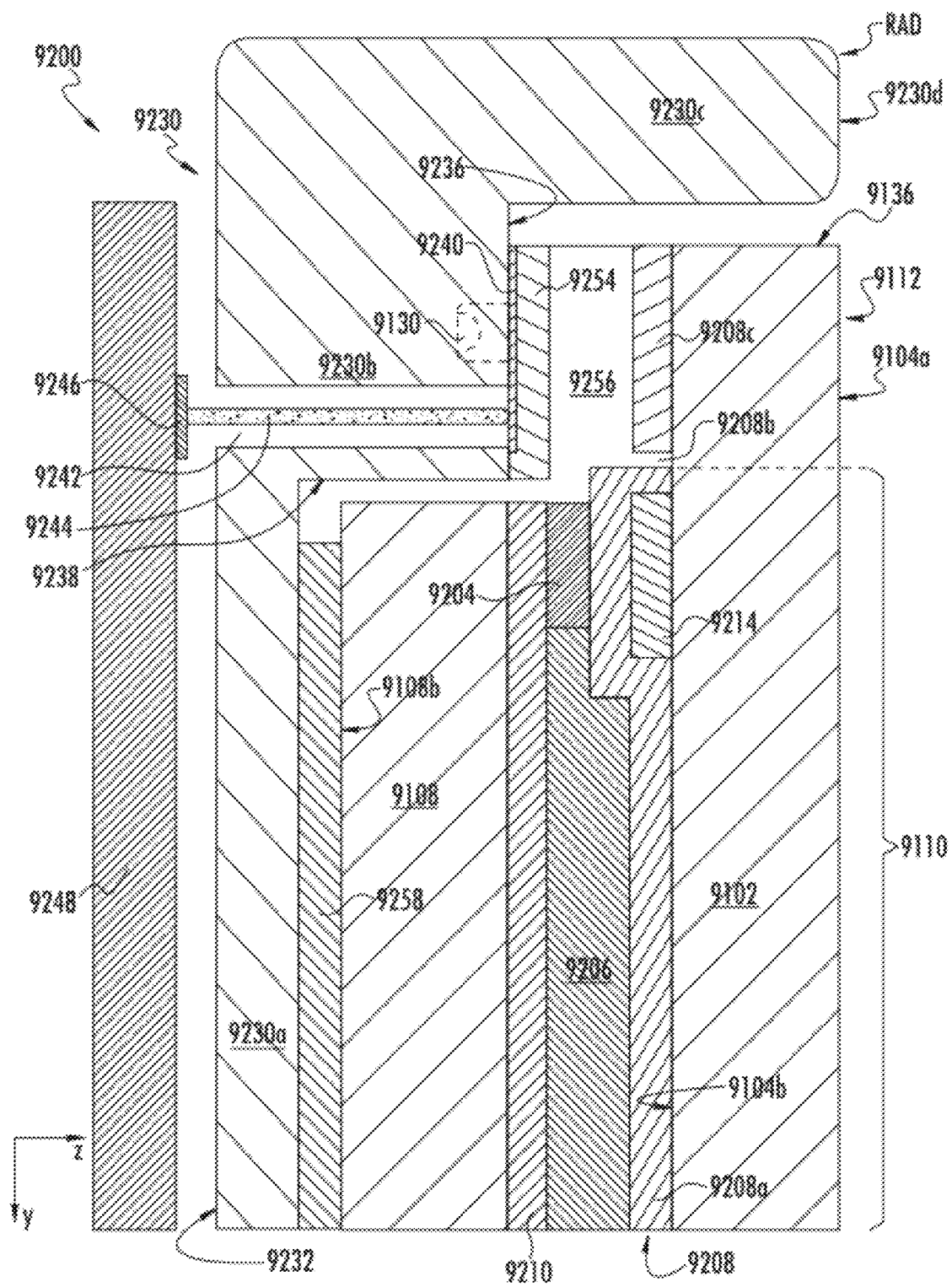
FIGS. 33(A, B) schematically illustrate, in cross-sectional views, portions of embodiments of EC-element including a capacitive switch and portions of corresponding carriers of the present invention that have rounded peripheral edges.

FIG. 33A demonstrates, in a cross-sectional view, a portion 9200 of a vehicular rearview assembly employing an embodiment 9104 of the EC element. As shown, the first substrate 9102 of the element 9104 support the EC cell 9110, which is generally defined by the first and second substrates and a seal 9204 disposed along the perimeter of the cell 9110. The cell contains an EC medium 9206 in physical contact with a transparent electrically conductive layer 9208 (such as a TCO) and a reflective thin-film stack 9210.

In further reference to FIGS. 32A and 33 it is appreciated that, when the TCO layer 9208 is deposited across the second surface 9104*b* of the EC element 9104 and unless additional masking step is involved, the TCO layer is extended to the edge surface 9136 of the first substrate. To facilitate formation of a switch element that is electromagnetically (and, in particular, capacitively) decoupled from the EC cell 9110, as discussed below, an electrical-isolation area 9208*b* is further established (e.g., by removing a strip of the layer 9208 with laser ablation, or mechanically, or via chemical etching) to electrically isolate a portion 9208*c*, which is now spatially coordinated with the ledge 9112, from a portion 9208*a*. Additionally, the electrically-conductive portion 9208*c* is characterized by a normal projection, onto the second surface 9104*b*, that is adjacent to but does not have any contact with a normal projection of the portion 9208*a* onto the same surface. (In an alternative embodiment (not shown), a portion of the layer 9208 that corresponds to the areas 9208*b* and 9208*c* of FIG. 33A may be completely removed.) Consequently, the capacitive coupling between the switch element and the EC cell is minimized As discussed in Our Prior applications, the transparent conductive layer portion 9208*a* is further configured, by providing appropriate electrical connectors (not shown) to be operable as a transparent conductive electrode while the thin-film stack is adapted to be operable as a reflective electrode of the EC cell 9110. The layer 9208 is shown to be disposed on top of a peripheral ring 9214 (made of chromium and/or other metals, as taught in Our Prior Application) which, in turn, is configured to substantially conceal the seal 9204 from being observable from the first surface 9104*a*. An alternative embodiment, not shown, may include a transparent conductive layer 9208 disposed under the peripheral ring 9214.

In further reference to FIG. 33A, the EC element (such as the element 9104 of FIG. 32A) is supported, from the back, with a carrier 9230, which is preferably made of a polymeric material and has an extended portion 9230*a* positioned along a fourth surface 9232 of the EC element 9104. The carrier 9230 is appropriately shaped to establish a step portion 9230*b* and a peripheral portion 9230*c*. The step portion 9230*b* integrally connects the extended portion 9230*a* with the peripheral portion 9230*c* (in fact, it is preferred that all three portions of the carrier are co-molded or molded as a unit) and defines two surfaces: a step surface 9236, which is generally parallel to the second surface 9104*b*, and a surface 9238 that is generally transverse to the extended portion 9230*a*. The carrier 9230 is appropriately dimensioned with respect to the size of the element 9112 to have the peripheral portion 9230*c* (i) accommodate the first substrate on the inboard side of the peripheral portion and (ii) accommodate the second substrate 9108 on the inboard side of the surface 9238. The peripheral portion 9230*c* may be configured to be optically clear, optically diffusive (e.g., to have ground surface and, therefore, "frosted" appearance), or have a colored appearance. The peripheral portion 9230*c* is additionally shaped such as to have its front surface 9230*d* curved, along the outer perimeter of the peripheral portion 9230*c*, with a radius of curvature Rad of no less than 2.5 mm. The level to which the surface 9230*d* is spatially protruding with respect to the expended portion 9230*a* may lie above or below the glass surface 9104*a*. In one implementation, a carrier such as the carrier 9230 can include several materials and be fabricated as a co-molded component. For example, while the portion 9230*a* of the carrier extending along the back of the mirror element includes a first material (for example, a polymeric material that is substantially opaque), the protruding portion 9230*c* may include an optically transparent or translucent material. When used in an embodiment employing an anisotropic polymeric birefringent film layer juxtaposed to the mirror element, for example (as taught in commonly assigned and incorporated herein by reference in their entirety U.S. 2009/0296190, U.S. 2010/0110553, and U.S. 2010/0277786), such two-shot molded implementation of the carrier 9230 facilitates the perception of the mirror element by the viewer as a single optical component.

In the embodiment 9200 of FIG. 33A, the surface 9236 is shown to be a support for an electrically-conductive pad 9240 configured such as to have a normal projection, onto the second surface 9104*b*, that is adjacent to but does not have any contact with a normal projection of the portion 9208*a* onto the same surface. Generally, the pad 9240 may be configured as an electrically-conductive layer carried on the surface 9236, or, alternatively, as a metallic plate, foil, or mesh juxtaposed with that surface (e.g., with the optional use of a conductive adhesive or conductive polymer as shown, in dashed line 9241, in embodiment 9250 of FIG. 33B, or by being simply placed in proximity to the surface 9236). The pad 9240 is electrically extended, through a passage 9242 in the step portion 9230*b* and with the use of an electrical connector such as an electrical pin 9244 and a (generally optional) contact pad 9246, to a circuitry for a capacitive switch electronics (not shown) on the PCB 9248 (at the back of the assembly) so as to define a capacitive switch of the embodiment. The capacitive switch is adapted to operate in response to a user input applied to the front of the assembly in the area of the ledge 9112. The user input may include placing a finger in proximity to or in contact with the first surface 9104*a* in the region of the ledge 9112, which generally causes a change of electrical potential associated with the pad 9240. The capacitive switch circuitry at the back of the assembly is thereby triggered to register a corresponding transfer of charge in response to which a particular function of the assembly is activated. In an alternative embodiment, such as an embodiment 9250 of FIG. 33B, the electrical connection operably extending the pad 9240 to the PCB 9248 may utilize a different electrically-conductive connector 9252 using, to name just a few, a specifically designed metallic spring contact, a "zebra"-strip, an electrically-conductive polymeric material or adhesive that are configured to be compressible between the conductive pad of the switch and the PCB. In an alternative embodiment, where either a conductive epoxy or a combination of wire and solder is used, no compression is required.

To present the user with an indication of a function/device, of the assembly, that would be activated in response to a particular user input (through operation of the capacitive switch defined by the pad such as the pad 9240 or, generally, through operation of any embodiment of a switch), an at least partially opaque graphical layer 9254 that has icons or other graphical indicia contained in it may be overlayed on top of or be juxtaposed with the pad 9240. The information contained in such indicia is delivered optically, through a region 9256 and through the transparent ledge 9112 to the front of the assembly by providing a backlighting arrangement for the indicia. In a specific embodiment, the region 9256 may be at least partially filled with an optically-transparent material (not shown) such as a polymer or dielectric by depositing such a material on top of the graphical layer 9240 prior to the attachment of the EC element to the carrier. As shown schematically shown in FIG. 33A, the backlighting system may include the use of a source of light such as a single-color LED (or, if the indicia is multi-colored, a multi-color LED source) 9130 that highlights the graphical layer through an appropriate aperture created in the pad 9240. In an alternative embodiment (not shown), the backlighting may utilize a lightpipe element configured to optically couple a source of light in the back of the assembly with the graphical layer. In yet another embodiment (not shown), the backlighting flux can be channeled to the graphical layer through the carrier itself a portion of which, co-molded with the rest of the carrier, is optically transmissive.

Figure 34A:
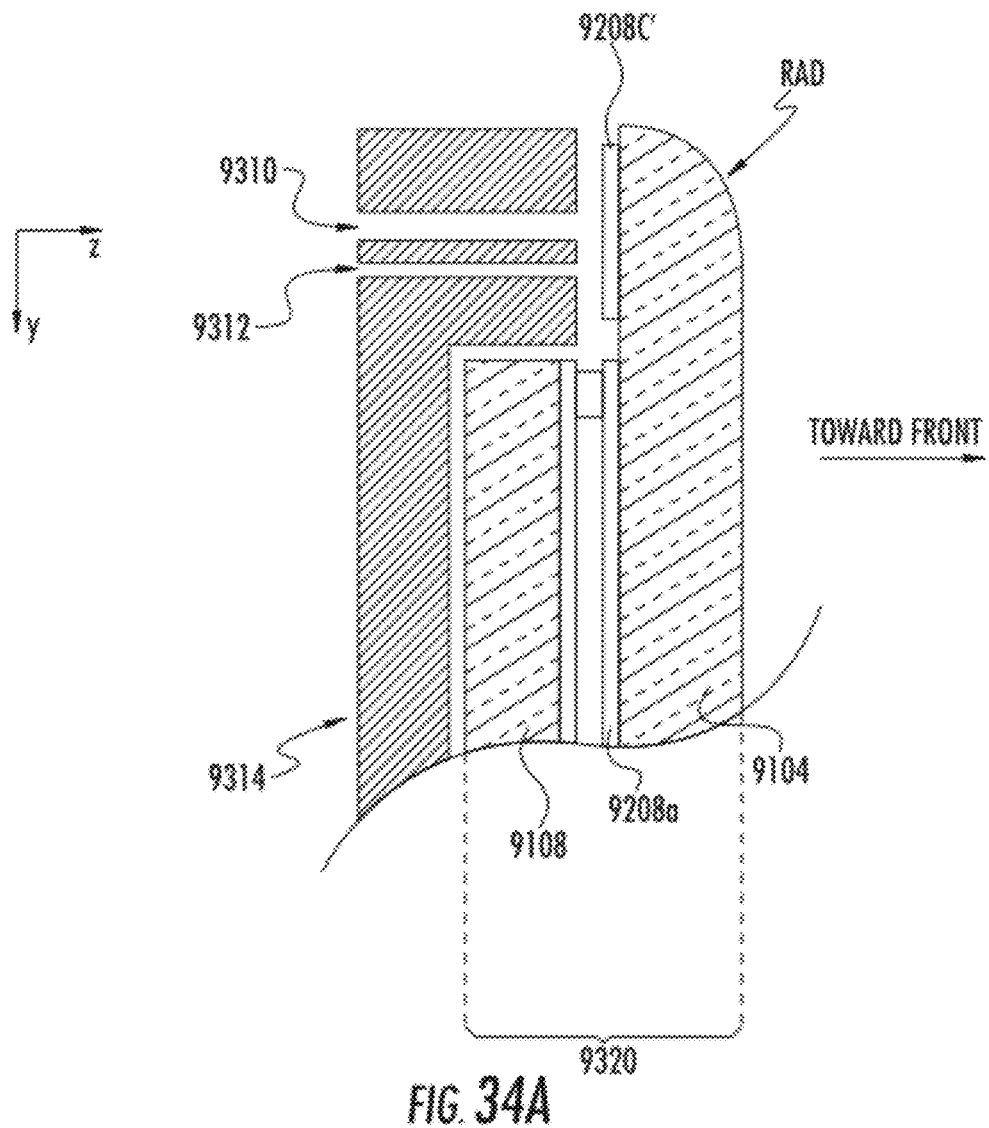
FIG. 34A depicts a portion of an EC-element embodiment including a capacitive switch and having a front substrate with appropriately ground peripheral edge.
Figure 35A:
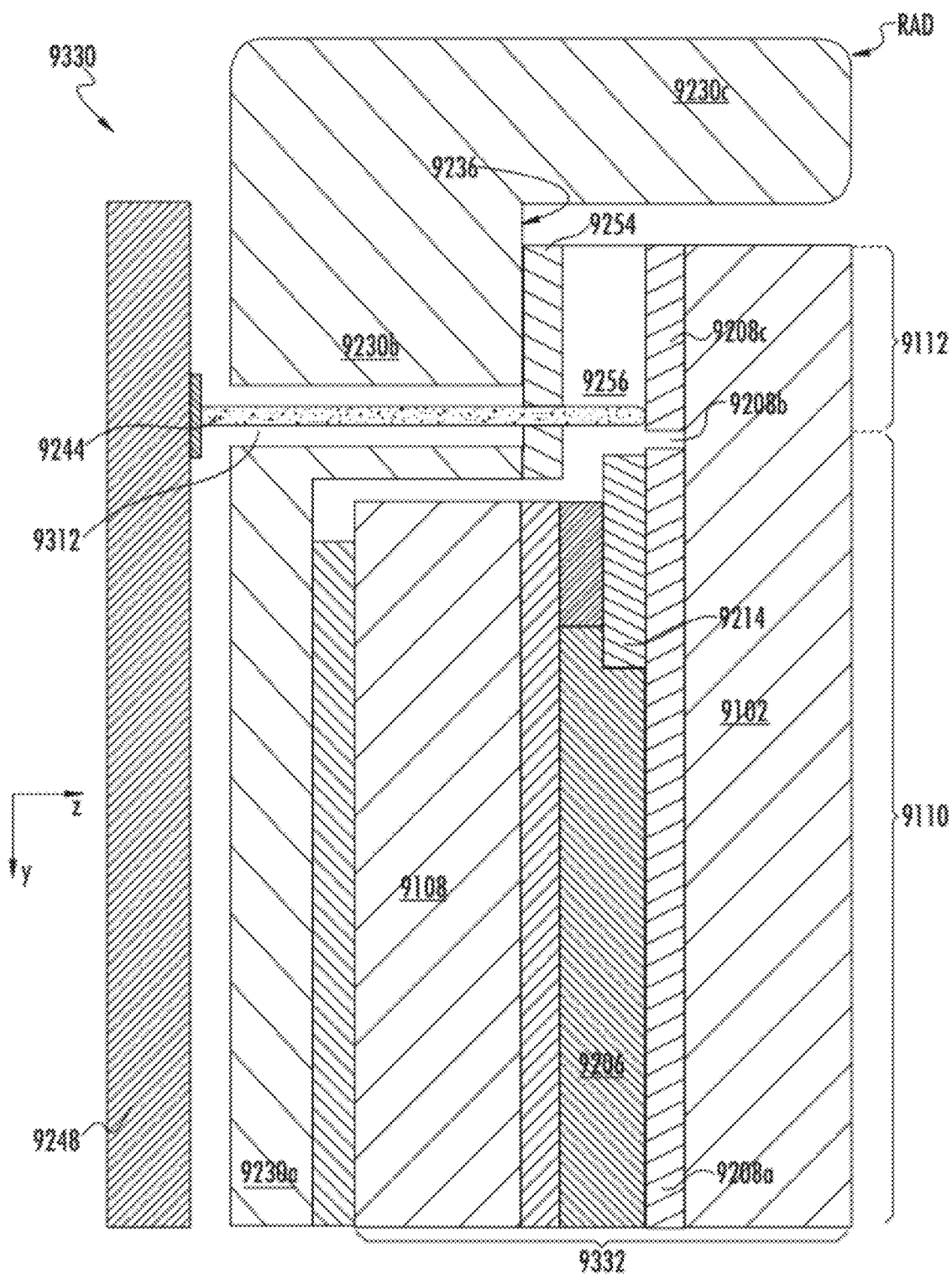
FIGS. 35(A-C) illustrate alternative embodiments of the invention.
Figure 35B:
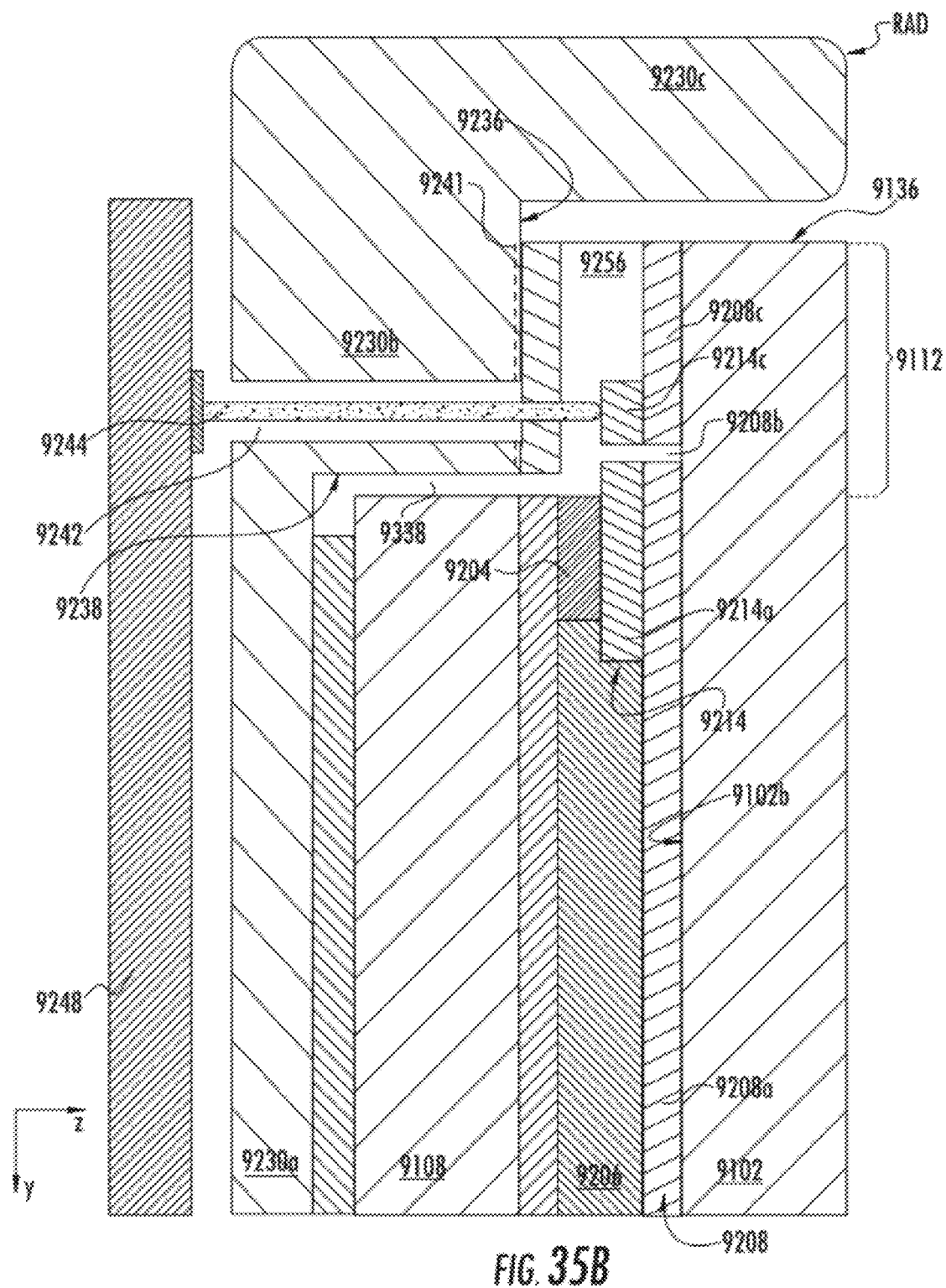

It is worth noting that in some embodiments a portion of the electrically-conductive layer disposed on the second surface of the EC element may be utilized as a conductive pad of the switch of the invention. In addition, in a specific embodiment, graphical information or code associated with an identified switch may be contained within a pad of the switch itself. Such an example is schematically shown in a cross-sectional view in FIG. 34A, where a TCO layer portion 9208$c'$ (corresponding to the layer 9208$a$ and electrically-isolated from that layer, as discussed in reference to FIG. 33A) may be used as a conductive pad of the capacitive switch. In this case, the visual indicia may be incorporated onto or into this layer and highlighted from the back, e.g. with light generated by a (not shown) light source that is transmitted to the layer 9208$c'$ directly through a channel 9310 configured in the carrier 9314 or, alternatively, through a lightpipe (not shown) that may be reaching to the indicia through such channel 9310. When the TCO-layer portion such as the portion 9208$c$ of FIG. 33A or 9208$c'$ of FIG. 34A is used as a conductive pad of a capacitive switch of the invention, the electrical connection is preferably provided to the layer 9208$c$ (9208$c'$) through a channel 9312 appropriately configured in the carrier 9314. The first substrate 9104 of the EC element of FIG. 34A is adapted to be thicker than 2.5 mm and to contain a region having a curvature with a radius Rad that is at least 2.5 mm or larger. The curvature of such curved annular region is determined across the first substrate. This curved region is circumferential with respect to the first substrate and, therefore, presents itself as a correspondingly curved annulus defining an edge region of the front surface of the EC element 9320. (An element or a portion of an element that has been shaped this way may be referred to herein as Rad-curved or Rad-rounded, for simplicity.) An alternative example is provided by FIG. 35A, showing a portion 9330 of an assembly utilizing and embodiment of the EC element 9332, where a TCO-portion 9208$c'$ is configured to operate as an optically-transparent conductive pad defining, in conjunction with the connecting pin 9238 and the corresponding electronic circuitry on the PCB 9248, a capacitive switch of the invention. However, in comparison with FIG. 34A, the indicia identifying the capacitive switch is adapted in the graphical layer 9254 disposed, as discussed in reference to FIGS. 33(A, B), on the step portion 9230$b$ of the carrier 9230. A source of light and optical system facilitating backlighting of the graphical layer 9254 is not shown for simplicity of illustration. In operation, once the graphical layer 9254 is backlit, the indicia information is transmitted optically, through the region 9256 and the ledge 9112 towards the front of the assembly. Although not shown in the drawings, in a modification to the embodiment of FIG. 35A the graphical layer 9254 may be disposed on the exposed surface of the portion 9208$c'$ instead, with an electrical connector 9238 being pressed against the portion 9208$c'$ through an aperture in the graphical layer. To conceal at least one of the connector 9238, the edge along which the surfaces 9236, 9238 intersect, and the gap 9338 between the edge surface of the second substrate and the carrier from being visible from the front of the assembly, a peripheral ring layer 9214 may be deposited on top of the TCO layer 9208 such as to extend beyond the area corresponding to the seal 9204 and towards the edge surface 9136 of the first substrate 9102, as shown in FIG. 35B. Further, the peripheral ring 9214 is judiciously ablated or etched to outline electrically isolated portions 9214$a$, 9214$c$ along such a line as to create an elongated trench 9208$b$ down to the second surface 9102$b$ that is devoid of any conductive material and that defines a portion of ledge 9112 corresponding to the TCO-portion 9208$c$ (configured, in this embodiment, as a conductive pad of the capacitive switch). The use of two areas of the peripheral ring—9214$a$ and 9214$c$—allows to relax the positioning tolerances when affixing the EC-element to the carrier, because the outboard portion 9214$c$ conceals the electrical connector and the passage 9242 through which this connector is inserted, and the inboard portion 9214$a$ the area of the gap 9338.

Figure 35C:
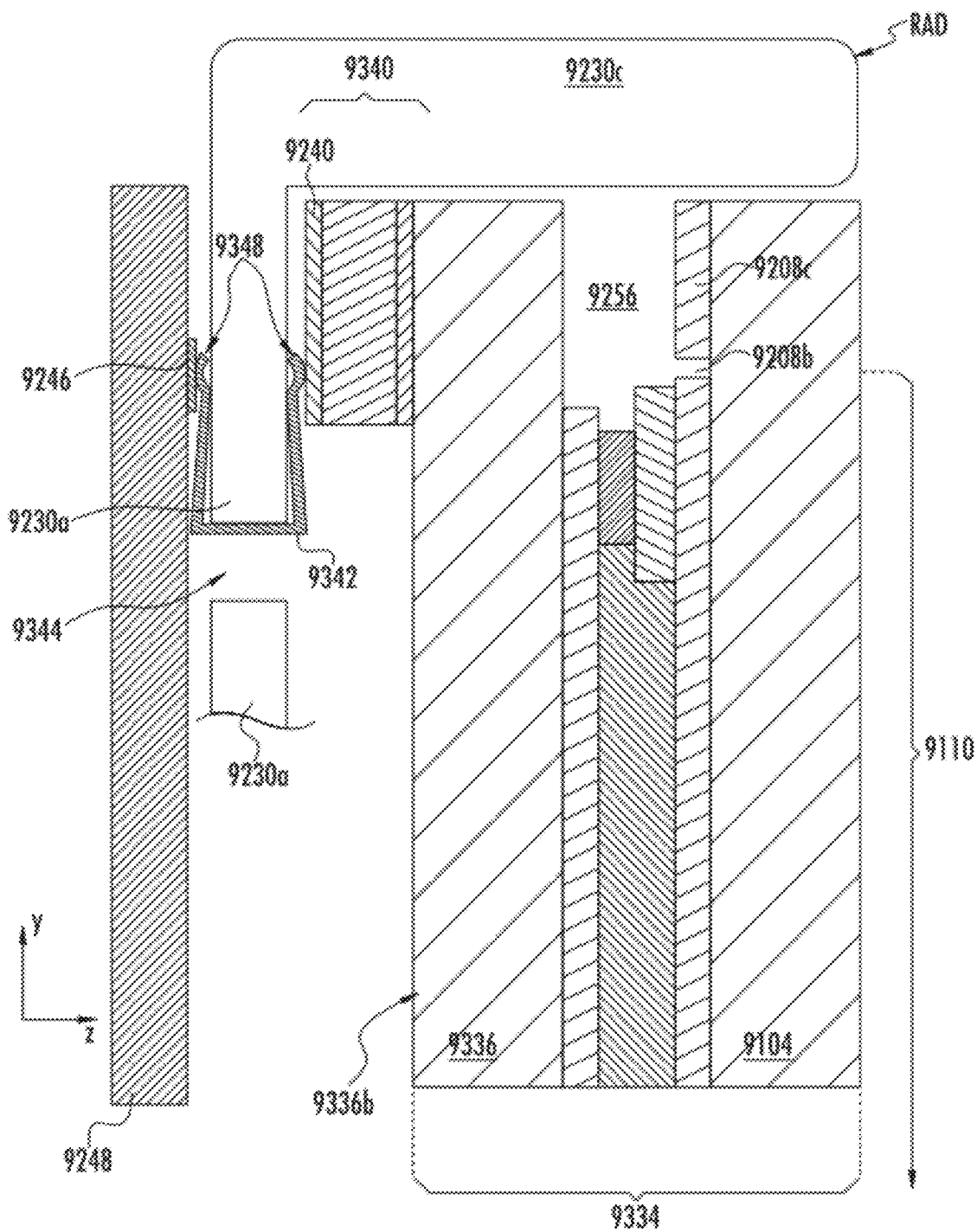

An alternative placement of the graphical layer and the conductive pad of the capacitive switch is shown in FIG. 35C. Here, an EC-element 9334 has first and second optical plates 9104, 9336 of substantially equal dimensions. However, the EC-cell 9110 is configured to occupy only a portion of the substrates 9104, 9336, leaving mutually-opposing elongated parallel regions of each completely transparent, with only the TCO portion 9208$c$ having been formed on surface II. A combination 9340 of the graphical layer and the conductive pad 9240 of the switch is juxtaposed with surface IV (surface 9336$b$) of the EC element 9334. As shown in FIG. 35C, the combination 9340 is configured to assure that the electrically-conductive layer 9240 is electromagnetically decoupled from the EC medium of the EC-element 9334. Specifically, the foot-print (projection) of the layer 9240 and that of the EC-medium of the EC-element 9334 onto surface II of the EC-element 9334 do not overlap. As a result, the electromagnetic screening of the layer 9240 by the EC-medium is minimized, as is the capacitive coupling between them. The optical system providing backlighting for the indicia in the graphical layer is not shown for simplicity of illustration. An electrical connection between the conductive pad 9240 and the switch circuitry on the PCB 9238 is configured with the use of a two-sided interconnect 9342. When inserted into a passage 9344, the interconnect 9342 is locked in its working position, with the use of retention snaps (not shown), on either side of the extended portion 9230$a$ such as to have its element spring-contacts 9348 to depress firmly into the switch pad 9240 and the contact pad 9246 when the EC element is attached to the carrier (the attachment means are not shown).

Embodiments of electrical and optical connections that facilitate the operation of the assembly of the present invention and establish corresponding to electrical and/or optical communication(s) among its components and devices are discussed elsewhere in this application.

Figure 36:
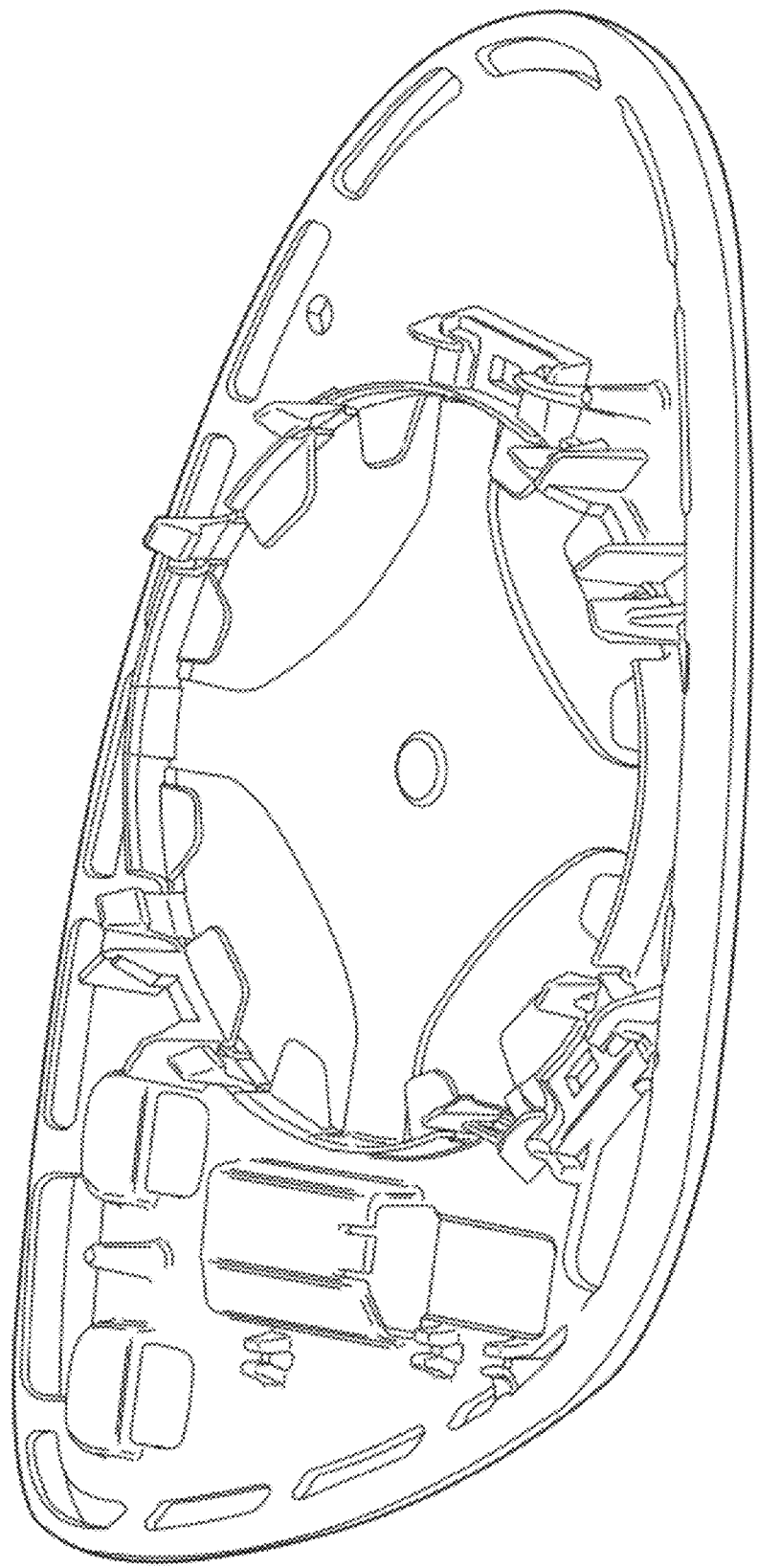
FIG. 36 shows an embodiment of the carrier of the rearview assembly.

Returning to FIGS. 33(A, B), the extended portion 9230$a$ of the carrier 9230 is firmly affixed to the fourth surface 9108$b$ of the EC element 9110 such as to mechanically hold and support the EC element during the operation of the assembly (9200 or 9250). The attachment between the extended portion and the fourth surface may be implemented in a number of known ways, for example with an adhesive or foam, 9258. It is appreciated that in any embodiment of the invention, the carrier supporting the EC element is appropriately configured such as to provide for necessary apertures and openings facilitation various electrical and optical communication between the electro-optics on the back side of the carrier and the EC element and other active elements in front of the carrier. A non-limiting example of the carrier is shown in FIG. 36 that corresponds to FIG. 37D of U.S. 2010/0321758, where some structural characteristics of a carrier-embodiment have been disclosed.

An embodiment of a PCB such as the PCB 9248 of FIGS. 33(A,B) generally includes circuitry for at least dimming the EC medium 9206, driving LEDs for backlighting of graphical indicia, and controlling capacitive switches, and may include throughout openings or apertures facilitating light delivery from a light emitter positioned behind the PCB towards the FOV at the front of the assembly.

Figure 33B:
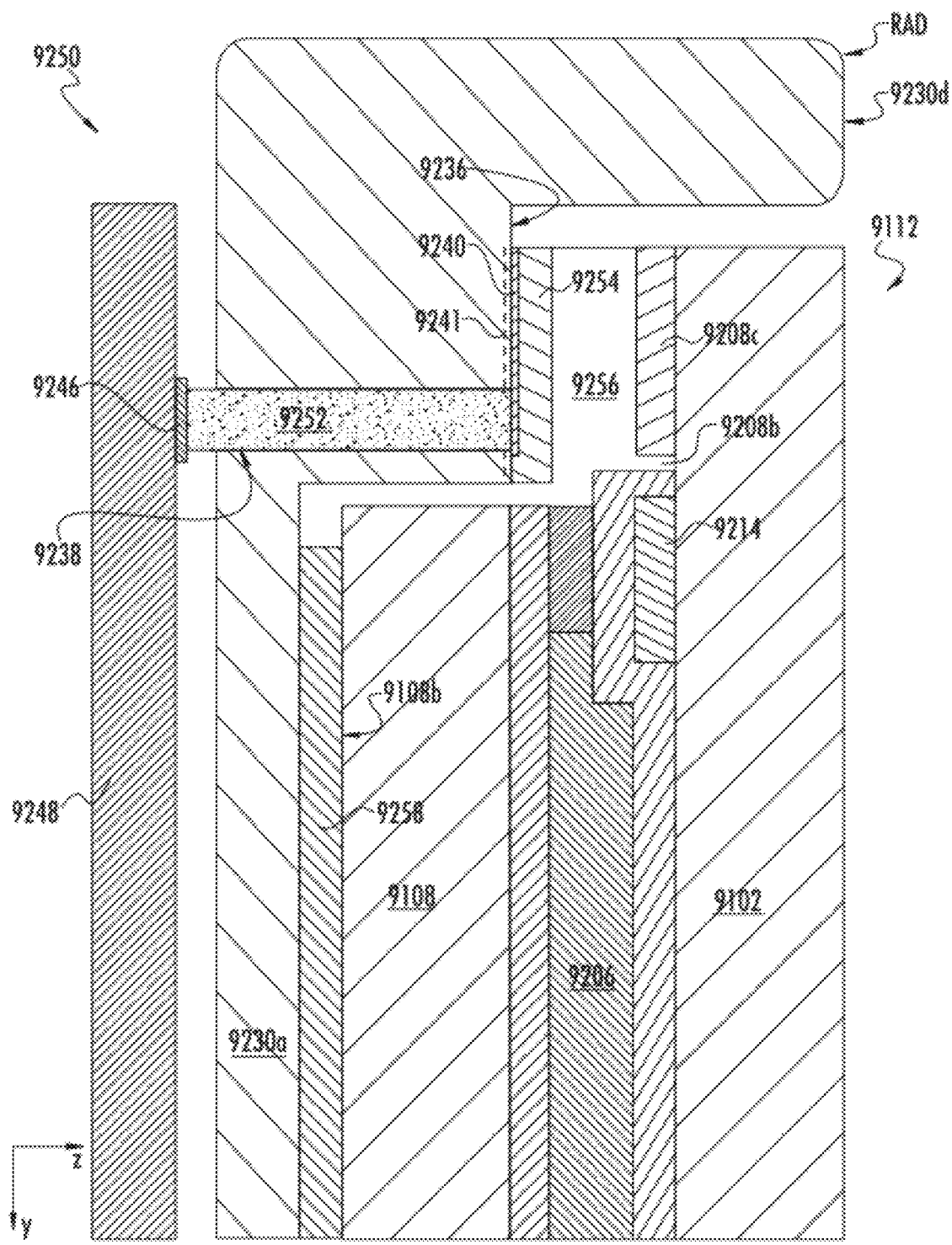
Figure 37A:
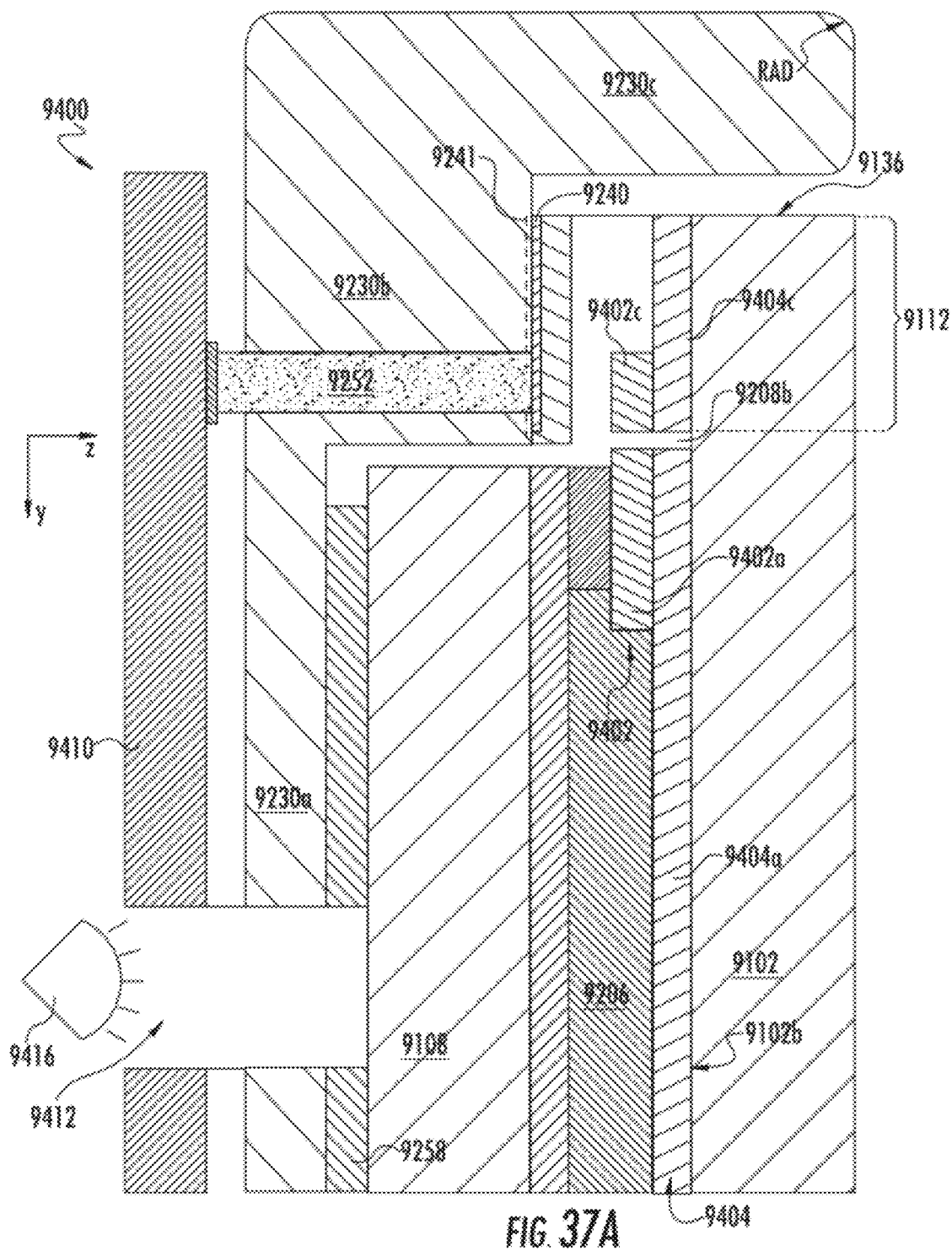
FIGS. 37(A-B) and 38 illustrate additional embodiments of the invention.

A portion of the alternative embodiment of the assembly employing an EC element with a cut-out substrate design is schematically shown in FIG. 37A to demonstrate a structure similar to that of FIG. 33B but including a differently arranged transparent electrode on surface II (second surface 9102b) of the EC element. In particular, as shown, a peripheral ring 9402 is deposited on top of the transparent electrically-conducting layer 9404 on surface II after which both layers 9402 and 9404 are simultaneously laser ablated or etched to establish an area 9208b devoid of these layers, thereby creating layer stacks 9402a, 9404a, and 9402c, 9404c that are electrically isolated from one another. Moreover, as shown, a peripheral ring portion 9402c is extending onto the ledge 9112 and, therefore, at least partially overlaps with a graphical layer (as viewed from the front of the assembly) to conceal and block the edge of the graphical layer from being viewed from the front of the assembly and to relax tolerance requirements during the fabrication and component-alignment processes.

In a specific embodiment, the portion 9402c of the peripheral ring can extend towards the edge 9136 such as to completely cover (not shown in FIG. 37A) the portion 9404c. In such specific embodiment, at least the layer portion 9402c and, optionally, both of the layer portions 9402c and 9494c are patterned (e.g., with laser ablation) to create graphical indicia therein that is backlit from the back of the assembly to make it visually perceivable from the front of the assembly. To this end, the PCB 9410, the extended portion 9230a of the carrier 9230, and the adhesive 9258 are appropriately adapted to include corresponding apertures or cut-outs that define channel(s) 9412, through which an optical communication is established between a light source 9416 at the back of the assembly, the graphics/indicia layer(s), and the transflective portion of the EC element.

Figure 37B:
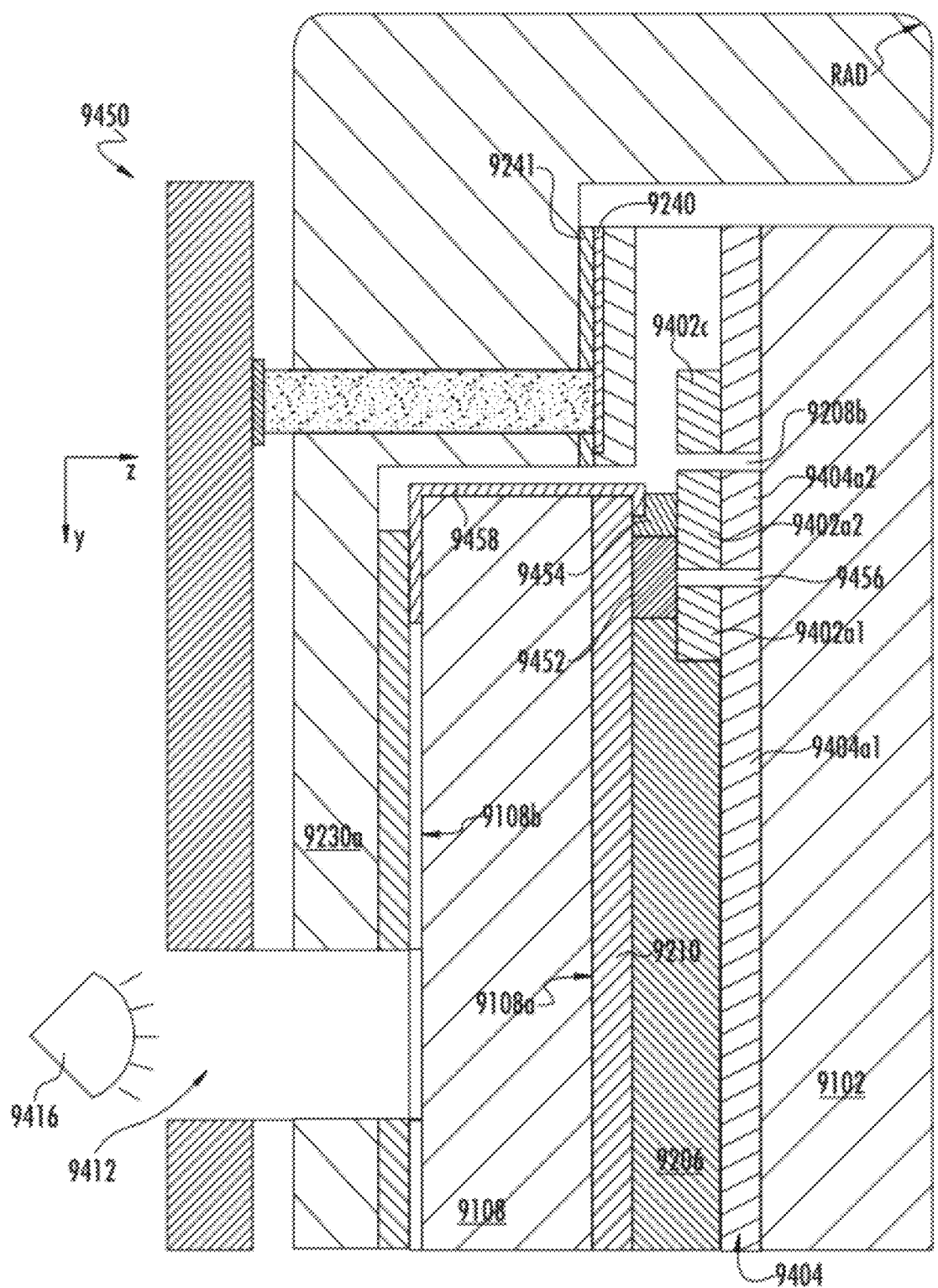
Figure 38:
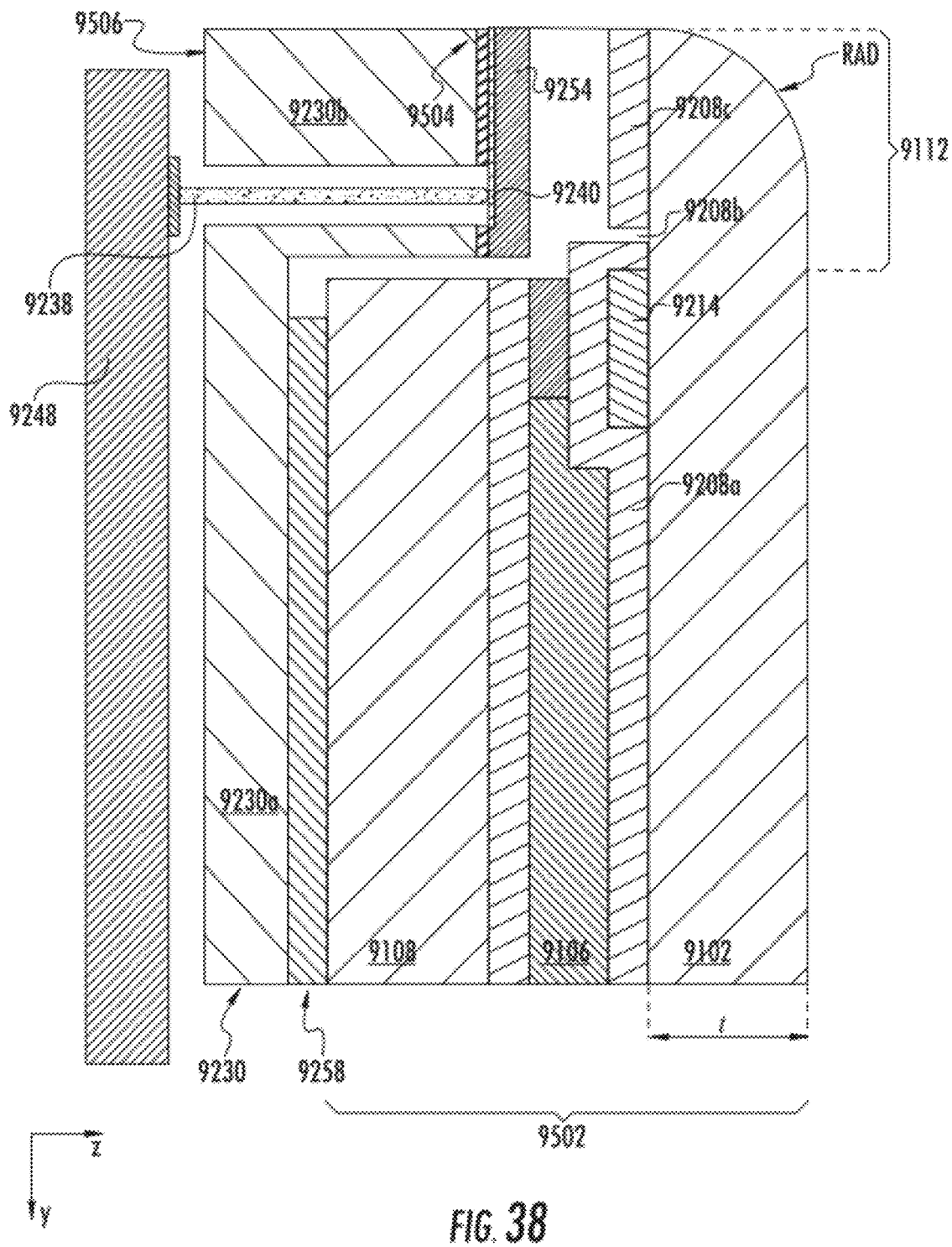

FIG. 37B illustrates a variation of the embodiment 9400, in which the seal area is shown to include a non-conductive material 9452 disposed circumferentially, around the perimeter of the EC-cell in direct contact with the EC-medium 9206, and a conductive material 9454 disposed outside of the conductive material 9452. To accommodate the presence of two materials 9452, 9454, the peripheral ring portion 9402a of FIG. 37A is judiciously separated into two sub-portions 9402a1, 9402a2 that are electrically-isolated from one another by a non-conductive area 9456 (shown ablated through both the peripheral ring material and the TCO material of the layer 9404 against the area occupied by the non-conductive seal material 9452). The conductive material 9454 electrically connects the back of the assembly (as shown, the back of the EC-element, surface 9108b) with the electrically-conductive portion 9404a2 of the layer 9404 through the peripheral ring portion 9402a2 and a conductive member 9458, which wraps around an edge of the substrate 9108. The member 9458 may be an electrically-conductive clip or layer, foil, mesh or, in a specific embodiment, a thin-film continuation of a layer that is part of the thin-film stack 9210 carried on the third surface 9108a. In a different area of the EC-element (not shown), the layer 9210 may be similarly format-ted to establish an electrical connection between it and corresponding electrical circuitry at the back of the assembly. Various electrical arrangements serving this purposes were detailed in Our Prior applications, e.g. in U.S. 2010/0321758 and U.S. 2010/0020380 and will not be discussed here.

As was mentioned above, a smoothed outer peripheral edge of the vehicular rearview assembly is dictated by considerations of safety. While embodiments of the present invention discussed above in reference to FIGS. 33(A,B), 35(A-C), 37(A,B) offer such "smoothed" edge by curving the outer edge of the peripheral portion of the carrier at a radius Rad of no less than 2.5 mm, an alternative solution may be to curve the front perimeter edge of the front substrate of the mirror element. This solution has been already mentioned in reference to FIGS. 8 and 9. The embodiment 9500 of FIG. 38 expands on this idea and illustrates a portion of the rearview assembly utilizing an EC-element 9502 with a cut-out substrate design where the first substrate 9102 has an outer edge curved, all the way along the perimeter of the substrate 9102, at a radius Rad of no less than 2.5 mm. While it may be preferred to have the first substrate as thick as 2.5 mm or even thicker, in a specific embodiment a 1.6 mm thickness may suffice. In yet another specific embodiment, the front edge 9504 of the carrier 9230 may also be similarly rounded (not shown) with a radius of at least 2.5 mm. The electrical communication between the circuitry on PCB 9248 and the conductive pad 9240 of the capacitive switch is established as discussed above, while the backlighting of the indicia in the graphics layer 9254 is delivered from a source of light (not shown) at the back of the assembly through a lightpipe or an optically diffusive element (not shown), whether through the carrier 9230 or along a portion of it, as schematically indicated with an arrow 9506.

It is worth noting that in embodiments having an additional electrically-conductive layer in front of the conductive pad of the capacitive switch, the effective capacitor formed by a combination of i) the user's finger placed in the proximity of the front surface region that corresponds to the conductive pad, ii) the conductive pad itself, and iii) the additional electrically-conductive layer in between—is a serial capacitor. In such embodiments, as already mentioned in reference to FIG. 18, if the additional electrically-conductive layer intervening between the finger and the conductive pad of the switch has an area greater than that of the conductive pad, the effective sensitivity of the capacitive switch will be increased. Accordingly, embodiments described in reference to FIGS. 33(A,B), 35C, 37A, 38, where the TCO portion 9208c, 9208c', although optional, when present is located in front of the conductive pad 9240 of the switch, it is preferred to dimension the conductive pad 9240 to have smaller area than that of the TCO portion 9208c, 9208c'. In a specific embodiment (not shown), a conductive pad of the capacitive switch may be disposed on the first surface of the mirror element such as to optimize a response of the system to the user input.

Figure 39A:
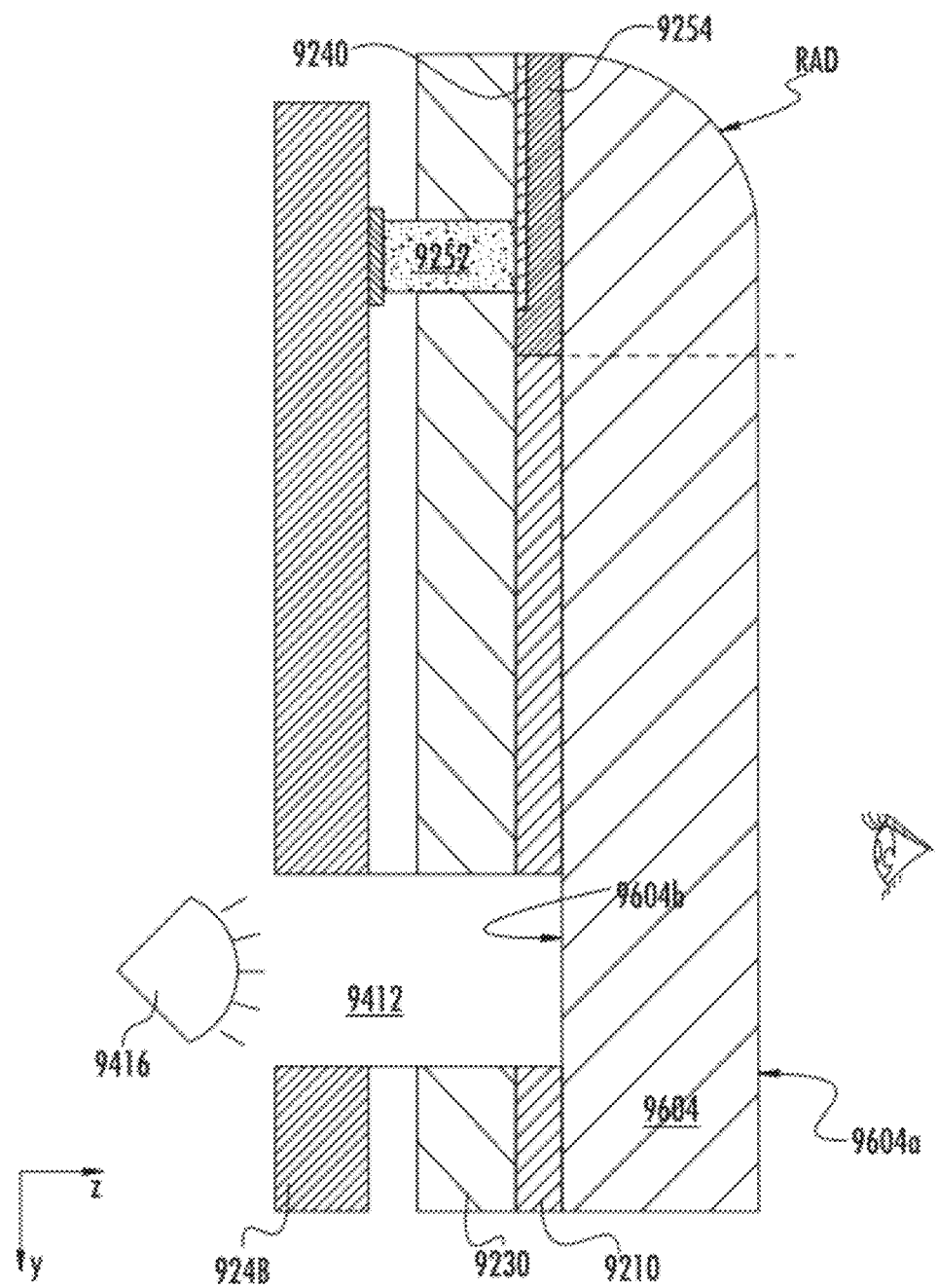
FIGS. 39(A, B, C) schematically show a mirror system of the rearview assembly utilizing various embodiments of a capacitive switch.

Although most of the discussion in this application is presented in reference to embodiments that utilize EC-based mirror elements, a simple plane-parallel mirror element or a mirror element utilizing a prismatic element can also be used without limitation instead of the EC element in at least some of the discussed embodiments. An example is provided in FIG. 39A, wherein a mirror element 9604 (which may be configured to use either a plane-parallel or a prismatically-shaped substrate) has an outer edge region curved at a radius Rad of no less than 2.5 mm. Various components including a capacitive-switch conducting pad 9240, a conductive connector 9252, a graphics layer 9254 as well as an optical system (not shown) providing backlighting of the indicia of the graphics layer are similar to those discussed above. Another example of a non-EC mirror utilizing a capacitive switch to activate a designated function or device of the rearview assembly is shown in FIGS. 39(B, C), where a conducting pad 9608 carried on the first surface of the embodiment (in order to provide for a stronger capacitance signal in response to the user input) is electrically extended onto a second surface 9604b of the element 9604 through an electrical member 9608' along the Rad-rounded edge surface of the element 9604. The graphics layer 9254 is disposed on the surface 9604b either adjacently or adjoiningly to the extension portion of the conducting pad and illuminated with light delivered from the light source 9416 at the back of the assembly. As shown in FIG. 96B, the conductive pad 9608 and its extension 9608' include a TCO layer. In an alternative embodiment, the pad 9608 and/or the extension 9608' may include a metallic layer. (In this case, not shown, it is preferred to incorporate the informative indicia in the pad itself, such as by patterning the now-metallic pad 9608, and by eliminating the graphics layer 9254). FIG. 39C offers a schematic depiction of the front of the element 9604 of FIG. 39B, and illustrates three electrically-isolated from one another pads 9608, 9608', 9608" and the isolation areas 9610, 9612 between these pads. The Rad-curved annulus along the edge surface of the glass element 9604 can be ground or, optionally, polished prior to deposition of the layer 9608'.

While embodiments discussed above in general reference to FIGS. 33-39 alluded to different sequences, in which a conductive pad layer of the capacitive switch and an associated graphical layer can be disposed with respect to the front of the assembly, it is appreciated that a particular orientation of these two layers provides potential advantages in manufacturing (including that of cost reduction and scalability). Specifically, a configuration in which the conductive pad of the capacitive switch is placed behind the graphical layer (see, for example, FIGS. 33B, 37A, 38) simplifies formation of internal electrical connections inside the rearview assembly. In particular, establishing a connection between the conductive pad and the PCB-circuitry for this configuration does not require a formation of a passage through the graphical layer towards the conductive pad (such as a passage in the layer 9254 through which the element 9244 connect the PCB 9248 and the pad 9208c'. In general, any electrically-conductive object of a substantial size, located in a vicinity of a capacitive switch pad, may act as an effective antenna of sorts and, in operation, pick up noise that would be then relayed to an electronic circuitry of the assembly to reduce the SNR of the operation of a capacitive switch. An electrically-conducting layer of a mirror element (the EC mirror element or a prismatic mirror element) is one of such "pick-up antennae". To mitigate the reduction of the SNR of the operation of a capacitive switch of an embodiment, the assembly should be configured such as to provide for such effective pick-up antennae components of the assembly, including the electrically-conductive layers of the mirror element, a relatively low-impedance path to the ground. In one embodiment, for example, the impedance of the electrical path between an electrically-conductive layer of the mirror element of the assembly and the ground is below 100 Ohms.

Embodiments of a Mirror Element with a Composite or Veneered First Substrate.

In order to satisfy the requirement of the ECE Regulation 46, mentioned elsewhere in this application, a mirror assembly has to meet a geometrical profile requirement that is often tested with a reference ball-like test unit and, for the purposes of this application, is referred to as a homologation requirement. Specifically, according to paragraph 6.1.1.3 of the ECE Reg. 46, any surface in "static contact with a sphere either 165 mm in diameter in the case of an interior mirror or 100 mm in diameter in the case of an exterior mirror, must have a radius of curvature 'c' of not less than 2.5 mm."

The use of a first substrate consisting of a single lite of glass, such as that discussed above in reference to FIGS. 9, 10, 34A, 38, 39(A-C), may be an easy choice from the point of view of fabrication, but it presents an unexpected challenge to optimization of operational characteristics of the related embodiments. A single-lite (or single-pane) first substrate generally has to be at least 2.5 mm thick or even thicker in order to form a substantially right dihedral angle between the edge surface of the first substrate and a surface behind it (such as the second surface of the first substrate) while, at the same time, having the edge of the first substrate rounded with a Rad radius. The right dihedral angle would ensure that the transition between the rounded edge of the first substrate and the following surface (such as the edge surface of the second substrate of FIG. 39A, or the outer surface of the step portion 9230b of the carrier 9230, see FIG. 38) is fully differentiable and that the above-mentioned homologation requirement is satisfied.

Figure 67:
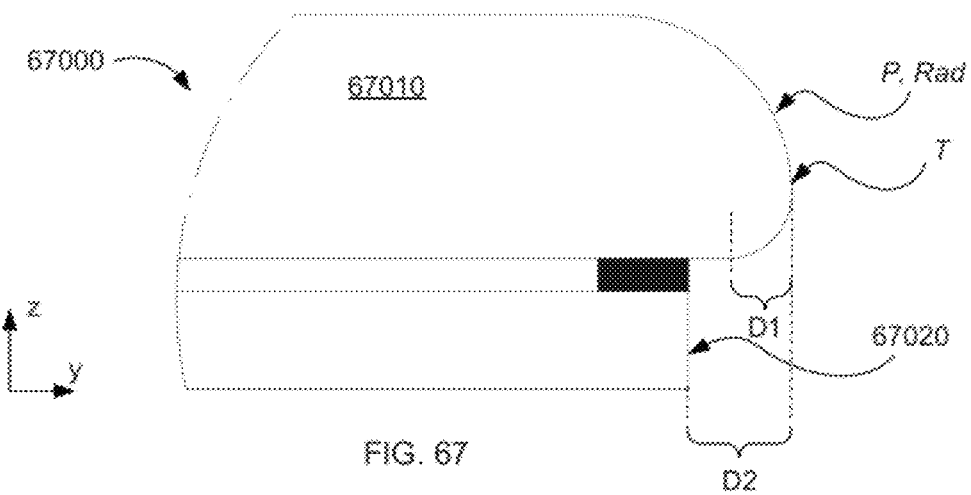
FIG. 67 provides an illustration of an embodiment satisfying homologation requirement.

Similarly, an embodiment of an EC-element based mirror element 67000 of FIG. 67 would pass a homologation requirement as long as a first substrate 67010 is rounded or curved (e.g., via grinding and/or polishing, molding or other means) such as to have edges curved with a monotonic cross-sectional profile P having a radius, at any point along the profile, of at least 2.5 mm. Homologation testing is usually performed at room temperature. The implementation of the embodiment 67000 also allows to mate the peripheral curvature (Rad) of the first substrate with a portion of the housing structure behind it to accommodate the thermal expansion and/or contraction of the housing structure. (Under normal operating conditions, a temperature-driven change in linear dimension (s) of the housing structure of about +/−1 mm is often observed. For example, for a typical mirror element of about 25 cm in length, the linear thermal expansion, corresponding to temperature variation from 25 C to 85 C, of the ABS-plastic based housing is about 1 mm more than that of glass. Similar variations are observed due to cooling down to about −40 C). As shown in FIG. 67, the edges and edge surface of the first substrate 67010 are ground or shaped such that a curved portion D1 is not observable from the front of the mirror element. A portion of the mounting structure (for example, the housing shell or a portion of the carrier, not shown), protruding forward from behind the assembly towards the front of the assembly adjacently to an edge surface 67020 of the second substrate, can now be interfaced with the first substrate to not extend outwards beyond the tip point T and still meet the homologation requirement at temperatures as high as, for example, 85° C. On the other hand, when a ledge or offset D2 formed by the substrates is large enough to accommodate the wall of the housing structure and a space for thermal variation of thickness of such wall, the housing structure wall remains in-board with respect to the tip point T at high temperatures and do not interfere with other elements.

Figure 68A:
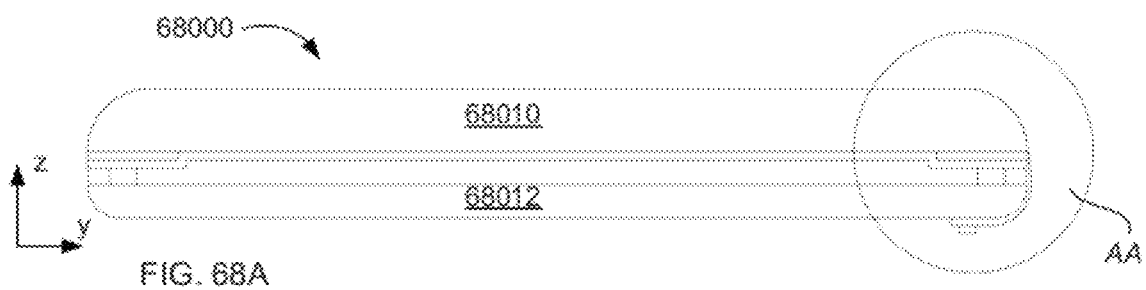
FIGS. 68A, 68B are diagrams providing illustrations of electrical contacts according to embodiments of the invention.
Figure 68B:
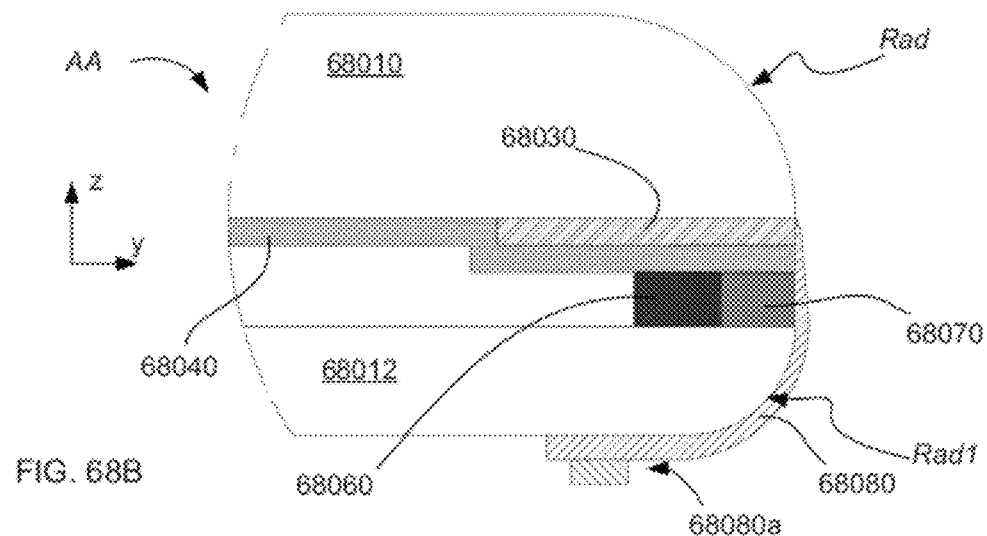

FIGS. 68A, 68B schematically illustrate a related EC-cell based mirror element 68000 and its portion AA in greater detail, respectively. Both first and second substrates 68010, 68012 are rounded (for example, by grinding) across the substrates and around the perimeter of the element 68000 to form an already discussed curved cross-sectional profile in the peripheral area of the pre-assembled element 68000. In the specific example of FIGS. 68A, 68B, the EC-element is shown to include a peripheral ring 68030 overcoated with a transparent electrode layer 68040 (for example, a layer of TCO). Alternatively, a peripheral ring can be disposed over a layer of the TCO. A chamber of gap 68050 of the element 68000 is sealed with a dual seal including a non-conductive primary seal material 68060 affixing the substrates 68010, 68012 to one another, and a conductive material (for example, conductive epoxy) 68070 disposed outboard with respect to the material 68060. While the first substrate 68010 is rounded with a radius Rad, the rounding of the second substrate 68012 is accomplished at a radius Rad1 that generally may differ from Rad. As a result of adding a curvature on the peripheral side of the element 68000, a sealing material may become exposed. Accordingly, an electrically-conductive coating 68080 (for example, the one including Chromium) is disposed on the rounded peripheral portion of the element 68000 to establish an electrical contact with the transparent electrode 68040, to establish electrical communication between the electrode 68040 and the back of the assembly (via a portion 68080*a*, optionally containing a conductivity enhancing element and/or an electrical connector) and to cover the otherwise exposed seal 68060, 68070 from the ambient. The coating 68080 is disposed along a perimeter of the element 68000 and, in specific embodiments, includes several spatially-separated portions or a single portion circumscribing the perimeter of the element 68000. Optionally, a cross-sectional profile of the coating 68080 is non-uniform to ensure a gradual transition between the Rad-rounded first substrate 68010 and the coating 68080.

The challenge of using a single-lite first substrate becomes apparent once it's appreciated that the thicket the substrate the heavier it is. To meet this challenge and to reduce the weight of the assembly, an embodiment of the invention optionally employs a lite of glass thinner than 2.5 mm.

In the latter case, some other part of the mirror assembly (like the carrier or the housing shell/casing) could be adapted to have a curved surface extending beyond the perimeter of the glass lite, as viewed from the front, in order to prevent the outside edge of the glass with an incomplete radius from having an exposed edge. In some embodiments of the invention, a 1.6 mm thick single lite of glass is used that has its edge circumferentially ground at a radius equal to or greater than 2.5 mm. In this case the housing shell/carrier is shaped according to provide for an overall external surface that is differentiable. Alternatively, if a glass lite thicker than 2.5 mm is used, it is possible to meet the 2.5 mm radius requirement and have the glass proud of the carrier/hosing shell when viewed directly from the front.

The use of a glass substrate with thickness of at least 2.5 mm instead of a thinner one may cause the following shortcomings: on the one hand, the thicker the substrate the heavier it is (which is generally unwanted) and, on the other hand, a thicker first substrate reduces the sensitivity of a capacitive switch the conductive pad of which is located on a surface behind surface I (for example, on surface II or surface III etc). The following examples of embodiments are directed to address these shortcomings without sacrificing the safety feature provided by the Rad-curved peripheral edge of the first surface. The idea behind the proposed solutions stems from the appreciation that configuring a composite first substrate (for example, formed by laminating together at least two thin lites of glass or laminating an additional substrate-like layer to the first surface of the first glass substrate) preserves the curved edge of an embodiment and, at the same time, facilitates positioning of a conductive pad of the capacitive switch behind the first surface and yet even closer to it than, e.g., when the conductive pad is located at the second surface of the mirror element (such as in the embodiment of FIG. 38). In addition, a layer of material intermediate to individual components that are being laminated together facilitates keeping elements of such substrate affixed together even when the substrate is shattered, thereby increasing the safety of the rearview assembly.

Figure 40A:
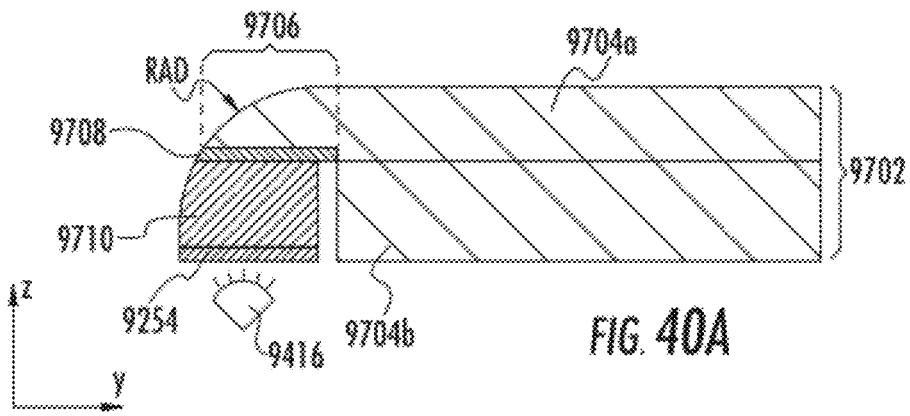
FIGS. 40(A-C) illustrate portions of embodiments implementing a capacitive switch in coordination with a composite substrate of the mirror system.
Figure 40B:
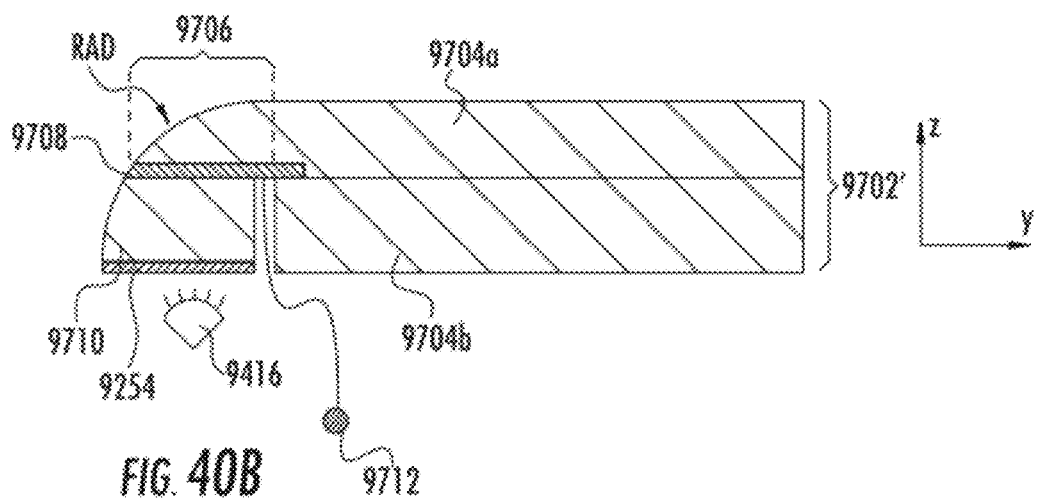
Figure 40C:
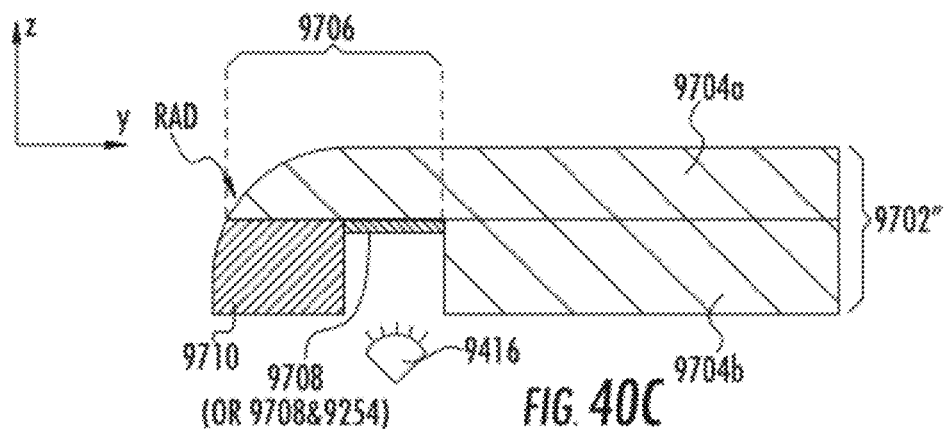

FIGS. 40(A-C) illustrate portions of composite first substrates 9702, 9702', 9702" for use in an embodiment of the rearview assembly each of which is shown as a combination of two lites, 9704*a*, 9704*b* where the lite 9704*a* is larger in size than the lite 9704*b* and is preferably laminated to it such as a fashion as to define a ledge 9706 formed by a portion of the front lite 9702*a* that "overhangs" the second lite 9702*b*. Thickness of either lite 9702*a*, 9702*b* is such that the composite first substrate 9702, 9702', 9702" has a thickness of at least 2.5 mm. A conductive pad 9708 corresponding to a capacitive switch of an embodiment is disposed on a ledge surface facing away from the front of the assembly and covers at portion of the ledge 9706 (FIG. 40C) or extends all the way between edges of the lites 9702*a*, 9702*b* (FIGS. 40A, 40B). Although this conductive pad may include a metallic layer, it is preferred that it include a layer of TCO and be, therefore, optically transparent.

A peripheral portion of the ledge 9706 is shown to be augmented (e.g., through lamination) with a plate 9710 of plastic material that may additionally carry a graphics layer such as layer 9254 (FIGS. 40A, 40B). The thickness of the plate 9710 is chosen such as to assure that the aggregate thickness of the ledge 9706 and the plate 9710 is no less than 2.5 mm. The source of light such as the element 9416 of FIG. 37A illuminates the graphics layer 9254 from the back and transmits the indicia information towards the FOV at the front of the assembly, through the conductive pad 9708 and the ledge 9706. In the embodiment of FIG. 40C, the inboard-located conductive pad 9708 may have the required indicia patterned therein or have an additional graphics layer (not shown) to be attached to the back surface of the pad. An electrical connection between the conductive pad 9708 and corresponding electronic circuitry at the back of the assembly is schematically indicated only in one embodiment, for simplicity of illustration with a connector 9712. Once the first lite 9702*a* has been built-up with a plastic portion 9710, a peripheral edge of the built-up ledge is further shaped along the perimeter of the first lite 9704*a*, as discussed above, to create a peripheral edge portion curved at a radius Rad of no less than 2.5 mm.

FIG. 41 offers a cross-sectional view of a portion of yet another embodiment containing a composite first substrate 9802, which includes first and second lites 9802*a*, 9802*b* laminated with the use of intermediate lamination material 9802*c* and which serves as a front optical substrate of an EC-element 9804. The first and second substrates are dimensioned so as to form a ledge 9806. In the area of the ledge 9806 there is a front portion (as shown, a portion 9808*c* of a TCO-layer that is electrically-isolated, with an area 9808*b* from an adjacent TCO layer 9808*a*) of the capacitive-switch's conductive pad that is laminated between the lites 9802*a*, 9802*b*. The composite substrate 9802 has a radius Rad of at least 2.5 mm around the perimeter of this substrate. Otherwise, the EC-element 9804 is structured by analogy with, e.g., the EC-element of FIG. 37A. The TCO-region 9404*c*, which is electrically isolated from the TCO-portion 9810*a* representing the transparent electrically-conductive layer of the EC-element 9802, is adapted to operate as an extension of the conductive pad 9808*c* connected to it with an electrically-connecting means 9812 (such as a metallic solid or patterned film, a metallic clip, conductive ink or epoxy, to name just a few) that extend along the Rad-rounded outer edge surface of the composite substrate 9802. The overall conductive pad of the capacitive switch of the embodiment, therefore, is wrapped around a portion of the edge surface of the composite double-pane first substrate 9802 of the EC-element 9804 such as to electrically connect the portion 9808c of the inter-pane transparent conductive layer with the portion 9810c of an electrically-conductive layer on surface II.

Turning to FIG. 42 and in further reference to FIG. 41, a schematic front view of the embodiment 9800 of FIG. 98 is shown with the Rad-curved annular edge region 9904, corresponding to the rounded edge surface of the first substrate 9802, and three regions 9906, 9908, 9910 that are defined by respective boundaries 9906', 9908', and 9910' corresponding to respective conductive pads (such as the pad 9808c, for example). Here, the EC-element 9804 is shown without any of the implied detail such as coatings or EC-medium. Graphical indicia or graphic layer such as the layer 9240 of FIG. 941 is shown as a star, a triangle, and a circle. Respectively-corresponding electrically-connecting means (such as the means 9812 of FIG. 41), wrapping around the Rad-rounded edge surface 9904 are shown as elements 9916, 9918, and 9920.

A variation of the embodiment of FIGS. 41 and 42 is schematically depicted in FIGS. 43 and 44, where a combination 10004 of a conductive pad and a graphic layer is laminated between the first and second lites 9802a, 9802b, which together form the composite first substrate 9802 of the EC-element 9804, and is further electrically extended, 9812, along the circumferentially Rad-rounded perimeter edge of the substrate 9802 to a back of a portion 10006 of the carrier of the invention. The back portion 10006, in turn, establishes an electrical connection (not shown) between the electrical extension 9812 and the electronic circuitry triggered by the user input applied through communication with the conductive pad of the combination 10004. A single capacitive switch is defined, in this case, by the conductive pad of the combination 10004, the corresponding electronic circuitry, and electrical connections between the two. The front view of the embodiment, FIG. 44, illustrates three switches with corresponding conductive pads extended 9812, 9812', 9812" to the back of the carrier. In yet another alternative embodiment (not shown) the electrical extension of the conductive pad of the switch may wrap around the EC-element to its back.

Figure 90:
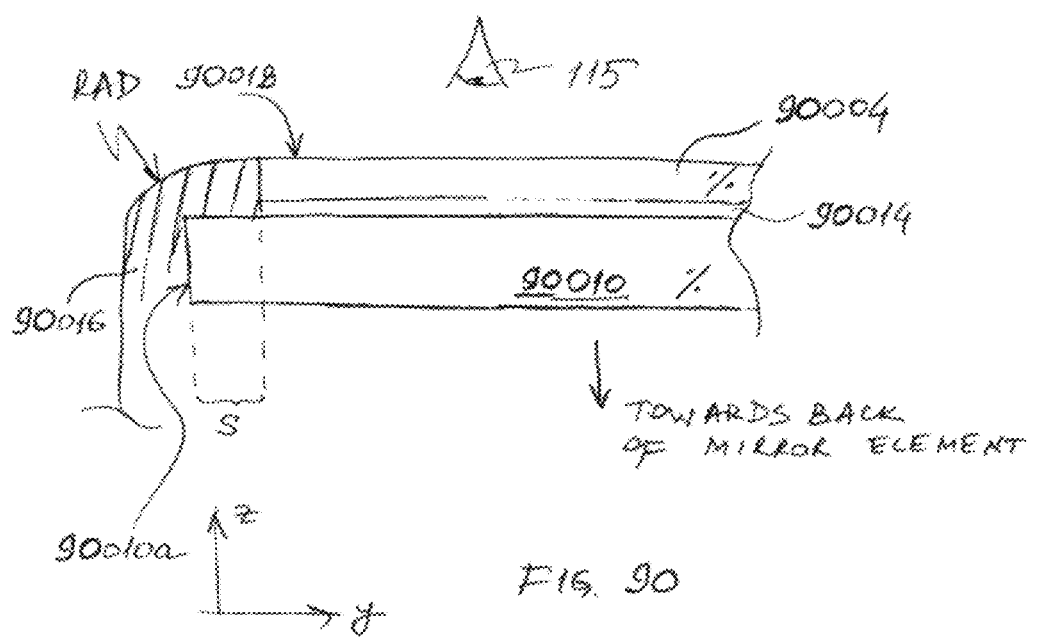
FIG. 90 is a diagram showing a an embodiment of the veneered mirror element of the assembly.

Implementations of the idea of a composite substrate discussed above include a substrate veneered with a lite of glass having dimensions that are substantially different from those of the substrate itself. For example, as discussed, a veneer (whether glass or plastic or some other appropriate transparent material) that is larger than the front substrate of the mirror element can be laminated to a front surface of the front substrate mirror element to form a ledge between the veneer and the front substrate, thereby providing additional locations for placing a conductive pad of the capacitive switch. In another example, schematically illustrated in FIG. 90, a portion of the composite mirror element is shown in which a veneer 90004 is affixed (for example, boned or laminated) to a front substrate 90010 of the mirror element either directly or through an optionally used plastic layer 90014. While the positioning of the veneer 90004 with respect to the substrate 90010 is characterized with an inset S with respect to an edge surface 90010a, the geometrical profile (for example, the shape) of the veneer 90004 otherwise simulates that of the mirror element. As shown, once the composite mirror element is formed, its peripheral portion can be wrapped or filled with an elastic material 90016 formed around the mirror element (for example, through molding) to conforms to and/or complement the inset profile formed by the veneer 90004 and the substrates 90010 to define a Rad-rounded surface mating tangentially with or to the surface 90018 of the veneer 90004. A portion of the elastic material 90016 that conforms to the inset S is optionally adapted to conceal the sealing material and/or electrical contacts (in case of the EC-element based mirror) from being observable from the front of the assembly. A "composite" approach to formatting the first substrate of the embodiment may be advantageously used also with a non-EC-element based vehicular mirror (such as a mirror employing a prismatic element), as well as a vehicular mirror assembly including an anisotropic polymeric film allowing to optimize performance of the assembly operating in a display mode, as discussed in details in Our Prior applications, e.g., in patent application Ser. Nos. 12/496,620, 12/629,757, and 12/774,721. Housing structures, embodiments of seal, peripheral rings, electronics, thin-films layers switches and other elements for use with such composite mirror element are not limited to any particular implementation. Various embodiments of numerous rearview assembly components discussed in this application can be used with such mirror element and in different combinations with one another.

It is appreciated that in an embodiment where a sandwich-like combination of the pad and graphical layer are carried on a glass surface, such association may be formed by "thy-transferring", as known in the art, of such combination onto a pre-heated glass surface or via screen-printing onto the glass surface.

Pairs of Substrates, Peripheral Rings, and Virtual Buttons (Including Indicators of Operation)

FIGS. 45(A, B) schematically illustrate that embodiments of an EC-element having a ledge such as ledge 10220 defined by the first and second substrates of the EC-element (as discussed in reference to FIGS. 32A, 33(A,B), 34A, 35(A,B), 37A, 38, 41, 43) or a similarly configured EC-elements generally utilize a pair of optical substrates such as a pair of FIG. 45A or a pair of FIG. 45B. The pair of FIG. 45A, also labeled as 10201 and referred to herein after as a "sized-down pair", includes a first substrate 10202 (whether made of a single lite substrate or a composite) and a second substrate 10204 that is formed from a lite of glass co-extensive with the substrate 10202 by removing a strip of glass 10206 thereby sizing this lite of glass down. The perimeter of the second substrate 10204 is generally shorter than that of the first substrate 10202. A second substrate 10210 of the pair 10207 of FIG. 45B, referred to herein as a "notched pair", is formed from a lite of glass initially co-extensive with the first substrate 10202 by creating a notch (or a cut-out, or indentation) 10210. In addition, while not shown in FIGS. 45(A,B), the front edge of the first substrate or both the first and second substrates may be rounded, Rad. Moreover, in a specific embodiment it may be preferred to similarly round the front edge of the carrier plate supporting the EC-element, with a radius Rad' that is no less than 2.5 mm (see, e.g., the description of FIG. 38). This may be done in addition or alternatively to rounding an edge of a substrate of a mirror element supported by the carrier, as discussed elsewhere in this application.

A second-surface peripheral ring region(s) of the EC-element in any embodiment of the assembly has to be judiciously adapted to the choice of a pair of substrate defining the EC-element and the choice of the embodiment of the conductive pad of the capacitive switch and the graphics layer corresponding to this switch to assure that its structure does facilitate the performance of all the functions of the ring. Consequently, the peripheral ring region(s) may include the ring itself (conventionally concealing the seal, plug material, and electrical connectors of the EC element, see, e.g., 9214 of FIG. 33A) and, in addition, may include region(s) outside of the EC-element such as the region 9214 of FIG. 33B or a region utilized as a conductive pad of the capacitive switch.

Figure 46A:
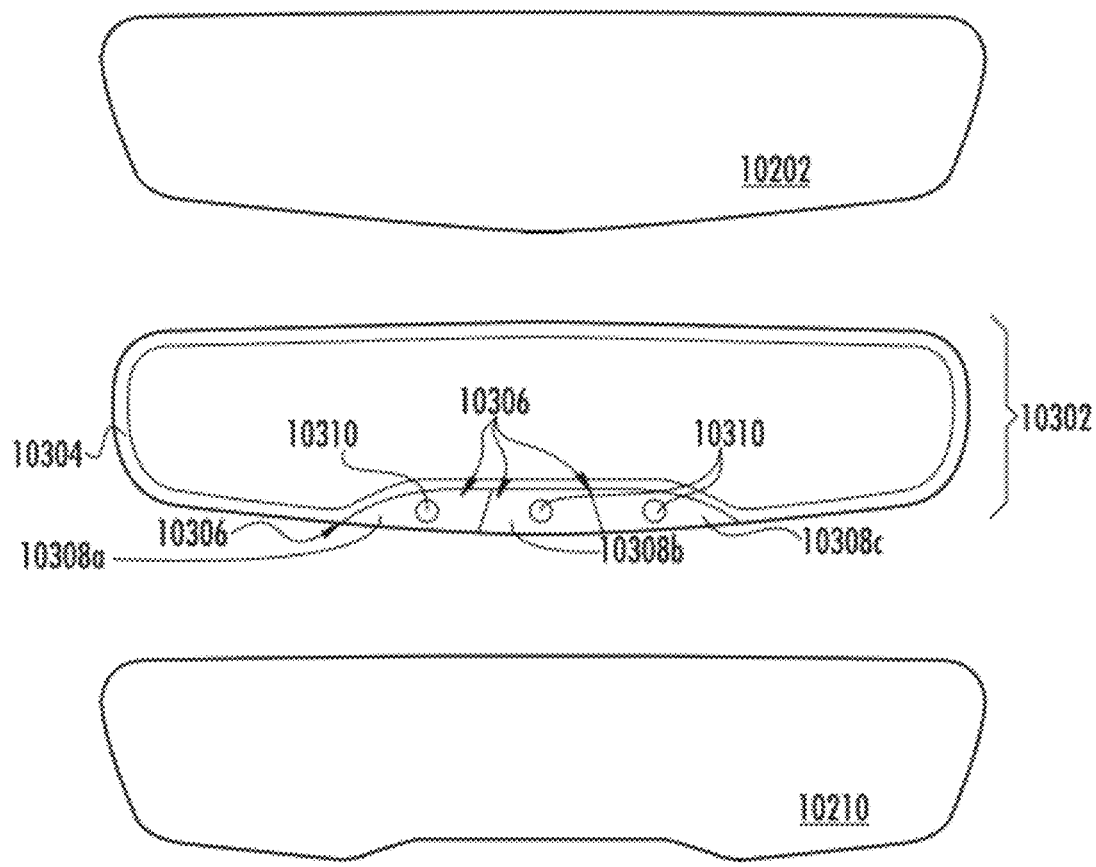
FIG. 46(A, B) illustrate, in different views, a notched pair of substrate and an embodiment of the peripheral ring region for use with a mirror system of the rearview assembly.
FIG. 46C illustrates a notched pair of substrate and another embodiment of the peripheral ring region for use with a mirror system of the rearview assembly.
FIG. 46D shows a front view of an embodiment of the mirror system containing capacitive switches.
Figure 46B:
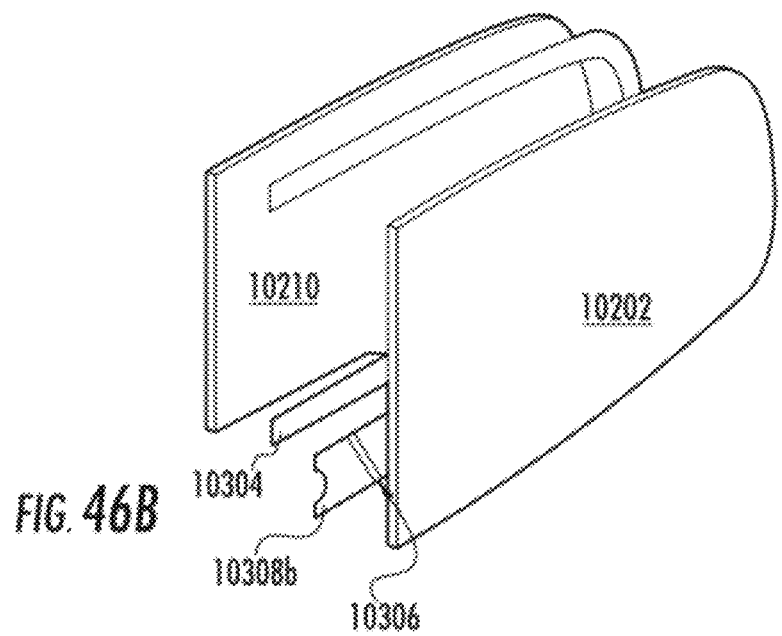
Figure 46C:
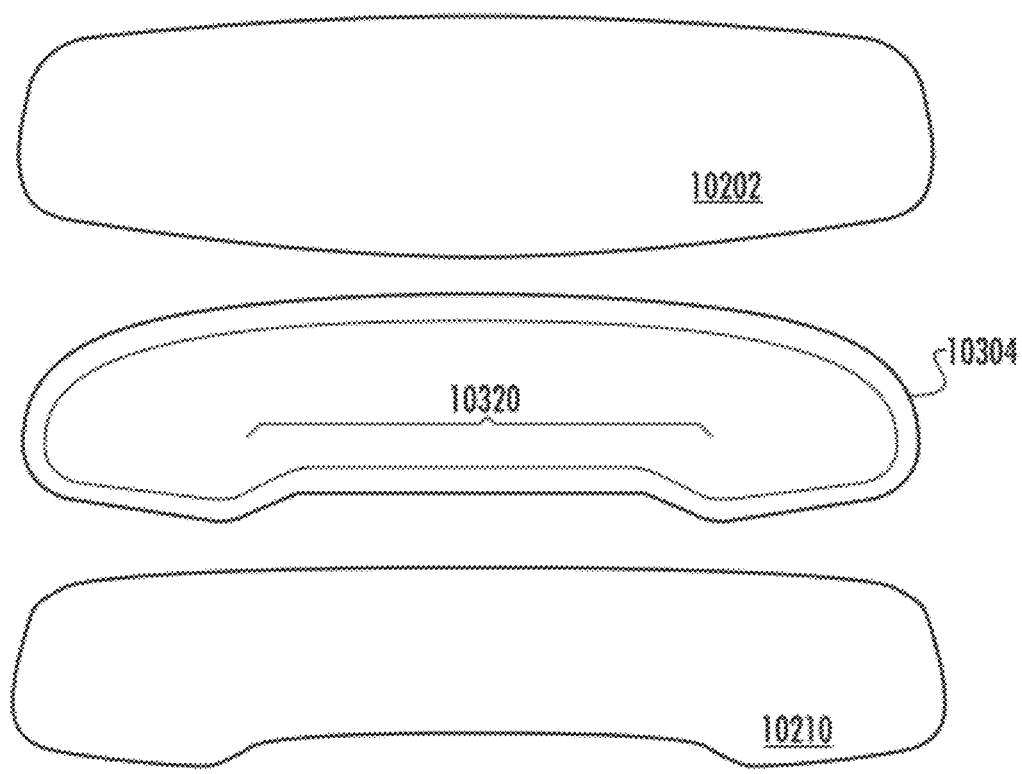
Figure 46D:
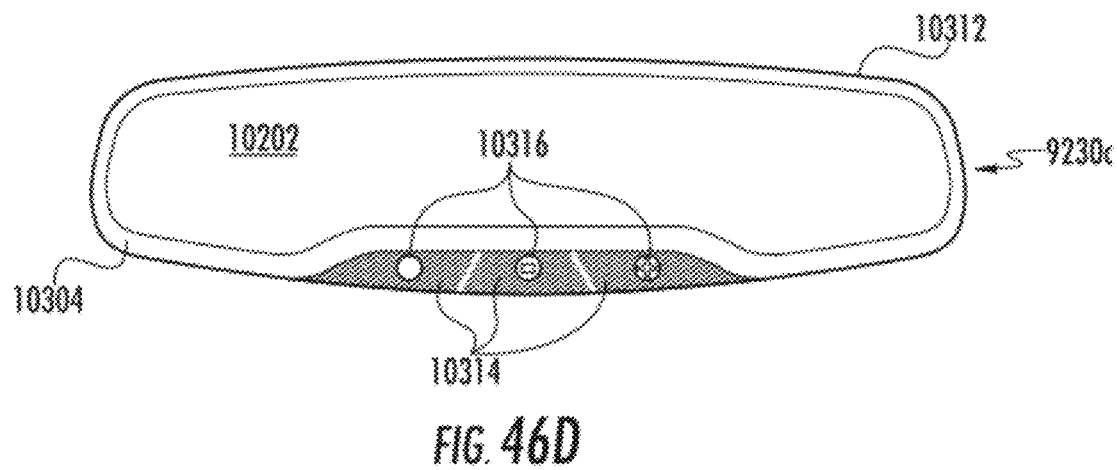
Figure 46E:
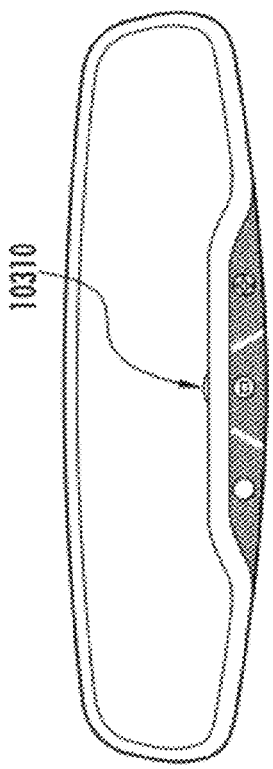
Figure 46F:
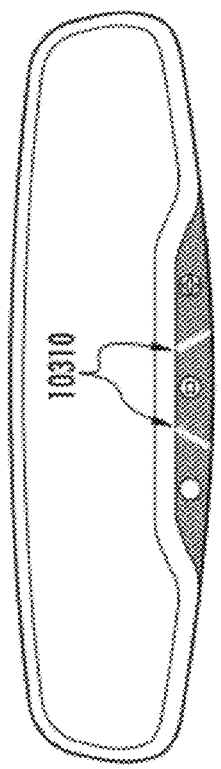
Figure 46G:
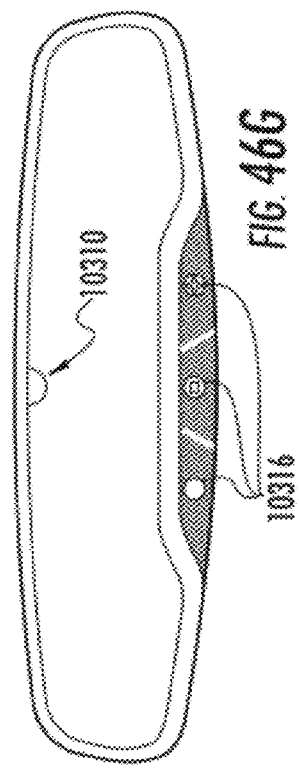
Figure 46H:
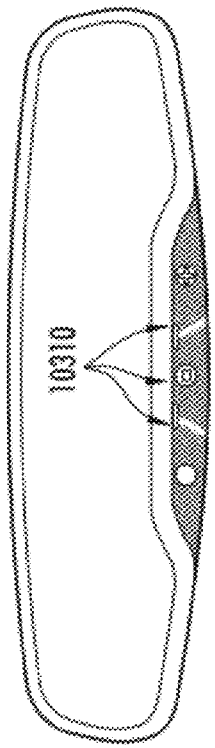
Figure 46I:
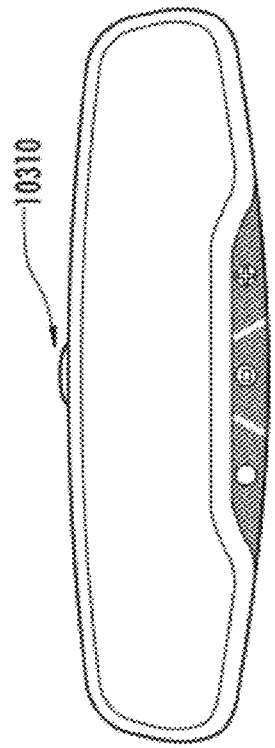
Figure 46J:
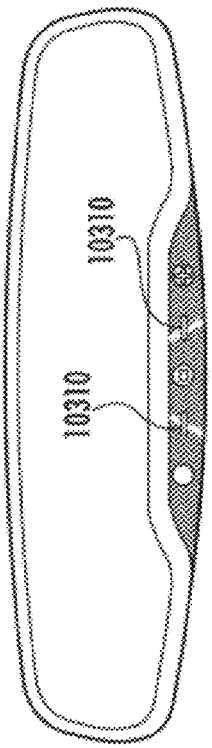
Figure 47:
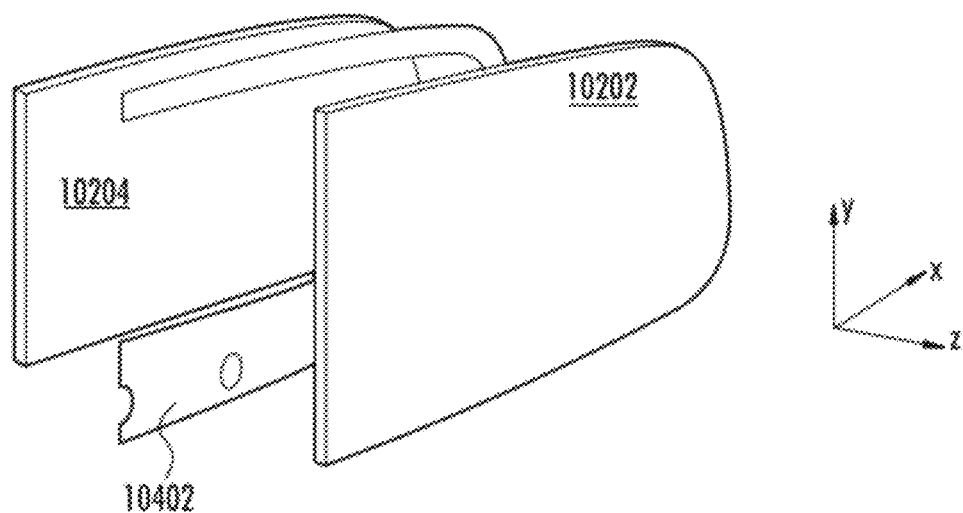
FIGS. 47 and 48 illustrate, in different views, a sized-down pair of optical substrates and an embodiment of the peripheral ring region for use with a mirror system of the rearview assembly.

FIGS. 46, 47 schematically illustrate some of the possible structures within the scope of the present invention. The front and perspective view of FIGS. 46(A, B) show a combination of the sized-down pair of EC-element substrates 10202, 10204 and a peripheral ring region 10302 disposed on the second surface of the EC element. The region 10302 includes a conventional peripheral ring 10304 shaped such as to outline the perimeter of the notched-back substrate 10204 and electrically isolated by electrically-nonconductive areas 10306, individually and as a group, "virtual button" regions 10308a, 10308b, 10308c. (The peripheral ring region 10302 is disposed, in this case, on the second surface of the EC-element.) Each of these regions is independently electrically extended (not shown) to the appropriate electronic circuitry on the PCB and is adapted to be a conductive pad of a corresponding capacitive switch. In establishing electrical connections between the conductive pads corresponding to the virtual button regions and the electronic circuitry, in one embodiment the pads are overcoated with a dielectric layer (not shown) which, when viewed from the front, visually conceals the isolation areas 10306 and prevents them from being observable. This dielectric layer is further appropriately patterned to provide for electrical passages to the conductive pads. In a specific embodiment (not shown), the peripheral edge of at least one of the first and second substrates of the sized-down pair 10202, 10210 of FIG. 46C is Rad-rounded. Areas 10310 represent openings in corresponding touch-pad regions of a peripheral ring-material through which the indicia/icons corresponding to the touch-pads is observable.

A front view of an embodiment of the rearview assembly employing some of the elements of FIGS. 46(A, B, C) is shown in FIG. 46D to be grouped together within a housing/casing (not shown) and a carrier the Rad-rounded peripheral edge 10312 of which surrounds the EC-element (compare, e.g., with the rounded edge of the peripheral portion 9230c of FIG. 33A). The virtual button regions 10314 are adapted to include either electrically-conductive regions 10308(a-c) on surface II (in case the peripheral ring regions are adapted according to the structure 10302) or separate layer(s) of graphical appliqué (such as the layer 9254 of FIG. 33A, for example) containing icons 10316. Therefore, the surface associated with an individual pad region can be specularly reflective, optically diffusive, or colored in a particular fashion, whether opaquely or translucently.

Announcing to the user that a particular function or device of the assembly has been activated in response to the user-input applied to the virtual button, while allowing multiple implementations, is not trivial because, on one hand, such announcements should identify individual virtual buttons and/or functions/devices and, on the other hand, they should be easily observable by the user. To this end, the front of the assembly may additionally configured include indicator(s) 10310 providing a preferably optical output to the user.

Generally, embodiments of the invention contemplate numerous lighting schemes (either for backlighting the appliqué, indicating the switch has been activated or showing that a particular switch is in use), including:
 1. A "day/night lighting" mode, where the intensity of the highlight may vary depending on whether it is daytime or nighttime. An ambient light sensor and/or a glare light sensor of the assembly can provide an output useful for such control.
 2. An "activation" mode, wherein, as described above, lights may be useful to show that a switch has been activated as outlined below. In this mode, arrangements include:
  i. a given icon can be caused to flash and/or to change color (especially easily if red, green and blue LEDs are combined in a backlight). In such a case the color of the backlight may change from any of these individual colors to any pre-determined color by appropriately mixing the intensities of red/green/blue backlights. Alternatively,
  ii. lit area may be separated from a virtual button and remain "on" or flash
   through transflective coating (whether a transflective region of the peripheral ring or a transflective region of the reflector/electrode);
   through secondary optic on the sensor, or through a transparent or translucent portion of a housing structure.
  iii. adjacent button indicate that a button is hit
  iv. all virtual buttons can be lit or flash
  v. while all virtual buttons flash, an active button remains "on"
  vi. the use of a wide virtual button so lighting appears around a finger
  vii. a center backlight to light the icon and an edge light to light the rest of the button when user input is applied.

In particular, in reference to FIGS. 46(E-J), the indicator(s) may be disposed, e.g.:

in the viewable area of the mirror such as above the region of the peripheral ring, FIG. 46E, or in the upper portion of the mirror such as in the area of an eye-hole corresponding to a glare sensor, FIG. 46G;

in the areas of isolation between neighboring virtual buttons, FIG. 46F;

within the boundaries of a virtual button, FIG. 46H and FIG. 46J;

within a portion of the housing structure (e.g., in a peripheral portion of the carrier, FIG. 46I). FIG. 53 schematically additionally illustrates positioning of optical indicators for capacitive switches.

In reference to FIG. 46G, where the optical indicator such as an LED shares an eye-hole opening with the glare sensor to deliver the capacitive-switch-activation feedback signal to the user, the operation of the glare sensor and the indicator is preferably temporally coordinated. As the microprocessor controls the indicator 10310 and the glare-sensor timing, the most recent glare-sensor data is saved and its activity is suspended while the optical indicator 10310 is "on". When the indicator is disabled, however, the activity of the glare sensor is resumed to provide current, live glare sensor data. Alternatively or in addition, if the operation of the glare sensor can be sampled as a fast enough rate, the optical indicator can be pulse-width modulated (e.g., be "on" 90% of the time) and readings of the glare sensor can be acquired during the "off" time of the optical indicator. In this case, care should be taken to consider rise and fall times of the optical indicator's electronic drive.

Figure 48:
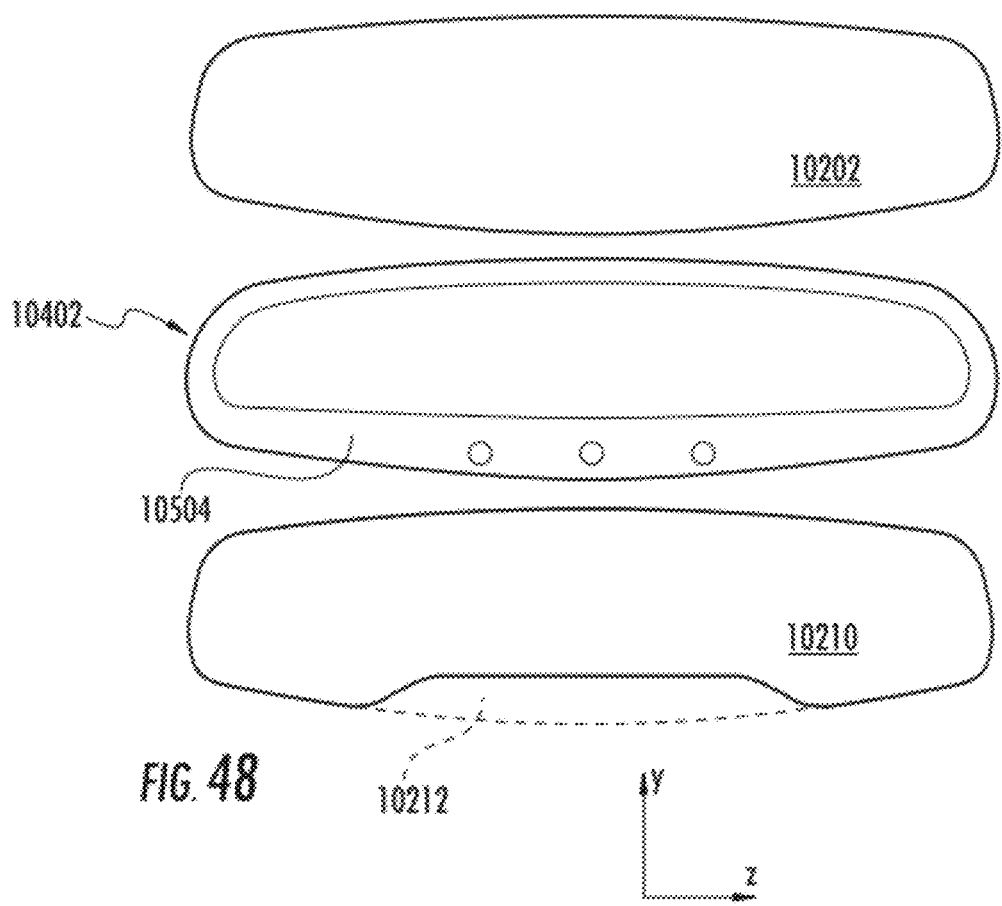

Continuing the discussion of differently dimensioned optical substrates, FIG. 47 corresponds to the assembly that utilizes the sized-down pair of substrates 10202, 10210 and a peripheral ring 10402, a widened portion of which extends to the ledge of the EC-element and is configured to operate as a graphics/indicia layer. A front view of a similar embodiment that utilizes a notched pair of substrates 10202, 10210 is illustrated in FIG. 48.

Referring to FIGS. 45A and 46(A-D), in one example the height of the touch-pad regions 10314 may be about 10 mm to about 13 mm, with roundish icons 10316 of about 6.5 to 7 mm in diameter. The peripheral ring 10304 has a width of about 4.5 mm anywhere except in the area 10320 above the touch-pads, where it is generally wide (e.g., 5.5 mm) In another example that utilizes a combination of elements of FIG. 48, the peripheral ring 10402 may have a width of about 4.5 mm everywhere except in the graphics area 10504, where it is judiciously configured to be so dimensioned as to conceal the area of the notch 10212 in the second substrate 10210, which corresponds to the ledge of the EC-element, from being observable from the front of the assembly.

Figure 56B:
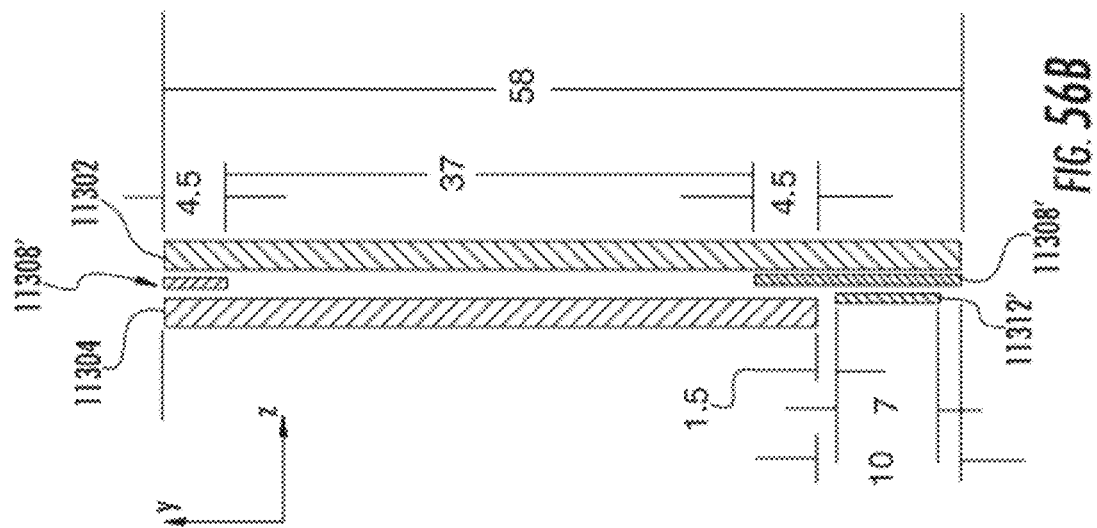
FIGS. 56(A, B) show a simplified cross-sectional view corresponding to embodiments of an EC-element of the invention.
Figure 56A:
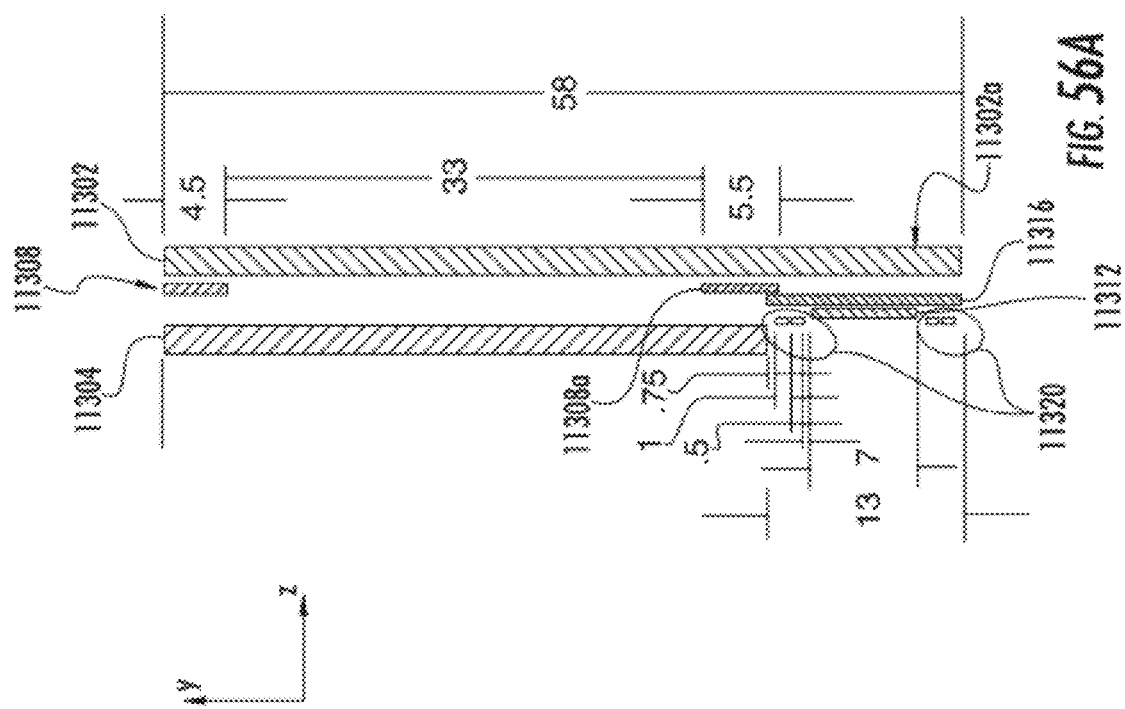

FIGS. 56(A, B) provide additional description of the EC-element construction by illustrating some key components and omitting the rest of otherwise present elements for simplicity of illustration. The structure of FIG. 56A generally corresponds to an embodiment employing either a sized-down pair of substrates or a notched pair of substrates and a peripheral ring layer having a single ring with a "notch" region such as the ring 10304 of FIG. 103C, with a notch region 10320. The structure of FIG. 56B generally corresponds to an embodiment employing a notched pair of substrates and a peripheral ring layer that has either a single peripheral ring that is widened in the notch region (such as the ring 10402 of FIG. 47) or a peripheral ring together with peripheral virtual button regions (such the embodiment 10302 of FIGS. 46A, 46B). Here, 11302 is the first substrate of the EC-element; 10304 is its second substrate; 11308, 11308a and 11308' are the corresponding peripheral ring layers; 11312 is the icon/graphics layer, while 11312' may combine the graphics layer and the electrically-conductive layer; 11316 is the layer of opaque applique; 11320 indicate circuit traces and/or the conductive pad for a capacitive switch. As discussed in reference to FIG. 35B, a portion 11308a of the peripheral ring layer is shown to have a projection, onto the first surface 11302a of the EC element, that overlaps with a corresponding projection of the applique layer 11316 in order to aid in alignment of EC-element components during the fabrication. While some dimensions are indicated in FIGS. 56(A, B), these dimensions are provided by way of non-limiting example(s) and may vary in different embodiments.

Specific Embodiments Facilitating Backlighting and Highlight of Indicia.

Figure 49:
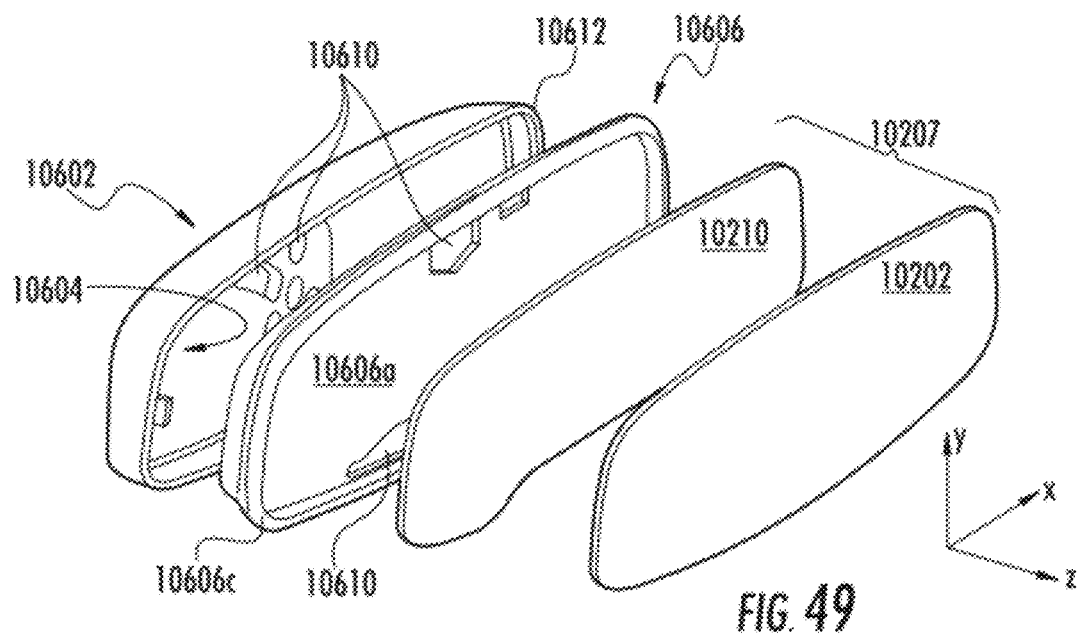
FIG. 49 is an exploded view of a portion of a rearview assembly employing an embodiment of the invention.

As shown in an exploded view of FIG. 49, the integration of optical substrates in an assembly may be carried out through cooperation among the housing shell or casing 10602, defining an aperture 10604 towards the front of the assembly, and a carrier 10606. The carrier 10606 is shown to include the extended portion 10606a, configured to support the notched pair 10207 from behind, and a peripheral portion 10606c (with an Rad-rounded outer edge) configured to peripherally surround the pair 10207, as discussed in reference to FIG. 37A, for example. Both the carrier 10606 and the housing shell/casing 10602 are shown to include various throughout openings and passages 10610 adapted to accommodate electrical and mechanical connectors, optical elements and other components of the rearview assembly.

Figure 50A:
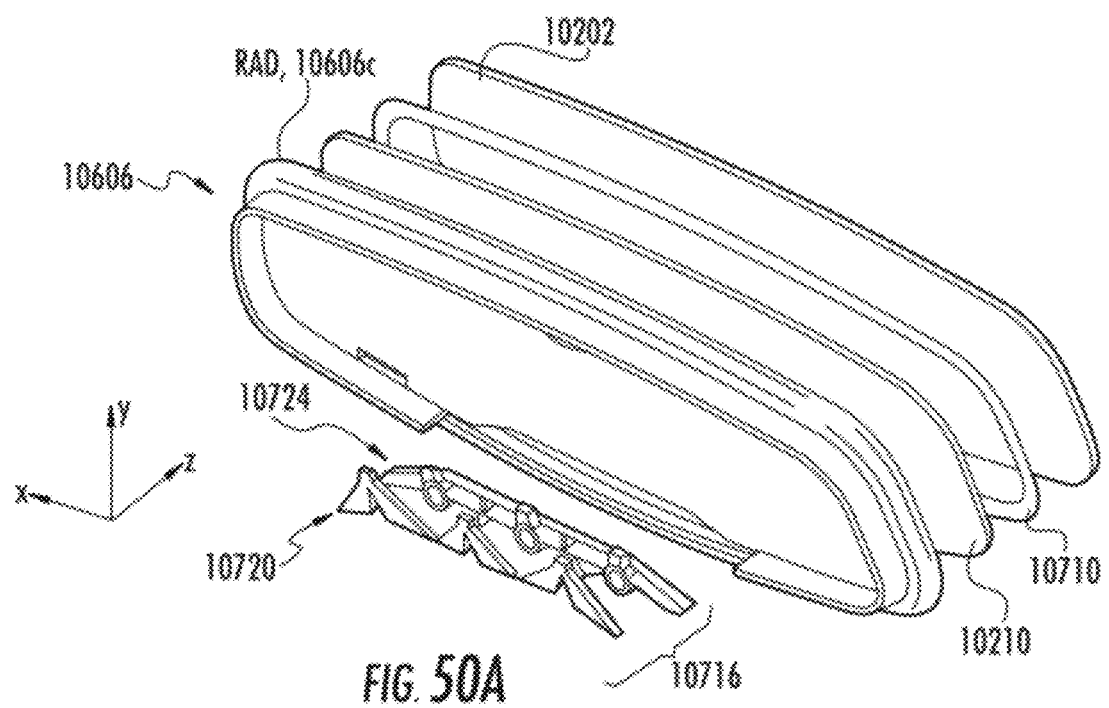
FIG. 50A is another exploded view a portion of a rearview assembly employing an embodiment of the invention.

FIG. 50A shows, at a different angle, a complementary exploded view of the carrier 10606, the notched substrate pair 10207, the peripheral ring region 10710 (such as, e.g., the ring region 10504 of FIG. 48 or the region 10302 of FIG. 46) between the substrates 10202, 10210, and a specific embodiment of a structure 10716 dedicated to facilitate delivery of light from a source of light (not shown) at the back of the assembly to the indicia layer (not shown) at the front of the assembly). Generally, with respect to backlighting of indicia and indicators of the virtual buttons corresponding to capacitive switches of the invention, light sources such as LEDs can be placed directly behind an area to be lit, and may utilize optical systems including lightpipes, diffusers, lenses etc. The embodiment of the shown structure 10716 includes an array 10720 of lightpipes and a lightpipe support 10724, which are further detailed in reference to FIGS. 50(B-D).

Figure 50B:
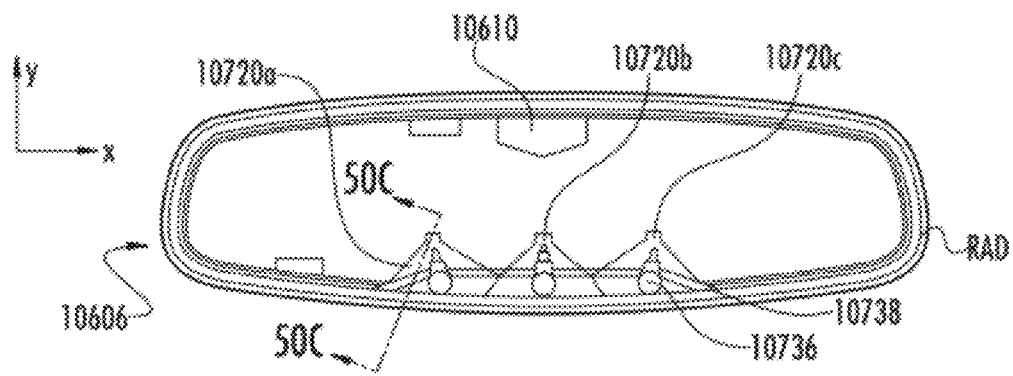
FIG. 50B is a front view of a carrier and a portion of the backlight system of the portion of FIGS. 49 and 50A.
Figure 50C:
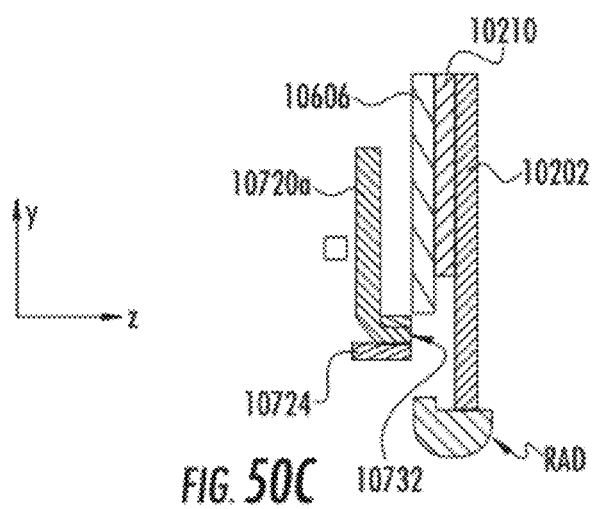
FIG. 50C provides a cross section corresponding to the view of FIG. 50B.
Figure 50D:
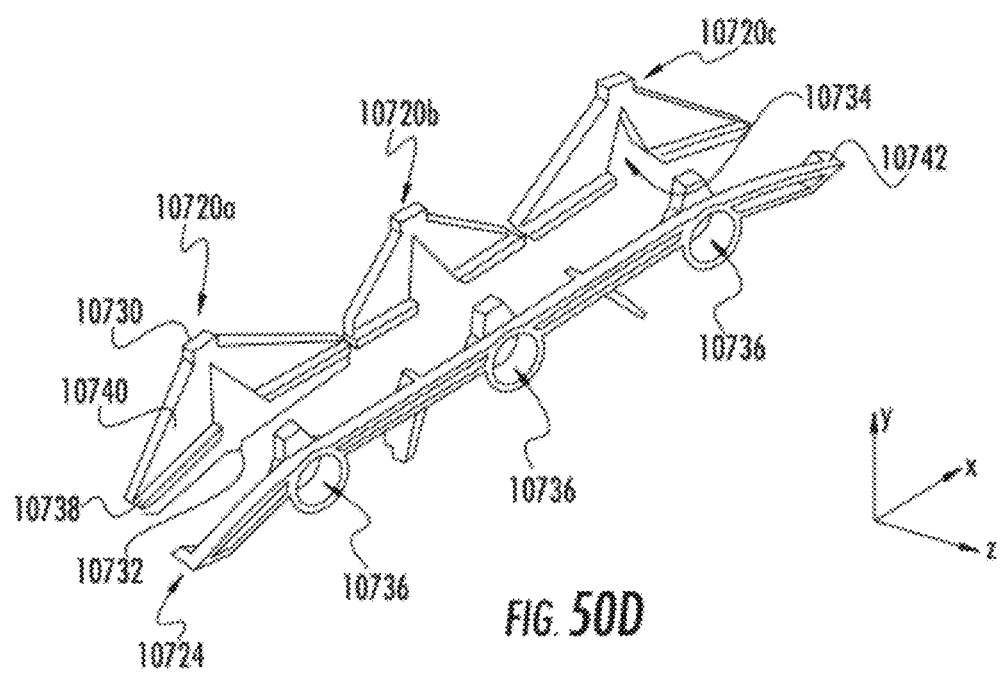
FIG. 50D illustrates an embodiment of a lightpipe and a supporting structure.

A front view of the carrier 10606 with the structure 10716 (including the array 10720 of lightpipes 10720a, 10720b, 10720c and the lightpipe support 10724) is illustrated in FIG. 50B. The number of lightpipes in an array of lightpipes generally corresponds to the number of the pad regions of the first substrate of the embodiment (such as regions 10314 of FIG. 46) and to the number of indicia regions (such as regions 10316 of FIG. 46) of the functional capacitive switches of a given embodiment. A lightpipe such as a transparent-plastic lightpipe 10720a, for example, has an input end 10730 and an output end. An input end of any of the lightpipes 10720(a, b, c) optically communicates with a light source such as an LED, OLED, an incandescent or electroluminescent source of light at the back of the assembly. An output end is judiciously structured such as to deliver light channeled through the corresponding lightpipe to the virtual-button indicators 10310. For example, the output end 10732 is shaped as a dove-tail to mate with the optical indicator embodiment of FIG. 46H or 46J and includes an opening 10734 for transmitting light from another LED through an aperture 10736 of the lightpipe support 10724 towards the icon 10316 of the assembly. In addition, the input end 10732 includes a foot 10738 angled with respect to a body 10740 of the lightpipe 10724a, 10724b, 10724c that facilitates a snap-on removable attachment between the lightpipe support 10724 and the lightpipe 10724a, 10724b, 10724c as shown in a cross-sectional view of FIG. 50C. A bridge 10742 of the support 10724 is dimensioned to fit within a cut-out opening 10610 at the bottom of the extended portion 10606a of the carrier 10606.

User Interface: Embodiments Incorporating a Lock-Out Switch.

The basic idea behind a "lock-out switch" stems from the realization that at least one of the "functional" switches (such as capacitive or optical switches) of an embodiment of a rearview assembly that are designed to respond to a user input from the front of the assembly (e.g., the one coordinated with a portion of the first surface, such as brushing or juxtaposing one's finger against it) is likely to be unintentionally triggered when the user tilts and turns the assembly affixed to the front windshield in order to adjust the viewing angle. In order to effectuate the adjustment of the mirror, the user more likely than not is bound to grasp the assembly (which is, when installed in the vehicle, is elongated in a horizontal direction, along x-axis, see, for example, the component 410 of FIG. 5), from the front such as to place some of his fingers on the top portion of the assembly and some of his fingers on its bottom portion, while covering a substantial portion of the front of it with the palm of his hand. In such a situation, a functional switch (such as a capacitive switch, for example, adapted to effectuate a wireless telephonic connection) that is cooperated with the front of the assembly will, more likely than not, be activated by the proximity of the palm and/or fingers of the user. It is also quite likely that more than one of such neighboring switches will be triggered simultaneously, thereby activating corresponding functions/assembly devices each and every time the user attempts to adjust the rearview mirror. Clearly, such situation is undesirable, especially when at least one of the switches activates a function requiring a participation of a third-party provider. It is preferred, therefore, to be able to mute (lock, stop temporarily, suspending the performance of) the functional switches for a period of time required to adjust the orientation of the rearview mirror. Such "muting" or "locking" can be implemented, for example, by providing a second set (of at least one) switch that locks-out the functional switches in response to an input corresponding to the angular adjustment of the rearview mirror by hand. Moreover, it is appreciated that this problem is specific to embodiments of a rearview assembly and simply does not exist in a case of, for example, networking/information/display modalities implemented in connection with and effectuated via input applied to a dash-board or any other immobile part of the vehicle. Therefore, traditional "lock-out" switch solutions that are applicable to permanently fixed devices are not likely to be befitting the vehicular rearview assembly.

In one embodiment, a dedicated pad (e.g., and electrically-conductive layer) for a lock-out capacitive switch can be added to the bottom and/or top surfaces of the assembly within such a distance behind the first surface of the mirror element as to be within the reach of a finger, for example within about an inch behind the edge 10602 defining the aperture 10604 of the housing shell/casing 10602 of FIG. 49. Alternatively, the lock-out electrically-conductive layer may be disposed on an outer or inner surface of a peripheral portion of the carrier, e.g., at the outer surface of the peripheral portion 9230c of the carrier 9230 of FIG. 33A or the carrier 10606 of FIG. 49. The conductor may be solid metallic layer or a patterned during the process of deposition such as vacuum metallization), a carbon ink coating, or conductive epoxy, to name just a few. The sensing area can also be configured by placing a flex circuit along a corresponding surface in any of the abovementioned locations. A conductive pad may be electrically extended to a PCB of the embodiment via, e.g., flex-circuit connectors, conductive elastomers, metallic spring clips, or a bus bar-type connection (e.g., a bar known as "board stiffener" that forms a bus surface perpendicular to the PCB). In the latter case (not shown), a conductive pad of the switch is disposed on a surface of a bus that is located in a bottom portion of the housing or in the upper portion of the housing close to the housing shell and perpendicular to the PCB which, in turn, is substantially parallel to the mirror element of the assembly. As a result, the conductive pad is extended alongside the inner surface of the housing and is capable of sensing the presence of a finger at the side of the mirror element of the assembly.

Figure 51:
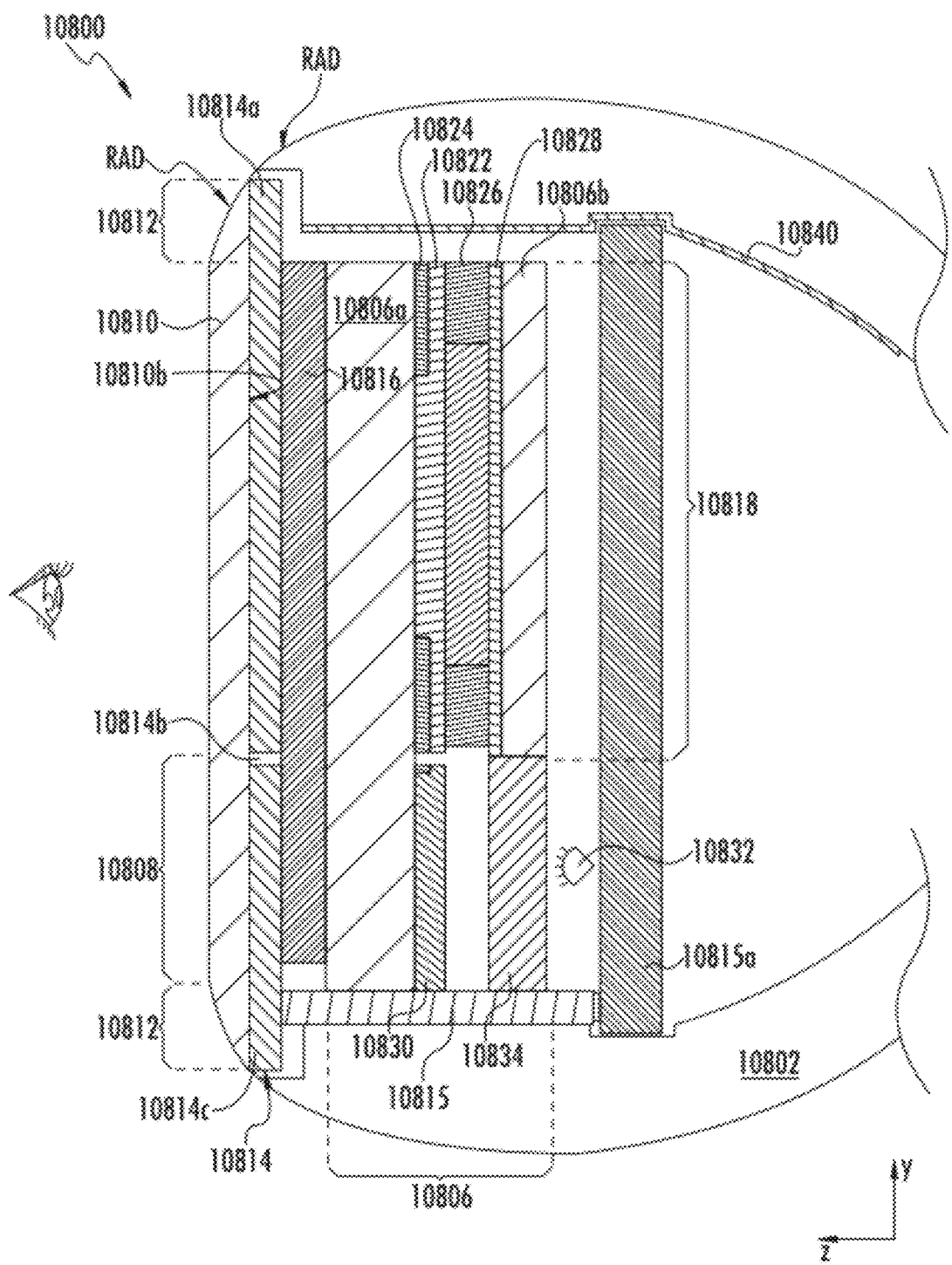
FIG. 51 shows an embodiment including an EC element, a capacitive switch, and a lock-out switch for use in a rearview assembly of the invention.

FIG. 51 schematically shows an embodiment 10800 of a rearview assembly that includes a housing structure 10802 hosting a transflective mirror system utilizing an EC-element 10806 with a cut-out design, where the second substrate 10806b is either notched or sized-down as compared to the first substrate 10806a. The EC-element 10806 defines a strip-like ledge 10808 between the first and second substrates 10806a, 1806b extending along a bottom portion of the EC-element 10806. The EC-element is further layered, at the first substrate 10806a, with an additional thin lite of glass 10810 (referred to herein as veneer) that extends beyond the first substrate 10806a such as to define a circumferential ledge 10812. As shown, a back surface 10810b of the veneer 10810 is overcoated with a transparent electrically-conductive layer 10814 (e.g., a TCO layer) a portion 10814c of which is electrically isolated by a non-conductive trench 10814b from a portion 10814a and is adapted to operate as a conductive pad of the capacitive switch. The capacitive-switch pad 10814c is electrically extended, through a conductor 10815 (such as, e.g. the element 9244 or 9252 of FIGS. 92A, 92B) to a PCB 10815a containing corresponding capacitive-switch electronic circuitry. An edge surface of the veneer 10810 is rounded off circumferentially, around the perimeter of the veneer with a radius Rad of no less than 2.5 mm. A front edge of the housing structure 10802 defines an aperture encircling the EC-element 10806 and is preferably also Rad-rounded around its perimeter. As shown, the veneer 18010 is adhered to the first substrate 10806a with an optically-transparent adhesive layer 10816.

Referring further to FIG. 51, the EC-element 10806 is configured in the above-mentioned fashion and includes an EC-cell 10818 containing, as described elsewhere in this application, a transparent electrically-conductive layer 10822 and a peripheral ring portion 10824 on the substrate 10806a, the seal 10826, and the transflective thin-film stack 10828 on the second substrate 10806b. A transparent electrically-conductive portion 10830 (that is isolated from the layer 10822 and disposed on the ledge 10808) is optional. The electrical isolation between the layers 10830 and 10822 assures that the electromagnetic coupling between the EC-cell of the embodiment and the capacitive switch is minimized The backlighting source 10832 is disposed anywhere behind the EC-element 10806 (as shown, in front of the PCB 10815a) and is configured to illuminate, through corresponding optical channels and/or light-guiding components (not shown) the indicia layer 10834 that is placed on a supporting surface (not shown) provided by a housing component of the assembly. A conductive layer 10840, which is carried on the inner surface of the housing structure 10802 and extends transversely to the layers 10814c, 10822, 10824, 10830 and the first surface of the EC cell 10818, is adapted to define a conductive pad of the lock-out sensor. The layer 10840 is operably communicated via known electrically-conductive means such as, for example, a flex cable, wire, electrically-conductive adhesive, electrically conductive clip, electrically-conductive thin-film member (coating or foil or mesh), or a spring member (not shown) with a responsive portion of the electronic "lock-out" circuitry such as to define a lock-out capacitive switch. While the layer 10840 is shown in FIG. 51 to be a liner to an upper portion of the housing structure 10802, it is understood that generally the layer 10840 may be disposed on an inner bottom surface or an inner side surface of the housing structure 10802. Optionally, a layer that is functionally equivalent to the layer 10840 can be disposed on an outer surface of the housing structure 10802 or, in a related embodiment, on an auxiliary PCB portion (not shown) that is electrically communicated with the PCB 10815a and is affixed transversely to it and to the conductive pad 10814c. (This structure is sometimes referred to as "board stiffener"). It is appreciated that, in general, any specific embodiment of the rearview assembly of the invention can be configured to contain a conductive pad of the capacitive switch and a conductive pad of the lock-out switch that are disposed transversely with respect to one another.

In one embodiment, a "lock-out" switch may be configured to include sensing pad(s) that are hidden from view and added in proximity to the sensing pads corresponding to functional capacitive switches (for example by the sides, and optionally between and above or below the sensing pads corresponding to functional capacitive switches at the front) of the assembly. When a user intends to activate a particular function or device of the assembly and extends his finger to a portion of the first surface correspondingly identified by indicia area or virtual button, the "hidden" areas are configured not to perceive the presence of the small area of the finger as they are sufficiently distanced from the sensing pad of the functional switch. In contradistinction, however, when the user grabs the assembly from the front to tilt it, the area of the palm of his hand covers both a functional switch and a "lock-out" switch, the latter causing corresponding electronic circuitry to temporarily mute functional switches of the assembly. FIGS. 52(A, B) schematically illustrate such "hidden" positioning of the conductive pad(s) 10902, 10902' of a lock-out sensor with respect to conductive pad(s) 10906, 10906' of capacitive switch(es).

In another embodiment where a sensing area of a functional capacitive switch is disposed on surface I of the EC-mirror element, a transparent conductor such as a TCO (for example, ITO) is applied to surface I of the mirror and is configured as a capacitive sensor input. Although the static offset signal of the capacitive switch may be significant due to the presence of the TCO layer (which is an effective ground) on the second surface (surface II) of the EC-element, the signal produced between a large-area hand of the user and the first surface capacitive pad is nevertheless measurable in comparison with the static offset and, therefore, detectable. As the cap touch circuit is tolerant of high resistance connections, higher resistance coatings may be used as a lower cost solution.

An alternative embodiment of a lock-out switch may be advantageously beneficial for the situation where more than one of functional capacitive switches is triggered simultaneously. Specifically, the PCB-circuitry may be configured to lock out all of the functional switches in response to received data representing switch activation from more than one of standard inputs (switch pads). FIG. 52C illustrates this concept, showing electrically isolated from one another capacitive pads 10910 operably connected to the circuitry that is responsive to a multiple-pad input. FIG. 52D illustrates a disposition of the capacitive pad 10914 of a lock-out switch in a bottom portion of the peripheral portion of the carrier (such as the portion 9230c of FIG. 32A, not shown here.)

In general, an electrically-conductive coating appropriately positioned anywhere on or in proximity with a mirror element of the assembly can be configured to operate as a pad of the capacitive lock-out switch, as long as this coating is electrically isolated from electrodes of the EC-element and does not interfere with the performance of the EC-element.

It is appreciated that coordination of operation of any functional switch (such as a capacitive switch activating an information display of a rearview mirror, for example) and that of a lock-out switch should preferably be time-coordinated to assure that no false trigger occurs. In one embodiment, for example, the controlling electronic circuitry of the assembly is adapted to delay the activation of a function or device triggered by a particular functional switch by time-delay of, for example, 100 msec (or any other time chosen depending on configuration of electronic circuitry involved). In addition, the system is configured not to activate the function/device (i.e., to nullify the triggering signal) if the controlling circuitry receives an activation signal from a lock-out switch during this time-delay. Having activation of a device delayed is typically achieved by shortening of the pulse sent to the telematics control unit by the amount of the lockout gating period. The length of the output pulse, therefore, does not represent the intended duration of the user's interaction with the functional switch (i.e., it does not represent the duration of the user input). To correct for this, the activation pulse sent to the control unit can be stretched by the amount of time by which the pulse has been delayed. To keep the feedback to the operator consistent, such "stretching" of the activation pulse may be also used in operating any indicator employed in the system.

The switch-lockout methods may also be improved by sensing that pressure has been applied to the glass surface by a finger of the user, for example. As previously mentioned, load cells may be used to detect pressure on the surface of the glass. An operational requirement may therefore be placed that any activation be validated by a reasonable amount of pressure in the button area of the glass. Because the glass is typically attached to the assembly with foam tape, a small amount of compliance (or spring-like response to pressure) is present in the design. Pressing any of the button regions of the glass will cause a small compression of the foam. This compression may be detected by a number of means, including load cells, optical sensors, magnetic sensors, resistive sensors, capacitive sensors, or tactile switches may also be used. A small compliance may also be designed in using various forms of hinges and compliant materials. Detecting that pressure has been applied can be implemented by using a capacitive touch circuit, with a sensor pad detecting the proximity of the element coatings that are at or near ground potential. Alternatively, a conductive coating may be applied to the back of the element to give a stronger signal. The sensor pad may be located on the PCB, or remotely place on a surface closer to the element, such as the board holder. Conductive foam may also be used to detect pressure. The momentary compression of the foam will cause a momentary change in resistance of the foam, which can be used as a validation signal for the capacitive touch circuit.

In yet another implementation, an optical detection-based lock-out switch can be implemented, which would be configured as discussed above in reference to, e.g., FIGS. 14 and 15. IR wavelengths for operation of such an optical lock-out switch can be judiciously selected to minimize interference with any functional light sensor contemporaneously used in the assembly. If desired, the optical lock-out switch can operate at a wavelength detectable by the glare sensor of the assembly. In this case, the difference (delta value) in readout data respectively corresponding to readings with the IR-source "on" and "off" is calculated, with averaging multiple delta values. Here, the high level of delta values will be indicative of the attempt to grab the mirror assembly. In addition or alternatively, multiple IR-sources can be employed on either left or right side of the mirror element to improve detection capability of the embodiment. As the IR sources may interfere with the accurate measurement of glare and ambient levels of light used by the EC circuitry, the IR sources may be pulsed and time-interleaved with the EC-light-level readings.

Electrical Connectors and Contacts.

Existing designs and processes for configuring electrical connections of a rearview assembly involve soldering of various components to both sides of a given substrate such as a PCB with appropriate electronic circuitry and, alternatively or in addition, the use of multiple clip-like-shaped connectors the positions of which should precisely match the designated locations on corresponding opto-electronic components within the assembly. The need in formation of the electrical contacts on both sides of a given PCB increases the cost of the final assembly. Indeed, flipping the PCB after the contacts have been formatted on one of its sides and running the process again to establish the contact on the other side effectively doubles the time processing time. At the same time, the quality of soldering process has to be controlled and/or verified to assure that created electrical impedance remains within the design range. Moreover, once soldered, a given electrical contact remains non-removable, for practical purposes, and if a positioning or soldering mistake has been made, results in a loss of a circuitry component. Furthermore, manual solder and assembly processes add labor cost and potentially create field-reliability problems. In addition, mechanical integration of various components in a housing structure of a rearview assembly usually implies that employed electrical contacts should be able to accommodate various ranges of mechanical tolerances without losing their functionality. For example, as the separation gap between the back of the EC element and the PCB with auto-dimming circuitry may vary within the prescribed range, a connector configured to provide electrical communication between the former and the latter not only should be operational as a "variable spatial range" connector but also be able to withstand different mechanical force, applied to it when the EC-element and PCB are pressed against one another, without losing its elasticity. Typically, at a high-end of force range the existing connectors may mechanically interfere with a mirror element and cause image distortions, while at a low-end of force they do not guarantee a stable electrical junction. This problem is particularly exacerbated in an embodiment where a mirror element of the rearview assembly is housed in a housing/casing structure that is devoid a portion extending over the first surface of the mirror element. In this case, controlling the pressure applied by various sources (such as electrical contacts connecting the electronic circuitry at the back of the assembly to various components of the mirror element) to the means for affixing the mirror element to a supporting element (such as an adhesive or a adhesive-treated foam tape commonly used for attachment of the carrier to the back of the mirror element, for example) becomes a non-trivial task, as the pressure-creating elements must be configured to exert a pressure within the limits not exceeding those at which the means for affixing the mirror element fails and/or those at which the performance of the mirror element itself is compromised. In particular, conventionally used plastics and adhesive means typically have an upper limit of force that these means can withstand, on a long time scale, without disassembling/detaching/deforming (corresponding to the so called "thermoplastic cold flow"). A typical EC-element-based mirror element also has an upper limit of applied pressure at which the mirror element breaks. Specific embodiments of the invention offer solutions to the above-mentioned concerns by providing electrically-conductive structures configured to establish an electrical communication between the opposite surfaces of the PCB, and the installation of which does not require any soldering and lands itself to a fully automated process. As a result, proposed embodiments facilitate a one-step positioning process that populates both sides of the PCB with electrical contacts thereby drastically reducing the overall cost of the assembly. Connectors used in present embodiments are characterized by a spring-compression curve that allows an operation within a wide range of mechanical displacement without creating an excessive compression force. It is noted that these embodiments can be used to establish electrical communication between the electronic circuitry and the EC-cell of the EC-element of the invention as well as between the electronic circuitry and a conductive pad of the embodiments of the capacitive switch.

FIGS. 54(A-D) illustrate examples of connectors for use in embodiments of the invention. For example, as shown in FIG. 54A, a compressible pre-sized conductive polymeric "zebra-strip" connector can be used to pair electrical contacts 11104a, 11104b, 11104c consolidated into a localized area with corresponding contact pads 11108a, 11108b, 11108c and, through the contact pads, electrically bridge each of the regions 11104a, 11104b, 11104c with corresponding electrical contacts on a PCB 11110 (compare, e.g., with elements 9240, 9252, 9246, and 9248 of the embodiment 9250 of FIG. 33B, for example). In implementing the embodiment of FIG. 54A, we tested a zebra-strip Fujipoly 6127 (FujiPoly America, Carteret, N.J.). Alternatively, a conductive polymeric cord (such as that used for EMI gasketing applications) can be used in place of the connector 9252. A conductive polymer cord for use in an electrical drive circuit may include, e.g., silver; another metal overcoated with silver, non-conductive fillers like glass overcoated with silver, aluminum, nickel, copper, gold, or palladium. Conductive polymers so constructed generally have a lower initial contact resistance, as well as a lower increase in resistance after performance testing. A conductive polymer cord for use in an embodiment of a capacitive switch may include various conductive fillers as mentioned above as well as less conductive fillers such as carbon graphite. In commerce, conductive polymeric cords are offered, e.g., by Laird Technologies (Chesterfield, Mo.), Majr Products (Saegertown, Pa.), or Parker Chomerics (Woburn, Mass.).

Figure 54C:
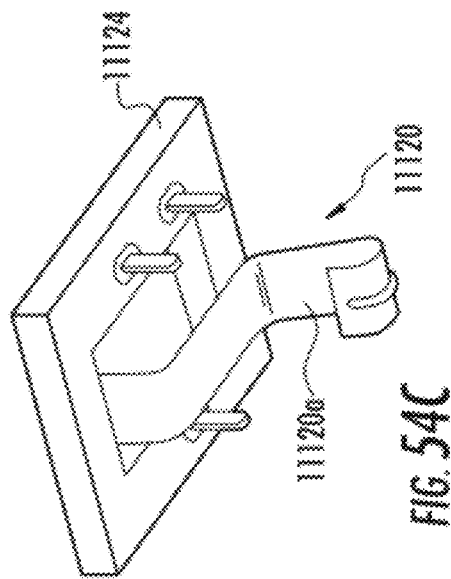
FIGS. 54(A-D) depict embodiments of electrical connectors for use with EC-elements and capacitive switches of embodiments of the invention.
Figure 54B:
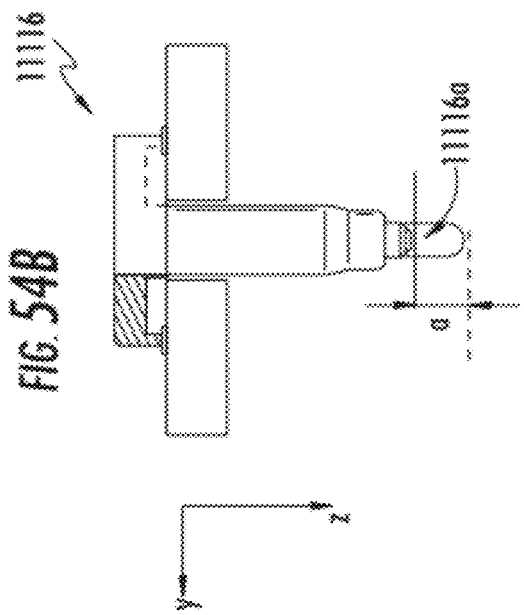
Figure 54A:
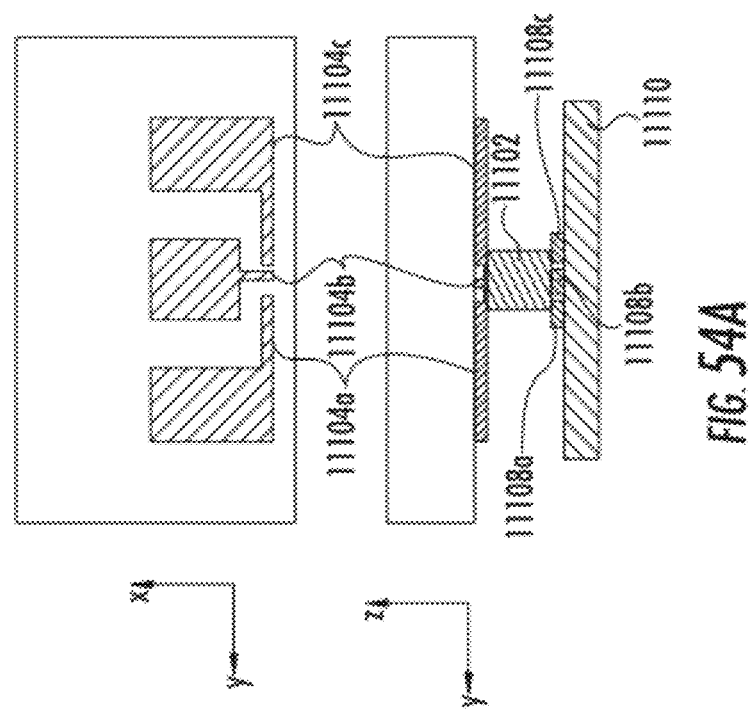
Figure 54D:
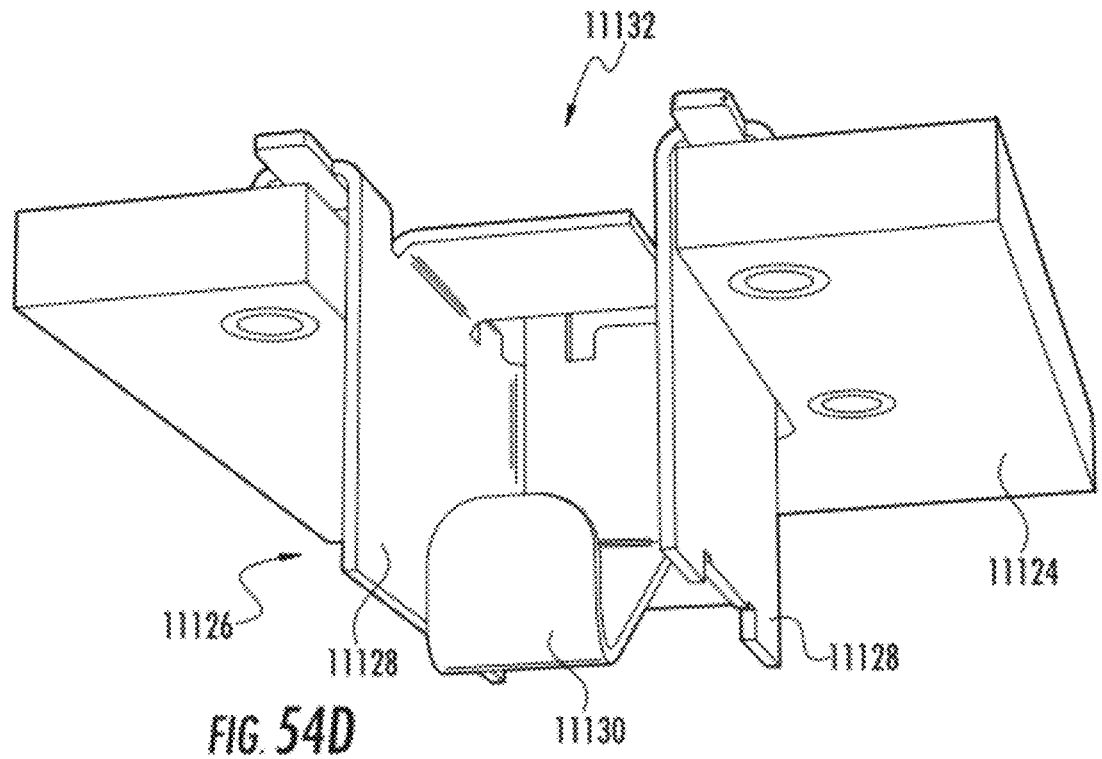

In another embodiment such as the embodiment 9200 of FIG. 33A, a pogo-stick 11116 of FIG. 54B which is internally loaded with a spring (not shown) elastically adjusting the position of a head 11116a of the stick to any point within a predetermined range a, can be used to implement the connector 9238. In another embodiment, a one-sided interconnect such as an Iriso clip 11120 of FIG. 54C can be pre-attached/soldered/welded) to provide electrical communication between the PCB 11124 and a given conductive pad (e.g., configured as the connector 9252 between the PCB 9410 and the conductive pad 9240 in the embodiment 9400 of FIG. 37A). It is appreciated, that the protruding tongue 11120a of the clip 11120 can be broken off from the PCB during handling. It may be advantageous, therefore, to employ instead a one-sided interconnect 11126 of the type shown in FIG. 54D that has side walls 11128 protecting a compliant pin 11130 from the mechanical impact. Attachment of such interconnect to the board 11124 may be carried out from the top side through a hole 11132 in the PCB 11124 to simplify and lower the cost of manufacture.

As discussed in reference to FIG. 33B, 37A, 39A, the electrical connector 9252 can include a conductive polymer that is either co-molded into shape during PCB holder manufacturing process or is pre-molded (by, e.g., extrusion into a cylinder) and inserted, as a separate element, into a passage through the PCB.

Another embodiment may employ a two-sided interconnect described in reference to FIGS. 55(A-E) and mentioned as element 9342 of FIG. 35C. Here, the embodiment 12000 of the interconnect takes a form of a slender two-sided clip having, on each side, a slender spring leaves 12004a, 12004b that preferably have rectangular cross-section and may be arced. Each of the leaves 12004a, 12004b has a width that varies from its upper value at the foundation 12008a, 12008b of the leaf to its lower value at the top 12012a, 12012b of the leaf. In one embodiment, the width of the leaf 12004a, 12004b varies linearly with distance. Each of the leaves 12004a, 12004b is attached, at a corresponding foundation 12008a, 12008b, directly to a preferably symmetrical clip-like frame 12016 having, as shown, retention snaps 12020a, 12020b formed at corresponding frame lands 12024a, 12024b. The retention snaps 12020a, 12020b are tilted inward with respect to the frame 12016. At the top 12012a, 12012b, each leaf 12004a, 12004b terminates with a corresponding contact portion. In one embodiment, the contact portions of the interconnect 12000 may include spoon end 12028a, 12028b. In a specific embodiment, the spoon ends may have corresponding concave surfaces that face the inside of the embodiment 12000. Transitions 12032a, 12032b between the contact portions 12028a, 12028b and the corresponding leaves 12004a, 12004b are appropriately curved such as to make tips 12036*a*, 12036*b* of the contact portions 12028*a*, 12028*b* protrude outwardly with respect to the corresponding leaves.

Figure 55A:
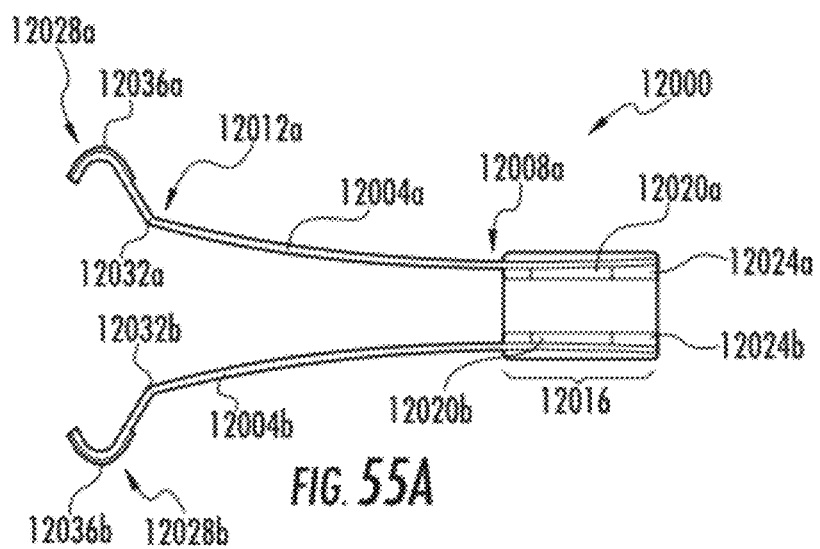
FIGS. 55(A-E) illustrate a double-sided connector and its use in an embodiment of the invention.
Figure 55E:
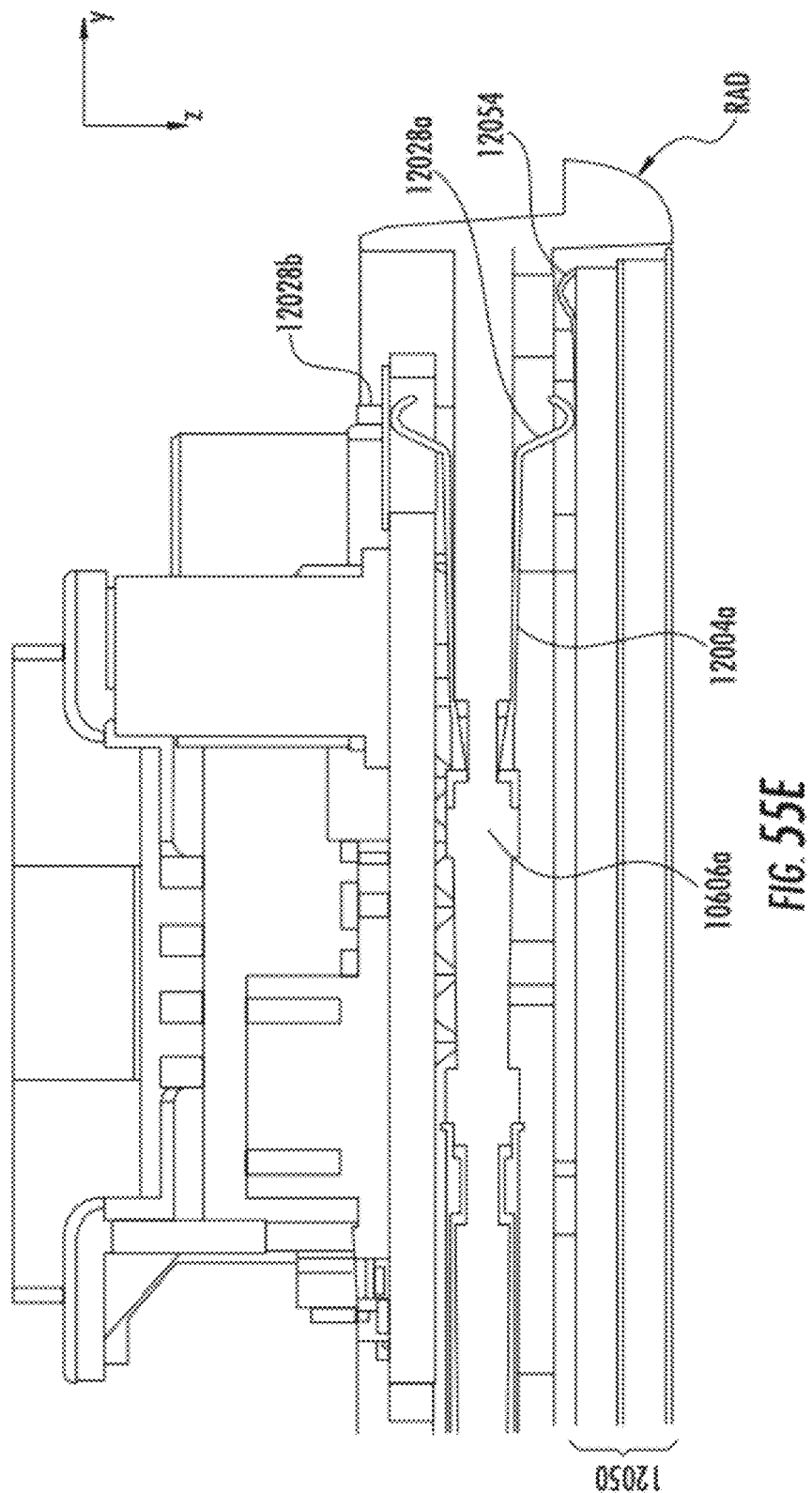

The embodiment 12000 may be constructed from a single metallic sheet with a formation process and have either symmetrical or asymmetrical structure. The asymmetrical structure may be advantageous in situations where the contact between a spoon end with the PCB on one side of the carrier is located in-board with respect to a contact on the other side of the carrier, between another spoon end and the EC-element's connector. In operation, the two-sided interconnector provides electrical communications between the elements located on opposite sides of the PCB drive circuitry. FIGS. 55(D, E) illustrate the mating between the extended portion 10606*a* of the carrier such as the carrier 10606 of FIG. 49 and the embodiment 12000. As shown, the interconnect 12000 is preferably automatically lowered through an opening 12040 in the extended portion 10606*a* of the carrier 10606 and then translated laterally towards the land 12044 until the paired inner surfaces of the frame 12016 are in grasp with the land 12044. The retention snaps 12020*a*, 12020*b* further facilitate a firm affixation of the interconnect 12000 to the extended portion 10606*a*. During the assembly process, when an EC-element 12050 is being affixed to the carrier 10606, the top spoon end 12028*a* is brought a solderless interfacial contact with an electrical extension 12054, thereby connecting an electrode (not shown) of the EC-element 12050 with the leaf 12004*a* and, through the body of the interconnect 12000, to the PCB and various electrical components on the back side of the carrier 10606. An interfacial contact to the EC-element 12050 can be adapted through a bus bar, J-clip, or other conductive surface (e.g., conductive polymer dispensed or traced onto a revealed surface; vapor deposition metal placed on glass). The interfacial contact with/to drive board can be formed with a metallic component placed onto the 'backside' of the PCB (e.g., electroless nickel immersion gold surface plating), which backside facing the back of the assembly. The interfacial contact between the contact portion 12028*b* and the front side of the PCB (the side of the PCB that faces the front of the assembly) can also be made by either orienting the front side of the board to the contact and the incorporation of any metallic pad on this front side or, alternatively, by cutting/routing a hole into the PCB and soldering a metallic pad around at least a portion of the hole. A second interconnect, shown as 12064 in FIG. 55D, is configured to establish electrical communication between the conductive pad of a capacitive switch of the UI of the invention, thereby operating in place of, e.g., the electrical pin 9244 of FIG. 33A or the connector 9252 of FIG. 33B.

Generally, the leaf 12004*a*, 12004*b* and the contact portion 12028*a*, 12028*b* of the interconnect 12000 are judiciously shaped such as to ensure an interconnect deflection within a pre-determined limit that is defined by a typical assembly process. It is preferred that an embodiment of the interconnect is configured to ensure that contact force that such embodiment exerts on a portion of the assembly with which it is in electrical and mechanical connection is minimized, and, at the same time, to ensure that the established electrical connection is stable over the entire deflection range experience by the embodiment in use. The amount of force or stress induced by the deflection of the interconnect during assembly and use should not exceed the yield or tensile strength of the material used to fabricate the interconnect. This limitations facilitates the use when the maximum movement or deflection of the interconnect is smaller than that which would otherwise cause the interconnect material to yield or plastically deform. Otherwise, exceeding the yield or tensile strength of the interconnect material would result in a reduced contact force induced by the interconnect. If the stress exceeds the yield strength and subsequent deflections cause a return to a lower stress state, the resulting contact pressure will be lower than in the non-permanently deformed case. It is appreciated that, generally, given the material of choice for the interconnect, the interconnect structure can be varied to affect its yield point. Yield point, yield strength, and tensile strength are properties derived using stress-strain curve relationships. Yield strength characteristics for several materials are listed in Table 3A (standard Be-alloys, for example from Materion, Mayfield Heights, Ohio; remaining materials: standard, for example from Olin Brass, East Alton, Ill.)

TABLE 3A

| Material | Temper | Yield Strength (KSI) |
|---|---|---|
| BeCu 25 (C17200) | ½H | 75-95 |
| BeCu 190 (C17200) | TM02 | 95-125 |
| BeCu 290 (C17200) | TM02 | 95-115 |
| BeCu 174 (C17410) | ½HT | 80-100 |
| Phos Bronze 510 (B103) | TM02 | 57 |
| CuNiSi 7025 (B422) | TM02 | 85-110 |
| Copper 102 (B152) | TM02 | 37 |
| Brass 230 (B36) | TM02 | 48 |

KSI = 1000 PSI; N/mm$^2$ = KSI × 6.895

Generally, the upper limit of a contact force that a spring-type contact applies at the point of contact with the board, a portion of the EC-element, or a capacitive switch portion of the assembly is defined by performance and response to such contact force of other components within the assembly, for example, by plastic flow of carrier elements 10606, 10606*a*; by the amount of optical distortion exerted by a spring contact onto the EC element 12050. It is appreciated that such contact force should be limited in order not cause the spring connector of FIGS. 54(B-D) or that of the embodiment 12000 to perform outside its elastic range. Another factors defining the connector design are the strength of the solder use with the connector as well as the strength of adhesive material or other attachment means use to affix the EC element to the carrier 10606. Embodiments of electrical connectors used herein for either the electrical drive circuit of the EC device or the capacitive switch application, should preferably exert maximum contact force of 5N, and more preferably 2N. At the same time, an embodiment of the rearview assembly is configured to assure that, regardless of the number and type of the electrical connectors used, the overall outwardly-directed force exerted, aggregately, by all electrical connectors (and that tends to push outwardly the mirror element from the aperture of the housing towards the FOV at the front of the assembly) does not exceed that corresponding to pressure of about 150 grams per square inch (or about 1.5 N per square inch) in relation to the overall are of the mirror element. For example, electrical connectors of an assembly with a mirror element having a 40 square-inch surface should be configured not to exert, aggregately, the contact force in excess of about 60 N. A mirror element with a 20 square-inch face should not be subjected to about 30 N of contact force applied by the electrical connectors. So configured assembly assures that the operation of the adhesive layer affixing the mirror element to the carrier is maintained. Other limiting factors determining the limit of contact force include the force the application of which fractures the mirror element and forces that deform the housing element or other components within the assembly. These mirror-fracturing and element-deforming forces generally vary based on the construction of the assembly as well as on the location of pressure points relative to the assembly components. Contact force applied to the mirror element directly can also induce distortion in imaging due to deformation of the mirror surface caused by the contact force.

On the other hand, the lower limit of the contact force relates to how stable and reliable is the physical contact between the connector and a responding part at the contact point. Generally, an accepted minimum contact force for tin-to-tin contacts is greater than 100 g (approximately 1 N), while that for silver-to-silver contacts is greater than 50 g (approximately 0.5N), and that for gold-to-gold contacts is greater than 25 g (approximately 0.25 N).

In a specific embodiment, the leaf and the spoon end were fabricated to assure the deflection on the order of 1.1 mm per side, as compared to the rest position, while exerting a mechanical stress that is linearly varied with the amount of deflection. Contacts shown in FIGS. 54(B-D) are also implemented for same 1.1 mm deflection range, with a maximum force of less than 2 N at 1.1 mm of displacement. This deflection range generally depends on and can be varied as required by the specifics of designs of the PCB, the EC-element, and the interface between these components. In a specific embodiment, based on the spring rate of 0.72 N/m, the contact force applied to the embodiment 12000 during the assembly process does not exceed 2.0 N, and the rate of linearly-varying mechanical stress of the embodiment does not exceed approximately 230 MPa/mm.

For an interconnect used in the EC-drive circuit, a value of electrical resistance for a contact assuring optimal functionality is less than 10 Ohms, preferably less than 1 Ohm, and even more preferably less than 0.050 Ohms. A contact resistance value characterizing the electrical contact between a connector and a capacitive switch is preferably less than 5000 Ohms, more preferably 4000 Ohms, even more preferably 500 Ohms. These resistance values allow for the design and verification of any interconnect system that is chosen for either an electrochromic drive circuit interconnect or a capacitive switch interconnect.

Figure 57:
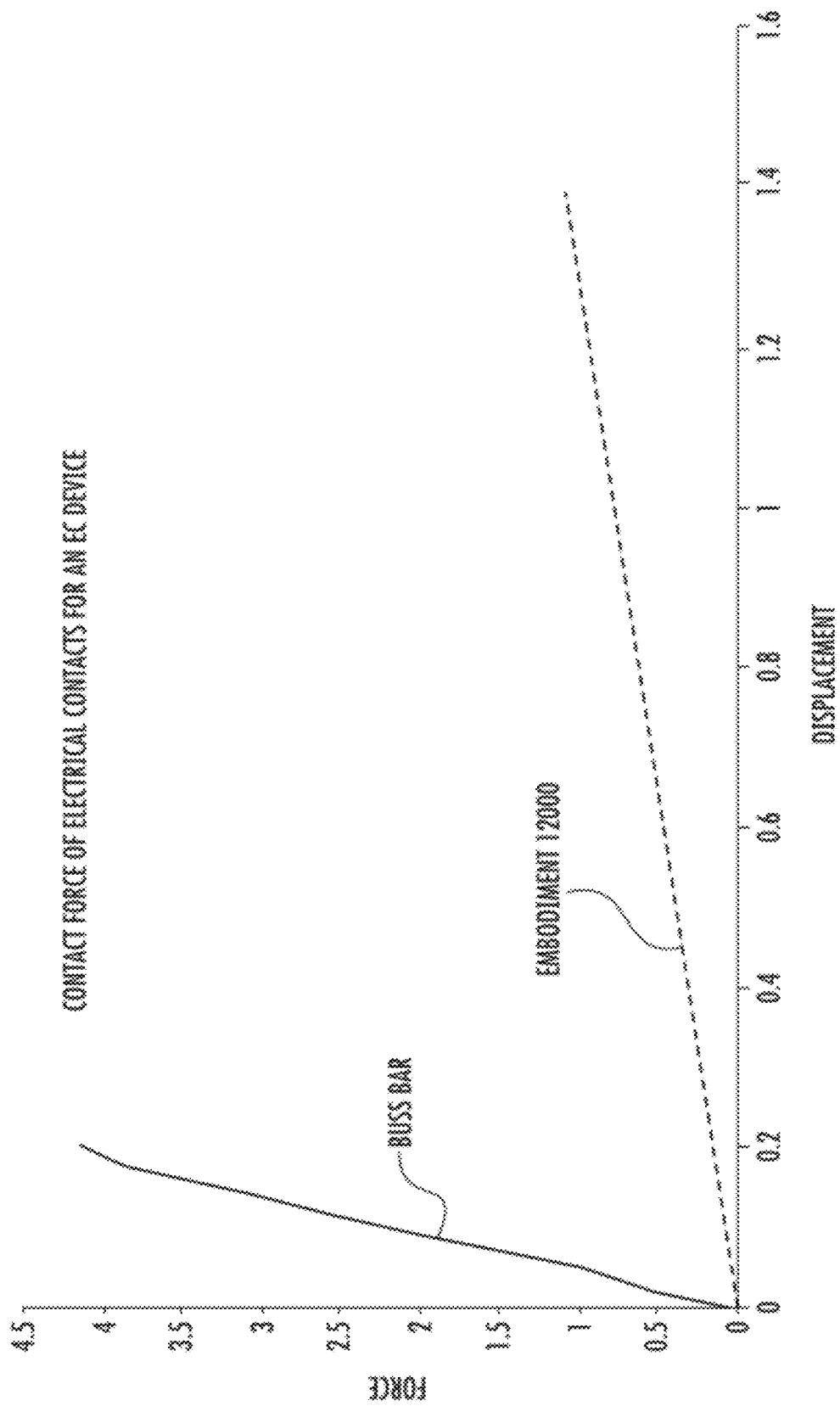
FIG. 57 is a contact force vs. displacement plot for the embodiment of FIGS. 112(A-C).

The greater the difference between the minimum and maximum contact force values characterizing a stable mechanical contact between the electrical connector and a responsive element (such as an electrical pad with which this connector is in mechanical and electrical contact), the more latitude is available for connector design (e.g., features of springs, choice of metal, tempers). The range of motion or displacement provided by a given connector should also be maximized in light of limitations imposed by the minimum and maximum contact force values. The relationship between the force and displacement may be expressed in a force-vs.-displacement plot. The lower is the value of a slopes of such a force-displacement graph, the more design latitude there is for a spring-like connector. The embodiments of connectors used to provide electrical communication in EC-element based device of prior art exhibit large spring rate, modulus, or slope of the force-vs.-displacement characteristic. In contradistinction, the embodiments of FIGS. 54(B-D) and 12000 have a significantly smaller spring rate. FIG. 57 shows the force-displacement relationship for the embodiment 12000 and, for comparison, a an electrical bus-bar conventionally used in an EC device. Although in this example the force range chosen for an electrical interconnect 12000 is between 0.5 N and 2.0 N, a system of FIG. 55E can be designed to operate within a wider range of contact force.

Figure 55F:
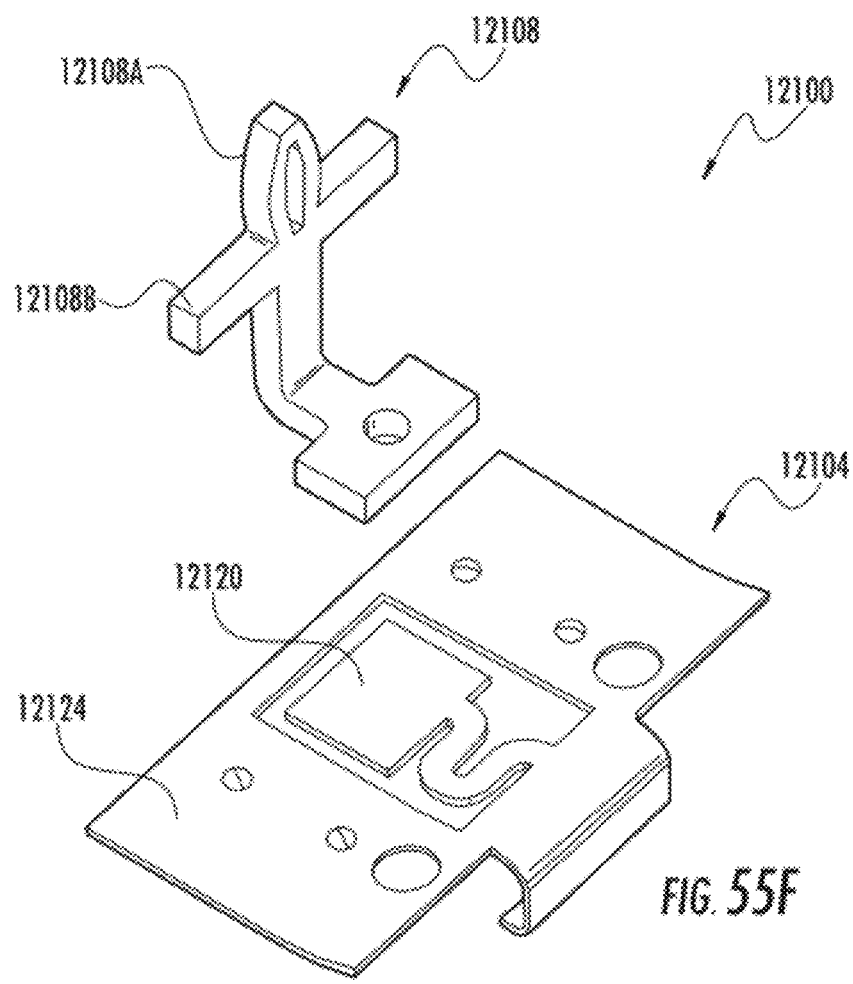
Figure 55G:
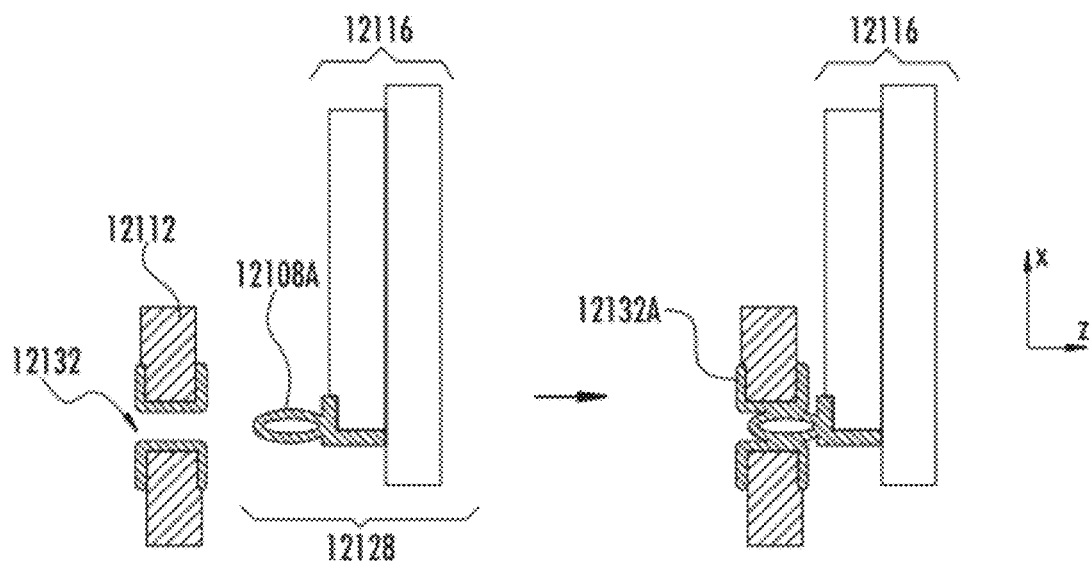

A related embodiment of an interconnect 12100 including, as shown in exploded view of FIG. 55F and a schematic side-views of FIG. 55G, a J-clip sub-portion 12104 and a pin or spade sub-portion 12108, is configured to ensure the electrical communication between the electrical circuitry associated with a PCB 12112 and an electrically-conductive portion (such as, for example, an electrode of the EC-cell, not shown) of the EC-element 12116 while exerting a substantially zero contact force onto the EC-element 12116. A J-clip sub-portion 12104 is configured to include an area 12120 of strain relief affixed and suspended with respect to the land 12124 of the J-clip sub-portion 12104. The pin or spade sub-portion 12108 having an elongated ring-like pin head 12108A and a collar 12108B may be integrated with the J-clip sub-portion 12104 (for example, by soldering or welding to the strain-relief area 12120) such as to protrude transversely from the land 12124. (It is appreciated that the interconnect 12100 can be configured as a single-piece element, where the pin sub-portion 12108 and the J-clip sub-portion 12104 are portions of the same three-dimensional J-clip configuration formed from a pliable electrically-conductive preform, such as a metallic plate, by stamping, for example). In further reference to FIG. 55G, the interconnect 12100 is appropriately attached, through its J-clip sub-portion 12104, to a substrate of the EC-element 12116 in electrical communication with the electrically-conductive portion of the EC-element 12116. To establish the electrical connection between the subassembly 12118 and the PCB 12112, the former and the latter are further brought into contact (through an opening in a carrier supporting the EC-element, not shown) such as to press the pin head 12108A through an opening 12132 that is appropriately plated with an electrically-conductive material 12132A. The depth at which the pin head 12108A is inserted into the opening 12132 is generally limited by the collar 12108B. The pin-head 12108A is appropriately configured to form mechanical and electrical contact with the electrically-conductive plating 12132A, which is further electrically extended to the electronic circuitry (not shown) of the rear-view assembly, by pushing against the plating 12132A from inside the throughout-opening 12132 and does not create any substantial force pushing outwardly (towards the front of the rearview assembly) against the EC-element 12116. Alternatively, a spring-like structure (not shown) mounted on the PCB 12112 could be configured to push against the pin 12108 to maintain electrical contact and causing substantially no force applied outwardly against the EC-element.

Additional Embodiments of Electrical Connectors and Contacts.

Earlier in this application, the reduction of width of the peripheral ring was discussed. As a result of employing a narrow peripheral ring, however, the use of what is known as a dual-seal (a non-conductive portion and a conductive portion disposed outside or outboard from the non-conductive portion and closer to an edge of the substrate of the EC-cell) may become no longer practical because such a dual seal is too wide and visible, from the front, as the now-narrowed peripheral ring is not wide enough to conceal both non-conductive sealing material and an adjoining conductive material. Accordingly, the electrically-conducting portion of the seal and/or silver epoxy (conventionally used, as a conducting bridge, at the peripheral portion of the EC-cell to facilitate the electrical communication between the electrical circuitry and the EC-cell's electrode) has to be reduced in width or even eliminated in favor of the remaining non-conductive primary sealing material, and the non-conductive primary sealing material has to be disposed, preferably, in close proximity to the edge of an EC-cell's substrate. Generally speaking, the reduction of width of the peripheral ring of the EC-cell based mirror element drives a need in reduction of the dimensions of associated electrical connectors.

The above-mentioned modification of electrically-conductive elements caused by the implementation of the reduced-width peripheral ring, leads, in turn, the reduction of conductivity of electrical bus(es) associated with the EC cell. The conductivity of the electrical bus and the current draw of the device affect the drop in electrical potential measured between the point of the electrical contact and the farthest point of the electrical bus. Such difference of potentials may be referred to herein as "bus potential drop". If the bus potential drop is such that the voltage, measured at a given location away from the contact point of the electrical bus, is below that required for operation of the EC-cell in the steady state (which is, typically, a voltage on the order of 1 V, depending on various factors), the EC-medium at around such location will not darken as required. As a result, the darkening of the EC-medium across the EC-cell may not be uniform, with non-uniformity being easily perceivable by the user. Moreover, speed of darkening of the EC-medium (and, accordingly, the speed of a complementary clearing process of the EC-medium) is also affected.

A discussion of technical problems related to darkening of the EC-medium and some of the related solutions are presented, in detail, in a commonly assigned U.S. Pat. No. 7,688,485, for example, the teachings of which are incorporated herein in their entirety. One of the operational targets related to uniformity of darkening of the EC-medium can be defined in terms of a difference of L* values measured during the darkening excursion in reflected light (of $D_{65}$ standard illuminant) across the EC-cell of the mirror element. Preferably, the maximal difference of L* values measured at any two points across the mirror element does not exceed about 20 units, more preferably is less than about 15 units, even more preferably is less than about 10 units, and most preferably less than about 5 units.

Table 3B offers some operational data for a typically-shaped inside automotive EC mirror of about 20 cm in length and about 5 cm in height, with a bus length of about 13 cm. For uniform darkening of such typical mirror it is desirable to have bus potential drop smaller than about 0.2 V at any point of operation both in transition and at steady-state regime.

TABLE 3B

| State | | Buss Resistance, Ohms | Current Draw, mA | Buss Potential Drop, V |
|---|---|---|---|---|
| Sample #1 | Transition | 3.5 | 85 | 0.22 |
| | Steady-State | 3.5 | 53 | 0.1 |
| Sample #2 | Transition | 0.8 | 105 | 0.07 |
| | Steady-State | 0.8 | 60 | 0.02 |

A) Multi-Fold and Complementary Electrical Elements.

Figure 66A:
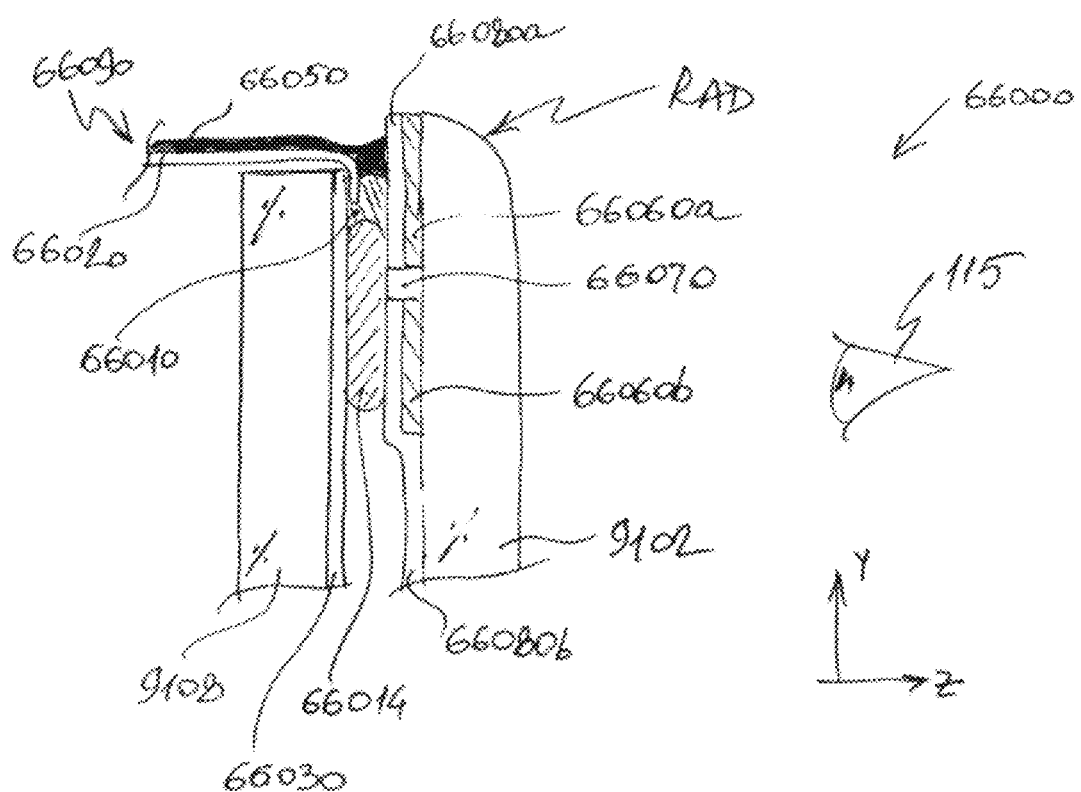
FIGS. 66A, 66B, 66C, 66D are diagrams depicting multifold and/or complementary configurations of an electrical buss according to an embodiment of the invention.

To compensate for the now-absent (or reduced in amount) electrically-conducting silver epoxy/conductive portion of the seal and to boost the conductivity of the bus, an embodiment of the invention includes a multi-layered electrical connector as discussed below in reference to FIGS. 66(A-D). FIG. 66A, for example, shows a simplified diagram of an embodiment 66000 of the EC-cell of the invention, in which the conducting bridge 66010 (such as silver epoxy), that is disposed on the outboard side of the non-conducting seal 66014 and facilitates the electrical contact between an electrically-conducting member 66020 and the reflective electrode 66030 on the third surface 66040 of the EC-cell, is overcoated with an electrically-conductive layer 66050. As discussed elsewhere in this application, the electrically-conducting member 66020 is configured to establish electrical communication between the electrode coating 66030 and the electronic circuitry (not shown) at the back of the assembly and includes at least one of a clip (such as a J-clip, for example) and a thin-film coating that wraps around an edge of the second substrate 9108.

The embodiment 66000 is shown in part, with a peripheral ring containing two portions 66060a, 66060b that are electrically separated from one another by an gap 66070 in the coating covering the second surface. The peripheral ring 66060a, 66060b is shown to be overcoated with transparent electrode layer portions 66080a, 66080b (for example, a TCO layer portions), with which the peripheral coating forms the coating covering the second surface of the embodiment 66000. However, a reversed order of layers in the coating covering the second surface of the embodiment is also within the scope of the invention. In further reference to FIG. 66A, the layer 66050 overcoating the member 66020 is formed, in one implementation, by electroplating the member 66020 after the EC-cell has been already assembled and the substrates 9102, 9108 have been sealed together and supplemented with a small amount of silver epoxy 66010. In such case, a barrier formed by the seal 66014/epoxy 66010 allows for localized electroplating that, optionally, may result in electroplating of a portion of the peripheral ring (as shown, the portion 66080a).

The use of a multilayer electrically-conducting element 66090, formed by the member 66020 and the electroplating layer 66050, effectuates the reduction of the overall resistance of the conductor(s) of the second substrate 9108. In a typical embodiment, for example, the resistance of the conductive elements of the substrate 9108 is about 5 Ohms (for about 250 mm long electrical bus). The electroplating of the member 66020 with such metals as, for example, nickel, copper, tin, silver, gold reduces this resistance to below about 3 Ohms (more preferably, below 2 Ohms, and even more preferably, below about 1 Ohm) and improves the uniformity of darkening and clearing of the EC-device of the invention.

Figure 66B:
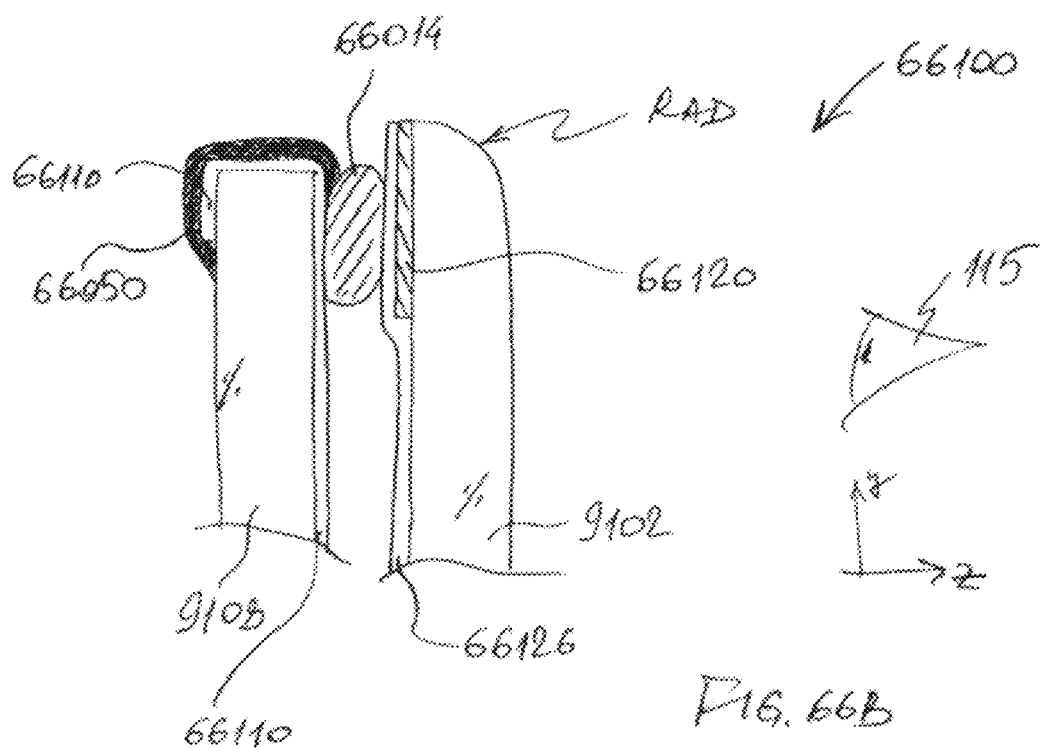

FIG. 66B shows a related embodiment 66100, where an electrically-conductive thin-film layer 66110, of a thin-film reflective stack (not shown) on the third surface of the EC-cell, wraps around the edge of the substrate 9108 to be electrically connected to the circuitry of the assembly (not shown). Here, a metallic layer 66050 electroplated on top of a wrap-around-the-edge portion the layer 66110 and forming, in combination with such wrap-around portion, a multilayer conductive member configured to electrically extend the layer 66110 to the back of the assembly, increases the overall conductivity of the layers associated with the third surface. As illustrated, the embodiment 66100 does not contain a conductive portion of the seal or silver-based epoxy, and includes a single-portion peripheral ring 66120 overcoated with a TCO-based transparent electrode 66126.

Figure 66C:
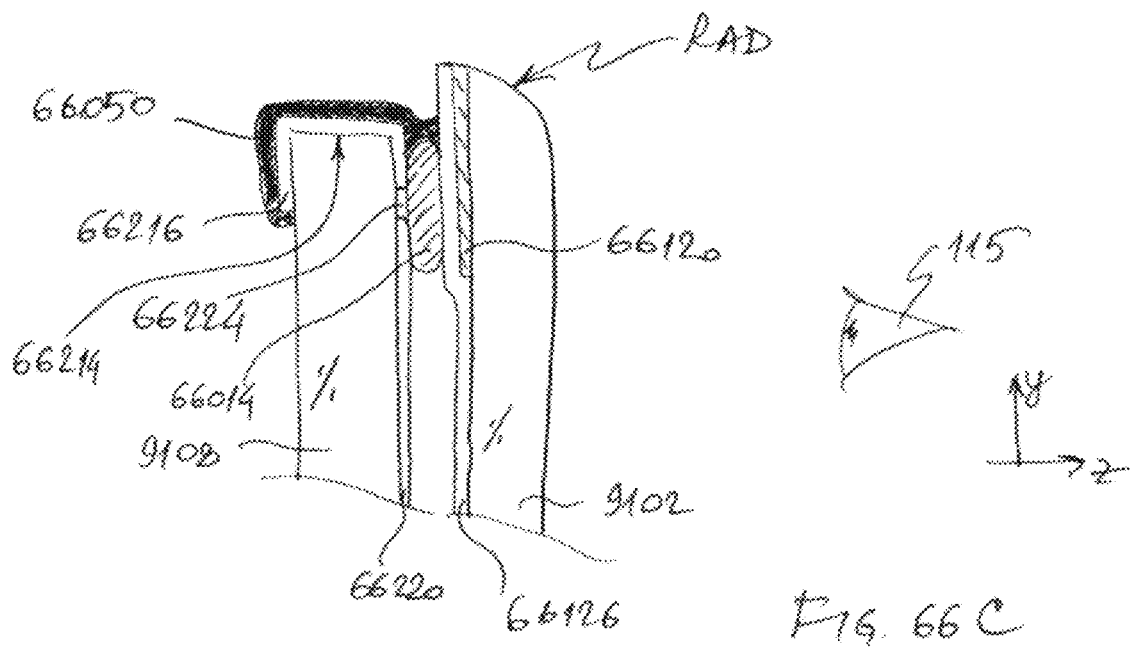
Figure 66D:
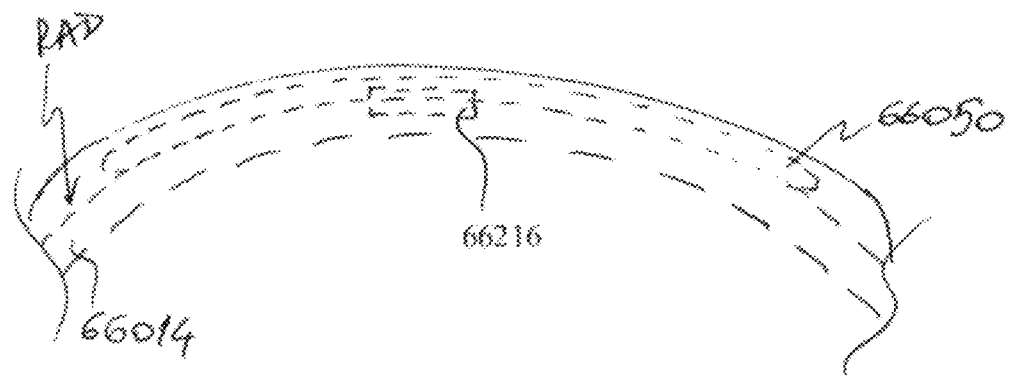

A related embodiment 66200 is shown in FIG. 66C. Similar to the embodiment 66100, the embodiment 66200 may also contain only a non-conductive seal or, alternatively, may contain a small amount of the silver epoxy (not shown) on the outboard portion of the non-conductive seal. An electrical connection between the electrode 66126 of the second surface and the electronic circuitry at the back of the assembly is configured via a (wrapped around an edge 66214 of the second substrate portion) electrically-conductive layer 66216 (such as a thin-film metallic layer) that is electrically separated from the electrode layer of the third surface 66220 with a (optionally laser ablated) gap 66224. The wrapped-around the edge of the second substrate layer 66216 is electroplated with an overlayer 66050 to bridge the non-conductive seal 66220 to form a multilayer connector to the TCO layer 66126. Metal 66050 is plated on the edge of the second substrate in the amount sufficient to reduce the resistance of the bus to a level corresponding to a bus potential drop of less than about 0.3 V over the length of the bus during state-state operation at room temperature.

It is appreciated that the results of electroplating can be effectuated not only via conventional electroplating process, but also with the use of an electroplating pen. In addition, the outer surface of the electroplated metallic overlay or the outer surface of the connecting member such as the members 66020, 66110, 66216 can be optionally anodized or otherwise treated (for example, chemically) as a result of which treatment the color of the outer surface in question is changed. Moreover, in embodiments employing multilayer connectors as described in reference to FIGS. 66(A-C) and similar embodiments, the entire perimeter of the EC-cell may be optionally electroplated. For example, in reference to the metallic material 66050 of FIG. 66A, such material is optionally disposed to not only on the connector 66020 but also to cover the sealing material/silver epoxy 66010/66014 outside the connector 66218 and along the perimeter of the EC-cell 66000. This latter example is schematically shown schematically in FIG. 66D.

Alternatively, the peripheral ring portion of the first substrate can be electroplated prior to the assembly of the EC-cell, with the use of an appropriate masking process. While the embodiments of FIGS. 66(A-D) are shown to contain the second substrate that is smaller than the first substrate, a similar electroplating approach to forming electrical connectors may be used in embodiments employing first and second substrates of substantially equal spatial extent and/or dimensions. Similarly, it is noted that the implementation of a multilayered and, specifically, electroplated electrical connector, of the EC-element of the assembly, with or without the electroplating layer extending beyond the bounds of the electrical connector and along the perimeter of the EC-element (to increase the conductivity of an electrical bus of the EC-element) is optionally used with any embodiment of the EC-based mirror of the assembly disclosed or implied in this application.

A related embodiment employing a cooperation of the EC-cell based mirror element both substrates of which are rounded in a peripheral portion around the perimeter and overcoated with an electrically-conductive layer has been already discussed above in reference to FIGS. 68(A, B).

B) Embodiments Employing Peripheral Ring as an Electrical Contact Element and/or Bus.

Figure 69A:
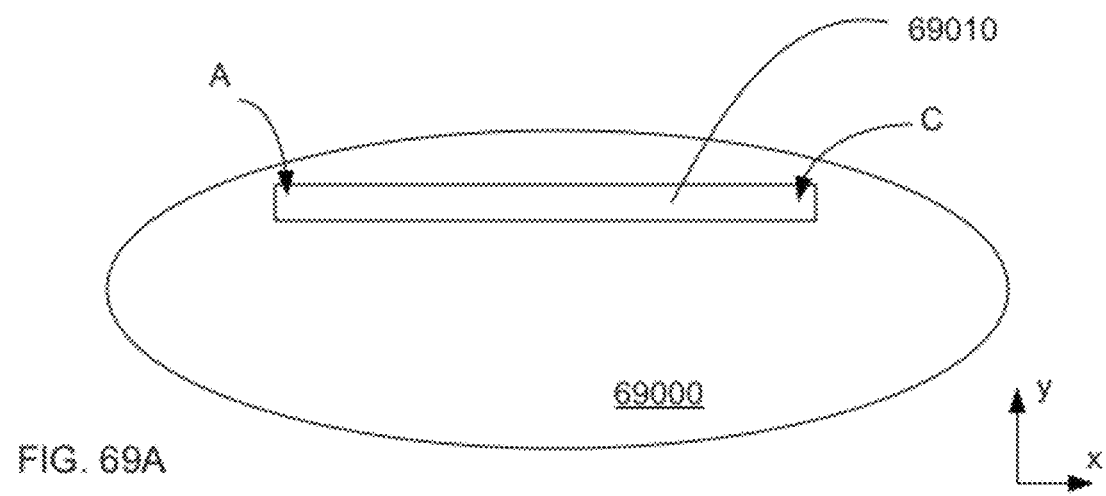
FIGS. 69A, 69B, 69C are diagrams illustrating the use of a peripheral ring of an element of the invention as electrical bus.
Figure 69B:
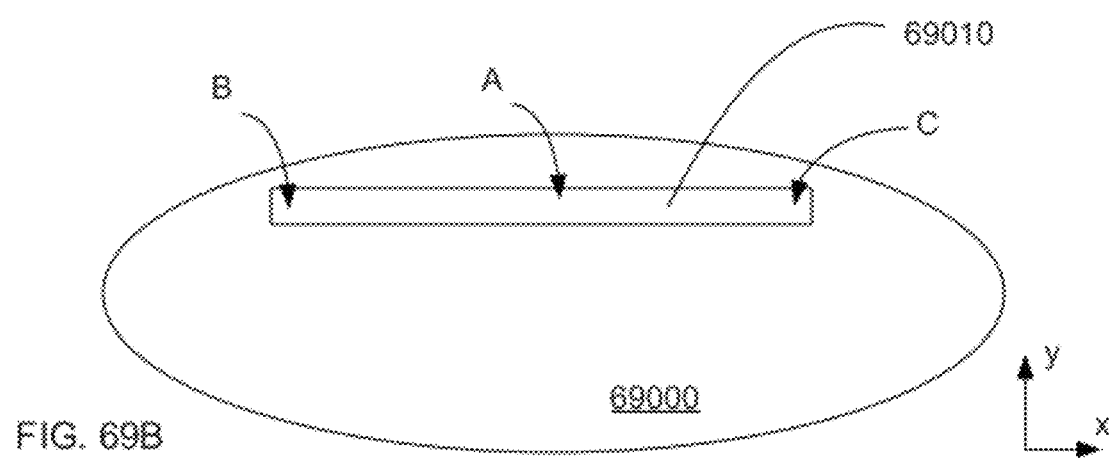
Figure 69C:
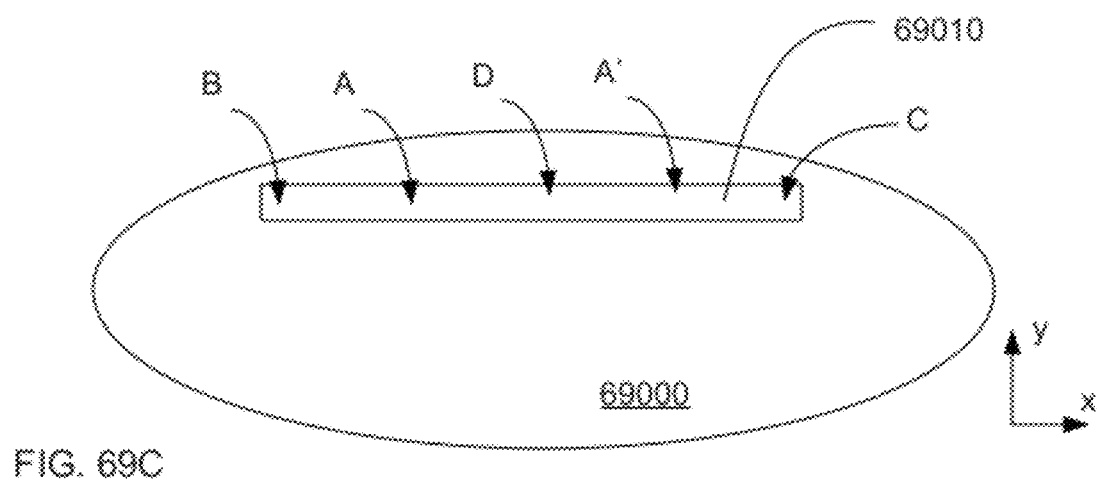

The peripheral ring of an EC-cell based mirror element is present at any point around the perimeter of the EC-cell and, therefore, lends itself to being used as an electrical bus, as long as it provides sufficiently high electrical conductivity. Generally, the resistance R of an electrical bus can be calculated as $R=\rho L/A$, where $\rho$ is the electrical resistivity, L is the length of the bus, and A is its cross-sectional area. In order to achieve target uniformity of darkening (expressed, for example, in terms of difference of $L^*$ values as defined above), the distribution of resistance across the bus as measure in reference to the point of electrical contact to the bus should be optimized. Generally, in reference to a diagram of FIG. 69A depicting a substrate 69000 with the electrical bus 69010 and in comparison with the data of Table 3B, the preferred bus resistance measured at point C (one end of the bus) about 25 cm away from the contact point A at the other end of the bus is less than about 5 Ohms, preferably less than about 2.5 Ohms, and most preferably less than about 1 Ohm. If the contact point A is chosen at about the middle of the bus, as shown in FIG. 69B, then the operationally allowable values of bus resistance at the ends B, C of the bus are approximately twice as high. Furthermore, in reference to FIG. 69C, if two contact points are made to the bus (at points A, A' substantially equidistantly located between the end and central points B, C, D of the bus 69010), then the acceptable operational resistance values measured at points B, C, D are about three times as high as the values stated above. In a similar fashion, the acceptable resistance limits are calculated depending on how many electrical contact points are established with the bus of the EC-element.

Tables 3C, 3D, and 3E offer examples of the bus-resistance characteristics of the peripheral ring employed as a bus. In particular, in Table 3C the resistivity of the peripheral ring is altered while its width is kept constant, and the thickness of the peripheral ring is then varied to achieve different resistance value targets. In comparison, in Table 3D the width of the peripheral ring is reduced in half as compared to that of Table 3C. In Table 3E, the resistivity of the peripheral ring is kept constant but the number of contact points is varied (from a single contact point at the end of the bus, see FIG. 69A, to a dual contact point as at points A, A' of FIG. 69C, to a triple contact point as at points B, D, C of FIG. 69C). A skilled artisan can expand this methodology to determine bus-resistance requirements for any number of contact points along the bus.

TABLE 3C

| R (Ohm) | $\rho$ (Ohm * m) | L (m) | A (m^2) | Ring width (mm) | Ring thickness (um) | R per cm | Contact location |
|---|---|---|---|---|---|---|---|
| 1.0 | 5.00E−08 | 0.25 | 1.25E−08 | 5 | 2.5 | 0.04 | Single Point End |
| 2.5 | 5.00E−08 | 0.25 | 5.00E−09 | 5 | 1.0 | 0.10 | Single Point End |
| 5.0 | 5.00E−08 | 0.25 | 2.50E−09 | 5 | 0.5 | 0.20 | Single Point End |
| 1.0 | 2.00E−07 | 0.25 | 5.00E−08 | 5 | 10.0 | 0.04 | Single Point End |
| 2.5 | 2.00E−07 | 0.25 | 2.00E−08 | 5 | 4.0 | 0.10 | Single Point End |
| 5.0 | 2.00E−07 | 0.25 | 1.00E−08 | 5 | 2.0 | 0.20 | Single Point End |
| 1.0 | 5.00E−07 | 0.25 | 1.25E−07 | 5 | 25.0 | 0.04 | Single Point End |
| 2.5 | 5.00E−07 | 0.25 | 5.00E−08 | 5 | 10.0 | 0.10 | Single Point End |
| 5.0 | 5.00E−07 | 0.25 | 2.50E−08 | 5 | 5.0 | 0.20 | Single Point End |

TABLE 3D

| R (Ohm) | ρ (Ohm * m) | L (m) | A (m^2) | Ring width (mm) | Ring thickness (um) | R per cm | Contact location |
|---|---|---|---|---|---|---|---|
| 1.0 | 5.00E−08 | 0.25 | 1.25E−08 | 2.5 | 5.0 | 0.04 | Single Point End |
| 2.5 | 5.00E−08 | 0.25 | 5.00E−09 | 2.5 | 2.0 | 0.10 | Single Point End |
| 5.0 | 5.00E−08 | 0.25 | 2.50E−09 | 2.5 | 1.0 | 0.20 | Single Point End |
| 1.0 | 2.00E−07 | 0.25 | 5.00E−08 | 2.5 | 20.0 | 0.04 | Single Point End |
| 2.5 | 2.00E−07 | 0.25 | 2.00E−08 | 2.5 | 8.0 | 0.10 | Single Point End |
| 5.0 | 2.00E−07 | 0.25 | 1.00E−08 | 2.5 | 4.0 | 0.20 | Single Point End |
| 1.0 | 5.00E−07 | 0.25 | 1.25E−07 | 2.5 | 50.0 | 0.04 | Single Point End |
| 2.5 | 5.00E−07 | 0.25 | 5.00E−08 | 2.5 | 20.0 | 0.10 | Single Point End |
| 5.0 | 5.00E−07 | 0.25 | 2.50E−08 | 2.5 | 10.0 | 0.20 | Single Point End |

TABLE 3E

| R (Ohm) | ρ (Ohm * m) | L (m) | A (m^2) | Ring width (mm) | Ring thickness (um) | R per cm | Contact location |
|---|---|---|---|---|---|---|---|
| 2.0 | 5.00E−08 | 0.25 | 6.25E−09 | 5 | 1.25 | 0.08 | Single Point Middle |
| 2.5 | 5.00E−08 | 0.25 | 5.00E−09 | 5 | 1.00 | 0.10 | Single Point Middle |
| 5.0 | 5.00E−08 | 0.25 | 2.50E−09 | 5 | 0.50 | 0.20 | Single Point Middle |
| 4.0 | 5.00E−08 | 0.25 | 3.13E−09 | 5 | 0.63 | 0.16 | Double Point |
| 5.0 | 5.00E−08 | 0.25 | 2.50E−09 | 5 | 0.50 | 0.20 | Double Point |
| 10.0 | 5.00E−08 | 0.25 | 1.25E−09 | 5 | 0.25 | 0.40 | Double Point |
| 6.0 | 5.00E−08 | 0.25 | 2.08E−09 | 5 | 0.42 | 0.24 | Triple Point |
| 7.5 | 5.00E−08 | 0.25 | 1.67E−09 | 5 | 0.33 | 0.30 | Triple Point |
| 15.0 | 5.00E−08 | 0.25 | 8.33E−10 | 5 | 0.17 | 0.60 | Triple Point |

Figure 70:
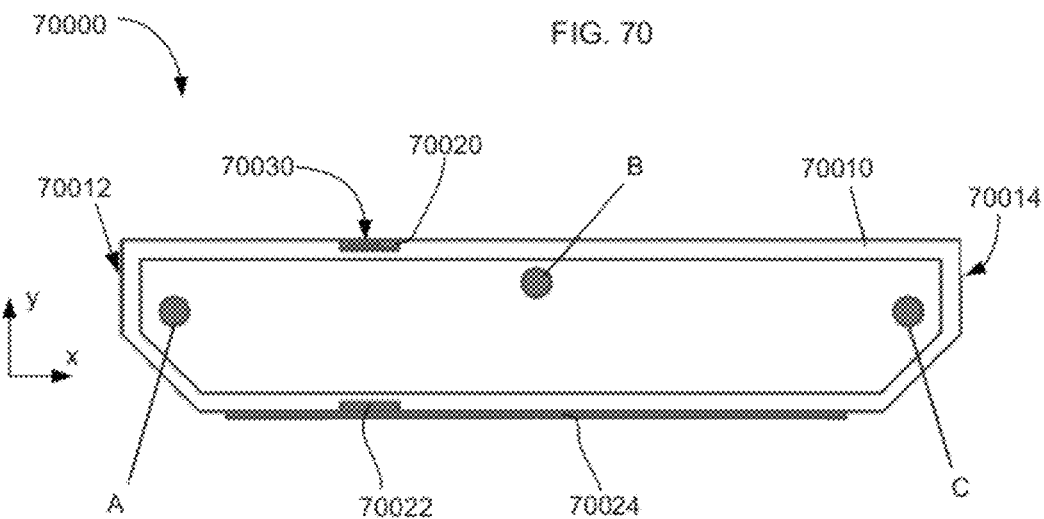
FIG. 70 is a diagram showing the geometry of an EC-cell based mirror element used to empirically quantify variations in reflectance of the mirror element during a darkening transition.

FIG. 70 is a diagram showing, from the front, geometry of an element used to empirically quantify variations in reflectance an EC-cell based mirror element 70000 during a darkening transition. The length of the embodiment 70000, which includes a peripheral ring 70010 of about 5 mm in width on surface II, was about 21.5 cm between edges 70012, 70014. The height of the element 70000 was about 5.5 cm. The J-clips 70020, 70022 are located about 5.5 cm in-board from the edge 70012. The clip 70022 was in contact with the reflective electrode on surface III through a silver epoxy 70024 disposed along about 17 cm path between the EC-cell substrates behind the peripheral ring 70010. The electrode of surface III had opaque and transflective zones, and a zone of transition between the opaque and transflective zones was located at about 9 cm in-board from the edge 70012. The electrode of surface III included a TiO$_2$/ITO bi-layer (about 45 nm and about 18 nm, respectively), forming a base coating under metallic layer(s) of the electrode. A sheet resistance value of the base coating was about 80 Ohms/square. The metal layer(s) of the reflective electrode were recessed from edges of the element 7000 by about 3 mm. The silver epoxy 70024 was electrically isolated from the transparent electrode of surface II with a separation area (referred to in Our Prior applications as laser line and not shown in FIG. 70) passing through the peripheral ring 70010. The clip 70020 made contact with the peripheral ring 70010 at a "contact point" 70030 through silver paste. (The extent of the "contact point" 70030 was about 5 mm) the peripheral ring 70010, as a result, was configured as the electrical bus for the EC cell of the element 70000.

The characteristics of darkening of the EC element 70000 were measured at points A, B, and C, and included measurements of reflectance as a function of time, after a potential of about 1.2 V was applied between the electrode of the EC element 70000. Some variations of reflectance may be due to variations of the effective potential across the part, variations in EC cell spacing or gap, and other practical imperfections.

The thickness of the chromium peripheral ring 70010 was differed (from about 0.5 microns, to about 1.0 microns, 2.0 microns, 4.0 microns, and/or about 7.0 microns) is a set of measurements to alter its conductivity. The resistivity of the chromium coating is about 30 microOhm*cm. Table 3F summarizes the calculated resistance of the peripheral ring 70010.

The corresponding L* values are summarized in Table 3G. Based on a visual examination of the parts, and the quantitative L* values, the part with the 1 micron ring thickness was found to be borderline acceptable while the part with a 2 micron coating was found to be fully acceptable. In order to have acceptable uniformity of darkening, embodiments of the invention (regardless of a particular size/dimensions and implementation of contact points) are configured to ensure that the resistance per length between any contact point and a measurement location is less than about 0.6 Ohms/cm, preferably less than about 0.3 Ohms/cm, more preferably, less than about 0.2 Ohms/cm and most preferably less than about 0.1 Ohms/cm. As noted above, the bus may have higher resistance values as the number of contact points increases or the distance between the contact point and the location on the mirror decreases. For the low thickness rings, there is a significant bias in darkening across the part. The center and right hand positions have comparable darkening due to the location of the J-clip being centered between them. In contrast, the distance from the J-clip to the left side is much larger leading to a larger potential drop and thus a lag in coloring time. The addition of another contact point at the mirror location relative to the center line would result in a reduction of the potential drop as described above and thus would improve the coloring uniformity.

TABLE 3F

| R (Ohm) | ρ (Ohm * m) | L (m) | A (m^2) | Ring width (mm) | Ring thickness (um) | R per cm |
|---|---|---|---|---|---|---|
| 30.5 | 3.05E−07 | 0.25 | 2.50E−09 | 5 | 0.50 | 1.22 |
| 15.3 | 3.05E−07 | 0.25 | 5.00E−09 | 5 | 1.00 | 0.61 |
| 7.6 | 3.05E−07 | 0.25 | 1.00E−08 | 5 | 2.00 | 0.31 |
| 3.8 | 3.05E−07 | 0.25 | 2.00E−08 | 5 | 4.00 | 0.15 |
| 2.2 | 3.05E−07 | 0.25 | 3.50E−08 | 5 | 7.00 | 0.09 |

TABLE 3G

Difference Between Optical Parameters Measured at Specified Locations Across Mirror Element 70000 (Peripheral Ring 70010 is used as a bus)

| Sample ID | Specified Locations | Abs (delta Y) | Abs (delta L*) |
|---|---|---|---|
| 500-1 | Center; Left | −18.8 | −19.9 |
| | Center; Right | −0.7 | −1.7 |
| 500-2 | Center; Left | −20.6 | −22.1 |
| | Center; Right | −4.4 | −2.7 |
| 1K-1 | Center; Left | −17.2 | −18.3 |
| | Center; Right | −2.9 | −1.7 |
| 1K-2 | Center; Left | −15.7 | −17.0 |
| | Center; Right | −2.6 | −1.4 |
| 2K-1 | Center; Left | −11.1 | −11.7 |
| | Center; Right | −9.0 | −5.6 |
| 2K-2 | Center; Left | −12.6 | −13.1 |
| | Center; Right | −2.7 | −1.5 |
| 4K-1 | Center; Left | −9.4 | −9.0 |
| | Center; Right | −5.2 | −3.1 |
| 4K-2 | Center; Left | −8.2 | −8.1 |
| | Center; Right | −2.3 | −1.3 |
| 7K-1 | Center; Left | −3.4 | −3.9 |
| | Center; Right | −2.0 | −1.2 |
| 7K-2 | Center; Left | −9.9 | −8.2 |
| | Center; Right | −9.9 | −6.3 |

Figure 71:
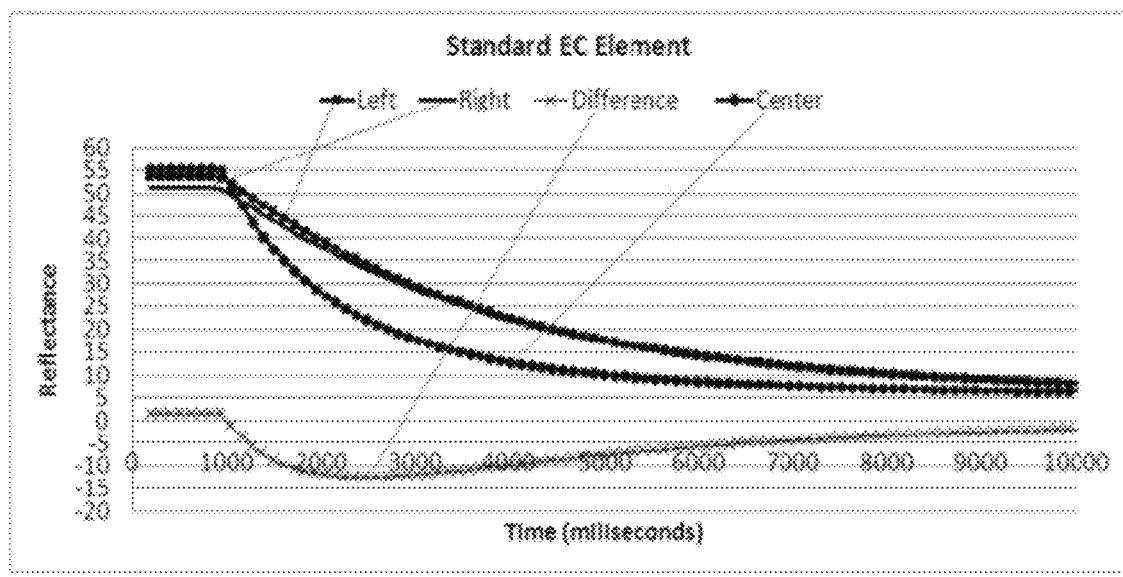
FIG. 71 shows a plot depicting change of reflectance with time.

In comparison with the measurements discussed in reference to FIG. 70, a different EC-cell based mirror element was used, in which an electrical bus was configured conventionally as follows. In this example, the mirror element was approximately 25.5 cm long and 7.0 cm high. A half-wave ITO layer was used for the second surface transparent electrode and a silver-gold alloy (approximately 22 nm thick) was used for the third surface reflective electrode, in which a base bi-layer of about 45 nm of TiO2 and 18 nm of ITO was deposited on glass below the silver-gold alloy layer. The sheet resistance of the base bi-layer was approximately 80 ohms/sq. The silver-gold layer was recessed from the edge of the glass substrate by about 3 mm and was not present under the epoxy seal. Standard bus clips were used to make contact to the electrode coatings. The bus was 18.5 cm long on the top of the mirror element and 20.0 cm long on the bottom. Both top and bottom portions of the bus were centered with respect to the mirror element. Values of reflectance during darkening were measured at comparably similar locations as those discussed in reference to FIG. 70, i.e. at the edges (points A and C) and at about a center of the element (point B). The change in reflectance values with time is shown in FIG. 71.

During the darkening excursion the maximum L* difference was approximately 16 units. A visual evaluation indicated that this level of reflectance variation was not considered objectionable. This level of variation is within the defined preferred ranges above. Table 3H summarizes the absolute difference values for reflectance and L* values, calculated by subtracting the values at the right and left positions (points A, C) from the center position (point B).

TABLE 3H

Difference Between Optical Parameters Measured at Specified Locations Across Conventional Mirror Element (peripheral ring is not configured as electrical bus)

| Sample ID | Specified Locations | Abs (delta Y) | Abs (delta L*) |
|---|---|---|---|
| #2 | Center; Left | −12.3 | −12.3 |
| | Center; Right | −11.2 | −11.7 |
| #3 | Center; Left | −15.9 | −16.0 |
| | Center; Right | −15.2 | −15.5 |
| #4 | Center;; Left | −14.2 | −15.5 |
| | Center Right | −14.7 | −16.3 |

C) Variations on Electrical Contacts and Connectors

Figure 72A:
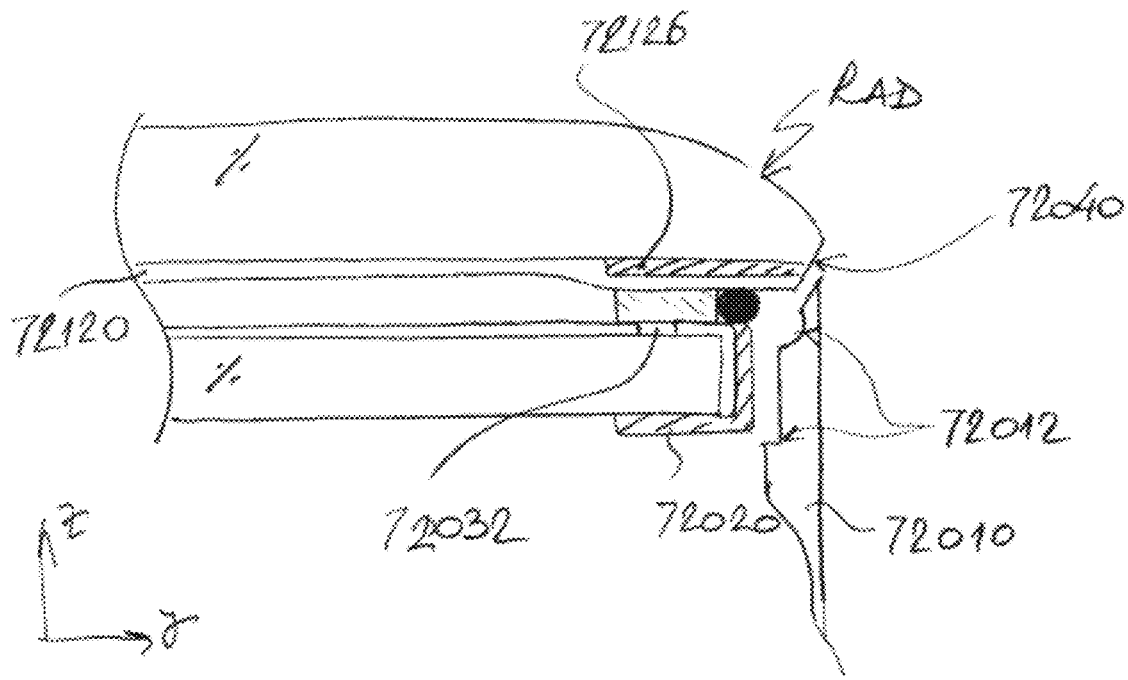
FIGS. 72A, 72B are diagrams showing implementations of the mounting structure of embodiments of the invention.
Figure 72B:
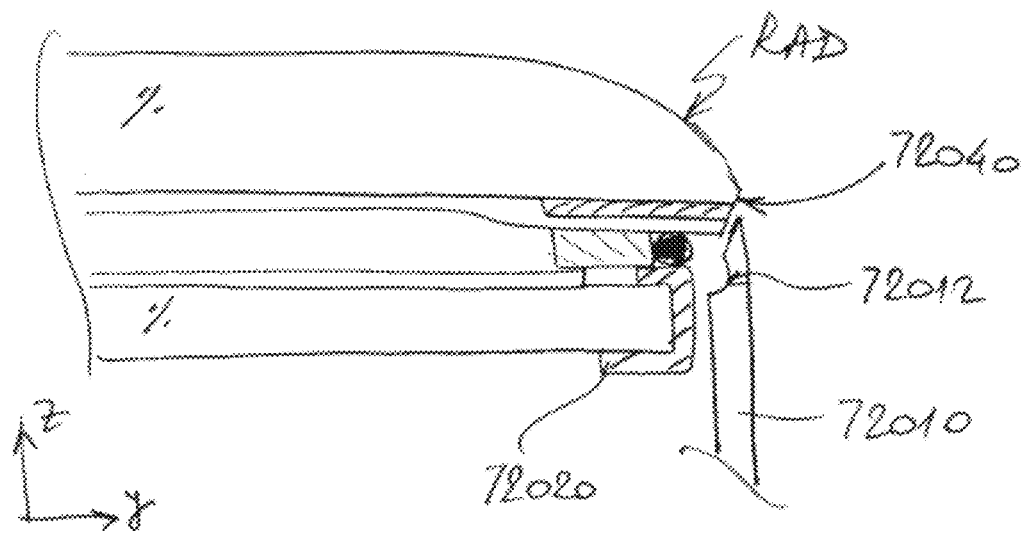

Diagrams of FIGS. 72A, 72B provide but two schematic examples in which a surface of the mounting structure 72010 that is facing an edge of the mirror element is adapted to include localized indents and/or notches and/or cut-away areas 72012 to accommodate the optional presence of an electrically-conductive member 72020 and/or conductive epoxy 72030 at the edge of the second substrate of the mirror element. The layer 72126 represents a second surface electrode. The electrically-conductive layer 72120 represents a second surface electrode, and the layer 72126 denotes a peripheral ring. The electrode 72130 on the third surface includes multiple portions that are substantially electrically isolated by a separation area 72032. While the second surface of the mirror element is shown to include a bevel 72040, in a related embodiment the second surface may contain a rounded edge instead or not be re-shaped at all. Although an edge of the first surface is shown to be Rad-rounded, in a related embodiment it may be beveled to not re-shaped at all.

Configuring an electrical contact on an edge surface of the substrate of the EC mirror element (instead of the surface that carries an electrode) is operationally justified. Indeed, an electrical bus disposed on surface II takes up either offset ledge space or space between the glass resulting in a larger offset ledge, a wider bezel, a wider chrome ring, a smaller display area in back of mirror or a smaller usable transflective area. The thickness of the bus material (if it is on the offset ledge) may cause misalignment between the mirror back and the mirror element. On the other hand, bus on surface III takes up space resulting in wider bezel, wider chrome ring, smaller display area in back of mirror or smaller usable transflective area. Bus on surface IV results in smaller displays or smaller usable transflective area. These shortcomings can be avoided if the bus is mostly applied to the edge surface of the second substrate with only a small portion of the bus wrapping around onto surface II or surface III (and if a portion on the bus that wraps around to surface IV is as narrow as or narrower than the width of the lip, if any, of the bezel component extending on surface I less the width of transverse offset between the first and second substrates, or the width of the peripheral ring less the width of transverse offset between the first and second substrates, or the width of the seal). The incorporation of the largest portion of the bus onto an edge surface of the substrate can be implemented in an number of ways including the following:

Conductive material like one containing conductive particles such as metal particles, metal nanoparticles, metal coated particles, carbon black, graphite, carbon nanotubes, graphene, conductive fibers, metal coated conductive fibers, or a conductive polymer or metal-organic materials that thermally decompose to metallic films, plated metal films electroless-deposited metallic films (incorporate the patent where we cover these in more detail U.S. Pat. No. 7,864,398) can be predominately applied to the edge of a substrate by methods such as dispensing, spraying, jetting, printing, rolling or wicking. This conductive material is applied such that it overlaps onto surface two or three and electrically connects to the conductive electrode coatings on surface two or surface three. This overlap can be continuous or the overlap can be intermittent. If the overlap is intermittent the frequency of the overlap should be sufficient to provide uniform coloring and clearing of the electrochromic device. The higher the conductivity of the electrode conductive coating the less frequent an overlap connection needs to be made. For a typical transparent metal oxide front electrode coating with a sheet resistance of about 12 ohms per square the distance between overlap points should be less than 2 inches, more preferably less than ¾ inch and most preferably less than ⅜ of an inch. It is preferred that the area occupied on surface two and/or surface three by the overlapping material be as narrow as possible. The overlap is preferably less than 1 mm, more preferably less than 0.5 mm and most preferably less than 0.2 mm.

The thickness of the material deposited onto the substrate edge be as thin as possible. It is preferred that the material is thinner than 0.5 mm, more preferable thicker than 0.25 mm and most preferable thinner than 0.1 mm.

If the bus material is subject to environmental corrosion or damage the bus can be overcoated with a protective or conformal coating such as a silicone, acrylate, epoxy or urethane. These protective or conformal coatings could be thermally or UV cured or could be reactive hot melts. The protective material could also be conductive if it is filled with an environmentally stable material like carbon black, graphite, ITO, tin oxide, or other materials described elsewhere in this application.

The conductive material can wrap around to surface IV for connection to the PCB directly or the conductive material can overlap onto a metal L-shaped or flat clip that is attached to surface IV with an adhesive such as a PSA. The clip/bus material overlap can be made on the edge or on surface four or both. The area on surface IV occupied by the conductive material or clip should be as narrow as possible. Preferably less than the chrome ring width minus the front to back substrate offset, the bezel width minus the front to back substrate offset or the width of the perimeter seal that is between surface two and surface three.

Another approach to making a very narrow bus would be to use a metal wire or ribbon that is less than the EC cell gap in diameter or thickness. This narrow wire or ribbon can be attached to the perimeter area of surface two or three by wire bonding or attachment with a conductive adhesive. The adhesive can be a B stage adhesive or a thermoplastic adhesive or a UV cure adhesive that will adhere to the wire to the glass or electrode area when the bond area activated with heat or ultrasonic energy or UV. Ideally the frequency of these bonds would be similar to the frequency of the bus overlap areas described above. If the wire or ribbon is attached to the substrate edge the conductive material adhering the wire to the glass edge preferably overlap onto the electrode on surface II or III. The resistance of the metal wire or ribbon would preferably be less than 5 ohms per linear foot, more preferably less than 2.5 Ohms per linear foot and most preferably less than 1 ohm per linear foot.

Another approach to making a narrow bus would be to use a multi-layer film such as a conductive adhesive/conductive foil/insulator/conductive foil/conductive adhesive. This multi-layer film would be primarily adhered to the substrate edge on would periodically be interleaved between substrate one and two such that the conductive foil layers make independent contact with the electrode layers on surface 2 and 3 through the conductive adhesive. The overlap area would be kept as narrow as possible and the frequency of overlapping areas would be sufficient enough to provide uniform coloring and clearing of the EC device. The cell gap would be established by the thickness of the film laminate. The conductive adhesive could be a Z axis conductor, a thermoset material, a thermoplastic material or a PSA. A tap portion of the multi-layer film would extend past surface four or be adhered to surface four and be used to connect to the PCB directly or through intermediate conductive means.

FIGS. 73(A-D) show different embodiments of establishing an electrical communication with a conductive layer on a surface (top surface as shown) of the EC-element substrate on and over the edge and/or edge surface of that substrate. In FIG. 73A, the silver-paste or conductive ink is continuously dispensed over and along the edge of the substrate 73012 to form an electrical bus that extends substantially and predominantly along the edge surface of the substrate. Embodiments of electrical connectors in any of FIGS. 73A through 73D are mostly disposed on a side or edge surface of a corresponding substrate, with only a small portion or extension of the electrical connectors being placed onto the working surface (top surface as shown). In any of these embodiments, dimensions of a portion of the electrical connector that is disposed along the edge surface of the substrate substantially (at least several times) exceed those of a portion disposed on a neighboring surface of the same substrate. FIG. 73B illustrates a bus formed by dispensing silver-paste (or conductive ink) elements 73020 in a fashion similar to ink-jetting along an edge surface 73014 of the substrate 73012 with a periodic roll-over dispensing of elements 73030 onto the top surface of the substrate 73012. The roll-over dispensed elements 73030 form excursions from the edge-dispensed conductor 73030 onto the top surface. It is preferred that the thickness of the conductive material rolled over onto the surface 73012 is smaller than the cell spacing (typically, about 100 microns to about 500 microns) in the completed EC device to avoid the electrical shorting between the opposing electrode of the device. Typical dimensions of the conductive ink or silver paste patch disposed, as part of an electrical connector, in the EC cell are less than about 100 microns in thickness by about 1 mm in width. Because the width of the deposited conductive bus as viewed from the front of the mirror should be hidden or concealed by the peripheral ring, the width of the bus adds to the width if the peripheral ring. As discussed elsewhere in this application, the width of the peripheral ring should be minimized. Accordingly, it is desirable to place the majority of the conductive bus element on or along the edge surface of the EC-cell substrate. Most preferably, the bus contacting the electrode of surface III is placed on the edge surface of the second substrate. FIG. 73C illustrates an electrical connector including a series of droplets of electrically-conductive material 73040 dispensed, for example, in an ink-jet like fashion that are connected with a thin copper or silver wire 73050 (for example, 0.003" diameter) passed therethrough. FIG. 73D illustrates an embodiment of a wrap-around-the edge clip element 73060 including a foot portion 73060*a* adapted to extend along the edge surface 73014 of the substrate 73012 and petals 73060*b* extending from the foot portion 73060*a* onto the surface carrying the electrically-conductive layer. In one implementation, the clip element 73060 has a layered structure shown schematically in FIG. 74, and including a symmetrically sandwiched structure such as (z-axis conductor 73062/metallic foil 73064/electrically insulating polymer layer 73066/metallic foil 73064/z-axis conductor 73062). The thickness of the layered clip structure is appropriately chosen to substantially match the gap of the EC element. In practice, the petals 73060*b* are inserted in the gap of the EC-element, while the foot portion 73060*a* is adhered to an edge or back of the mirror element with an adhesive.

FIG. 75 illustrates an embodiment establishing an wire-based electrical communication between a bonding pad 75010 of the back of the EC element (as shown, surface IV) and a portion of an electrically-conductive layer on surface II (as shown, a portion 75020 corresponding to a peripheral ring), to provide a bus with a low bus potential drop. The wire 75030 is bonded close to the seal of the EC element (not shown) in a weaving fashion or pattern. An alternative pattern may include multiple separate short wire legs (not shown) connecting the pad 75010 and the portion 75020. Both the pad 75010 and the portion 75020 can optionally be overcoated with a protective coating after the wire pattern has been established.

Figure 76:
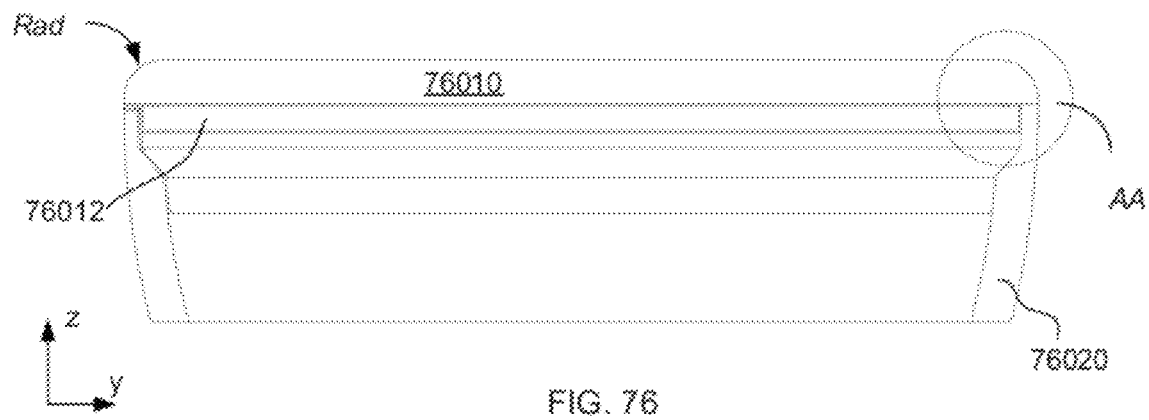
FIG. 76 is a cross-sectional view of an embodiment of the invention.
Figure 77:
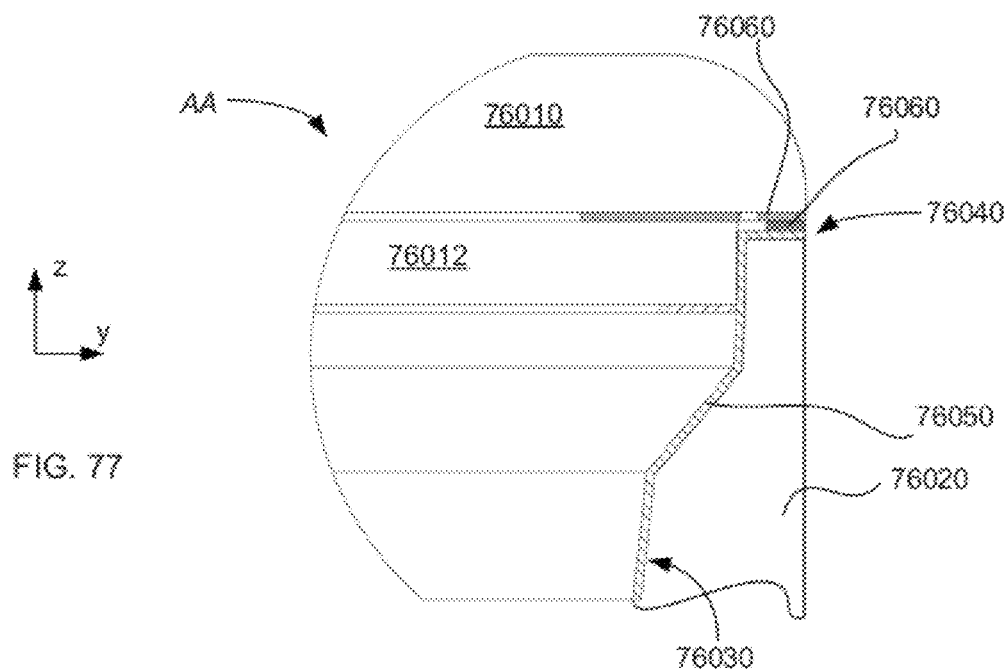
FIG. 77 is a detailed cross-sectional view of a portion of the embodiment of FIG. 76.

In another embodiment, and in contradistinction with a conventionally employed association and/or affixation of a conductive member or clip or bus with the mirror element, a conductive member establishing an electrical communication between an electrically-conductive layer of the mirror element and a back of the assembly (for example, between an electrode of the EC-element and the electronic circuitry at the PCB) is configured as part of the mounting and/or housing structure of the assembly and not as a part of the assembled mirror element. The following provides one example in reference to an EC-cell-based mirror element (but a similar arrangement employing a prismatic mirror element is also within the scope of the invention). In this configuration, the electrical extension between an electrode of the EC element and the electronic circuitry is established when the pre-fabricated EC element is removably cooperated with the mounting and/or housing structure. Accordingly, when the EC element is separated from the mounting and/or housing structure of the assembly, such electrical extension is abolished but can be re-established by putting the assembly together again. An example illustrating this aspect of the invention is shown in FIG. 76. Here, the EC-cell based mirror element is shown to include first and second substrates 76010, 76012 and supported, in the assembly, by a housing structure configured as a shell having an internal volume and an aperture corresponding to the front of the assembly. As shown in more detail in FIG. 77, the internal or inner surface 76030 of the housing structure 76020 has a profile appropriate to establish a close fit with at least a portion of the EC-element such as to establish a physical contact with a portion of the EC-element. As shown, for example, a rim 76040 of the aperture defined by the housing structure 76020 is appropriately dimensioned to come in close proximity to the second surface of the EC element. The inner surface 76030 is metalized with an electrically-conductive layer 76050 which, when the housing structure is mated with the mirror element, is brought in electrical communication with a portion of the transparent electrode 76070 on the second surface of the embodiment through a conductive epoxy or paste 76060, for example, or even directly. Another end of the layer 76050 (not shown) is electrically extended to the PCB and electronic circuitry (via a "zebra" contact or otherwise). In other words, an electrical connector or layer or, in a related embodiment, clip that is employed to electrically connect the second and/or third surface electrode to electronic circuitry at the back of the assembly is configured as part of the housing and not a pre-assembled EC-element. In a related embodiment, the layer 76050 can be built-in to the housing structure 76020 fully or partially around its perimeter, either in an integrated and substantially inseparable fashion (for example, a deposited thin-film coating or conductive ink deposited on and carried by the inner surface of the housing structure along its rim) or as a stand-alone component (such as a metallic inlay, foil, mesh, clip). When the layer 76050 is dimensioned to follow the internal surface of the housing structure 76020 in a closed loop or fully along the perimeter of the rim of the housing structure 76070, the layer 76050 represents a tubular member. The width, length, and cross-sectional profile of such tubular member may be uniform or non-uniform, depending in part on the profile of the inner surface of the housing structure 76020 and the edge surface of the mirror element. Moreover, the width and/or length of such tubular member may be smaller than its transverse dimension (i.e., as measured across the aperture of the housing shell). The tubularly-shaped member 76050 is configured to contact an electrode of the EC-cell based mirror element (or an electrically-conductive layer of a prismatic mirror element) When the housing structure 76070 and the mirror element are mated. The electrical contact is established, optionally, along a portion of the perimeter of the mirror element and, in a specific embodiment, around such a perimeter. The use of additional connecting members such as stand-alone L-clips and/or wires that are used in conventional EC element may remain complementary, if desired. FIG. 78 shows an exploded perspective view of portions of some of the elements of the embodiment of FIGS. 76, 77 in more detail. It is appreciated that in such configuration the edge of the EC-element can be ground to form a Rad-rounded annual peripheral area after the EC-element has been already assembled, and without interrupting or otherwise jeopardizing any electrical connections established as a result of mating the housing structure 76020 and the mirror element.

FIG. 79 shows a diagram illustrating another embodiment of an EC-element 79002 supported by a carrier 79004 and a related electrical interconnect including J-clip 79010 wire-bonded with a contact pad 79020 of the PCB 79030 through an opening 79040 in the PC 79030 and/or around the edge of the PCB. The contact pad 79020 is preferably formed during the PCB manufacturing process. Wires with diameters 0.001"-0.030" made of aluminum, gold, silver, copper and corresponding alloys able to be bonded directly to a metallic element via melting. The carrier 79004 includes a reinforcing element such as a stump 79050 configured to support the PCT during wirebond to the pad 79020. Without such reinforcing area, there exists an upper limit on the size of the wire that can be directly bonded to the pad 79020, which limit is defined by the force applied to the pad 79004 during the boding process.

Embodiments With a Reconfigurable Switch.

It is often desirable to reduce the overall weight and/or size of a rearview assembly while preserving its operability and functionality. One solution that facilitates not only the reduction of weight but also the optimization of the forward and rearview vision (by optimizing the effective size of the assembly) is the use of a reconfigurable switch, i.e. a switch that is adapted to correspond to and to activate more than one functional modality/system of the assembly.

A reconfigurable switch can be located in different portions of the assembly, for example on top of, on the bottom of, or to the side of an area corresponding to a video- or information display such as an RCD display. In one embodiment, a reconfigurable switch is operably associated with operation of the display and adapted to activate a mode of operation of the assembly that is being displayed at the display at the moment. For example, as shown schematically in FIG. 58A, a set 11502 of four reconfigurable switches is associated with a low portion of the front substrate 11506 of an EC-element of the assembly and is configured to choose one or more of several modes of operation of or types of information displayed by a display 11510. Once a choice is made by, for example, activating a particular switch 11502A, the visual information displayed on the display 11510 is updated. The updated information may again present an updated choice of several display modes to the user (by analogy with a "menu" arrangement, whether pictorial, or graphical, or textual), in which case the same switch 11502A is re-programmed/re-configured, according to operation of a computer processor that is operably linked to the embodiments of FIG. 58, to be associated with at least one of the modes presented on the updated display. It is appreciated that virtual button of a reconfigurable switch of the invention may be co-located or overlapped with the area occupied by a display of the assembly. For example, as shown schematically in FIG. 58B, the lower portion 11512 of the front substrate 11506 of the mirror element is associated with a display 11516, a portion of the face of which additionally displays virtual button indicia corresponding to the set 11502 of reconfigurable switches. Optionally, a portion of front substrate in which a button of a reconfigurable switch is located may be protruding from the main land of the front substrate in a form of extension or a "chin" of the glass substrate (not shown).

Figure 58A:
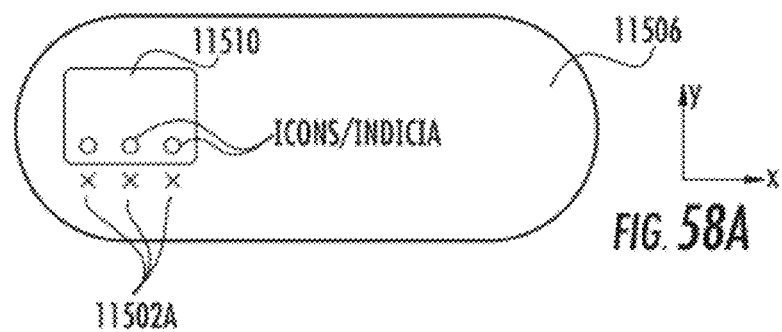
FIGS. 58(A-F) show schematically embodiments of a reconfigurable switch.
Figure 58B:
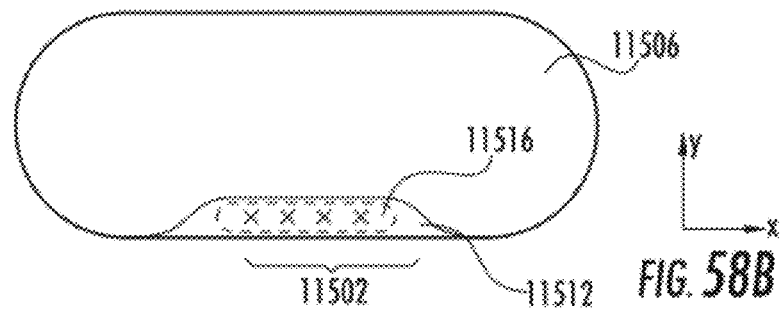
Figure 58C:
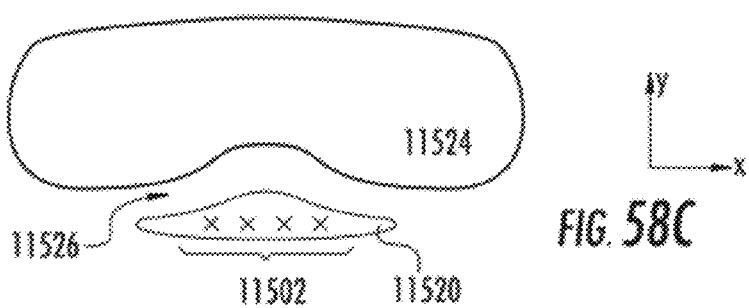
Figure 58D:
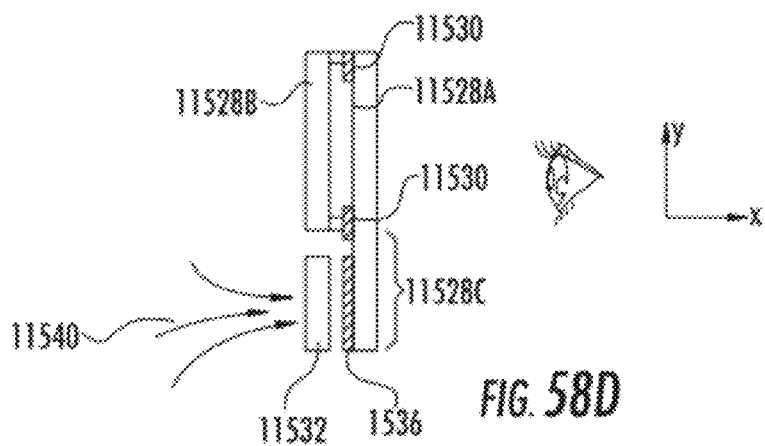

The reconfigurable switch icons/indicia/legend may be formed using known display technologies including such technologies as LCD, VF, LED, OLED, EC, electrophoretic, and electrowetting, to name just a few. Specific techniques employed in manufacture of a display with which a reconfigurable switch is associated include active matrix display, dot matrix display, segmented-numeric or alphanumeric type display, and segmented icon type display. Specific liquid crystal displays may include TN, STN, scattering (such as PDLC or dynamic scattering), dye-type, cholesteric, and/or DAP type of displays. Alternatively or in addition, the display device associated with a reconfigurable switch can be configured to be transmissive (such as a TOLED or a transmissive LCD), transflective, translucent, reflective, or opaque. Many of the above-listed types of displays require the use of a sealed cell similar to a cell used in EC devices. Such a display cell can be combined with the EC-element-based mirror element using the same front substrate or be a stand-alone element. As shown in FIG. 58C, for example, a portion 11520 carrying a set 11502 of reconfigurable switches may be distinct and separate/separable from (but optionally integrated with) a portion 11524 containing a mirror element of the assembly, to which such portion 11520 is geometrically mated (a gap 11526 between the portions 11520 and 11524 is reduced or even closed upon proper assembly). FIG. 58D shows in side view a portion of specific embodiment including a combination of an EC-element 11528 having a first substrate 11528A forming a ledge 11528C with respect to the second substrate 11528B and a peripheral ring 11530. (Housing and other elements such as, for example, electrical connection, light source providing backlighting of the display and/or indicia of the switch are omitted for the clarity of illustration.) Behind the ledge 11528C a reconfigurable/updatable display 11532 is disposed in spatial and operable coordination with a portion 11536 of the reconfigurable switch (such as a conductive pad of a capacitive switch, for example). The display 11532 can be backlit with a lighting system (not shown) of the assembly configured to deliver polychromatic/multicolored illumination (illustrated by arrows 11540) to the display 11532.

Figure 58E:
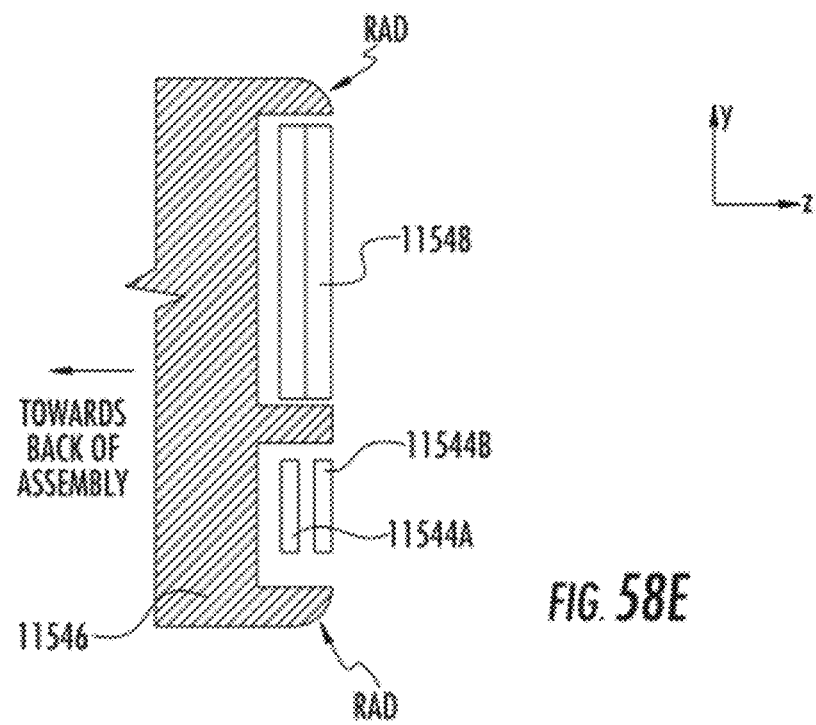

As shown in a related embodiment of FIG. 58E, a combination 11544 including a reconfigurable/updatable display 11544A and a corresponding reconfigurable switch 11544B can be integrated as a stand-alone component and coordinated with a portion of the housing element shown schematically as 11546 the outer front edge of which, in a specific embodiment, is Rad-rounded. The housing element 11546 is adapted to provide housing for an EC-element 11548 as well.

Figure 58F:
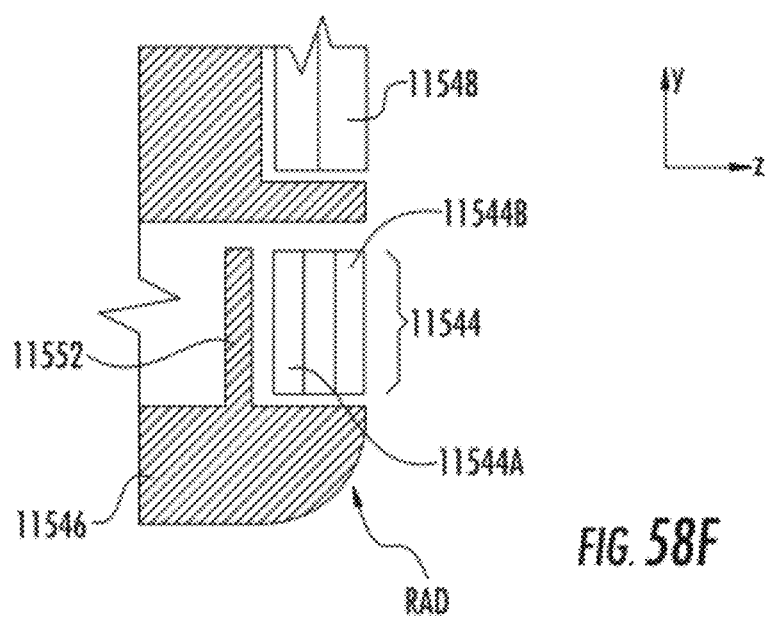

In a specific embodiment of a rearview assembly, a portion of which is schematically shown in FIG. 58F, a portion 11552, of the housing 11546, corresponding to the combination 11544 can be appropriately adapted to be pliable and to move with respect to the remaining portion of the housing and to form a mechanical switch that facilitates the update of the modes of the display 11544A when toggled with respect to the display. In, in the configuration of FIG. 58F, the reconfigurable switch 11544B is configured as a capacitive switch (or a membrane switch, or another type of switch as discussed earlier in this application) with an electrically-conductive pad (now shown), the operation of a re-configurable/updatable combination 11544 is configured to be caused by a operably-coordinated combination of a mechanical switch formed by the pliable portion 11552 and the capacitive switch 11544B.

In a related embodiment of a rearview assembly (not shown) containing a reconfigurable display-switch pair in which the display is configured as a pressure-sensitive element, the optical properties of which change in response to mechanical pressure, a user input to the switch area could be recognized, by the electronic circuitry, via registration of a change in an optical characteristic in response to the finger's pressure.

Embodiments With Transparent Switch Area.

Configuring the peripheral portion of the housing or carrier (such as the portion 9230c of FIG. 33A, as discussed above) as an optically transparent element is advantageous in that, when viewed by the driver from inside the vehicle, the transparent peripheral portion 9230c transmits light from the scene in front of the driver thereby effectively reducing the visually perceived "weight" or "size" of the rearview assembly. Similarly adapting a "switch area" of the assembly (i.e., the area that is associated with the virtual buttons of the UI as observed by the driver) to be transparent would reduce the forward-looking visual size of the mirror even further. In this case, various icons (whether reconfigurable as discussed above or permanent) and conductive pads corresponding to switches, a reconfigurable display, and other functional elements can be coordinated with the transparent switch area. For example, a transparent capacitive switch electrode structure could be formed by disposing a layer of transparent conductor such as a TCO, a metallic thin-film (for example, silver), or a coating of carbon nanotubes or graphene on a transparent substrate (for example, glass or plastic). This transparent capacitive switch electrode structure is then further overcoated with a graphics layer containing icons/indicial for switches and disposed in the transparent switch area of the rearview assembly. On the other hand, the opaque/non-transparent components of the assembly (such as, for example, the mirror housing/casing, the mounting stem of the assembly, and the PCB or other electronics) are appropriately oriented not to obstruct the view of the forward scene as viewed by the driver from inside the vehicle through the transparent switch area. This concept is illustrated schematically in FIG. 59A, showing in front view an embodiment 11600 of the rearview assembly having a transparent lower portion 11604, through which the user can see the forward scene, and a transparent peripheral portion 11608 of the housing element. A partial cross-sectional view of the embodiment 11600 is shown in FIG. 59B. A conductive pad 11610 of the transparent capacitive switch (shown in dashed line and made of a TCO material such as, for example, ITO, ZNO, AZO and the like) is deposited on the second surface of the EC-element 11612 in the area of a ledge formed by the first substrate with respect to the second substrate. A portion of the pad 11610 is overlaid with a graphics layer 11616 (whether opaque or translucent), leaving a patch of the conductive pad electrically-connected to the circuitry at the pack of the assembly (not shown). The EC-element 11612 is structurally supported by housing/carrier element 11620 at least a portion of which is transparent to light. The carrier 11620 is further mechanically affixed to the back portion of the housing of the assembly (not shown) and illuminated, from the back with a light source 11624 highlighting, in an "on" mode, the indicia 11616. (The light from the source 11624 can be delivered to the indicia through the transparent carrier 11620 in any known fashion, for example, as free-space propagating light or light channeled towards the carrier with the use of a waveguide, not shown). Switch area 11604 could also be backlit by light 11624 when the level of illumination provide by the ambient (for ex ample, natural light) is low. One alternative embodiment is shown schematically in FIG. 59C. Here, the first and second substrates of the EC-element 11616' are substantially co-extensive and no ledge is formed between them. However, a carrier 11620' has a lower transparent portion 11630 configured to protrude, as a chin extension, below the EC-element 11612'. In this implementation, no electronics or opaque portions of the assembly are positioned behind the transparent portion 11630, as viewed from the front of the assembly.

While not shown in the drawings, it is appreciated that, a transparent or translucent mechanical switch structure can be additionally formed in cooperation with or independently from the transparent capacitive switch. Corresponding opaque electrical contacts are moved to an edge of the mechanical switch area not to obscure the forward looking scene. In one specific embodiment, a transparent mechanical switch may include a membrane constructed with the use of transparent plastic film and transparent associated electrodes. In another specific embodiment the transparent switch could be a toggle0type or a push-button switch formed primarily out of transparent plastic.

Embodiments of the Peripheral Ring.

Embodiments of peripheral rings for EC-elements of vehicular rearview assemblies discussed so far in related art and in this application have a single circumferential band 8210 disposed around a perimeter of the first or second surface of the mirror element 8220, as shown in FIG. 23A. While this "one size fits all" design has been commonly accepted, it does not address different aesthetic requirements set by different car manufacturers. We discovered that configuring an embodiment of a peripheral ring as a multi-band construct may provide a non-obvious solution to satisfying various aesthetical requirements to appearance of the mirror. Generally, in multi-band embodiments of a peripheral ring, a plurality of bands of spectral filter materials are disposed circumferentially around a perimeter of and on a surface of a mirror system of the invention. While different bands of a peripheral ring may be configured in a quasi-concentric fashion, thus sharing an origin with one inside the other, a non-concentric configuration and a segmented configuration are also contemplated to be within the scope of the present invention. An example of a multi-band peripheral ring concept is provided in FIG. 23B, where a top view of a substrate of an embodiment 8230 of a mirror system is shown to have two peripheral rings 8232, 8234. It is understood that locations within the mirror system, widths of, and materials the bands of a peripheral ring are made of will depend on a particular application and aesthetic requirements. Moreover, it is understood that different bands may be carried on different structural surfaces of a mirror system, as is described in more detail below. In a specific embodiment, therefore, a multi-band peripheral ring may include bands spatially separated along the direction of incidence of light onto the mirror system. Generally, according to the embodiment of the invention, the aggregate of widths of bands of a multi-band peripheral ring will not exceed 10 mm, and will preferably be less than 6 mm, and most preferably less than 4 mm. Relative to the aggregate width of a peripheral ring, a width of a given band can be between 5 percent and 95 percent, preferably between 10 percent and 90 percent, and most preferably between 25 percent and 75 percent.

Figure 24B:
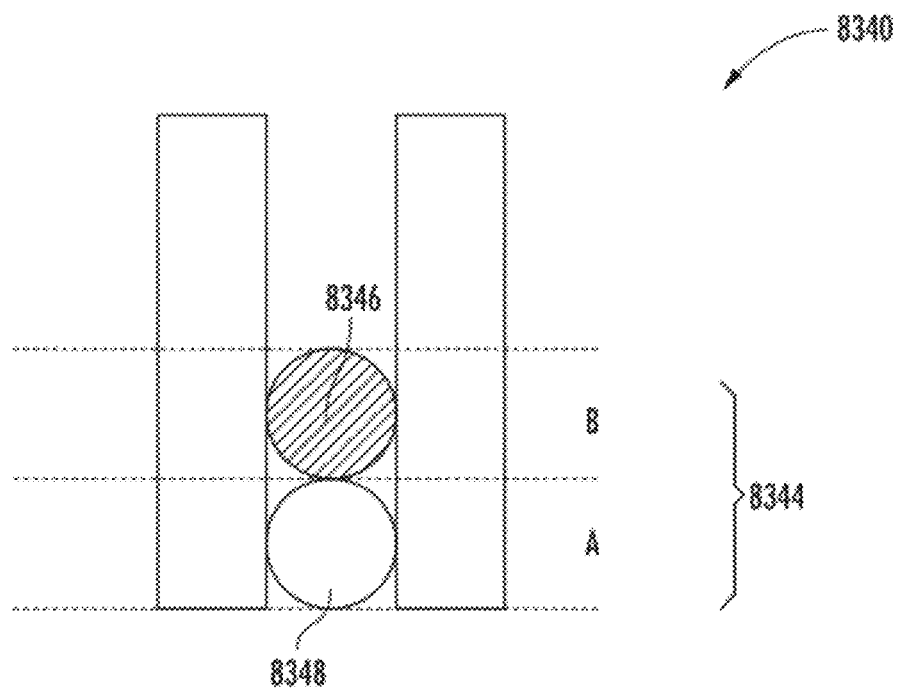
FIG. 24B illustrates a two-lite embodiment of an electro-optic (EO) element having a two-band peripheral ring and a double seal the components of which correspond tom the two bands.

FIG. 24A schematically shows peripheral regions A, B, C, and D of a specific embodiment 8300 of a mirror system comprising three substrates 8310, 8312, 8314 where a multi-band peripheral ring (in this case, a ring including up to four bands) may be configured. For simplicity of illustration, no mounting elements (such as a bezel or a carrier), or conventional optical coatings, or sealing materials are shown. Although the peripheral regions are identified on only one side of FIG. 24A, it is understood that these regions extend in a circumferential fashion around the perimeter of the embodiment 8300. It is also understood that configuration of a multi-band peripheral ring is not limited to a single surface of a particular substrate. Rather, a multi-band peripheral ring may consist of bands generally disposed on different surfaces (in the case of embodiment 8300, on either of surfaces I through VI). As shown, e.g., a multi-band peripheral ring 8320 includes four bands 8322, 8324, 8326, 8328 disposed respectively on the first, second, third, and fourth surfaces of the embodiment. Generally, several seals can be used between the substrates forming an EO-element of the embodiment, each seal corresponding to a particular band of the peripheral ring. For example, as shown in FIG. 24B, an embodiment of a two-lite EO-element 8340 may have a peripheral ring 8344 defined by two bands (A and B, corresponding coatings not shown) and a double seal including seal components 8348, 8346 that respectively correspond to the bands A and B.

It is also understood that, in general, some of the substrates may be transversely offset with respect to other substrates and/or be of different dimensions in order to facilitate, e.g., configuration of electrical interconnections and fabrication processes.

Figure 24C:
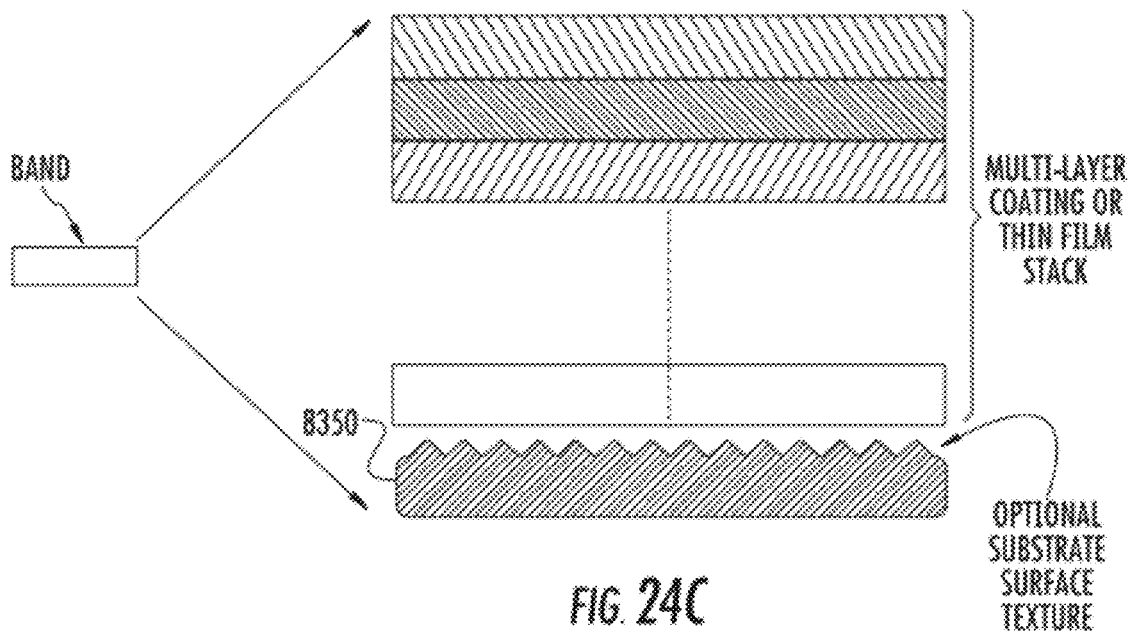
FIG. 24C illustrates a non-specularly reflecting peripheral ring of an embodiment of invention.

In reference to FIG. 24C, a peripheral region may be characterized by specular or non-specular reflectance, or a reflectance the characteristic of which spatially varies with a position in the region. The non-specular characteristic may be formed by choice of material deposited on a substrate 8350, such as a frit, or the substrate may be altered by bead (or sand or other media)-blasting, sanding, rubbing, laser treating, deposition of a transparent layer, a semi-translucent layer with small particles, or semi-transparent layer that has texture or altered from a smooth surface by other means. A peripheral region may have a color determined by various means known in the art such as thin film interference, deposition of a colored thin film (absorption effects), paint, frit or other means. Alternatively, a coating or treatment may be absent in a zone and the aesthetic then determined by the seal or other components within or behind the corresponding band of a multi-band ring. It is essential that means employed to achieve desired aesthetic parameters does not hinder or frustrate electrical interconnections required for proper functioning of the embodiment. If a given treatment, coating or other aesthetic means is employed that is not compatible with the necessary electrical interconnections then electrical interconnections should be appropriately modified and/or reconfigured by, e.g., employing electrically-conductive coatings instead of hard-body connectors. These reconfigured components may be hidden by the aesthetic means or may be incorporated as part of the aesthetic means whereby the reconfigured electrical interconnectors additionally contribute to the appearance of one or more regions of a band.

Figure 60:
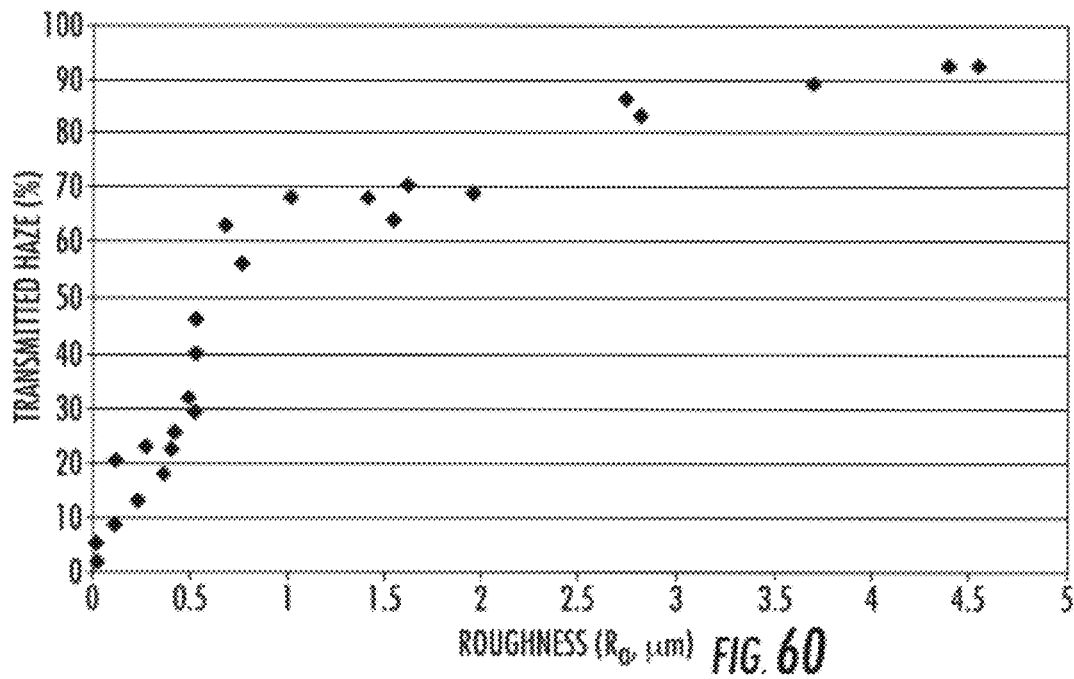
FIG. 60 shows a characteristic pertaining to a peripheral ring disposed on a textured glass surface.

In one embodiment, a band of the peripheral ring (whether it belongs to a single- or multi-band peripheral ring) may be formed to include a thin-film coating deposited on a textured glass surface. For example, a glass surface of a substrate onto which a thin-film band coating is deposited (such as the second surface of the first substrate) can be textured and/or roughened (such as by laser ablation or grinding) to contain, generally in an area associated with the peripheral ring, a surface relief the roughness characteristic of which is sufficient for a band of the peripheral ring to appear optically diffusive when viewed through the substrate. Surface-roughing (texturing) produces a hazy appearance of a portion of the glass surface. In addition, the "roughened" glass area of the peripheral ring region facilitates concealing the seal material and helps to reduce glare (in reflection) that may be experienced by the user at night. FIG. 60 shows the relationship between transmitted haze as measured through a roughened glass surface and the measured roughness of the surface. The roughness ($R_a$, average value, in microns, characterizing measured surface in at least one direction) depicted in FIG. 60 was measured across the glass substrate roughened/textured as discussed above, with a Taylor Hobson Form Tallysurf Aspheric Measurement System Laser 635 using a 2 micron conisphere stylist having a 40 degree cone angle, at 0.1 mm per/sec, over a distance of about 30 mm. In addition, Table 4 illustrates dependence of specular reflectance measured, through the glass substrate, off of the peripheral ring reflector disposed on a roughened/textured portion of the glass.

TABLE 4

| Specular Reflectance (%) | Roughness ($R_a$, µm) |
| --- | --- |
| 44.09% | 0.021 |
| 16.08% | 0.1098 |
| 7.81% | 0.272 |
| 6.69% | 0.4155 |
| 6.17% | 0.4877 |
| 5.64% | 0.5195 |
| 5.61% | 0.525 |
| 5.02% | 0.6754 |
| 5.09% | 1.4007 |
| 5.05% | 0.763 |
| 4.80% | 1.9496 |
| 4.80% | 1.017 |
| 4.60% | 1.6038 |
| 42.13% | 0.024 |
| 37.32% | 0.1116 |
| 28.75% | 0.2275 |
| 23.17% | 0.3588 |
| 20.70% | 0.3994 |
| 17.50% | 0.5156 |
| 6.69% | 1.5372 |
| 4.82% | 2.8088 |
| 4.58% | 2.7356 |
| 4.51% | 3.6906 |
| 4.50% | 4.3943 |
| 4.51% | 4.5493 |

In a specific embodiment, when the roughened ring-like circumferential portion of the second surface in the perimeter region of the front substrate of the mirror element is overcoated with a metallic thin-film band coating, the corresponding peripheral-ring band will create a rough metallic ("brushed metal") appearance when viewed from the front of the mirror. On the other hand, when such roughened peripheral-ring area is overcoated with an appropriately designed TCO and/or dielectric thin-film stack, the peripheral-ring band viewed from the front may have a colored textured appearance. It is appreciated that the width of either thin-film band coating (whether electrically-conductive or dielectric) overlaying the roughened portion of the peripheral ring area does not, generally, equal to that of the roughened portion of the peripheral ring area. The thin-film band structure may be wider or narrower than the textured ring-like portion of the glass surface on which it is deposited. Changing the surface-roughening pattern using a programmed laser-ablation system, for example, can produce a variety of textures and aesthetically pleasing peripheral rings (especially when the roughened area is overcoated with reflective material.)

Figure 25A:
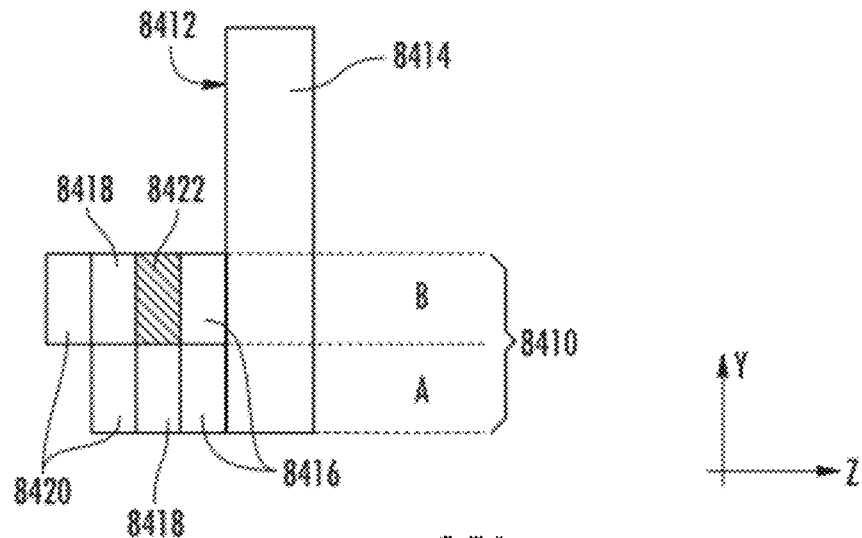
FIGS. 25(A-D) show various embodiments of a two-band peripheral ring used in w mirror system of a rearview assembly of the invention.

A specific embodiment of a two-band ring where all bands are disposed on the same surface can be fabricated either in two cycles (e.g., one band per cycle) or in a single cycle if thin-film structures of the two bands are appropriate configured to contain common layers. For example, as schematically shown in FIG. 25A, two bands A and B of a peripheral ring 8410 are disposed on the same surface 8412 of a substrate 8414. A reflectance value of a band A is higher than that of a band B. Both the thin-film stack corresponding to the band A and that corresponding to the band B include a common layer 8416 of a TCO or another dielectric material such as $SiO_2$, MgO, $Ta_2O_5$, $ZrO_2$, $MgF_2$, ITO, TiOx, CeOx, $SnO_2$, ZnS, NiOx, $CrO_x$, $NbO_x$, and $ZrO_x$, $WO_3$, NiO or $Ti_xSiO_y$, zinc oxide, aluminum zinc oxide, titanium oxide, silicon nitride disposed on the surface 8412. Examples of suitable TCO materials include ITO, F:SnO2, Sb:SnO2, Doped ZnO such as Al:ZnO, Ga:ZnO, B:ZnO, and/or IZO. The band A additionally includes a dielectric layer 8418 (selected from the list above for layer 8416) and a metallic layer 8420 (such a silver-gold alloy, silver alloys as described below, chrome, ruthenium, stainless steel, silicon, titanium, nickel, molybdenum, and alloys of chromium, molybdenum and nickel, nickel chromium, nickel-based alloys, Inconel, indium, palladium, osmium, cobalt, cadmium, niobium, brass, bronze, tungsten, rhenium, iridium, aluminum and aluminum alloys as described below, scandium, yttrium, zirconium, vanadium, manganese, iron, zinc, tin, lead, bismuth, antimony, rhodium, tantalum, copper, nickel, gold, platinum, or their alloys and alloys whose constituents are primarily those aforementioned materials, any other platinum group metals, and combinations thereof. The spectral properties of light reflected from the band A are determined essentially by the material of the layer 8420 and the aggregate thickness of the layers 8416 and 8418.

In comparison with the band A, the band B has an additional layer 8422 interdisposed between the layers 8416 and 8418, which is used to dramatically reduce the overall reflectance of the band B. Preferably a metal used for layer 8422 should high value of real part of a refractive index in order to meet the reflectance objectives of a given application. The real part of refractive index should be above about 1.5, preferably above 1.9, and most preferably greater than about 2.1. The value of the imaginary part of the refractive index for a metallic material 8422 for attaining very low reflectance values will vary with the real refractive index. Lower k values are needed for low real refractive indices and higher k values will work as the real index increases. Preferably, both the real and imaginary parts of the refractive indices should be relatively large. Appropriate metals or materials for the thin absorbing metal layer include nickel silicide, chrome, nickel, titanium, monel, cobalt, platinum, indium, vanadium, stainless steel, aluminum titanium alloy, niobium, ruthenium, molybdenum tantalum alloy, aluminum silicon alloys, nickel chrome molybdenum alloys, molybdenum rhenium, molybdenum, tungsten, tantalum, rhenium, alloys of these metals and other metals or materials with both the real and imaginary refractive indices being relatively large. The thickness of the thin metal layer should be less than about 20 nm, preferably less than about 15 nm and most preferably less than about 10 nm. The preferred thickness will vary with the reflectance objective and refractive index of the metal selected for a given application. It is anticipated that at least one thin-film layer of the multi-band peripheral ring 8410 may extend into the viewing area while the others are localized in the area of the ring. In addition, UV shielding or blocking may be attained through a combination of material choices and the optical design of the stack. For example, the dielectric materials may be selected which display absorption properties. Specifically, $TiO_2$ $CeO_2$ and zinc oxide are effective UV absorbers. The absorption of the UV light by these materials may be augmented through a judicious optical design of the coating by using a multilayer stack such as an H/L/H stack. It is appreciated, that coatings of a particular band of a multi-band peripheral ring that are located on surfaces preceding the sealing materials should preferably protect the sealing materials from exposure to the ambient UV light. The UV blocking means should reduce the UV transmittance below 5%, preferably below 2.5% and most preferably below 1%.

In a non-limiting example, the substrate 8414 is made of glass, and the surface 8412 is the second surface of the embodiment. The band B contains the layer 8416 is about 52 nm of ITO, the layer 8422 is 8.2 nm of Chrome, the layer 8418 is 46 nm of ITO, and the layer 8420 is 50 nm of silver-gold alloy, with gold being at about 7% of the composition. When viewed through the first glass substrate 8414, the band B has a neutral color and a reflectance of 6.9%. The reflected value of a* is 3.1 and that of b* is −3.8. The band A, where the Chrome layer 8422 is not present, has a neutral reflected color and a reflectance of greater than about 86.6%. The reflected value of a* is −2.0 and that of b* is 0.6. The presence or absence of one layer, therefore, may result in a reflectance difference value of greater than about 70% for this coating stack. Table 5 illustrates how the value of reflectance and color of reflected light may be altered by the adjustment of the thickness of the layers. The stack may be altered to change the intensity of the reflectance and/or the color as needed for a given application. Substitution of any or all of the layers with different materials can be used to attain further degrees of freedom in designing a coating for a particular set of optical requirements. Table 6 shows how the color and transmittance vary with the thickness of the high reflectance AgAu7x layer. As a layer is thinned, the transmittance increases with only subtle changes to the color and reflectance.

TABLE 5

| ITO | Cr | ITO | AgAu7x | R | a* | b* |
|---|---|---|---|---|---|---|
| 52 | 8.2 | 46 | 50 | 6.9 | 3.1 | −3.8 |
| 42 | 8.2 | 46 | 50 | 7.0 | 4.7 | 2.6 |
| 32 | 8.2 | 46 | 50 | 8.0 | 3.4 | 10.9 |
| 22 | 8.2 | 46 | 50 | 9.9 | 0.5 | 16.9 |
| 12 | 8.2 | 46 | 50 | 12.2 | −2.2 | 18.8 |
| 62 | 8.2 | 46 | 50 | 7.9 | −1.1 | −6.1 |
| 82 | 8.2 | 46 | 50 | 11.7 | −9.0 | −0.3 |
| 52 | 6.2 | 46 | 50 | 7.0 | 5.1 | −15.4 |
| 52 | 4.2 | 46 | 50 | 12.4 | 4.0 | −20.8 |
| 52 | 10.2 | 46 | 50 | 9.1 | 0.8 | 4.7 |
| 52 | 14.2 | 46 | 50 | 15.7 | −1.0 | 8.0 |
| 52 | 8.2 | 36 | 50 | 10.1 | 3.2 | −7.3 |
| 52 | 8.2 | 26 | 50 | 14.7 | 3.5 | −8.7 |
| 52 | 8.2 | 56 | 50 | 5.1 | 7.1 | −7.4 |
| 52 | 8.2 | 66 | 50 | 5.2 | 25.7 | −37.3 |

TABLE 6

| ITO | Cr | ITO | AgAu7x | R | a* | b* | T |
|---|---|---|---|---|---|---|---|
| 52 | 8.2 | 46 | 50 | 6.9 | 3.1 | −3.8 | 0.5 |
| 52 | 8.2 | 46 | 40 | 6.8 | 2.8 | −2.6 | 1.1 |
| 52 | 8.2 | 46 | 30 | 6.5 | 2.3 | −0.1 | 2.6 |
| 52 | 8.2 | 46 | 20 | 5.9 | 1.7 | 4.0 | 6.5 |
| 52 | 8.2 | 46 | 10 | 6.1 | 2.3 | 4.1 | 16.8 |

The reflectance value of light reflection in the area of the "bright" band A is dominated by the reflectance of the metal positioned away from the viewer. If the silver-gold alloy from the previous example is replaced with chrome and the other layers are re-optimized (the thickness of the layer 8416 of ITO is 53 nm and the thickness of the layer 8418 of ITO is 57 nm), then a neutral appearance in reflection is still attained but the reflectance of the band A is reduced to about 50%. If, instead of silver-gold alloy, Ruthenium is used in the layer 8420, the reflectance is about 57%, Rhenium yields about 38%, Molybdenum 45%, Copper 54%, Germanium 29%, Tantalum 39%, and other metals will yield other reflectance values depending on their properties. This embodiment is not limited to this set of metals and other metals (described elsewhere in this document) with different reflectance values and hues may be used and are within the scope of this art. Moreover, multiple metals may be employed where the thickness of each layer is adjusted to attain the reflectance and hue for a given application. For example, in the case where a silver alloy is used as the second metal layer, a high reflectance is attained. If it is important to have lower reflectance and opacity one can include an additional metal or metals between the silver alloy layer and the viewer to attenuate the intensity of the reflectivity. The additional layer may provide other benefits such as adhesion, corrosion protection or any other of beneficial properties. Typically, the reflectance will decrease as the thickness of the additional layer(s) is increased, eventually reaching the reflectance of the additional metal when the thickness reaches a critical thickness. Alternatively, if only the reflectance is to be reduced, and transmittance is not needed to be low (see embodiments below) the thickness of the metal, such as silver gold alloy, can be reduced thus decreasing the reflectance and increasing the transmittance. In other embodiments where lower reflectance is desired in combination with low transmittance, the additional metal or absorbing layer may be placed behind the reflector metal, relative to the viewer on the outside portion of the rearview assembly. In this manner, the thickness of the reflecting metal layer may be adjusted as needed to attain the desired reflectance value and the thickness of the additional layer behind the reflector metal can be adjusted as needed to attain the desired transmittance value. The metal above or below the silver layer may be selected to be, e.g., chromium, stainless steel, silicon, titanium, nickel, molybdenum, and alloys of chrome, and molybdenum and nickel, nickel chromium, molybdenum, and nickel-based alloys, Inconel, indium, palladium, osmium, tungsten, rhenium, iridium, molybdenum, rhodium, ruthenium, tantalum, titanium, copper, nickel, gold, platinum, and other platinum-group metals, as well as alloys the constituents of which are primarily aforementioned materials. Combinations of metal layers are selected so that the reflectance may be set between about 45 and 85% with the transmittance between about 45 and 5%. Preferably the reflectance is between 55% and 80% with transmittance intensity between about 35% and 10%.

It is recognized that appropriate optimization of a thin-film stack of a particular band of the peripheral ring will affect the optical properties of the band. In a specific embodiment, it may be preferred to include a layer of a quarter wave thickness and a refractive index intermediate between the first TCO or dielectric layer and the refractive index of the substrate, e.g., glass or other transparent media between the substrate and the TCO layer. Flash overcoat layers of materials mentioned in U.S. Pat. No. 6,700,692 may also be incorporated into the above described designs. Depending on the thickness and optical properties of the materials chosen for the flash layer(s), adjustments may be needed to the underlying stack to maintain a similar degree of match or mismatch between the relatively opaque region and the transflective region(s).

In order to have a noticeably different appearance between the bands of a multi-band peripheral ring, when required, the corresponding brightness values should differ by at least 3 L* units. Preferably the brightness values of the bands will differ by greater than about 10 L* units, more preferably by about 20 L* units, even more preferably by more than about 50 L* units. The low reflectance band of the peripheral ring should be less than about 60%, more preferably less than about 30%, even more preferably less than 20% and most preferably less than about 12%. The value of reflectance of the high-reflectance band should be greater than about 40%, preferably greater than about 50%, even more preferably greater than about 60% and most preferably greater than about 70%. The difference in reflectance values between the two bands may be a difference in magnitude of the specular reflectance or it may be a difference in the specular and non-specular reflectance. In addition or alternatively, the two bands have a difference in color or hue. The corresponding difference in C* values (measured in reflectance) should be greater than about 5 units, preferably greater than about 10 units, more preferably greater than about 15 units and most preferably greater than about 25 units. The color difference may be combined with changes in either reflectance magnitude, reflectance type (specular or non-specular) or some other aesthetic effect such as surface texturing.

Figure 25B:
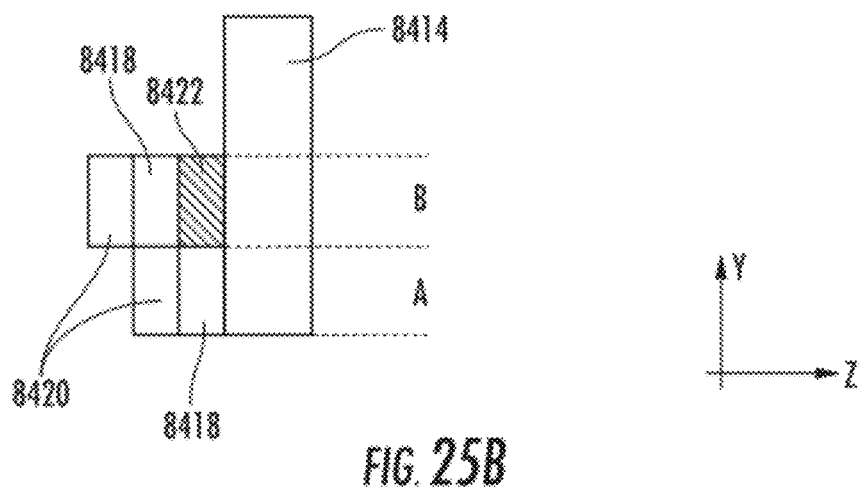
Figure 25C:
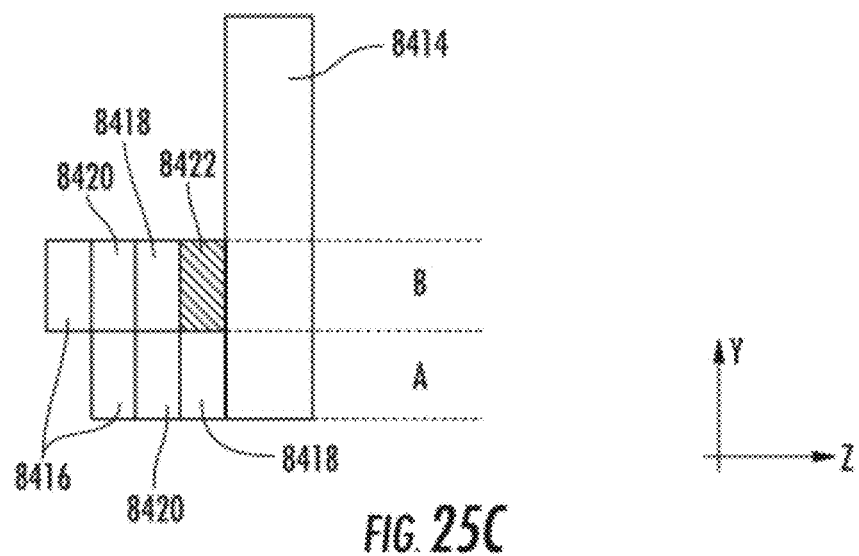
Figure 25D:
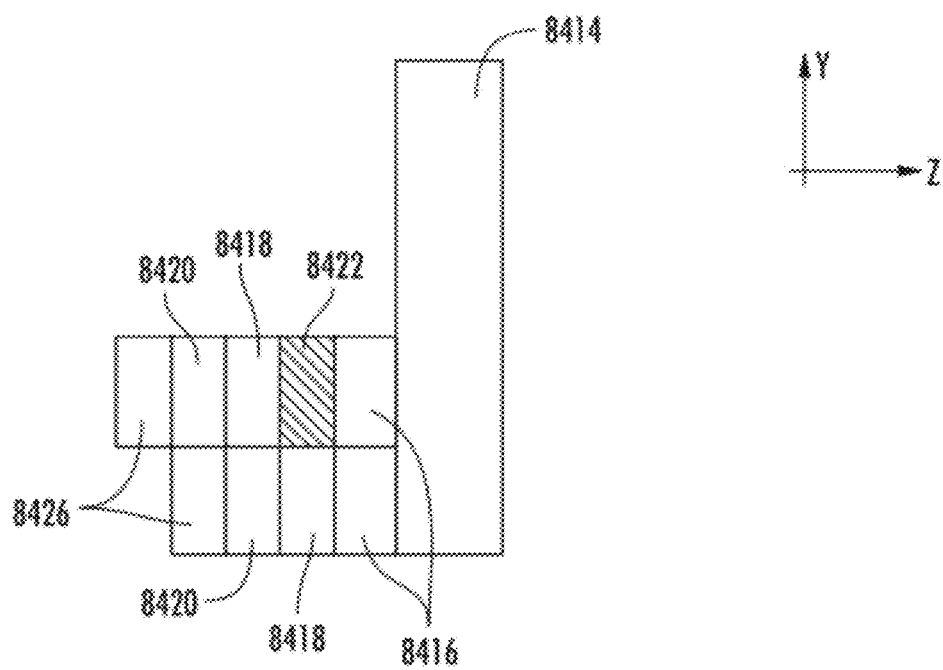

FIGS. 25B through 25D present different variants of the embodiment of FIG. 25A. The stacks A and B in FIG. 25B, for example, do not have the first TCO or dielectric layer disposed on glass as shown in FIG. 25A. (If the first TCO covered the entire surface, then its removal would result in a lower sheet resistance in the viewing area and potentially increasing the switching or darkening time.) The reflectance in the two bands and color of ambient light incident from the first surface and reflected by the bands in the +z direction are relatively unaffected by the removal of the first ITO layer. The color and reflectance may be tuned or adjusted as described above but with one less degree of freedom. The thickness of the layers, as described above, can be altered to change the color. The ease of color tuning is reduced when a layer is absent. The embodiment of FIG. 25B demonstrates a basic structure of a two-band peripheral ring having a high-reflectance band and a low-reflectance band. FIG. 84C, in comparison with FIG. 25B, has an additional TCO or dielectric layer 8416 as the layer distal to the viewer. This layer may be present in the ring area only or it may extend into the viewing area. This layer may be present to protect the metal layers or improve the adhesion to the seals or provide an altered electrical contact to the bus or electro optic material. FIG. 25D, in comparison with FIG. 84A, shows an additional TCO or dielectric layer 8426 on top of the layers 8420 in both bands A and B. The layer 8426 can add properties similar to those as described in reference to FIG. 25C. Furthermore, if the outermost layer is a TCO then it will lower the sheet resistance in the viewing area or modify the optical thickness and the resultant color in the bright and predominantly, the dark state of an EC as described in Our Prior applications. A TCO layer used within the area of a peripheral ring serves a purpose of attaining the desired reflectance and color, and when it extends beyond the peripheral ring it also serves as a transparent electrode for the EC-cell, the conductivity of which may be modified by additional TCO layers. The thickness of a TCO layer in various positions in the stack may be optimized to coordinate the desired color in the ring positions and the viewing area in the bright and dark state. Additional TCO layers that extend beyond the ring area may be added on top of the ring layers to add additional conductivity to the electrode.

It is appreciated that when a multi-band peripheral ring is disposed on the first surface instead of the second surface, the order of the layers should be reversed (with respect to the viewer) in order to preserve the optical properties of the ring.

Figure 26:
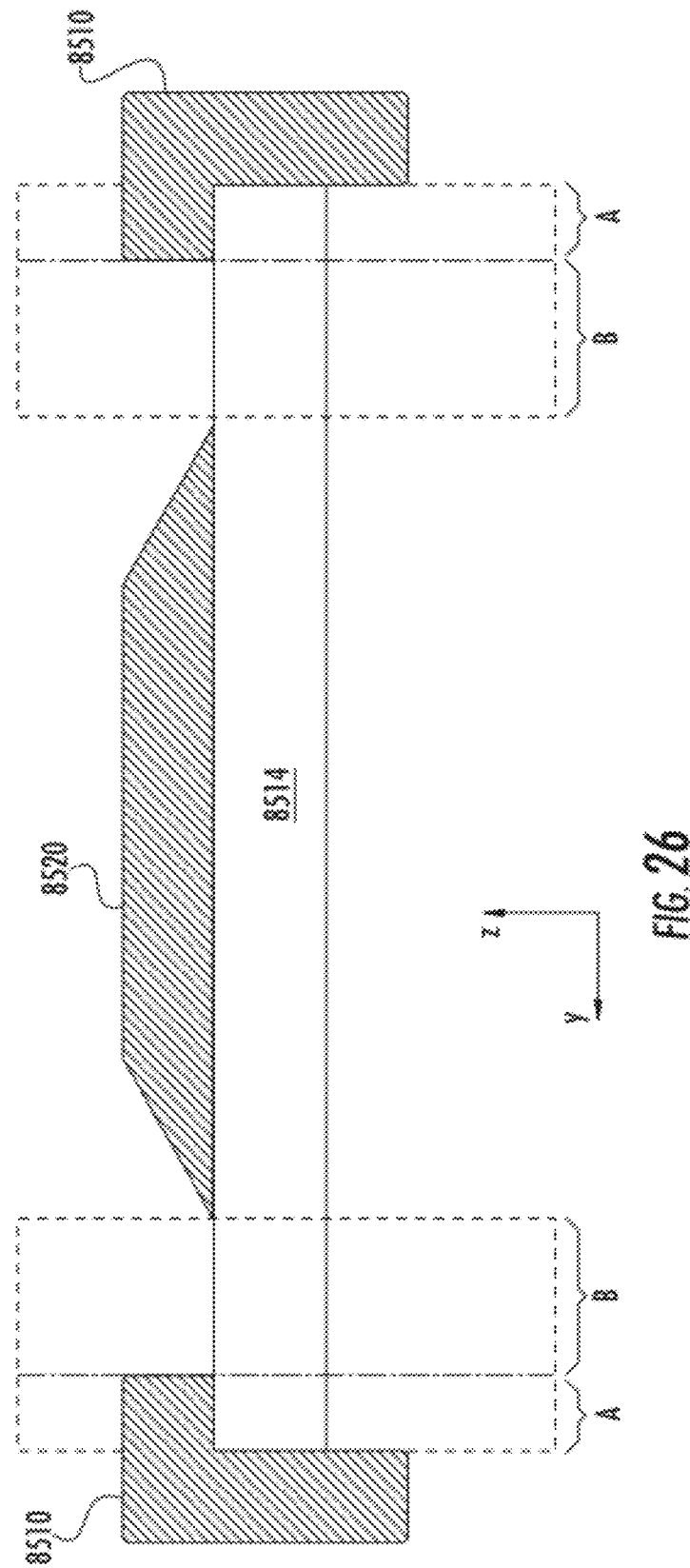
FIG. 26 illustrates a mask construction means used to fabricate an embodiment of a two-band peripheral ring of the invention.
Figure 27:
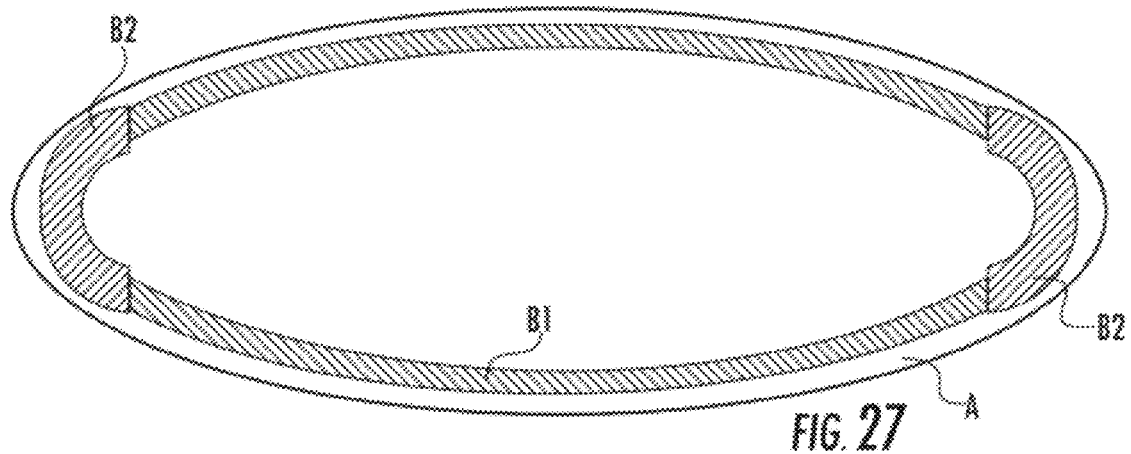
FIG. 27 shows an embodiment of a two-band peripheral ring having a non-uniform thickness.

As demonstrated, configuring bands of a multi-band peripheral ring to have common thin-films layers makes the multi-band ring more suitable for manufacturing. One technique to facilitate a single-cycle manufacturing is to use simplified masking and registration of multiple masks. There are several masking options available for deposition of the multi-band coating depending on the type of coater used (e.g., in-line or turret). FIG. 26 shows one possible mask construction including an edge mask 8510 and the plug mask 8512. It is understood that other masking or fabrication options are viable for making these products and the invention is not limited to this particular example. In a turret type coater the substrate 8514 to be coated is held stationary relative to the target with or without masking present. The target or other deposition means are activated and the substrate is coated in areas not masked. The part then cycles to another deposition bay where the process is repeated with the same or different masking arrangement.

The number of deposition bays is selected based on a given application. In order to produce the construction described in FIG. 25A, the substrate would be arranged with only the plug mask so that both bands A and B receive the coating. Optionally, the plug mask 8512 may be absent so that the layer 8416 covers the entire surface of the substrate in addition to the regions A and B. Further, the edge mask 8510 is used to prevent the deposition of the layer 8422 in the region A and the plug mask 8512 is used to limit the deposition of layer 8422 in the region B. The layer 8418 would be disposed similarly to the layer 8416. In the case of the layer 8420, only the plug mask 8512 would be used. It is understood that other masks may be added or subtracted as needed to achieve the proper thickness and locations of the layers on the part and is within the capabilities of one skilled in the art.

Generally, a dark/opaque material such as an appliqué may be disposed at the back of the mirror element. In embodiment including two lites of glass, such appliqué may be disposed on or behind the fourth surface and does not need to terminate at an edge of peripheral region B. For aesthetic reasons, such as matching the color of the vehicle interior, the appliqué may be of a color other than black. Elements and materials located behind such appliqué (as viewed from the first surface) remain, therefore, hidden from view. For example, portions of electrical connectors such as J-clips disposed or extending over the appliqué on surface IV are not visible from the front of the assembly. In an alternative implementation, where the J-clip may be disposed onto surface IV under the appliqué, the appliqué often overlays/adhered to the J-clip differently from the way it overlays/adheres to glass. These differences are discernible, through the transflective area, to the user because the conditions for reflection of light incident onto the portion of surface IV surrounding the J-clip differ somewhat from the conditions at about the J-clip. The combination of J-clip and appliqué creates an effective pocket or bubble under the appliqué leading to non-uniformities in reflection as seen from the front. To reduce the visibility of this "standing out" area, a pad of black or at least optically opaque ink (such as, for example, "Black UV-LED IR2 Ink" with a part number of I-7102-200) can be printed onto the area of surface IV to which the J-clip is attached prior to such attachment. The ink pad is configured to operate as a black screen blocking the view of the J-clip and the discernible portion around it. In other embodiments it is possible that embedded light sources with means such as matte finish and/or anti-reflective coatings (to decrease the visibility when off) are incorporated within region B. If the band B has low reflectance (and, accordingly, high transmittance) and the adjacent band A has high reflectance (and low transmittance), the light from the embedded light sources will traverse the mirror element towards the viewer substantially only through the band B because the band A and the central portion of the mirror have a relatively low transmittance. Alternatively, the light can originate from the edges of the glass or from another source direction and transmit through zone B either relatively collimated or with a spread of angles. The light source(s) of the embodiment may be arranged and integrated with other functionalities for a variety of purposes. In one embodiment the light sources indicate an approaching vehicle in the blind spot of the driver by scrolling from the top middle to the top left for a vehicle on the left and from the top middle to the top right for vehicles in the right blind zone. The light sources could also be used as a compass indicator with light at the top middle and bottom of the mirror corresponding to N, S, E, W. with additional points as desired. The light source(s) could also be used as a make-up or vanity mirror that might only allow activation if the vehicle were in park. Decorative functions or themes such as a holiday theme of red and green lights could also be incorporated into the peripheral ring lighting.

Additionally, layers in a particular band of a peripheral ring may have non-uniform thickness as needed to attain particular functional or aesthetic effects. This can be seen in FIG. 27, where a band in region B is divided into two portions designated as B1 and B2 and generally having different reflectance and transmittance values. The two regions in zone B can be comparable to stacks of the prior or related art and as described of the novel coatings and structures defined in this patent. The transmittance in the low reflectance and high reflectance zones, in some embodiments, is less than about 5%, preferably less than about 2%, more preferably less than about 0.5% and most preferably less than about 0.25%. This is so that the seal is protected from UV light which can degrade the integrity of the seal, as described above. If, however, it is important to convey visual information through the seal area, the transmittance may be relatively high as described above.

As already mentioned, in a specific embodiment it may be beneficial to have all or part of the multi-band peripheral ring be at least partly transparent in the visible, UV or NIR spectra. For instance, a glare sensor can be positioned behind the ring when a band of region A and/or B has sufficient transmittance in the relevant part of the electromagnetic spectrum and the seal (if present in a particular band) also has the necessary transmittance. Here, teachings of U.S. Pat. Nos. 7,342,707; 7,417,717; 7,663,798 (different means for attaining a transflective coating, including a graded transition) and U.S. patent application Ser. Nos. 11/682,121; 11/713,849; 11/833,701; 12/138,206; 12/154,824; 12/370,909 (transflective stacks, including means to minimize the color difference between multiple zones of a mirror element and to increase durability) can be advantageously utilized. A number of different means may be employed to produce a transflective ring. For instance, a band of a multi-band peripheral ring may comprise a thin metal layer, a semiconductor material such as silicon, or may be composed of a dielectric multilayer stack. Silver or a dielectric multi-layer is most applicable when both relatively high transmittance and reflectance is desired. The semiconductor layer may comprise Silicon or doped silicon. Small amounts of dopants may be added to alter the physical or optical properties of the Silicon to facilitate its use in different embodiments. The benefit of a semiconductor layer is that it enhances the reflectivity with less absorption compared to a metal. Another benefit of many semiconductor materials is that they have a relatively low band gap. This equates to an appreciable amount of absorption at the UV and blue-to-green wavelengths and high transmittance in the amber/red parts of the spectrum is needed for sensors and the like. The preferential absorption of one or more bands of light lends the coating to have relatively pure transmitted color. The high transmitted color purity equates to having certain portions of the visible or near infrared spectra with transmittance values greater than 1.5 times the transmittance of the lower transmitting regions. More preferably the transmittance in the high transmitting region of a multi-band transflective peripheral ring will be more than 2 times the transmittance in the low transmitting region of a multi-band transflective peripheral ring and most preferably more than 4 times the transmittance in the low transmitting region. Alternately or in addition, the transmitted color of a transflective band of a multi-band peripheral ring should have a C* value greater than about 8, preferably greater than about 12 and most prefer ably greater than about 16. Other semiconductor materials that result in transflective coatings with relatively high purity transmitted color include SiGe, InSb, InP, InGa, InAlAs, InAl, InGaAs, HgTe, Ge, GaSb, AlSb, GaAs and AlGaAs. Other semiconductor materials that would be viable would be those that have a band gap energy at or below about 3.5 eV. In an application where stealthy characteristics are desired and a red signal is used then a material such as Ge or an SiGe mixture may be preferred. Ge has a smaller band gap compared to Si and this resulting in relatively low transmittance levels within greater wavelength range, which facilitates the "hiding" of any features behind the mirror. If a uniform transmittance is needed then it would be advantageous to select a semiconductor material that has a relatively high band gap.

Figure 28A:
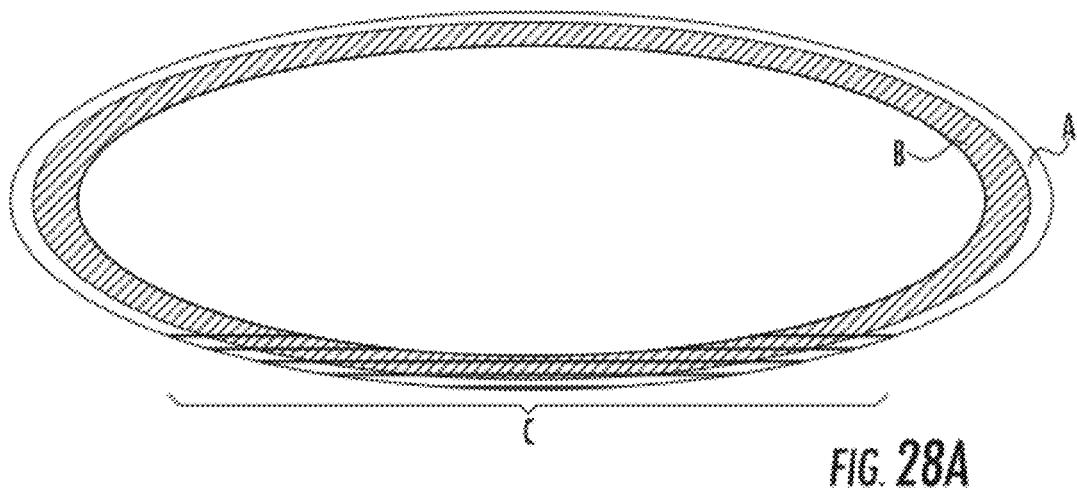
FIG. 28(A, B) illustrate an embodiment of a two-band peripheral ring with a portion that is transflective. A sensor is positioned behind the transflective portion of a two-band peripheral ring.
FIG. 28C illustrates transmission and reflection spectra of one embodiment of a transflective thin-film stack used on a second surface of the mirror system of the invention.
Figure 28B:
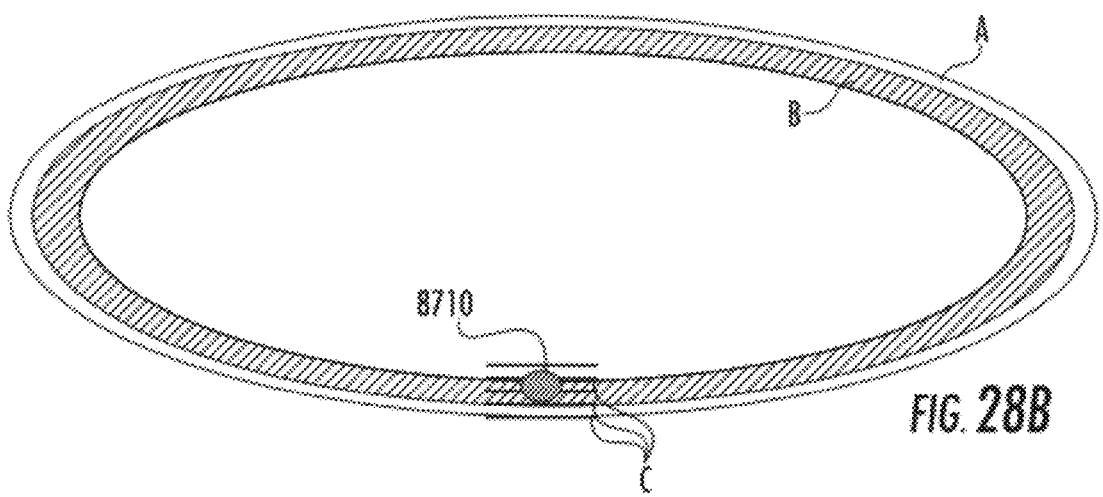
Figure 28C:
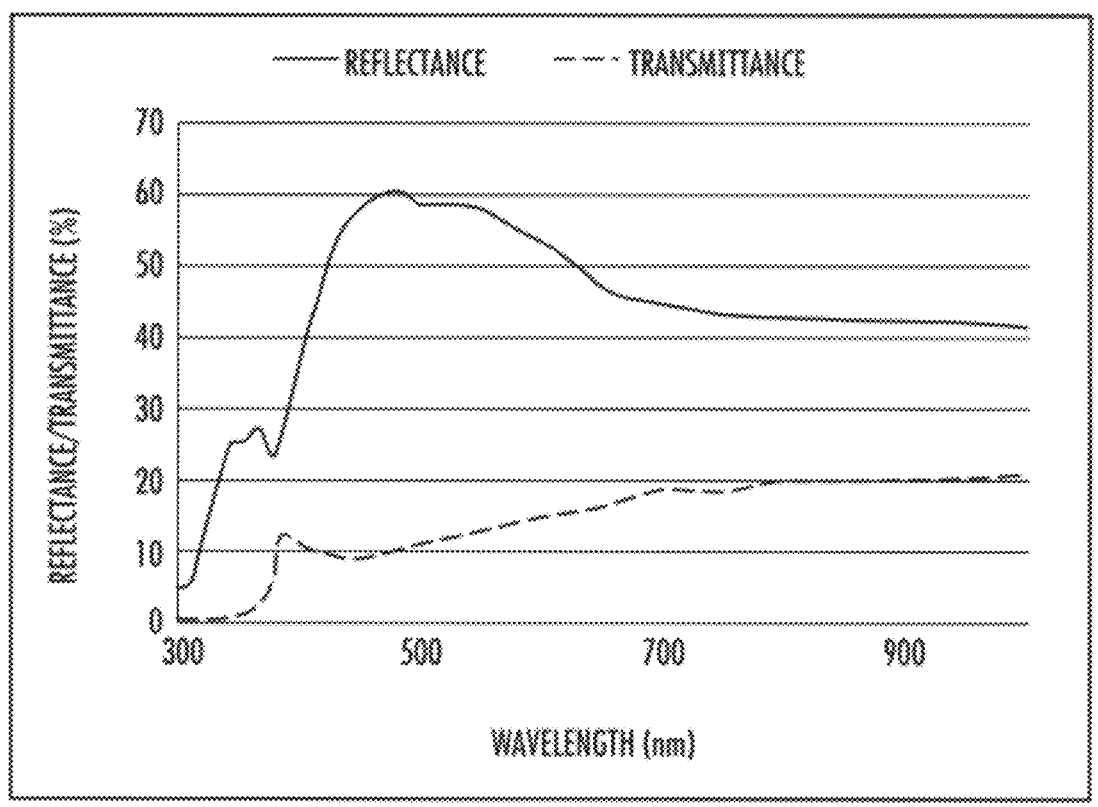

FIG. 28A shows an example where a portion C of a two-band peripheral ring is transflective, while another portion includes the above-described bands A and B. Optionally, the portion of the ring outside of portion C may include a single band A produced with aesthetics produced for a given application. The transflective portion C may cover a part or the entire peripheral ring as needed for a given application. In FIG. 28B, the transflective portion C is relatively small and a sensor 8710 is placed behind it. The sealing element (not shown) may be positioned in the portion C such that it does not block the light from reaching the sensor or, optionally, the seal may be formed by using a clear seal. The transitions between the opaque zone A and the transflective zone C may be formed using means taught in the "Multi-Zone Mirror" application so that there is no discernable line or interface between the two zones. Some examples of transflective thin-film stacks for use with corresponding opaque zone are listed in Table 7. Examples A through I in Table 7 all include a specific embodiment of a transflective surface II perimeter ring stack. Examples A, B, C and G also include an opaque equivalent. In each case, the stack is identified as being on surface II with the glass substrate listed as the first entry. Each subsequent entry represents a layer applied to surface 2 subsequent to the layer listed above it. The opaque versions are designed to match the color and reflectance of the transflective perimeter ring stack as closely as is reasonable for embodiments where it is desirable for only a portion of the perimeter ring to be transflective with the remainder being essentially opaque. The thickness of each layer is shown in nanometers. The transmittance (%), reflectance (%) and color (a*, b*) are also given for each example. In each case other than A, the transition between the transflective stack and the opaque stack can be abrupt, which will yield a reasonably stealthy transition, or the transition can be graded to yield a very stealthy transition. Example A would likely require a graded transition in order to appear stealthy. Both approaches are taught in detail in U.S. 2009/0207513. FIG. 28C shows the reflectance and transmittance of example H. The spectra show low transmittance in the UV portion of the solar spectrum and a relatively high transmittance in the visible spectrum. Preferably the UV transmittance is less than about 15% of the visible transmittance, preferably less than about 10% of the visible transmittance and most preferably less than about 5% of the visible transmittance. It is appreciated that, as applied to any of embodiments of the invention and without the loss of generality, a portion of the peripheral ring can be made transflective by appropriate spatial patterning a peripheral ring layer (i.e., creating areas within the boundaries of the peripheral ring that are devoid of the material of the peripheral ring layer, by analogy with patterning discussed in reference to FIGS. 7A-7E, for example.)

TABLE 7

Examples of surface II transflective thin film stacks, some with matching opaque equivalents.

| Example | Transflective: | | | | | | Opaque: | | | | | |
|---|---|---|---|---|---|---|---|---|---|---|---|---|
| | Layer | nm | % T | % R | a* | b* | Layer | nm | % T | % R | a* | b* |
| A | Glass | | 5.1 | 64.9 | 0.4 | 4.8 | Glass | | 0.8 | 73.2 | −0.4 | 1.8 |
| | Al90/Si10 | 23.5 | | | | | Al90/Si10 | 40.0 | | | | |
| | ITO | 145.0 | | | | | ITO | 145.0 | | | | |
| B | Glass | | 6.5 | 46.2 | −1.8 | −3.8 | Glass | | 0.7 | 57.1 | −1.3 | −2.5 |
| | Cr | 14.0 | | | | | Cr | 35.0 | | | | |
| | ITO | 145.0 | | | | | ITO | 145.0 | | | | |
| C | Glass | | 5.5 | 52.8 | −1.1 | 0.3 | Glass | | 0.5 | 63.7 | −1.0 | 2.7 |
| | Brass | 10.0 | | | | | Brass | 10.0 | | | | |
| | Cr | 13.0 | | | | | Cr | 35.0 | | | | |
| | ITO | 145.0 | | | | | ITO | 145.0 | | | | |
| D | Glass | | 10.1 | 34.0 | 4.5 | −4.6 | | | | | | |
| | Ti | 35.0 | | | | | | | | | | |
| | ITO | 145.0 | | | | | | | | | | |
| E | Glass | | 8.2 | 40.9 | 4.2 | 0.2 | | | | | | |
| | Brass | 5.0 | | | | | | | | | | |
| | Ti | 35.0 | | | | | | | | | | |
| | ITO | 145.0 | | | | | | | | | | |
| F | Glass | | 8.8 | 64.9 | 2.2 | 2.5 | | | | | | |
| | 7X | 25.0 | | | | | | | | | | |
| | Ru | 5.0 | | | | | | | | | | |
| | ITO | 145.0 | | | | | | | | | | |
| G | Glass | | 21.5 | 65.4 | 0.4 | 3.1 | Glass | | 2.0 | 65.7 | 0.7 | 0.0 |
| | ITO | 72.7 | | | | | ITO | 72.7 | | | | |
| | 7X | 14.0 | | | | | 7X | 14.0 | | | | |
| | Ni | 0.0 | | | | | Ni | 30.0 | | | | |
| | 7X | 9.3 | | | | | 7X | 9.3 | | | | |
| H | Glass | | 12.9 | 56.2 | −5.7 | −0.1 | | | | | | |
| | ITO | 115 | | | | | | | | | | |
| | Cr | 5 | | | | | | | | | | |
| | Ru | 5 | | | | | | | | | | |
| | Si | 115 | | | | | | | | | | |
| I | Glass | | 31.4 | 66.2 | −1.7 | 0.6 | | | | | | |
| | TiO2 | 54.5 | | | | | | | | | | |
| | SiO2 | 91.4 | | | | | | | | | | |
| | TiO2 | 54.5 | | | | | | | | | | |
| | SiO2 | 91.4 | | | | | | | | | | |
| | TiO2 | 54.5 | | | | | | | | | | |
| | ITO | 72.1 | | | | | | | | | | |

Figure 29D:
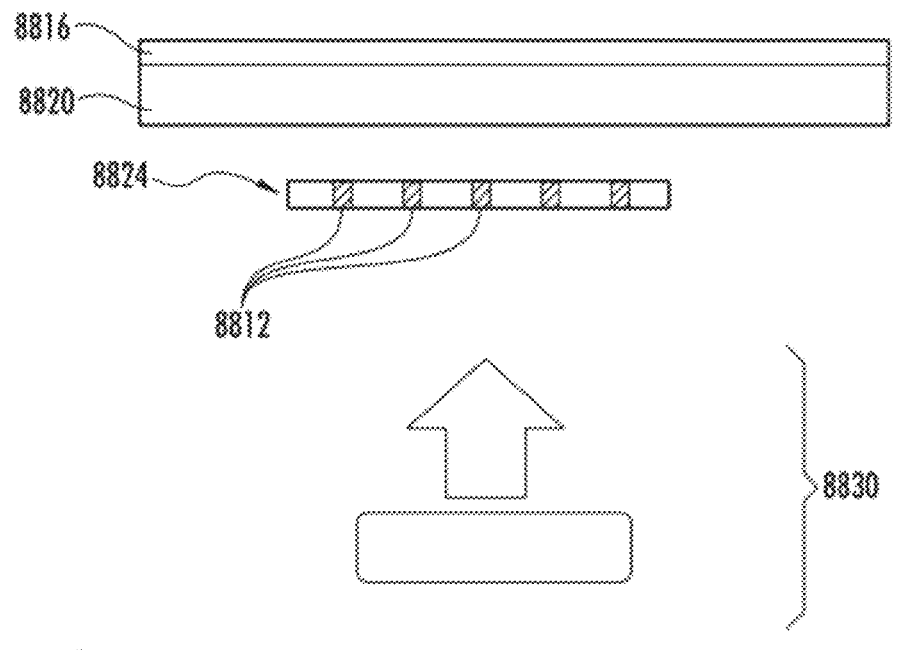
FIGS. 29(A-D) illustrate alternative embodiments and uses of a transflective multi-band peripheral ring of the invention.

In another embodiment of a peripheral ring, as shown in FIG. 29A, a transflective portion C of a two-band (A and C) peripheral ring may include indicia or icons 8810. The indicia may be invisible under normal conditions and only become observable when needed. In other embodiments it may be preferable to have the indicia visible under normal conditions. In yet another embodiment, the indicia may become observable via voice activation, proximity sensors or other sensing means. In the embodiment where the ring is transflective (see FIGS. 29B and 29C, for example), the openings 8812 for indicia or icons 8810 may be formed in a relatively opaque coating 8814 located behind a transflective coating 8816 on one of the surfaces of a corresponding substrate 8820. Alternatively, see FIG. 29D, the openings 8812 for indicia or icons may be present on a separate masking element 8824 located behind the transflective coating 8816 of the peripheral ring and only become visible when the light unit 8830 of the rearview assembly is activated.

Optimization of Thin-Film Stacks for Low-Reflectance (Dark) Peripheral Ring.

The basic block of a thin-film structure (Glass/relatively thick metallic layer 1/dielectric or TCO layer/thin metallic layer 2) for constructing a band of a peripheral ring with desired color/reflectance properties has been discussed above. Reduction of the reflectance figure for a think-film stack of a peripheral ring can be achieved by adding a TCO or dielectric layer under the metallic layer 1, thereby creating a four-layer stack. In the following Tables 8, 9, 10, the additional TCO layer is denoted as "base ITO", the metallic layer 1 is denoted as "#1 Cr", the following dielectric or TCO layer—as "middle ITO", and the upper metallic layer 2—as "top chrome". While the following examples present embodiments of a low-reflectance peripheral ring that employ particular materials (ITO and Chrome), it is understood that these are non-limiting examples and that the use of TCO materials and metals in general for configuring a band of such peripheral ring is within the scope of the present application.

The goal in creating samples 1 through 3 was to form peripheral-ring thin-film coatings having a different low-reflectance values while maintaining a neutral color in reflection. The goal in creating the remaining samples 4 through 7 was to maintain a low level (of about 10 percent) reflectance while varying the reflected color. Since the optical constants of a thin metallic film often deviate from those of a bulk metal, the transmittance value of the metallic layer 1 is provided for reference. Designs of samples 8-15 demonstrate that a low-level reflectance of the peripheral ring (about 7.5 percent) can be attained while varying the color of light reflected off the ring to the FOV in front of the rearview assembly. Maintaining the thickness of the top metallic layer 2 (for example, as shown, at 66%) facilitates minimization of transmittance of the peripheral ring, thereby preserving its operation as a ring concealing the seal/plug of the EC element from exposure to incident ambient light. Reduction of the thickness of the metallic layer 2 ("top chrome") increases the transmittance of the thin-film stack 9 from essentially zero up to 1.8%), as shown in Table 10.

TABLE 9-continued

| Sample # | Base ITO | #1 Cr | Middle ITO | Top Chrome | #1 chrome transmittance | Reflectance | a* | b* |
|---|---|---|---|---|---|---|---|---|
| 14 | 64 | 9.5 | 47 | 66 | 16.9 | 7.5 | 0.8 | −7.8 |
| 15 | 56 | 9.3 | 66 | 66 | 17.4 | 7.5 | 6.6 | −7.7 |

TABLE 10

| Sample # | Base ITO | #1 Cr | Middle ITO | Top Chrome | Transmittance | Reflectance | a* | b* |
|---|---|---|---|---|---|---|---|---|
| 25 | 166 | 19.6 | 142 | 66 | 0.02 | 40.0 | 14.7 | 14.9 |
| 26 | 166 | 19.6 | 142 | 40 | 0.19 | 40.2 | 15.0 | 14.9 |
| 27 | 166 | 19.6 | 142 | 25 | 0.73 | 40.6 | 14.3 | 14.9 |
| 28 | 166 | 19.6 | 142 | 15 | 1.8 | 40.0 | 12.2 | 13.7 |

TABLE 10A

| Sample # | Base ITO | #1 Cr | Middle ITO | Top Chrome | Reflectance | a* | b* |
|---|---|---|---|---|---|---|---|
| 16 | 149 | 13.5 | 10 | 66 | 40.0 | 1.1 | 15.8 |
| 17 | 166 | 19.6 | 142 | 66 | 40.0 | 14.7 | 14.9 |
| 18 | 174 | 27.4 | 139 | 66 | 40.0 | 15.0 | 0.0 |
| 19 | 186 | 38.0 | 123.8 | 66 | 40.0 | 10.7 | −10.0 |
| 20 | 200 | 47.6 | 117.2 | 66 | 40.0 | 0.0 | −13.2 |
| 21 | 120 | 14 | 95 | 66 | 40.0 | −15 | −15.4 |
| 22 | 157.9 | 11.4 | 102.7 | 66 | 40.0 | −15.3 | 0.8 |
| 23 | 123 | 19.0 | 50 | 66 | 40.0 | −9.9 | 14.5 |
| 24 | 40 | 36.0 | 87 | 66 | 40.0 | −1.4 | 1.3 |

Table 10A summarizes thin-film stacks for use in an embodiment of the peripheral ring that ensures reflection of ambient incident daylight light with efficiency of 40% (corresponding the common mirror standards employed in automotive industry) but with different colors. Here, the thickness

TABLE 8

| | Model Results | | | | | | | | Experimental Results | | |
|---|---|---|---|---|---|---|---|---|---|---|---|
| Sample # | Base ITO | #1 Cr | Middle ITO | Top Chrome | #1 chrome transmittance | Reflectance | a* | b* | Reflectance | a* | b* |
| 1 | 67 | 5.4 | 59 | 66 | 30.0 | 4.7 | −0.3 | −0.1 | 4.2 | 0.5 | −2.6 |
| 2 | 56 | 11.5 | 50 | 66 | 13.4 | 10.2 | 2.3 | 0.0 | 13 | 0.4 | 2.1 |
| 3 | 155 | 7.6 | 71 | 66 | 22.0 | 15.0 | 0.0 | 0.0 | 15.1 | −4.5 | 2.4 |
| 4 | 102 | 7.2 | 60 | 66 | 22.9 | 10.0 | 0.0 | −15.0 | 10.3 | −3.8 | −14.5 |
| 5 | 138 | 6.6 | 51 | 66 | 25.0 | 11.2 | 0.0 | 15.0 | 9.5 | −3.6 | 9.4 |
| 6 | 81 | 3.0 | 69 | 66 | 45.6 | 10.0 | 15.0 | −15.0 | 12.6 | 11.7 | −7.9 |
| 7 | 140 | 4.0 | 37 | 66 | 38.0 | 10.6 | 14.0 | 14.0 | 9.3 | 20.3 | −1.9 |

TABLE 9

| Sample # | Base ITO | #1 Cr | Middle ITO | Top Chrome | #1 chrome transmittance | Reflectance | a* | b* |
|---|---|---|---|---|---|---|---|---|
| 8 | 82 | 3.7 | 62 | 66 | 40.0 | 7.5 | 7.5 | 0.0 |
| 9 | 91 | 3.9 | 56 | 66 | 38.5 | 7.5 | 6.1 | 6.0 |
| 10 | 88 | 4.6 | 53 | 66 | 34.1 | 7.5 | 0.0 | 7.5 |
| 11 | 74 | 4.4 | 51 | 66 | 35.1 | 7.5 | −4.4 | 6.9 |
| 12 | 76 | 5.4 | 47 | 66 | 29.9 | 7.5 | −4.8 | 0.1 |
| 13 | 77 | 6.9 | 47 | 66 | 23.9 | 7.5 | −4.1 | −6.7 | of the first chrome layer was increased over the preferred ranges established for the low-reflectance peripheral ring examples discussed above.

In another embodiment, a low-reflectance band of a peripheral ring (which will appear dark to the observe during normal exploitation of the rearview assembly). In a specific implementation, a layer of Chromium employed in the peripheral ring can be doped with oxygen and nitrogen, for example during reactive sputtering of Cr with air. For better stoichiometry of the resulting deposited layer, both $O_2$ and $N_2$ can be introduced as reactive gases under independent control to enable ratios other than the native $O_2/N_2$ ratio of air (~78% $N_2$, ~21% $O_2$). Experimentally-derived data showing a portion of the range of reflectance and colors (glass side) available by reactively sputtering Cr with air is shown in Table 11. Experimentally derived data showing a portion of the range of reflectance and colors (glass side) available reactively sputtering Cr with $O_2$ and $N_2$ is shown in Table 12. The sputtered Cr data in Tables 11 and 12 were obtained from a 5×22 $in^2$ Cr target sputtered at 3 kW (DC) at a standoff distance of ~3 in and 3 passes at a substrate velocity of 24 inches per minute.

In another embodiment, a thin layer of Cr (base layer) was deposited onto the glass substrate, followed by a layer of air-doped Cr (referred to as "black Cr") was deposited onto the base layer (50/40 gas ratio, 3 kW, 2 Passes @24 ipm). A bulk layer of Cr (~630 Å) was then deposited onto the black Cr layer. The glass side reflectance and color of these black Cr stacks are given in Table 13. The base layer and bulk layer materials might be substituted with materials other than Cr to yield the same dark ring effect. Also, the doping of metals other than Cr may also yield similar dark rings.

TABLE 11

Cr reactively sputtered with air.

| Ar/Air (sccm) | Pressure (mTorr) | % Reflectance (glass side) | a* | b* |
|---|---|---|---|---|
| 50/0 | 2.60 | 54.5 | −1.2 | −0.2 |
| 50/10 | 2.65 | 49.3 | −0.6 | 3.0 |
| 50/20 | 2.70 | 41.1 | 0.2 | 4.9 |
| 50/30 | 2.85 | 32.2 | 0.6 | 6.3 |
| 50/40 | 2.90 | 23.4 | 0.3 | 5.1 |

TABLE 12

Cr reactively sputtered with $N_2$/$O_2$ mixtures.

| Ar (sccm) | $N_2$ (sccm) | $O_2$ (sccm) | Pressure (mTorr) | % Reflectance (glass side) | a* | b* |
|---|---|---|---|---|---|---|
| 50 | 32 | 8 | 2.90 | 26.9 | 0 | 3.6 |
| 50 | 32 | 11 | 2.92 | 17.0 | −1.1 | 0.7 |

TABLE 13

Multilayer "black Cr" coatings.

| Ar (sccm) | Air (sccm) | Cr Base Layer (Å) | Pressure (mTorr) | % Reflectance (glass side) | a* | b* |
|---|---|---|---|---|---|---|
| 50 | 40 | 25 | 2.90 | 25.2 | −0.5 | 2.8 |
| 50 | 40 | 12 | 2.90 | 21.7 | −0.2 | 4.3 |
| 50 | 40 | 8 | 2.90 | 21.5 | −0.4 | 4.0 |

Yet in another embodiment, Cr layer may be doped with carbon. The doping can be obtained through reactive sputtering in a similar manner to that described above. Cr can be sputtered with argon and a carbon source such as acetylene can be introduced as a reactive gas. The doping of the Cr layer can also be accomplished through ion-assisted deposition in which case the carbon will be provided via the ion source. In yet another method, a thin layer of Cr might be deposited and then implanted with carbon from an ion source. The thickness of the Cr layer would be limited by the energy of the implanting ion source due to the relationship between ion energy and implantation depth. Bulk Cr might then be deposited onto the carbon implanted Cr layer to make it opaque. As was described for the $O_2$/$N_2$ doped Cr, a thin base layer of Cr, or another adhesion or optical layer, might be deposited prior to the carbon doped layer and then that bilayer coating might be over-coated with an optically dense layer, such as Cr.

Shaping the Peripheral Ring.

Figure 61A:
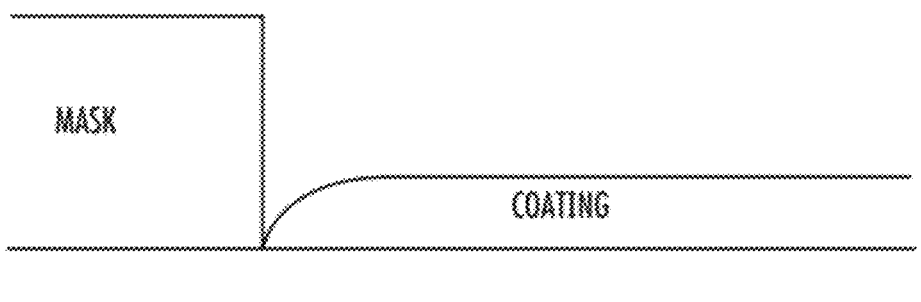
FIGS. 61(A-D) illustrate schematically process of shaping an edge of a peripheral ring with laser ablation.
Figure 61B:

When physical masking is employed during physical vapor deposition step of EC-element fabrication (such as, for example, sputtering of a peripheral ring), the deposited material layer is often caused to be non-uniform and have thickness that decreases towards the edge of mask, as schematically shown in FIG. 61A, due to shadowing effects of the mask edge. In some peripheral rings this effect can lead to an observable artifact such as a dark or fuzzy edge or even a color shift at the edge of the coating attributed to the thickness change. To remove this unwanted artifact, embodiments of the present invention employ the combination of physical masking with laser ablation. Physical masking can have the advantage of speed and simplicity for patterning larger features of an EC-element. Laser ablation generally uses a laser beam focused into a very small spot and scanned (rastered) across an element being ablated. The time required for ablating large features can negatively impact the cycle time of a fabrication process. Nevertheless, these two methods are synergistic and can be gainfully combined. Physically masking off a portion of the area of interest during deposition can greatly reduce the area that must be later laser ablated thereby improving cycle time. If, however, long fabrication cycle time is acceptable or if high-power lasers or multiple lasers to be employed in fabrication are readily available, the entire surface of the underlying substrate may be coated (with the peripheral ring materials or coatings) and then removed from the viewing (central) portion of the substrate through laser ablation. This approach has an advantage in that it does not require, whatsoever, hard tooling or masking associated with the patterned deposition process. This version of the manufacturing process may be easily adapted to accommodate more than one product shape with simple software modifications, thereby reducing downtime and ancillary manufacturing costs associated with maintaining the hard tooling and masking.

Figure 61C:
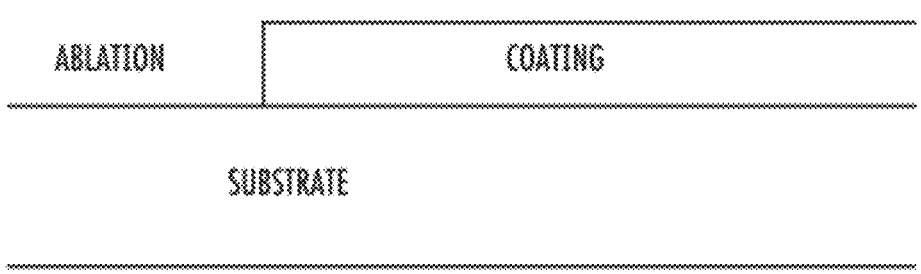
Figure 61D:
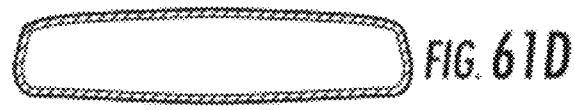

In one embodiment, a band of a peripheral ring of an EC-element can be fabricated by first employing a physical mask to create a crudely shaped open area (FIG. 61B) in the central portion of the substrate element, and then refining the crude shape of the formed peripheral ring with laser ablation to yield the peripheral ring shaped according to the design and having sharp edges (FIG. 61C, 61D). One advantage of this approach is that the roughly-shaped thin-film pattern (FIG. 61B) formed by physical masking can be designed in such a way that several different finely-shaped patterns (similar to that shown in FIG. 61D) can be obtained by laser ablation from the initial rough shape. This allows to reduce the number of physical masks that have to be machined in order produce several different final peripheral ring shapes. Another advantage of the combined manufacturing approach is that the visual edge quality of the chrome ring may be improved by the laser ablation finishing of the edges. For example, the outer circumference of the peripheral ring of FIG. 61D can be formed by laser ablation or by cutting of the substrate. In another example, the rough mask might be an under-sized copy of the intended final shape so that the laser ablation step of manufacturing process serves only to remove a small amount of material in order to clean the edge of the ring and improve its appearance. Spatially slow changes of a thickness of a peripheral ring may affect its appearance. Assuming that a transitional region corresponds to a distance along which the thickness of the peripheral ring material changes from about 90% of the maximum thickness to below 10% of the maximum thickness, such transitional region should be less than about 1 mm, preferably less than about 0.5 mm, and more preferably less than about 0.25 mm. In one implementation, the peripheral ring is terminated abruptly, without any transitional thickness region. Accordingly, embodiments of the inventions are configured to ensure that a peripheral ring is terminated at a rate of change of thickness of the peripheral ring with distance, across the ring, of (the maximum thickness of the ring per mm), preferably at a rate greater than 2*(maximum thickness of the ring per mm), more preferably greater than 4*(maximum thickness of the ring per mm) and most preferably greater than about 100*(maximum thickness of the ring per mm)

The laser-ablation based method of removal of the unwanted portion of the thin-film coating to yield the intended shape is easily applied to an EC-element a peripheral ring of which includes a "metal under TCO" combination as described above. For example, the TCO is deposited onto the substrate before the metallic layer(s) of the peripheral ring. Laser ablation of the metallic layer(s) or other layers of the peripheral ring with the use of a typical marking laser is likely to partially remove or damage the TCO layer. Such damage may adversely impact the performance of the EC-element due to shorts or contaminants on the transparent electrode of the EC-element. In this instance, the use of a specialized, pico-second or other rapidly pulsed laser is preferable. For example, it was shown that a Trumpf sourced, green, pico-second laser is capable of removing the metallic layer of the peripheral ring without damaging the underlying TCO layer. The pulsed laser beam was directed through the glass and through the TCO layer prior to impinging upon the metallic layer. The laser beam does not interact with the glass or TCO since either is transparent in the green (~500 nm) portion of the optical spectrum. In addition, energy pulses are delivered to the metallic coating on a short enough time scale, and there is not enough time for significant energy to propagate into the layers adjacent to the layer being ablated before the pulse is over. This enables the removal of the layer(s) of the peripheral ring from the surface of the TCO without significant damage to the TCO.

Figure 62:
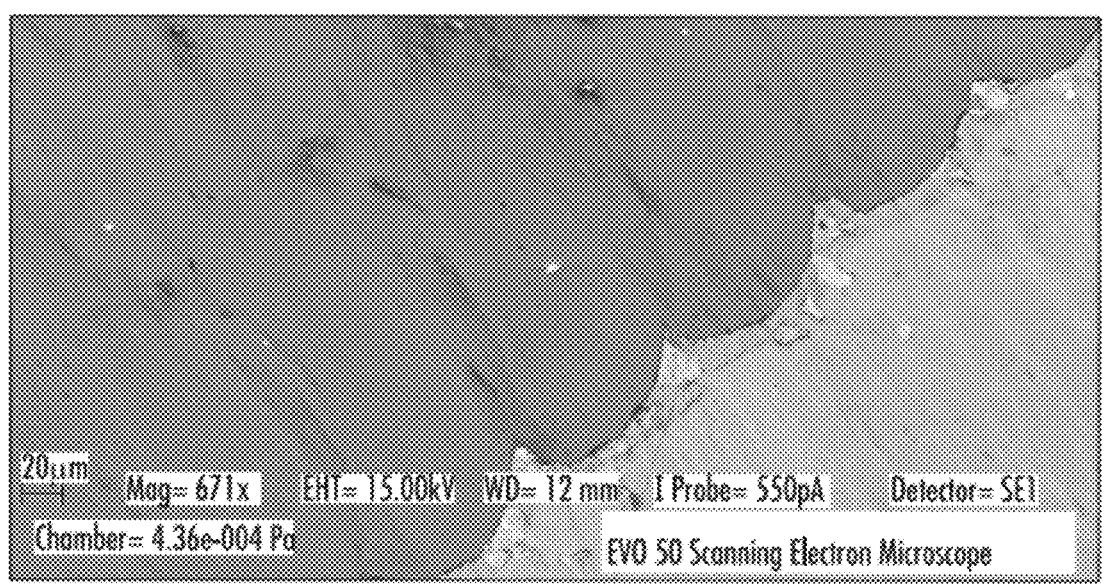
FIG. 62 shows an SEM image of a laser-ablated edge of a peripheral ring.

FIG. 62 shows an SEM image of the edge of a multilayer metal coating that was removed from the surface of an ITO layer without damaging the ITO. The ITO in the ablated area was analyzed by spectroscopic ellipsometry and compared to a control ITO layer that has not been overcoated with a metallic layer and not subjected to laser ablation. The refractive index of a TCO material (such as ITO) relates to the electrical conductivity of the TCO. The ellipsometry analysis showed the two ITO layers to be equivalent. Sheet resistance measurements of the two ITO layers were also equivalent. Any residue of the peripheral ring material left on a surface (a substrate surface, or a surface of the layer underlying the layer being ablated) may cause effects potentially impeding the operation of an electrooptic (EO) or EC assembly or may affect the aesthetics of the assembly. In order to minimize these potential effects, it is desired that a surface that has been laser-treated has the following characteristics. Preferably, after laser ablation, the haze (or correlated haze, or light scattered off from the resultant surface) is less than about 1% (of reflected or transmitted light, depending on the measurement), preferably less than about 0.5%, more preferably less than about 0.25% and most preferably less than about 0.10%. Alternatively or in addition, the residue of the peripheral ring material on a substrate or a TCO surface should cover cumulatively less than about 2% of the ablated area, more preferably less than about 1%, even more preferably less than about 0.5% and most preferably less than about 0.25% of the ablated area. As described in Our Prior applications, compensation of excessive absorption in the transparent electrode (on surface II of the EC cell) may require increased quantities of precious metal(s) for formation of a reflective layer in the reflective electrode (on surface III of the EC cell) to compensate for losses due to absorption. Accordingly, the absorption in the substrate or TCO-coated substrate after the peripheral ring material has been laser ablated should be minimized. Preferably, the absorption of the TCO coated substrate should be less than about 10%, more preferably less than about 5%, more preferably less than about 2.5% and most preferably less than about 2%. Alternatively, the effect of any damage or residue may be quantified in terms of increases in absorption relative to the raw, uncoated substrate. Using these terms, the increase in absorption should be less than about 10%, preferably less than about 4% and most preferably less than about 1%.

In carrying out the ablation of a metallic coating on a glass substrate, it was observed that the results were dependent on whether the laser beam was delivered to the coating directly or through the glass substrate. In the former case, there usually remained metal residue on the glass which, in the case of an actual EC-element, can cause optical absorption and/or scattering, as discussed above. In the latter case, however, the ablated surface was significantly cleaner with no visible residue by optical microscopy. (Under these conditions, however, some damage to the surface of the glass could be produced on a size scale observable under optical microscopy and visible to the eye as subtle haze. In practice, the optimization of the laser power, frequency and motion velocity enabled minimization of the surface damage to the glass to a degree that did not result in a perceptible level of visible haze in the final assembly.)

Adaptability of the Perimeter Portion of the Ec-Based Mirror Element to Glare Reduction The problem of glare, arising when driving at night, is well recognized in the field of vehicular rearview assemblies. This problem has been substantially addressed with respect to the portion of the assembly, the optical properties of which are controllable and where an EC-element is caused to reduce its effective reflectance value, perceivable from the front, in response to a signal from the glare sensor. However, a peripheral region of the EC-element-based mirror that is associated with a peripheral ring of the EC element is passive and, therefore, not operable to change its optical characteristics. As a result, industry and related art give no credence to and are practically silent about attempting to use the passive peripheral (perimeter) portion of the EC-element-based mirror element in addressing the problem of glare. We have discovered, however, that optimization of response of the EC-element-based rearview mirror assembly to lighting conditions over the whole clear aperture of the EC-element can be achieved by specifically configuring the peripheral ring of the EC-element. According to embodiments of the invention, the glared caused by light reflection from the perimeter portion of the EC-element-based vehicular mirror is optimized by configuring the thin-film stack of the peripheral ring such as to achieve a compromise in optical characteristics of the peripheral ring under both the photopic and scotopic lighting conditions.

Photopic vision is generally understood as human vision in daylight, well-lit conditions (luminance levels of about 1 to about $10^{-6}$ cd/m$^2$), that is defined primarily by on the function of the retinal cone receptor cells. In comparison, scotopic vision is vision in low illumination occurring at luminance levels of about $10^{-2}$ to about $10^{-6}$ cd/m$^2$ and defined primarily by the function of the retinal rod receptor cells. The photopic visual response curve has a peak at about 55 nm or so, while the scotopic visual response curve is spectrally shifted, with respect to the photopic curve, towards the shorter wavelengths by about 50 nm. Human vision in transitional, intermediate lighting conditions is known as mesopic vision and is effectively a combination of scotopic and photopic vision. Visual acuity and color discrimination of the human vision under mesopic illumination conditions is known to be rather inaccurate. Typical scotopic and photopic spectral responses of a human eye are well known and are not discussed in this application.

Owing, in part, to temporal asymmetry of the rate of accommodation of the eye to changing illumination conditions, a glare-reduction benefit that a particular passive reflector is thought to provide under low-illumination conditions can be substantially nullified by the change of illumination when the headlights of the following car strike the rearview mirror. While counterintuitive and surprising, this effect is rather straightforward to rationalize. Indeed, accommodation of the eye to change of lighting conditions is asymmetric: it takes minutes to transition from high to low levels of illumination, while accommodation in reverse takes significantly shorter time. If a passive reflector (such as, for example, the annular peripheral ring corresponding to the perimeter portion of the EC-element) is designed to assure low levels of reflectance (i.e., a reduced glare) under low illumination conditions (i.e., as perceived by an eye that has adapted to scotopic vision), the abrupt change of the eye's vision from scotopic to photopic may result in perceiving the levels of light reflectance from the passive reflector as being excessively high, thus actually worsening the perceived glare in comparison with that for which the reflector has been designed. In other words, the passive reflector designed to ensure low reflectance levels as perceived by the scotopically-adjusted eye, may produce prohibitively excessive reflectance as perceived by an eye in a photopic mode. It is appreciated that such effect also depends, in part, on the spectral content of incident light and, therefore, depends on the type of the light source used in the headlights of a vehicle producing the glare in the rearview mirror at hand.

Figure 64A:
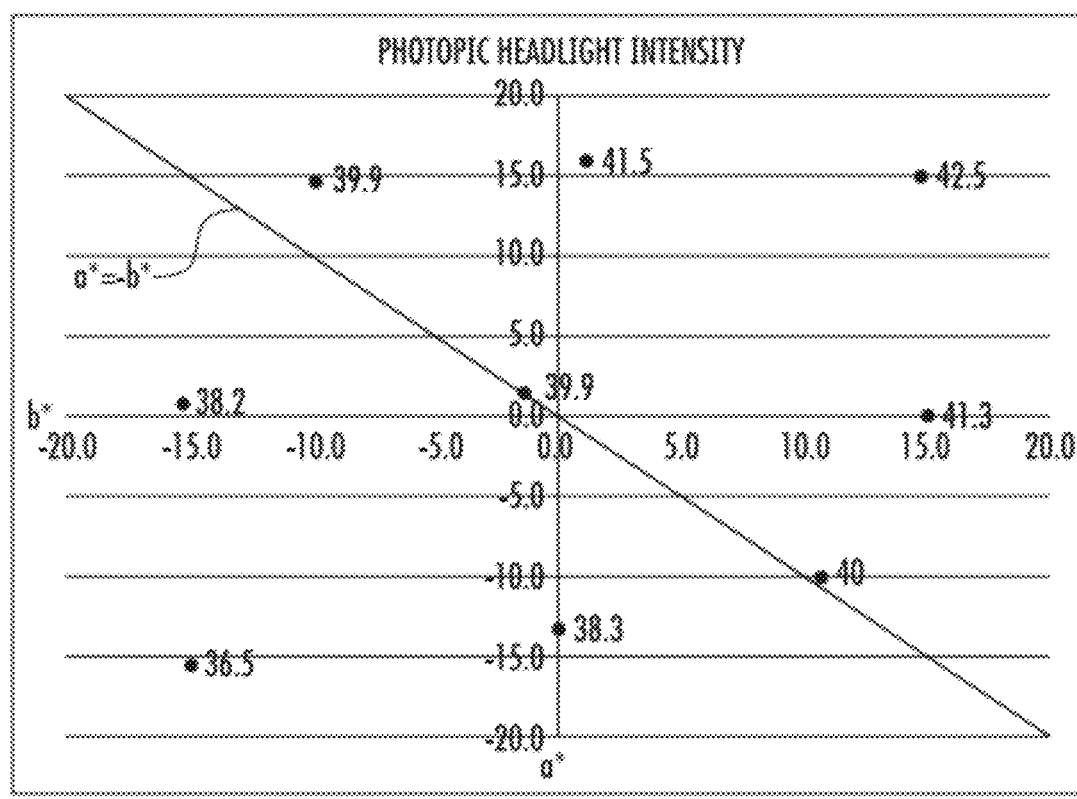
FIGS. 64(A,B) illustrate thin-film structures for use in an embodiment of the peripheral ring of the EC-element of the vehicular rearview assembly that are optimized for photopically adjusted and scotopically adjusted vision of the user, respectively.
Figure 64B:
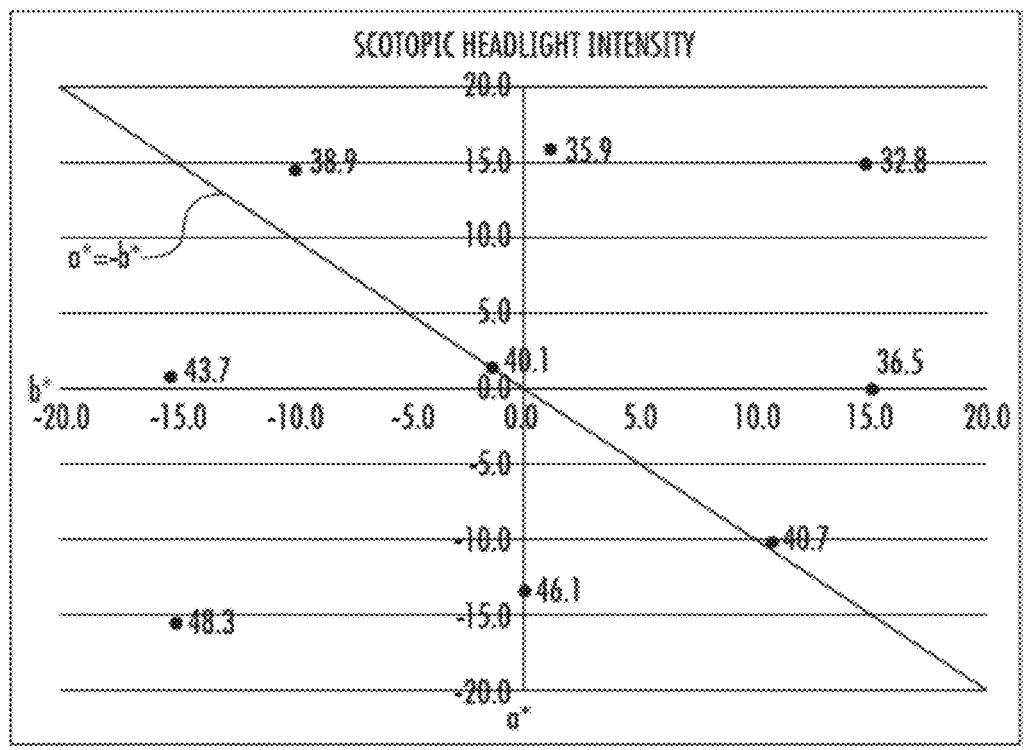

Table 13A summarizes the integrated reflectance values (Y) describing the optical performance of the thin-film coating samples listed in Table 10A for the two modes of vision, photopic and scotopic, and under illumination produced by different light sources. The design of every listed coating sample was optimized to achieve a 40% reflectance value under illumination typical for daylight conditions (D65 standard illuminant) as perceived by a 10-degree observer. The plurality of light sources considered includes, in addition to the D65 standard illuminant, the standard illuminant A (corresponding to incandescent headlights), the HID light source (standard high-intensity discharge headlights), and standard LED headlights. Because spectral contents of light produced by these light sources differ, the corresponding integrated reflectance values vary as well. The presented averaged, over the types of light sources, reflectance values attend to the fact that under actual driving conditions the driver is likely to be exposed to light from every type of the headlights. FIGS. 64A and 64B show how the averaged reflectance levels vary as a function of color of the reflected light (expressed in CIELAB terms of L*, a*, and b*) and, in reference to FIGS. 64A, 64B, conclusions about the optimal structure of the EC-element based vehicular rearview reflector can be made.

TABLE 13A

Headlight Effects

| | Photopic 10 Degree | | | | Scotopic | | | | Photopic | Scotopic |
|---|---|---|---|---|---|---|---|---|---|---|
| Sample # | D65 | A | HID | LED | D65 | A | HID | LED | Average* | Average* |
| 16 | 40.0 | 41.7 | 41.6 | 41.1 | 34.5 | 36.6 | 36.2 | 34.9 | 41.5 | 35.9 |
| 17 | 40.0 | 43.7 | 42.5 | 41.4 | 31.1 | 32.9 | 33.0 | 32.5 | 42.5 | 32.8 |
| 18 | 40.0 | 42.3 | 41.1 | 40.5 | 36.0 | 36.0 | 36.4 | 37.1 | 41.3 | 36.5 |
| 19 | 40.0 | 40.6 | 39.7 | 39.6 | 41.6 | 39.9 | 40.5 | 41.7 | 40.0 | 40.7 |
| 20 | 40.0 | 38.5 | 38.0 | 38.5 | 46.2 | 43.9 | 49.0 | 45.4 | 38.3 | 46.1 |
| 21 | 40.0 | 35.5 | 36.4 | 37.5 | 51.0 | 48.0 | 48.0 | 49.0 | 36.5 | 48.3 |
| 22 | 40.0 | 37.5 | 38.3 | 38.9 | 44.5 | 44.3 | 43.9 | 43.0 | 38.2 | 43.7 |
| 23 | 40.0 | 39.7 | 40.1 | 40.0 | 38.3 | 39.8 | 39.0 | 37.8 | 39.9 | 38.9 |
| 24 | 40 | 39.9 | 39.9 | 39.9 | 40.2 | 40.2 | 40.1 | 40 | 39.9 | 40.1 |

*No Daylight (D65) Conditions factored into Average

For example, during the scotopic illumination conditions (after the dusk and during nigh-time), the EC-part of the rearview mirror quickly reduces its reflectance in response to the bright headlights and prevents the driver's eye from shifting its sensitivity to the photopic mode. The low levels of reflectance (between approximately 35% and 60%, preferably between 35% and 55%, and more preferably between 35% and 50%) that are required to result from the operation of the rearview mirror as a whole (i.e., a combination of the scotopically-optimized peripheral ring and the EC-element) in low illumination conditions dictate, in reference to FIG. 64B, such a structure of the scotopically-optimized peripheral ring that ensures the color of reflected light to have a*>0 and b*>0. In a specific embodiment, the scotopically-optimized peripheral ring should be configured to ensure that reflected light has a* and b* value that lie above the line a*=−b* on the color-map of FIG. 64B.

On the other hand, and in further reference to FIGS. 64A and 64B, during the operation under high-level illumination (bright day light), the peripheral ring the structure of which is optimized for scotopic vision will produce higher levels of reflection than the peripheral ring the structure of which is optimized for photopic vision. In a photopic-vision environment, therefore, it is preferred to configure the rearview assembly such as to equip the EC-element with a peripheral ring reflecting the incident light at the specific levels of reflectance listed above and with the spectral content described by the negative values of a* and b*. In a specific embodiment, the EC-element-based rearview assembly optimized for operation under daylight conditions should have a peripheral ring that, in reflection, produces light the spectral characteristics of which correspond to the portion of the color-map of FIG. 64A that lies below the line a*=−b*.

Figure 65:
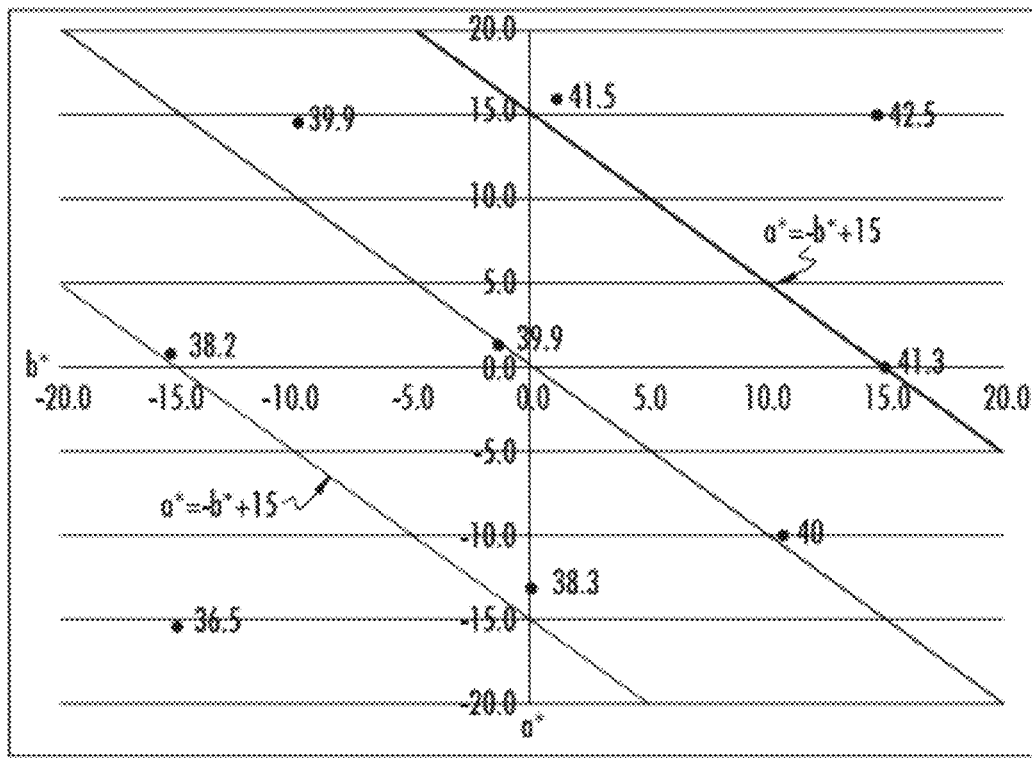
FIG. 65 illustrates the thin-films structures for use in an embodiment of the peripheral ring of the EC-element of the vehicular rearview assembly that are optimized for both photopically and scotopically adjusted vision of the user.

A practical design of the peripheral ring thin-film coating, from the glare reduction point of view, should ensure, therefore, that the reflectance of the peripheral ring portion of the EC-element-based mirror perceived by either the scotopically- or photopically-adapted eyes remains within the specified limits. FIG. 65 shows preferred color characteristics of light reflected by such practical thin-film structure. It is preferred that the thin-film structure of the peripheral ring is configured to reflect light with efficiencies of (between approximately 35% and 60%, preferably between 35% and 55%, and more preferably between 35% and 50%) and color described by a* and b* values corresponding to the portion of the color-map of FIG. 65 defined between the limits a*=−b*+15 and a*=−b*−15.

In embodiments employing indicia and/or conductive pads for elements of the UI of the assembly such as capacitive switches, the reduction of glare produced by the peripheral ring region when the mirror element is darkened may become rather involved. In reference to FIGS. 46 (D-J), for example, a portion of the peripheral ring 10304 that extends along the perimeter of the mirror element may be concealed behind the rounded edge of the first substrate (as discussed elsewhere in this application). At the same time, a lower portion of the peripheral ring 10304 extending, as viewed from the front of the assembly, above the virtual buttons 10314 lacks such visual protection and produces glare. In one embodiment where the layer carrying indicia for the virtual buttons is associated with the first surface, such glare is be reduced and mitigated by extending the layer carrying the indicia over the lower portion of the peripheral ring (not shown). In an embodiment where the layer carrying the indicia for the virtual buttons is associated with the second surface, the lower portion of the peripheral ring optionally includes a material that reduces the visibility of the ring or makes it appear to be dark, as discussed elsewhere in this application.

Optimization of Choice of Materials for Reflectance Enhancement.

Earlier in this application described was a means of increasing the reflectance of a portion of the peripheral ring with the use of high reflectance (HR) metallic layers by disposing them directly on a TCO, dielectric or another other layer, directly on glass substrate, or an optional adhesion-enhancement layer that may be present on the glass surface. The high reflectance metals appropriate for such a purpose are defined based on their bulk reflectance properties and, to a large extent, their intrinsic color. Preferably the high reflectance metal should have a neutral color so that ambient light reflected from the resulting peripheral ring substantially matches in color the light reflected from the central portion of the mirror element. Table 14 below illustrates the reflectance values characterizing various metallic 3 nm-thick layers deposited on and viewed through the glass substrate and comparisons of these reflectance values and color of reflected ambient light with that of the glass substrate itself.

TABLE 14

| Material | Reflectance | a* | b* | Delta R | Delta a* | Delta b* |
|---|---|---|---|---|---|---|
| glass | 7.9 | −0.2 | −0.6 | | | |
| 3 nm cobalt | 5.8 | −0.1 | 0.0 | −2.2 | 0.1 | 0.6 |
| 3 nm chrome | 6.3 | −2.0 | −2.3 | −1.7 | −1.8 | −1.7 |
| 3 nm iridium | 6.7 | −0.9 | 0.7 | −1.3 | −0.8 | 1.2 |
| 3 nm Mo | 5.4 | −2.9 | −1.2 | −2.6 | −2.7 | −0.7 |
| 3 nm Ag with 7% Au | 11.0 | 1.3 | 4.1 | 3.1 | 1.5 | 4.6 |
| 3 nm Au | 7.8 | 0.8 | 9.2 | −0.2 | 0.9 | 9.8 |
| 3 nm Cd | 8.5 | −0.5 | −0.4 | 0.5 | −0.3 | 0.2 |
| Cu 3 nm | 6.9 | 5.1 | 3.7 | −1.1 | 5.3 | 4.3 |
| 3 n 5050 SnCu | 6.7 | −0.1 | 0.6 | −1.2 | 0.0 | 1.2 |
| 3 nm 5050 CuZn | 7.5 | 1.0 | 4.7 | −0.4 | 1.2 | 5.3 |

TABLE 14-continued

| Material | Reflectance | a* | b* | Delta R | Delta a* | Delta b* |
|---|---|---|---|---|---|---|
| 3 nm Nb | 4.2 | −0.1 | −1.3 | −3.7 | 0.1 | −0.7 |
| 3 nm Pd | 6.5 | 0.3 | 0.6 | −1.4 | 0.5 | 1.1 |
| 3 nm Ru | 10.5 | 0.4 | −0.1 | 2.5 | 0.6 | 0.4 |
| 3 nm Pt | 5.5 | 0.2 | 0.5 | −2.4 | 0.3 | 1.0 |
| 3 nm Rhenium | 5.8 | −1.5 | −4.7 | −2.2 | −1.3 | −4.1 |
| 3 nm Rh | 7.7 | 0.7 | 0.3 | −0.3 | 0.9 | 0.9 |
| 3 nm Ta | 5.1 | −0.2 | −0.2 | −2.9 | 0.0 | 0.4 |
| 3 nm Ag | 10.3 | 1.2 | 3.7 | 2.4 | 1.4 | 4.3 |
| 3 nm Al | 19.9 | 0.2 | 3.5 | 11.9 | 0.4 | 4.0 |

Table 15 illustrates values of real and imaginary parts of the refractive indices at 550 nm for various metals.

TABLE 15

| Metal | n @550 nm | K @550 nm |
|---|---|---|
| Ag | 0.136 | 3.485 |
| AgAu7x | 0.141 | 3.714 |
| Al | 0.833 | 6.033 |
| Al:Si 60:40 | 3.134 | 4.485 |
| Al:Si 90:10 | 1.244 | 4.938 |
| Al:Ti 50:50 | 2.542 | 2.957 |
| Al:ti 70:30 | 2.885 | 3.392 |
| Au | 0.359 | 2.691 |
| Cd | 1.041 | 4.062 |
| Co | 2.053 | 3.826 |
| Cr | 2.956 | 4.281 |
| Cu | 0.958 | 2.577 |
| CuSn | 1.871 | 4.133 |
| CuZn | 0.587 | 2.854 |
| Ge | 3.950 | 1.975 |
| Ir | 2.229 | 4.314 |
| Mo | 3.777 | 3.521 |
| Nb | 2.929 | 2.871 |
| Ne | 1.772 | 3.252 |
| Pd | 1.650 | 3.847 |
| Pt | 2.131 | 3.715 |
| Re | 4.253 | 3.057 |
| Rh | 2.079 | 4.542 |
| Ru | 3.288 | 5.458 |
| Ta | 3.544 | 3.487 |
| Ti | 1.887 | 2.608 |
| V | 3.680 | 3.019 |
| W | 3.654 | 3.711 |
| Zn | 1.117 | 4.311 |
| Zr | 1.820 | 0.953 |

It is known by one skilled in the art that refractive index of a given metal and dispersion of refractive index are dependent on the process and deposition parameters used to produce the coating and that a deposition processes can be optimized to slightly modify optical constants of a particular metal. The difference between material properties of thin metallic films as compared to bulk (or thick film) metals has limited the use of metals, at least in applications related to automotive rearview mirror assemblies, to substantially thick metallic layers where the optical properties are more predictable and consistent with the "bulk"-metal behavior. The data of Table 14 suggest that, generally, metals would not be optimal materials for increasing the reflectance of other metals or, if such a possibility exists, then at least the increase in reflectance may not be accompanied with a neutrality of color. As a result, the use of thin metallic film for reflectance-enhancement of multi-layer stacks has been substantially limited.

The following describes an attempt to formulate a generalized approach of determining which metals can be reliably used for enhancing the reflectance of a simple structure comprising a chosen metallic material (referred to hereinafter as a base metal) carried by a thick glass superstrate that acts as incident medium. In particular, such reflectance-enhancing (RE) metallic layers are considered to be disposed on a second surface of the thick glass superstrate and the base metal. The change in reflectance is being considered in light incident onto the metallic layers through the glass superstrate and reflected back to the first surface. The generalized approach is determined based on considering the relationships, between the real and imaginary parts of refractive indices for several base metals and several 3 nm thick RE-metallic layers, that allow for increase in reflectance at issue. The D65 Illuminant and 10 degree observer color standards were used for all calculations.

Example 1

Environmentally stable and low-cost Chromium is used as the base metal. A thin film program was used to calculate the resultant color and reflectance of light for the different 3 nm-thick RE-metallic layers. The results are summarized in Table 16.

TABLE 16

| Structure | Reflectance | a* | b* |
|---|---|---|---|
| Reference (Glass + chrome base layer) | 52.3 | −1.9 | −0.7 |
| Reference + RE-layer made of . . . | | | |
| cobalt | 54.3 | −1.6 | 0.5 |
| chrome | 52.3 | −1.9 | −0.7 |
| iridium | 54.8 | −1.8 | 0.6 |
| Mo | 50.1 | −1.4 | 1.5 |
| Ag with 7% Au | 57.4 | −1.7 | −0.3 |
| Au | 54.7 | −2.1 | 2.1 |
| Cd | 56.7 | −1.7 | −0.6 |
| Cu | 54.4 | −1.3 | 0.3 |
| SnCu 5050 | 55.2 | −1.7 | 0.2 |
| CuZn 5050 | 55.0 | −1.7 | 0.9 |
| Nb | 50.9 | −1.4 | 1.4 |
| Pd | 55.2 | −1.6 | 0.3 |
| Ru | 54.9 | −1.6 | 0.2 |
| Pt | 53.9 | −1.6 | 0.8 |
| Rhenium | 47.6 | −1.2 | 4.3 |
| Rh | 55.7 | −1.4 | 0.4 |
| Ta | 50.2 | −1.6 | 2.1 |
| Ag | 56.9 | −1.7 | −0.2 |
| Al | 62.2 | −1.5 | −0.9 |
| Al:Si 60:40 | 53.2 | −1.6 | 0.3 |
| Al:Si 90:10 | 58.3 | −1.7 | −0.3 |
| Al:Ti 50:50 | 51.8 | −1.7 | 0.9 |
| Al:Ti 70:30 | 51.7 | −1.6 | 1.3 |
| Ge | 47.4 | −1.9 | −1.1 |
| Ni | 53.8 | −1.7 | 0.8 |
| Ti | 52.7 | −1.8 | 0.4 |
| W | 49.2 | −1.7 | 3.1 |
| V | 49.4 | −0.7 | 0.8 |
| Zn | 56.7 | −3.1 | −1.1 |
| Zr | 51.7 | −1.9 | −0.7 |

Figure 30A:
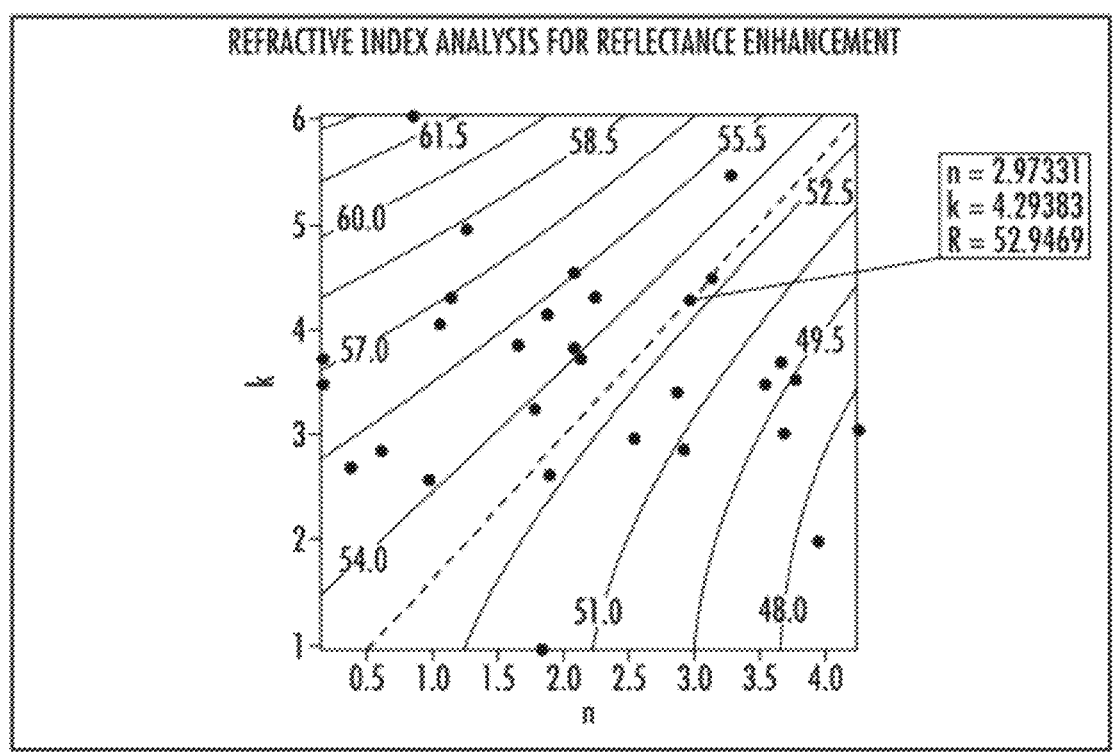
FIG. 30(A-C) show variations in reflectance values as functions of real and imaginary parts of refractive index of a metal layer used for reflectance-enhancement in three corresponding embodiments of the invention.

FIG. 30A graphically shows a corresponding change in reflectance of the considered structures of Table 16 with n (real part of the index of the RE-metal, x-axis) and k (imaginary part of the index of RE-metal, y-axis). The dots on the graph represent the reflectance values for the different RE-metals. The contour lines represent contours of iso-reflectance. The dashed line represents a contour approximately describing the reference structure of Table 16. The use of metals having n and k values falling to the right of the dashed reference line as RE-metals leads to decrease of the reflectance value of the structure, while the use of metals with n and k values falling to the left of the dashed reference line leads to the overall increase in reflectance. Based on the dashed reference iso-contour, the condition on RE-metals assuring the increase in reflectance of the reference structure of Table 16 is $k-1.33n \geq 0.33$. It is understood that when a metal satisfying the above equation is used as a RE-layer added to the reference structure, the increase of the RE-layer thickness above 3 nm will only further increase the overall reflectance. Generally, therefore, the thickness of the RE-metallic layer should be greater than about 1 nm, preferably greater than about 3 nm, more preferably greater than about 5 nm and most preferably greater than about 10 nm. As noted above there may be other layers between the reflectance enhancement layer and the substrate.

Figure 30B:
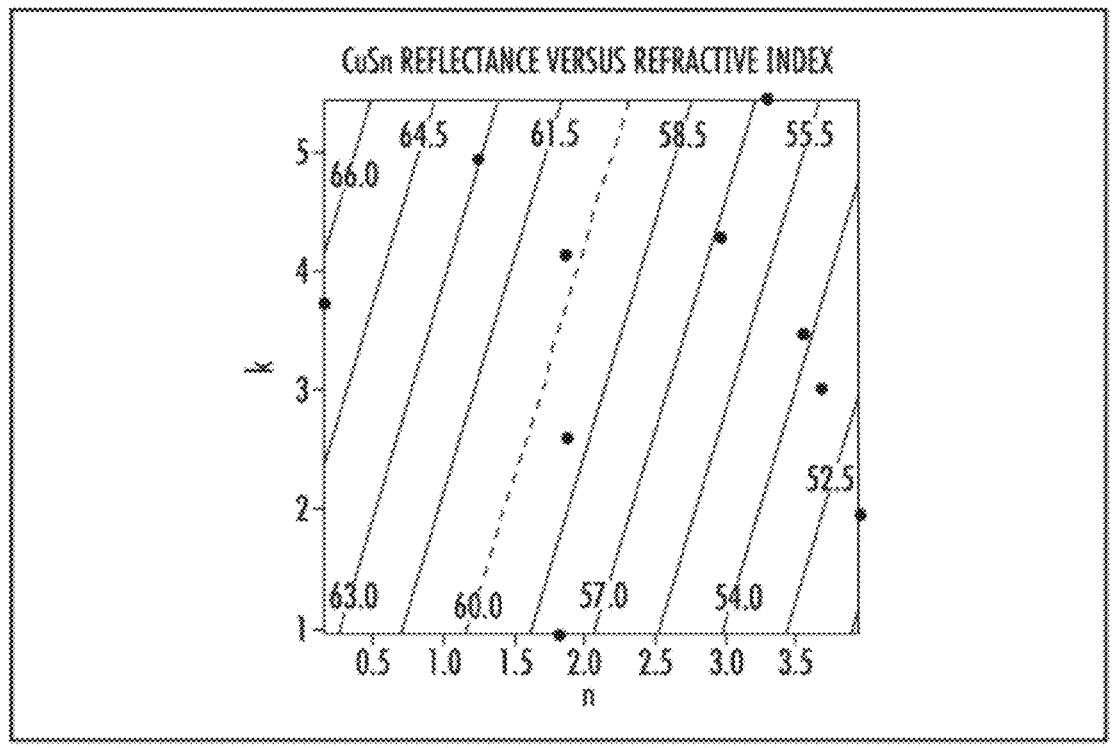
Figure 30C:
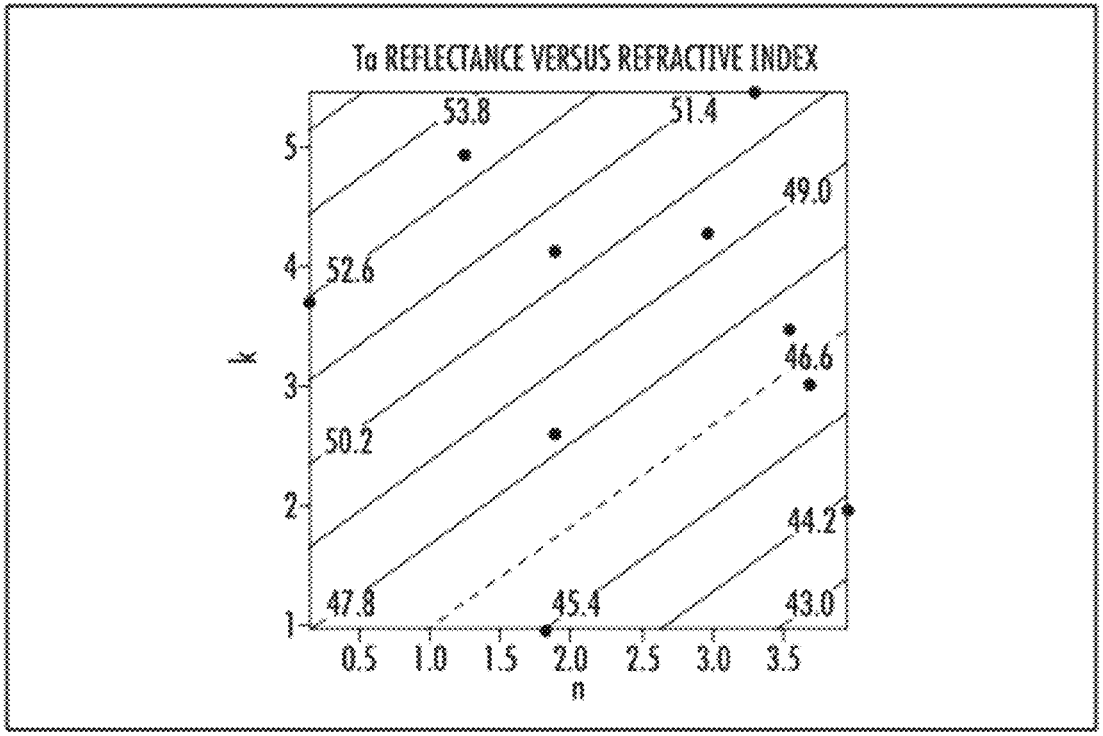

Similarly, two additional examples have been considered: Example 2 with CuSn alloy (50:50) as the base metal, and Example 3 with Ta as the base metal. Table 17 and FIG. 30B present results for Example 3, while Table 18 and FIG. 30C summarize the results for Example 4.

TABLE 17

| Structure | n | k | R | a* | b* |
|---|---|---|---|---|---|
| Reference (Glass + CuSn base layer) | 1.871 | 4.133 | 60.0 | −0.4 | 3.2 |
| Reference + RE-layer made of . . . | | | | | |
| AgAu7x | 0.141 | 3.714 | 65.4 | −0.4 | 3.3 |
| Al:Si 90:10 | 1.244 | 4.938 | 64.1 | −0.5 | 2.7 |
| Cr | 2.956 | 4.281 | 56.2 | −0.2 | 1.5 |
| Ge | 3.950 | 1.975 | 50.3 | 0.1 | 2.3 |
| Ru | 3.288 | 5.458 | 56.7 | −0.6 | 2.3 |
| Ta | 3.544 | 3.487 | 52.4 | 0.2 | 5.4 |
| Ti | 1.887 | 2.608 | 58.1 | −0.3 | 4.0 |
| V | 3.680 | 3.019 | 57.3 | 0.4 | 2.5 |
| Zr | 1.820 | 0.953 | 58.4 | −0.4 | 3.0 |

TABLE 18

| Structure | n | k | R | a* | b* |
|---|---|---|---|---|---|
| Reference (Glass + Ta base metal) | 3.544 | 3.487 | 46.6 | 0.2 | 3.7 |
| Reference + RE-layer made of . . . | | | | | |
| AgAu7x | 0.141 | 3.714 | 51.9 | 0.1 | 4.0 |
| Al:Si 90:10 | 1.244 | 4.938 | 53.6 | −0.1 | 3.1 |
| Cr | 2.956 | 4.281 | 49.2 | −0.3 | 1.9 |
| CuSn | 1.871 | 4.133 | 50.6 | 0.0 | 3.4 |
| Ge | 3.950 | 1.975 | 42.9 | 0.1 | 1.0 |
| Ru | 3.288 | 5.458 | 51.3 | −0.2 | 2.1 |
| Ti | 1.887 | 2.608 | 47.7 | 0.2 | 3.6 |
| V | 3.680 | 3.019 | 47.6 | 0.4 | 2.2 |
| Zr | 1.820 | 0.953 | 46.3 | 0.1 | 3.2 |

The reflectance iso-contour for Example 2 in FIG. 30B is at 60% reflectance and is described by the equation $k=3.919*n-3.6129$. The higher reflectance is attained when the following condition is met: $k-3.919*n \geq -3.6129$. The reflectance iso-contour for Example 3 in FIG. 30C is at 46.6%. The equation for this contour is estimated to be $k=0.8452*n+0.1176$. The condition for enhanced reflectance is $k-0.8453*n \geq 0.1176$.

Figure 31A:
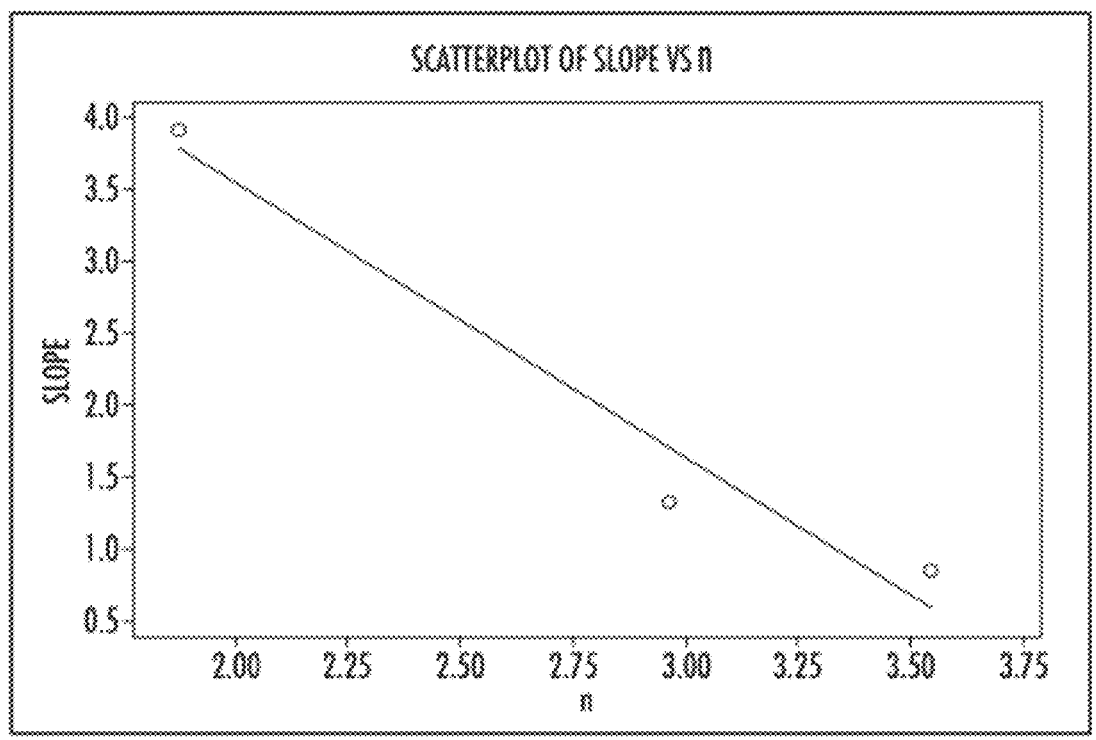
FIGS. 31(A, B) illustrate a derivation of formula facilitating the determination of a metallic material for reflectance-enhancement in embodiments of the invention.
Figure 31B:
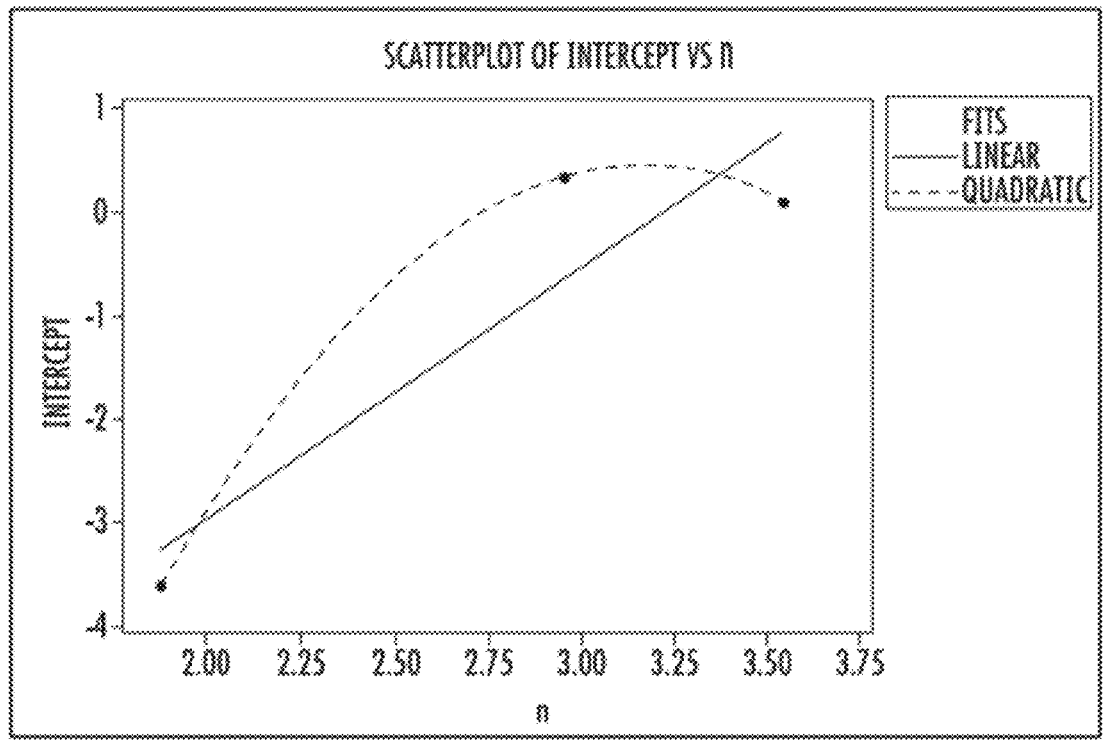

Further, values of slopes of the above three linear dependences and values of k corresponding to n=0 (the intercept of the y-axis) were plotted against values of n to obtain FIGS. 90A and 90B, where discreet results are fitted linearly (FIGS. 31A and 31B) and quadratically (FIG. 31B). The obtained fits are as follows: slope=$7.362-1.911*n$; linearly fit intercept=$2.413*n-7.784$ and the quadratically fit intercept=$-23.7+15.23*n-2.401*n^2$. Based on these generalized fits, the estimate of the coefficients of the equation necessary to define the optical constants for the RE-metals can be performed.

The appropriate materials for reflectance enhancement taught above are defined for systems with a relatively high refractive index superstrate. Float glass or plastic, for instance, have a relatively high refractive index relative to air. That is why the thin metals, as taught above, act as anti-reflection layers when in contact with, and viewed through, a high index superstrate. A similar behavior occurs with other superstrate materials such as Electrochromic fluid or gel. The EC fluid or gel has a high refractive index relative to air and that is why the reflectance of an EC element is substantially lower than the reflectance of the mirror metalized glass. A mirror system described herein, comprising a first lite of glass with a first and second surface, a transparent electrode arranged on the second surface such as ITO, a second lite of glass with a third and fourth surface, a reflective metal system comprising a first layer of chrome on the third surface and a second layer of ruthenium on the chrome layer with a perimeter seal that forms a chamber between the two lites of glass. The chrome/ruthenium coated glass has a reflectance of about 70% when measured with air as a superstrate and about 57% in the EC configuration. Much of the reflectance drop is due to the high refractive index of the EC fluid being in contact with the ruthenium layer.

Various metals have been taught in the art that exhibit high reflectance and are electrochemically stable in an Electrochromic device. For instance, silver alloys, such as silver gold, or other noble metals such as platinum or palladium have been described in the Electrochromic art. There have been a limited number of viable metals taught in the art due to the combined requirement of high reflectance and electrochemical stability. For instance, as taught in U.S. Pat. No. 6,700,692, the metals must have a sufficient electrochemical potential to function satisfactorily as an anode or cathode in a fluid based electrochemical device. Only noble metals, Au, Pt, Rh, Ru, Pd have demonstrated sufficient reflectivity and electrochemical stability. The prior art references that alloys may be viable but no methods are described that can be used determine which alloys may be viable from a reflectance perspective. The formula described above can be used to target the viable noble metals alloys that will increase the reflectance of a base metal in an electrochromic device. The structure of the coatings on the $2^{nd}$ lite of glass would be glass/base metal/reflectance enhancement noble metal alloy/viewer. The formula taught above demonstrates a way to select improved metal alloys that include noble metals that are suitable for Electrochromic devices.

The previous teaching around the use of noble metals in Electrochromic devices relies on the combination of electrochemical stability and high reflectivity that the noble metals possess. Other metals, other than aluminum, haven't been proposed because they do not have sufficient reflectivity and electrochemical stability. Aluminum has been proposed, but has not been realized practically as a third surface electrode because it does not have sufficient electrochemical stability in a fluid based EC device. Other metals or alloys have not been employed in Electrochromic devices because it is believed that they do not have the necessary reflectivity and electrochemical stability. The discovery described above, where a metal with a newly defined refractive index characteristic can increase the reflectance of a base metal, enables a new class of metals, alloys and materials to be considered for use in Electrochromic mirrors and devices. The REM should increase the reflectance of the base metal by at least 2 percentage points, i.e., 50 to 52%, preferably increase the reflectance by about 5%, more preferably by about 7.5% and most preferably by greater than about 10%.

The refractive index characteristic is insufficient because there is no correlation between this characteristic and the electrochemical potential characteristics. If the REM is doped or alloyed with a noble metal it would fall within the improvements for the noble metal alloys defined above. The REM may be employed in a thin film stack in an intermediate location by the application of a capping layer with sufficient electrochemical properties. The capping layer may be a noble metal, or alloy of a noble metal or may be a transparent conduction oxide such as ITO, IZO or the like described elsewhere in this application. The capping layer, if it does not have a refractive index as defined with our new equation will reduce the reflectance of the REM. This has obvious disadvantages and therefore the capping layer must be relatively thin otherwise there will be no reflectance increase attained from the REM. The capping layer, if it does not meet the criteria for reflectance enhancement, will decrease the reflectance to a greater degree in an opposite manner to which the refractive index will increase the reflectance. Therefore, layers with large real parts of the refractive index and low parts of the imaginary refractive index will decrease the reflectance the greatest. Obviously, as taught above the relative change in the reflectance is a function of the relative refractive indices between the two metals. The amount of change for a given thickness of film (such as 3 nm, for example) can be estimated from the newly developed formulae. Preferably, a capping layer with noble characteristics should reduce the reflectance by less than 5%, more preferably less than 2.5% and most preferably less than 1.5%. The thickness of the capping metal layer with noble characteristics necessary to maintain these reflectance changes will vary with the refractive index properties of the REM but should be less than about 4 nm, preferably less than about 3 nm and most preferably less than about 2 nm. A TCO-based capping layer may meet the reflectance requirements at up to a 30 nm thickness.

Silver Alloys for Corrosion Resistance

High reflectivity of silver makes this material particularly useful for mirrors and EC-mirrors. Specifically, in applications where a central portion of the mirror inside the peripheral ring has reflectance values greater than 60%, more preferably greater than 70% and most preferably greater than about 80%, and where matching of the ring's reflectance value to that of the central portion of the mirror is required, it is advantageous to use high-reflectance Ag-based materials for in a thin-film stack of the peripheral ring instead of Chrome and noble metals. Generally, the quality requirements for a peripheral ring are more stringent than those for a $3^{rd}$ surface reflector because all portions of the peripheral ring are visible to the user while portions of the $3^{rd}$ surface reflector next to electrical bus connections are hidden from the view and, therefore, allow for minor metal degradation and corrosion. Therefore, not only must the seal and electrical connections adjoining the peripheral ring be maintained in environmental tests but the visual appearance of the peripheral-ring coating must be maintained. Silver has limited corrosion resistance and electrochemical stability that in the past limited its use as a 3rd surface reflector electrode in EC-mirror systems. Later, dopants and stabilizing layers have been proposed and commercialized that were claimed to increase both the resistance of silver to CASS testing (from a chemical durability perspective) and its electrochemical stability (from a device electrical cycling perspective). For example, a commonly-assigned U.S. Pat. No. 6,700,692 generally taught that platinum-group metals (such as, for example, Pt and Pd along with Au) were the preferred dopants for Ag, and that noble metals (such as, for example, Ru, Rh and Mo) were preferred materials for stabilization layers. No specific examples were offered by the related art, however, that pertain specifically to the dopants alone and their effect on chemical or environmental durability of Ag. Prior art simply implied that addition of the platinum-group metals to the silver layer provides the electrochemical stability while the use of stabilization layers below (and/or above) the silver provide the CASS resistance.

We discovered non-obvious solutions that allow for substantial improvement of the durability of Ag and Ag-alloys through the use of alternate dopants and without the use of stabilization layers. The basic structure of an underlying embodiment included Glass/ITO (125 nm)/silver or silver alloy (50 nm)/ITO (15 nm). Fully assembled EC-elements were run through the CASS testing and steam testing, while epoxy-sealed EC-cells without EC-medium were subjected to blow tests. Testing conditions were as follows: CASS testing was performed according to recognized industrial standards. In the steam tests the parts are held in an autoclave at approximately 13 psi and 120 C in a steam environment and checked once a day until failure. In the case of CASS two failure modes are noted—coating degradation and seal integrity. In the case of the steam tests, only seal failure is reported. In the blow test, a hole is drilled in a part, the part is gradually pressurized until failure occurs, and the pressure at failure is noted. A number of failure modes are possible in the Blow test but in this example, adhesion of the coating materials to the glass, adhesion of the coating materials to each other and adhesion of the coating materials to the epoxy are the failure modes of most interest.

Table 19 shows the CASS, Steam and Blow results, obtained with multiple samples, for pure silver and different silver alloys. The average values are presented for the Steam and Blow tests, while results of the CASS tests are expressed in days to failure. It is believed that ability of a material to survive approximately 2 days without coating damage (in CASS test) is sufficient for most vehicle interior applications. All CASS tests were stopped at 17 days or 400 hours, which corresponds to a relatively long exterior vehicle test. Depending on the application the CASS requirement may vary between these two extrema. The pure silver has the worst performance in the steam test, relatively poor CASS results, and relatively poor adhesion in the blow tests that demonstrated substantial intra-coating delamination. Samples made with the traditional dopants, Pd, Pt and Au, are also shown in Table 19. Improvements are demonstrated for the steam and blow tests relative to the pure silver but the CASS results are still not adequate. Similarly, the AgIn alloy has improved properties in Steam and Blow but the CASS results are improved but not adequate for all applications.

Silver alloys known as Optisil™ (supplied by APM Inc,) were also evaluated. Three versions, 592, 595 and 598 were tested. The compositions are shown below in Table 20. Each version demonstrates substantial improvement relative to the pure silver with the Optisil 598 showing the best performance. The Optisil 598 has some coating lift in the blow tests but percentage of coating lift was very small and this also corresponded with the highest average blow value. Therefore, even though some lift is present, the results do not show significant failure mode for this material. The Optisil materials are viable for interior vehicle applications and some are viable for external applications also. A number of sterling silver alloys were tested. The specific compositions, based on analysis of the sputtering targets, are shown in Table 16. These particular alloys show substantial improvement over the pure silver. The Sterling "88" and 51140 alloys had the best performance of the group with the 51308 and Argentium having lesser performance. In the Optisil family, the lower levels of Cu and Zn provide better CASS resistance. For the Argentium, the copper and germanium additions help improve the CASS resistance. The "Sterling" samples benefited from the addition of copper (all), zinc and Si (88 and 51308) and Sn (51308).

TABLE 19

Days to Failure
(Results are for all parts in test unless noted)

| Material | CASS Coating | CASS Seal | Steam Day-To-Fail | Steam % Coating lift | Blow PSI |
|---|---|---|---|---|---|
| Ag99.99% | 1 (1 part ok to day 12) | 1 (1 part ok to day 12) | 4.3 | 30 | 31.2# |
| Optisil 592 | 5.5 (2 part average) (2 parts ok to day 17) | 15 | 20.5 | 0.8 | 32.4 |
| Opti 595 | 17 | 17 | 20.2 | 15.8 | 30.1 |
| Optisil 598 | 17 | 17 | 24.3 | 0.83 | 41.5# |
| 83Ag/17In | 1 | 6.25 | 19.7 | 0 | 37.0 |
| Ag94/Pt6 | 1 | 1 | 18.7 | 4.2 | 35.2# |
| Ag96/Pd3 | 1 | 1 | 12.2 | 86.7 | 39.4# |
| Argentium sterling | 1 (2 part average) (2 parts ok to day 17) | 5.5 (2 part average) (2 parts ok to day 17) | 27.3 | 0 | 38.1# |
| Sterling "88" | 17 | 9 (2 part average) (2 parts ok to day 17) | 21.3 | 0 | 28.5 |
| Sterling 51140* | 7 (1 part) (3 parts ok to day 17) | 7 (1 part) (3 parts ok to day 17) | 23.7 | 0 | 32.1 |
| Sterling 51308 | 8 | 8 | 20.7 | 8.3 | 34.6 |
| Ag93/Au7 | 1 | 1.33 | 13.3 | 25.8 | 29.2# |
| Ag16Au | 2 | 2 | 18.3 | 22.5 | 30.2 |
| Ag76/Au24 | 1 | 1.33 | 11.3 | 95.8 | 40.5 |

*These parts had some suspended data in steam tests, therefore actual average is higher than reported values
These part had some intra-coating adhesion failures

TABLE 20

Silver Alloy Compositions

| Name | Ag | Cu | Ge | Zn | Sn | Si | Au | In |
|---|---|---|---|---|---|---|---|---|
| Argentium | 91.73 | 6.879 | 1.329 | | | | | |
| Sterling 51308 | 92.76 | 2.775 | | 4.194 | 0.1097 | 0.0894 | 0.0153 | |
| Sterling 51140 | 92.18 | 7.779 | | | | | | |
| Sterling 88 | 92.49 | 5.5403 | | 1.8833 | | 0.0422 | | |
| Optisil 598 | 98.24 | 1.134 | | 0.4805 | | 0.088 | | |
| Optisil 595 | 95.04 | 2.761 | | 1.892 | 0.0573 | 0.2066 | | |

TABLE 20-continued

Silver Alloy Compositions

| Name | Ag | Cu | Ge | Zn | Sn | Si | Au | In |
|---|---|---|---|---|---|---|---|---|
| Optisil 592 | 92.95 | 4.767 | | 2.064 | 0.1183 | 0.0577 | | |
| Ag/In | 82.82 | 0.0124 | | 0.0056 | | | 0.0114 | 17.13 |

Degradation of a material usually occurs in multiple ways, and there are often multiple possible protection pathways and the different elements doped into or alloyed with the silver can act to stabilize the metal thus improving its performance. The different silver alloys may contain one or more elements that act on one or more of the protection pathways to stabilize the silver. Silver often degrades by migration into a lower energy state. The silver atoms are 100 times more mobile along the boundary of an Ag-grain than within the bulk of the grain. Therefore, addition of an element migrating to the Ag-grain boundary and inhibiting the mobility of the silver is expected act to improve the durability of Ag. Metals such as Ti and Al are often corrosion resistant because they oxidize and the surface oxide seals the metal preventing further reactions. In the case of silver, elements may be added to the metal that act to protect the silver from the corrosive or degradation of environmental stressors. In other cases an element may be added that forms an alloy with the silver that alters the chemical or environmental activity of the silver. The Sterling silver alloys described above may, in part, contribute to this stabilization method. Still other methods to stabilize the silver include the use of an interface treatment as taught in Our Prior applications, where sulfur or other element is embedded into the surface of a coating or substrate prior to the deposition of the silver or silver alloy. Our Prior applications also taught the deposition of silver or a silver alloy onto a ZnO or other surface that puts the deposited material into a low energy state, thereby improving its environmental durability. The silver layer may also be protected by the application of metal or non-metal (oxide, nitrides, etc) either above or below the silver layer. Additionally, the silver or silver alloy may be protected by being overcoated with a relatively thick oxide layer such as ITO. It is recognized that variation of deposition conditions such as target shielding angles, target to substrate distance, composition of residual background gasses, speed of layer growth, e.g., may produce somewhat varying results. Nonetheless, the trend of improvement of various characteristics for noted materials noted is expected to hold over a range of parameters, particularly those typical for magnetron sputtering.

Specific materials that may be added to the silver that enable one or more of the stabilization mechanisms described above include: Al, Zn, Cu, Sn, Si, Ge, Mn, Mg, W, Sb, B, Cr, Th, Ta, Li, and In. These can be used either alone or in combination to enable good CASS performance, adequate Steam lifetime and good adhesion of the silver layer. Preferably, the CASS resistance should be greater than about 2 days, preferably greater than 5 days, more preferably greater than 10 days and most preferably greater than 17 days. The steam lifetime should be greater than 10 days, preferably greater than 15 days, and more preferably greater than 20 days. The coating stack should maintain adherence to glass, epoxy and within itself during adhesion tests. The blow test described above demonstrates relative performance among a set of samples but the test is dependent on mirror shape, pressure ramp rate, edge treatment and epoxy type as well as coating performance.

Galvanic Corrosion

Figure 63:
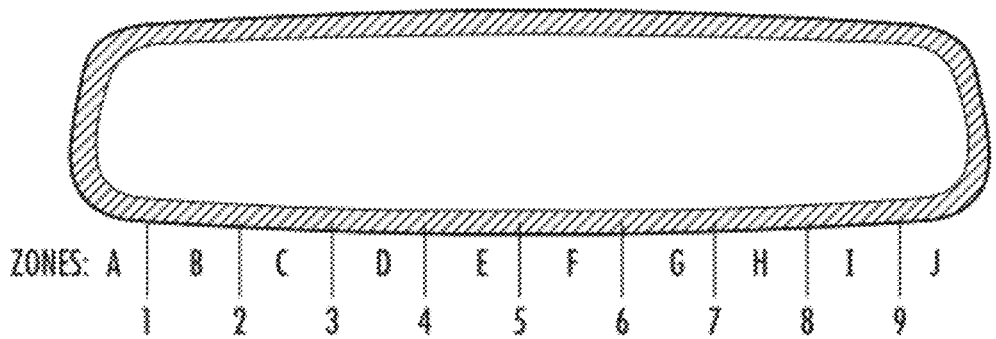
FIG. 63 provides illustration to discussion of galvanic corrosion of a thin-film stack of an embodiment of the invention.

While the problem of galvanic corrosion of thin-films of the EC element in a rearview assembly arises due to exposure of an edge of the EC-element to electrolytes (such as salt laden solutions from road-spray, for example, or CASS solution), related art does not seem to address or even acknowledge this problem. For example, a thin-film stack such as a stack of the third-surface transflective electrode, deposited on a glass substrate and comprising Cr, Ru, Ag, and TCO layers may form a galvanic series, thereby facilitating degradation of the electrode from the edge of the EC-element inwards and causing not only the change in appearance of the EC-element based mirror but also a breach of EC-cell. In an embodiment of the present invention, protection of the EC-element thin-film stack against corrosion includes the use of a so-called "sacrificial anode" co-located with (either adjacently or adjoiningly) with the thin-film stack at the edge of the EC-element. Experiments were conducted to determine the extent of protection provided by the sacrificial anode element to a third-surface thin-film stack including a 35 nm thick Cr layer, a 3 nm thick Ru layer, a silver-gold alloy (7% Au) of about 25 nm, and an ITO of about 15 nm. A portion of a bus clip (containing either a single section or "tooth" or multiple sections/"teeth", thus having various lengths as described in Table 21) constructed of a copper-cobalt-beryllium alloy (alloy C17410, Be 0.15-0.5; Co 0.35-0.6; Cu balance) was used as a sacrificial anode element at attached to the edge of the EC element in contact with the thin-films stack. In reference to FIG. 63 and Table 21, the lower portion of the EC-element was exposed to an electrolyte (CASS solution), while a chosen sacrificial anode element(s) were placed at location(s) labeled with numerals (1 through 9) along the lower edge of the element (for samples in Group 1) or along the upper edge of the element (for samples in Group 2). The zones of the lower portion of the EC-element, in which effects of galvanic corrosion of the lack thereof were subsequently observed, are labeled with letters (A through J).

Samples of Group 1 were held in the CASS chamber for only 24 hours. The parts were inspected after the 24 hour period was complete. Samples 1 to 3 had no bus clips present and had extensive corrosion damage within the 24 exposure. There were failures in most of the zones A to J. Samples 4 to 6 had full continuous clips present between positions 1 to 9. One part had a failure in Zone A while the other two samples did not fail during the 24 hour exposure. Samples 7 to 9 had individual bus clips present at positions 1 to 9. These parts only had failures in zones A and J. The zones between the individual clips were protected by the proximity of the individual clips. This implies that at the 0.5" distance away from the clips the coating is protected. The failures in Zones A and J show that at up to a distance of 1.25" the clips provide galvanic corrosion protection.

Group 2 had two groups, those that had failures within 24 hours and those kept in the chamber for another 24 hours for a total exposure of 48 hours. Various locations for the clips were tried in this series of experiments. In each case the coating was protected between individual clips spaced at 1" separations. For the other variants the protection distance varied from between ½" up to 4". In practice, the necessary distance between the sacrificial anode and the coating to be protected will vary with the specific geometry of the full mirror assembly but as this test shows additional protection is attained when the distance between them is relatively small.

the electrical conductivity for the EC-cell, the 5 nm chrome layer provided adhesion of different metals to the ITO, the Al-based material provides relatively high reflectance for the system, the 35 nm chrome provides opacity, and the 5 nm ruthenium provides good electrical conductivity and stability

TABLE 21

| Sample ID | Configuration | Result by zone | Distance of Degradation to Sacrificial Anode |
|---|---|---|---|
| Group 1 24 Hour inspection ||||
| 1 | No buss bar or individual teeth | failure in most zones | N/A no clips |
| 2 | No buss bar or individual teeth | failure in most zones | N/A no clips |
| 3 | No buss bar or individual teeth | failure in most zones | N/A no clips |
| 4 | Continous serrated buss bar points 1-9 | Failure in zone A. | ⅞" |
| 5 | Continous serrated buss bar points 1-9 | No Failure | |
| 6 | Continous serrated buss bar points 1-9 | No Failure | |
| 7 | Individual clips at points 1-9 | Failure in zone J | 1¼" |
| 8 | Individual clips at points 1-9 | Failure in zone J | 1" |
| 9 | Individual clips at points 1-9 | Failure in zone A | ¾" |
| Group 2 24 hour inspection (parts listed under 48 hour inspection had no breach at 24 hours) ||||
| 10 | Continuous serrated buss bar from points 5-9 | Failure in zones D and E | ⅝" |
| 11 | Individual clips at points 4-9 | Failure in zones C and D | ⅞" |
| 12 | Individual clips at points 1-6 | Failure in zone J | 4" |
| 13 | Continuous serrated buss bar from mid 3 and 4 to mid 6 and 7 | Failure in zones A, B and J | 2½" |
| 14 | Individual clips at points 4-9 | Failure in zone A | 3¾" |
| 15 | Individual clips at points 1-7 | Failure in zone J | 2⅝" |
| 16 | Individual clips at points 1-7 | Failure in zone J | 2½" |
| 17 | Continuous serrated buss bar from points 1-5 | Failure in zones G and H | 1¾" |
| 18 | Individual clips at points 2-9 | Failure in zone A | 1⅝" |
| 19 | Individual clips at points 1-3 and 7-9 | Failure in zones A, D, E, F | ½" |
| 20 | Continuous serrated buss bar from mid 3 and 4 to 6 | Failure in zones A, B, C, D and J | 1½" |
| 21 | Individual clips at points 1-6 | Failure in zone J | 3¾" |
| 48 hour inspection ||||
| 22 | Individual clips at points 2-9 | None | N/A |
| 23 | Individual clips at points 1-8 | None | N/A |
| 24 | Individual clips at points 1-3 and 7-9 | D, E, F, G | 1⅛" |
| 25 | Individual clips at points 3-9 | Failure in zones A, J | 1½" |
| 26 | Individual clips at points 3-9 | Failure in zones A, B, C, J | 1" |
| 27 | Continuous serrated buss bar from points 5-9 | Failure in zones D, E | ⅞" |
| 28 | Continuous serrated buss bar from points 1-5 | Failure in zones F, G, J | ½" |
| 29 | Individual clips at points 1-8 | Failure in Zone A | ⅝" |

Aluminum Alloys for Corrosion Resistance

As noted in other parts of this specification, aluminum has a high reflectance and, for that reason, is also of interest for fabrication of a peripheral ring. Though the use of this material in peripheral rings is known, no means of improving its chemical and environmental durability has been proposed. We discovered a variety of alloys of aluminum and dopants that improve the stability of aluminum in EC-element environment. Elements such as magnesium, manganese, silicon, copper, ruthenium, titanium, copper, iron, oxygen, nitrogen or palladium either alone or in combination with other elements in this group will improve the stability of the aluminum. Other elements may be present in the aluminum without deviating from the spirit of this invention. The amounts of these elements required for improvement of aluminum qualities may be between 50 and 0.1 weight-%, preferably between 40 and 0.5 weight-%, more preferably between about 25 and 0.5 weight-%, and most preferably between about 10 and 0.5 weight-%.

Table 22 shows the performance of different Al-based materials in the CASS test either as single layers or in stacks. The stack consists of 120 nm ITO/5 nm chrome/Al-based material/35 nm chrome/5 nm ruthenium. This stack is particularly well suited for a perimeter ring. The ITO provides to a Ag-paste type electrical bus of the EC-element. The aluminum-based materials may be spatially uniform in composition or the composition may be graded across a part. A graded part is one in which the composition gradually changes from one composition to another composition across the part. The graded parts are produced in a combinatorial fashion using two three-inch sputter cathodes angled toward each other. The angle of the cathodes, the relative power and the composition of the targets mounted to each cathode can be varied to alter the composition across the substrate. The relative composition of the coating at different locations can be estimated using analytical techniques or from calibration experiments.

As shown in Table 22, the pure aluminum coating is degraded in less than a day in CASS testing. We discovered that stability of aluminum coatings varies with the thickness of the aluminum layer. In particular, the lifetime in CASS decreases as the thickness of the layer increases. A very thin layer, approximately 50 angstroms, has significantly superior stability lasting up to 17 days in CASS. We also unexpectedly discovered that Al deposited at high grazing angles in the combinatorial deposition system also had unexpectedly high stability, which can possibly be explained by the fact that a thin metallic layer incorporates more of the background gas into its matrix during deposition and the trace oxygen or water present during deposition is partially oxidizes the aluminum, thereby leading to the improved CASS stability. For improved stability, the oxygen content in the aluminum film should be below about 20%, preferably below about 10%, more preferably less than about 5%, and most preferably less than about 2.5%. The lower oxygen content has the added benefit of having a lesser impact on the optical properties of the aluminum. Alternatively, the crystal structure of the aluminum may vary with thickness. In this case the physical thickness of the layers themselves, rather than oxygen content is the mechanism leading to improved stability. The aluminum layer should be less than about 70 angstroms, preferably less than about 55 angstroms and most preferably less than about 40 angstroms. The reflectance of a stack may be tailored to a specific level by depositing a breaker layer in between multiple silver layers such as Al/SiO$_2$/Al/SiO$_2$/Al. The breaker layer should be relatively thin to avoid thin film interference colors, i.e., less than about 500 angstroms, preferably less than 250 angstroms and most preferably less than about 100 angstroms.

We also discovered that Al:Si compound, where the Si-content varies from about 40% to 10%, performs substantially better than the pure aluminum. The higher Si level of about 40% has CASS performance that is independent of thickness, while the lower Si content material (at about 10% level) demonstrates the CASS stability versus thickness of the layer similar to that of the pure aluminum. Aluminum-titanium compounds were also evaluated. Titanium contents between about 50% and 25% show substantially improved CASS stability. Ruthenium added to AlTi or other aluminum compounds also substantially improved the performance even at very small levels. This additive, along with Pd, is expected to lead to improved CASS results in various aluminum-based materials. Additional aluminum alloys demonstrate improved stability in a CASS corrosion environment. Table 22A illustrates the CASS performance for the different stacks for different thicknesses of the alloys. Table 22B illustrates the reflectance for the different alloys in the so called Gamma stack described elsewhere in this patent. The composition of the AlNiB is 95.5/4.0/0.5 atomic % and the composition of the AlNd is 98/2 atomic %. The coatings were incorporated into EC cells and put through CASS testing. During the test for 400 hours there was no degradation of the coating regardless of the coating thickness. For two thicknesses, there was minor coating lift near the seal (mid thickness) and lift under the seal (high thickness) but the seal maintained integrity and the EC media was not compromised. It is theorized that the lift of the coating is due to stress in the system and not an inherent material property. Alteration of deposition properties is expected to eliminate this particular failure mode. It is concluded that the aluminum alloys of Tables 22A and 22B provide adequate reflectance for outside mirror applications at reasonable thicknesses while simultaneously providing neutral reflected color.

TABLE 22

| Stack | Metal Details | Metal Thickness (angstroms) | CASS Performance |
| --- | --- | --- | --- |
| ITO/Cr/Metal/Cr/Ru | Al | 140 | <1 day |
| ITO/Cr/Metal/Cr/Ru | AlTi 70:30 | ~150-200 | 14 days |
| ITO/Cr/Metal/Cr/Ru | AlTi 50:50 | ~150-200 | 14 days |
| ITO/Cr/Metal/Cr/Ru | AlTi 75:25 | ~150-200 | 14 days |
| ITO/Cr/Metal/Cr/Ru | Al | 94 | <1 day |
| ITO/Cr/Metal/Cr/Ru | Al | 70 | <1 day |

TABLE 22-continued

| Stack | Metal Details | Metal Thickness (angstroms) | CASS Performance |
| --- | --- | --- | --- |
| ITO/Cr/Metal/Cr/Ru | Al | 56 | 2 days |
| ITO/Cr/Metal/Cr/Ru | Al | 47 | very light damage up to 21 days |
| ITO/Cr/Metal/Cr/Ru | Al | 40 | very light damage up to 21 days |
| ITO/Cr/Metal/Cr/Ru | Al:Si 60:40 | 140 | >21 days |
| ITO/Cr/Metal/Cr/Ru | Al:Si 60:41 | 105 | >21 days |
| ITO/Cr/Metal/Cr/Ru | Al:Si 60:42 | 84 | >21 days |
| ITO/Cr/Metal/Cr/Ru | Al:Si 60:43 | 70 | >21 days |
| ITO/Cr/Metal/Cr/Ru | Al:Si 60:44 | 60 | >21 days |
| ITO/Cr/Metal/Cr/Ru | AlTiRu | ~150-200 | >17 |
| ITO/Cr/Metal/Cr/Ru | AlTiRu 90:8:2 | ~150-200 | >17 |

TABLE 22A

CASS results

| Group | Description | CASS Degradation | Other Effects | Seal Failure (fluid turns green) |
| --- | --- | --- | --- | --- |
| A1 | AlNd_73 Å | None | None | — |
| A2 | AlNd_142 Å | None | Minor Coating Lift at plug | — |
| A3 | AlNd_219 Å | None | Coating lift at seal | — |
| B1 | AlNib 60 Å | None | None | — |
| B2 | AlNib 123 Å | None | Minor Coating Lift at plug | — |
| B3 | AlNib 194 Å | None | Coating lift at seal | — |

TABLE 22B

Gamma stack reflectance and color (glass side measurements)

| Group | Trial | Y (% Reflectance) | a* (in reflection) | b* (in reflection) |
| --- | --- | --- | --- | --- |
| A1 | AlNd_73 Å | 50.47 | −4.76 | 1.43 |
| A2 | AlNd_142 Å | 55.99 | −3.67 | 2.01 |
| A3 | AlNd_219 Å | 57.65 | −2.79 | 1.77 |
| B1 | AlNiB 60 Å | 49.62 | −4.36 | −0.97 |
| B2 | AlNiB 123 Å | 54.16 | −3.44 | 0.24 |
| B3 | AlNiB 194 Å | 55.87 | −2.90 | 1.27 |

Optical properties of aluminum may be affected by added elements. Table 23 shows the refractive index parameters of some of the aluminum-based materials. These values may be used in conjunction with the reflectance-enhancement-metal (REM) formula described above to determine the arrangements wherein these materials can be used to increase the reflectance of Al-based film.

TABLE 23

| Material | n | k |
| --- | --- | --- |
| Al60/Si40 | 3.13 | 4.49 |
| Al90/Si10 | 1.24 | 4.94 |
| Ti50/Al50 | 2.54 | 2.96 |
| Ti30/Al70 | 2.88 | 3.39 |

Other Materials Viable as REM with CASS Resistance

Copper alloys of Zinc and tin, known as brass and bronze, respectively, have good optical properties and function well as REM layers for a wide range of base metals and, depending on the composition, can have good CASS resistance. Navel brass, with a 60:40 Cu:Zn ratio and other trace elements, lasted up to 7 days in CASS while Cu:Sn at a 50:50 ratio also survived up to 7 days in CASS (both in a ITO/Cr/Metal/Cr/Ru stack described above for Al. It is expected that select alloys and compound of copper, alloyed with other elements will be suitable for use as REM layers. The homogeneous peripheral ring embodiments described herein are often preferred to match the reflectivity and color of the main mirror reflector. The color tolerancing described elsewhere in this document may be preferred in some applications. Additives to make brass more corrosion resistant include iron, aluminium, silicon nickel, tin and manganese. In certain applications, where a single phase is present in the brass, phosphorus, arsenic or antimony in levels of less than 0.1% can provide further stability. In some embodiments, having a zinc content of less than 15% may also provide benefits. Brasses known commonly as "Admiralty" or "Navel" brass may be particularly stable in corrosive environments. Bismuth bronze, a copper/zinc alloy with a composition of 52 parts copper, 30 part nickel, 12 parts zinc, 5 parts lead, and 1 part bismuth is quite stable. It is able to hold a good polish and so is sometimes used in light reflectors and mirrors. Additives to make copper-tin bronzes more corrosion resistant include phosphorus, zinc, aluminum, iron, lead, and nickel.

The homogeneous ring embodiments described herein are often preferred to match the reflectivity and color of the main mirror reflector. The color tolerancing described elsewhere in this document may be preferred in some applications.

Universal Thin Film Stacks.

The durable silver- and aluminum-based alloys are particularly useful as so-called universal materials. Depending on the requirements of a particular application, the reflectivity and color of the peripheral ring may vary. As more reflectivity levels of the ring are requested by the users, manufacturing of peripheral rings becomes challenging if multiple metals are needed to attain the desired reflectivity properties. If, for instance, different embodiments or applications require 35%, 45%, 55%, 65%, 75% or 85% reflectance, then up to 6 different materials could be used to attain the desired color match. It is often easier to lower the reflectance of a high reflectance metal rather than raise the reflectance of a lower reflectance metal. Therefore, in certain manufacturing scenarios a range of reflectance values can be obtained with a high reflectance metal by either reducing the thickness of the metal and optionally backing the layer with a low transmittance metal when opacity is needed. The REM formula described above can be used to assist selecting appropriate metal combinations. Another way to lower the reflectance of a high reflectance metal is to put a lower reflectance metal in front of it (relative to the viewer). The thickness of the lower reflectance metal can be increased to decrease the reflectance of the high reflectance metal. The silver and aluminum alloys described herein are particularly good in that they have excellent environmental durability, adhesion and high reflectance. Therefore, in a production environment, a number of commercial products may be produced simply by adjusting the thickness of a single layer. This leads to a particularly simple process for manufacturing thus reducing capital cost, development time and product durability.

For example, silver and silver alloys and aluminum alloys are particularly reflective. A stack consisting of these material maybe quite reflective. Table 24 shows the calculated reflectance of stacks using a silver gold alloy with 7% gold as the principle reflector layer while Table 25 shows the calculated reflectance of stacks using an aluminum silicon alloy with 10% silicon. The stack have additional layers present. A thin ITO layer is present next to the glass based on the assumption that an adhesion layer may be needed while a layer of ruthenium and chrome are added on top of the reflected layer to guarantee an opaque coating. These layers may be present or not depending on the needs of a given application. Examples 1 to 7 show the impact of altering the silver alloy on reflectance. By changing the thickness the reflectance may be altered without sacrificing transmittance properties. In examples 8 to 13 a thin layer of ruthenium is placed between the ITO and the silver alloy wherein the ruthenium acts to minimize the reflectance. In either of these ways a single stack can be used for a variety of applications by simply adjusting the thickness of one layer.

A similar behavior is shown with aluminum as the principle reflector metal in Table 25. In examples 14 to 19 the thickness of the aluminum alloy is altered to modify the reflectance. Examples 20 to 24 show the effect of adding a thin ruthenium layer between the viewer and the aluminum alloy. In this embodiment, as in the embodiment above with silver, the reflectance may be attenuated with the adjustment of only a single layer.

The novelty of these designs is their ability to adjust the appearance with a simple one layer adjustment. In practice, one or more layers may be adjusted as needed to attain the desired optical effects. The table shows a particular effect for a specific stack. In practice alternate metals may be used as defined elsewhere in this document.

TABLE 24

| Sample # | ITO | Ru | AgAu7x | Ru | Cr | Y | a* | b* |
|---|---|---|---|---|---|---|---|---|
| 1 | 10 | 0 | 60 | 4.5 | 50 | 92.3 | −0.6 | 2.4 |
| 2 | 10 | 0 | 40 | 4.5 | 50 | 90.4 | −0.6 | 2.6 |
| 3 | 10 | 0 | 20 | 4.5 | 50 | 81.0 | −0.8 | 2.9 |
| 4 | 10 | 0 | 15 | 4.5 | 50 | 75.9 | −0.9 | 2.9 |
| 5 | 10 | 0 | 10 | 4.5 | 50 | 69.2 | −1.1 | 2.7 |
| 6 | 10 | 0 | 5 | 4.5 | 50 | 61.5 | −1.3 | 2.2 |
| 7 | 10 | 0 | 0 | 4.5 | 50 | 53.6 | −1.6 | 1.5 |
| 8 | 10 | 1 | 60 | 4.5 | 50 | 79.5 | −0.5 | 5.1 |
| 9 | 10 | 2 | 60 | 4.5 | 50 | 70.4 | −0.4 | 6.2 |
| 10 | 10 | 2.5 | 60 | 4.5 | 50 | 67.0 | −0.5 | 6.4 |
| 11 | 10 | 3 | 60 | 4.5 | 50 | 64.1 | −0.5 | 6.4 |
| 12 | 10 | 4 | 60 | 4.5 | 50 | 59.8 | −0.6 | 6.1 |
| 13 | 10 | 5 | 60 | 4.5 | 50 | 56.9 | −0.7 | 5.5 |

TABLE 25

| Sample # | ITO | Ru | AlSi (90:10) | Ru | Cr | Y | a* | b* |
|---|---|---|---|---|---|---|---|---|
| 14 | 10 | 0 | 60 | 4.5 | 50 | 73.43 | −0.77 | 2.64 |
| 15 | 10 | 0 | 40 | 4.5 | 50 | 73.46 | −0.77 | 2.63 |
| 16 | 10 | 0 | 20 | 4.5 | 50 | 72.01 | −0.89 | 2.41 |
| 17 | 10 | 0 | 15 | 4.5 | 50 | 70.32 | −0.98 | 2.24 |
| 18 | 10 | 0 | 10 | 4.5 | 50 | 67.19 | −1.11 | 2.02 |
| 19 | 10 | 0 | 5 | 4.5 | 50 | 61.84 | −1.29 | 1.75 |
| 20 | 10 | 1 | 60 | 4.5 | 50 | 69.41 | −0.77 | 2.95 |
| 21 | 10 | 2 | 60 | 4.5 | 50 | 66.24 | −0.79 | 3.03 |
| 22 | 10 | 3 | 60 | 4.5 | 50 | 63.76 | −0.82 | 2.97 |
| 23 | 10 | 4 | 60 | 4.5 | 50 | 61.84 | −0.85 | 2.84 |
| 24 | 10 | 5 | 60 | 4.5 | 50 | 60.39 | −0.88 | 2.66 |

Examples of Mounting Elements and Housing Structures of the Rearview Assembly.

Embodiments of housing and mounting structures of the rearview assembly, discussed below, are adapted to provide a solution to at least one of these commonly-experienced problems: (i) to reduce or damp or negate mechanical vibrations of the components of the rearview assembly, (ii) to provide a certain level of preload force between or among the elements of the assembly, (iii) to facilitate firm and reliable affixation of a mirror element or system of the assembly to a mounting element carrying this element or system in the assembly, and (iv) to reduce or eliminate leakage of light produced, in operation, by one or more of light sources associated with the rearview assembly across the area of the mirror element thereby improving contract of operation of the assembly in both the reflector mode and the display mode. The discussion of several examples of the housing and mounting structures warrants a preliminary reference to FIG. 80, that shows schematically an exploded view of an embodiment of an interior rearview assembly 80000 including a mirror element (or system) 80010, a mounting element (also referred to as carrier or support plate) 80020, a PCB 80030 with electronic circuitry adapted to control the operation of devices of the assembly 80000, and a housing shell 80040 having an inner volume 80040a and a rim or edge 80040b that defines an aperture leading to the inner volume 80040a. An inner surface 80042 of the housing shell 80040 includes a plurality of protrusions (such as snap-teeth features, for example) 80044 that, when mating with respectively corresponding peripherally-distributed snap openings 80046 of the carrier 80020, affix the carrier 80020 to the housing shell 80040. A position of a moveable housing structure 80050 that includes the housing shell 80040 and the carrier 80020 is adjustable, in part, with the use of an angularly-adjustable mount 80050. The local system of coordinates (x,y,z) indicates the spatial orientation of components, with the axis z directed generally rearwardly towards the back of the vehicle.

Some features of the carrier 80020 are now presented in reference to FIGS. 81, 82, 83A, 83B and 84 and in further reference to FIG. 80. As shown in these Figures, the carrier 80020 includes a first portion 82100 preferably made of a rigid, resilient material, to which a second portion 82500 preferably made of an elastic and compressible material is integrated (in a specific implementation—via molding). When molded during fabrication, the first and second portions form a one-unit carrier such as, for example, that presented in FIG. 81. While the first and second portions 82100, 82500 are preferably co-molded in the same fabrication cycle that produces the hybrid carrier 80020, and therefore, are not, generally, formed independently as separate components to be integrated later, the structures of the first and second portions 82100, 82500 are better illustrated in some of the FIGS. 80-84 as being separate. Such separated illustrations are provided for clarity of the discussion only.

In reference to FIG. 82, for example, the first portion 82100 of the carrier 80020 is configured to resemble a plate substantially co-extensive with the mirror element 80010 (as seen in FIG. 80) that is attached, in the assembly, to a mounting surface 82102 of the first portion 82100 (generally, with an adhesive element and optionally—removably). The lateral extent of the first portion 82100 is defined by an edge surface 82106. In one implementation, the edge surface 82106 additionally defines at least one notch in a peripheral area of the first portion 82100 (as shown—notches 82110a, 82110b). In addition to notches 82110a, 82110b the mounting surface 82102 contains at least one opening (such as openings 82210a, 82210b, 82210c, 82120d, 82120e and other similar openings) through the carrier 82100. Some of these openings (such as the opening 82120c, for example) are configured to establish an electrical communication between the mirror element 80010 and the PCB 80030 (see FIG. 80). In one example, such openings optionally define a passage for an electrically-conductive connector such as a wire or pin between the capacitive switch electronics and an electrically-conductive layer or conductive pad or patch associated with the mirror element 80010. Other openings (such as, for example, the openings 82120a, 82120d) are configured to establish optical communication between the mounting surface 82102 and the opposite, back surface of the carrier 82100 (not shown). In one example, light from a light source (not shown) disposed on the PCB 80030 behind the carrier 80020 and spatially aligned with the opening 82120d is delivered through the opening 82120d towards the mirror element 80010 and, optionally, through the mirror element 80010 towards the FOV at the front of the assembly. In another example, light (such as ambient light or glare) incident onto the first surface of the mirror element 82010 is transmitted through a transflective coating of the mirror element (discussed earlier) and through the opening 82120a towards an optical sensor (not shown) disposed at the back of the assembly 80000.

In further reference to FIG. 82, the second portion 82500 of the carrier is a molded elastic element, a boundary of which is defined by a band or strip 82510. The band or strip 82510 is, generally, a narrow piece oriented around the perimeter of the first portion 82100 having a substantially uniform width and/or, optionally, a non-uniform cross-sectional profile (as discussed below). The band 82510 generally forms a ring or skirt that optionally circumscribes the perimeter of the first portion 82100. Alternatively or in addition, the band 82510 may, in a specific embodiment, include an optional slit or notch such as that indicated with a numeral 82512. The band 82510 optionally includes at least one of the ribs 82514 at a surface that, in the assembly, is facing the mirror element 80010. In reference to FIG. 83A, for example, the second elastic portion 82500 also includes one or more pad or plug elements shaped sa pins or studs (such as pads or plug elements 82510a, 82510b, 82520a, 82520b, 82520d, 82520e and similar pads as shown but not labeled) connected to the band 82510 via corresponding bridges or connecting links (such as, for example, bridges or links 82550, 82552, and 82554, to name just a few). It is appreciated that, in practice, at least some or, preferably, all of the elements of the second portion 82500 (i.e., the band, the one or more pads or plug elements, and the bridges connecting those) are co-molded of the same elastic material and configured to spatially correspond to one or more openings through the first portion 82100 of the carrier 80020.

One or more of the pad elements of the second elastic portion 82500 include a corresponding channel therethrough bounded by a peripheral portion of the pad element. For example, as shown in FIG. 83A, each of the pad elements 82520a, 82520d, 82510b has a corresponding bounded channel 82520a', 82520d', 82510b'. The channel or opening 82520a', for example, is adapted to establish optical communication between the front and an ambient light sensor (not shown) of the assembly. Accordingly, the pad elements 82520d, for example, define an annular cross sections in the plane of the ring 82510 (or xy-plane). It can be seen from FIG. 82, that one or more of the pads or plug elements of the second portion 82500 has a body that is extended transversely to the ring 82510 and configured to mate with a respectively corresponding opening of the first, rigid portion 82100 of the carrier 82020. As seen in FIG. 82, for example, a pad element 82520d (with an unmarked channel therethrough) has a body labeled as B extending rearwardly, substantially along the z-axis of FIG. 82. In comparison, the pad elements 82520e, 82520b also have rearwardly extended bodies (denoted as C in FIG. 82), however these pad elements are devoid of channels therethrough and have a substantially solid cross-sections in the xy-plane.

In practice, the second elastic portion 82500 is integrated and/or co-molded with the first, rigid portion 82100 such that (i) the band 82508 is molded around the perimeter of the portion 82100 (in a position adjacent to the edge surface 82106) to protrude or project transversely from the surface 82102 of the plate portion 82100 in a form of a flexible and compressible lip adapted, in the assembly, as a gasket between the housing shell and an edge of the glass element (as discussed below). Furthermore, as a result of integration and/or co-molding of the portions 82100 and 82500, (ii) the pads or plug elements are molded into the corresponding openings through the plate portion 82100. As illustrated in FIGS. 81, 82, 83A, 83B, for example, the pad 82520a corresponds to, is coordinated with and molded into the opening 82120a, and the pads 82520b, 82520e respectively correspond to, are coordinated with and molded into the openings 82120b, 82120e. Similarly, the pads or plugs 82510a, 82510b respectively correspond to, are coordinated with and molded into the notches 82110a, 82110b. It is appreciated that the pad or plug elements, of the second elastic portion 82500, of the hybrid carrier 80020, that have channels therethrough are coordinated with the corresponding openings of the first rigid portion 82100 of the hybrid carrier 82020 such that a fluid and/or optical and/or electrical communication is established along the channels between the sides of the carrier 82020. Having been co-molded, the portions 82100 and 82500 form a two-shot hybrid carrier 82020. In such a hybrid carrier, the walls of the channels such as the channels 82520a', 82520d', 82510b', for example, are adapted to prevent light, delivered from lights source(s) at the back of the assembly (e.g., LEDs) through the channels towards the mirror element at the front of the assembly (such as indicia that requires highlighting), from leaking across the assembly and reducing the visual contrast of the indicia and display(s) as perceived by the user. Similarly, the extended bodies of the pad elements such as elements 82520e, 82520b, for example, act as dampers reducing or even eliminating buzzes, squeaks, rattles or other noises caused by mechanical displacement of the elements of the assembly during operation.

FIG. 84 offers a perspective back view of the two-shot co-molded hybrid carrier 82020, in which the pad and plug elements of the elastic portion 82500 of the carrier that are devoid of channels therethrough (such as the element 82520e, for example) are shown to extend rearwardly beyond the plane of the rigid portion 82100 and adapted to come to contact with a portion of the assembly located behind the carrier 82020 such as to damp or reduce or eliminate the mechanical vibrations of that portion. Embodiments of the hybrid co-molded carrier discussed above include at least one elastic element that protrudes or stems out transversely and forwardly and at least one elastic element that protrudes or stems out transversely and rearwardly, with respect to the plane defined by the rigid portion of the carrier.

FIGS. 85A, 85B illustrate schematically a related embodiment 85000 of the hybrid carrier containing a rigid portion 85100 and a elastic portion 85500 co-molded with the rigid portion 85100. (It is appreciated that different features of the carrier discussed in reference to FIGS. 80 through 84, while not shown in FIGS. 85A, 85B, remain within the scope of the invention and can be optionally employed in the embodiment 85000). No other elements or components of the rearview assembly are shown in FIGS. 85A, 85B for simplicity of illustration only. The carrier 85000 is appropriately structured to address the abovementioned problems of light leakage and mechanical vibrations. In particular, a conventionally individually-made and stand-alone component often referred to as "compass boot" (that possesses a crush rib adapted to reduce or block leakage of light from the compass display across the assembly) is substituted with a co-molded compass-boot element 85510, of the elastic portion 85500. The element 85510 has ribs or walls 85512 adapted to prevent light passing, in the assembly, through the aperture 85514 of the boot 85510 from the compass display towards the viewer. In contradistinction with the conventional compass-boot component, however, the proposed co-molded version simplifies the assembly (since the integration of the boot and the carrier is now done automatically during the fabrication of the carrier element). In addition, and unlike the conventionally used boot, the boot 85510 has a foundation or skirt 85518 that forms a membrane covering a void or aperture in the rigid portion 85100 and reducing such void or aperture to minimal size required for passage of light from the compass display component (not shown). By analogy with the elements 82520e, 82520b of FIGS. 81-84, the elastic pads 85522 of FIGS. 85A, 85B are adapted to come into contact with a portion of the assembly located behind the carrier 85000 to reduce the mechanical vibrations of that portion.

The formation of a hybrid (such as two-shot co-molded) carrier adapted to support the mirror element from the back within the assembly additionally allows not to use an opaque appliqué layer conventionally extended along and affixed to the rear surface of the mirror element. A conventional appliqué layer contains apertures therethrough that have to be accurately aligned and spatially matched with transflective areas of the mirror element to ensure the optimized operation of the assembly. With the use of a co-molded carrier such as the carrier of FIGS. 80 through 85, on the other hand, the co-molding of the elastic portion of the carrier with its rigid portion automatically defines the channels and/or openings of the elastic portion of the carrier in spatial registration with the transflective zones of the mirror element, while the opaque foundation or of the elements of the elastic portion of the hybrid carrier provides uniform dark background in transflective zones of the mirror element. Incidentally, the abandoning of the appliqué layer substantially simplifies the assembly process since a need to adhere an appliqué layer in spatial coordination to the rear surface of the mirror element is now eliminated.

FIG. 86A illustrates, in simplified exploded cross-sectional view 86000, the cooperation among some of the components of the rearview assembly discussed in reference to FIGS. 80-84. Shown are the housing shell 80040 cooperated with an angularly-adjustable mount 86010 and a subassembly 86020 (via snap elements 86022, for example). The subassembly 86010 includes, in part, a mirror element (as shown, an EC mirror element 80010 although the use of a prismatic element is also contemplated) and the hybrid carrier 80020 represented by the first rigid and second elastic portions 82100, 82500. It is appreciated that prior to joining the subassembly 86020 and the housing shell 80040, the skirt or ring 82510 of the elastic portion of the hybrid carrier is not compressed and is protruding outwardly with respect to and encircling an edge of the mirror element 80010. Generally, an edge of the mirror element that the skirt of the elastic portion of the hybrid carrier encircles may include an edge of at least one of the first and second substrates of the EC mirror element (when the mirror element includes an EC element) or an edge of a prismatic mirror element (if such element is used in the assembly).

The mirror element 80010 includes a front substrate 80010a and a rear substrate 80010b that is smaller than the front substrate and is positioned behind it not to be observable from the front of the assembly. The front substrate 80010a defines a ledge 80010c (with respect to the rear substrate 80010b) in association with which various indicia and/or (optionally, capacitive) switch elements shown as 86030 are structured. A PCB 86040, containing various electronic circuitry optionally including a pre-programmed processor, is behind the carrier 80020. Light sources such as, for example, LEDs 86044, 86046 deliver light from behind the carrier 80020 through the channels/openings in the carrier (discussed above) toward the mirror element 80010. For example, the light 86046 highlights the indicia 86030 through the channel or opening 86056, while the light source 86044 delivers light through a channel 86054. In a similar fashion, the ambient light sensor 86060 receives ambient light through the opening 82520a' (not marked in FIG. 86A for simplicity of illustration). Walls of the elastic pads or plug elements of the hybrid carrier 80020 that correspond to the ledge 80010c may extend farther away from the surface of the first portion 82510 of the carrier 80020 than the walls of the elastic pads or plug elements located elsewhere at the carrier 80020, to provide a channeling of light without leaking all the way towards the first substrate.

Figure 86B:
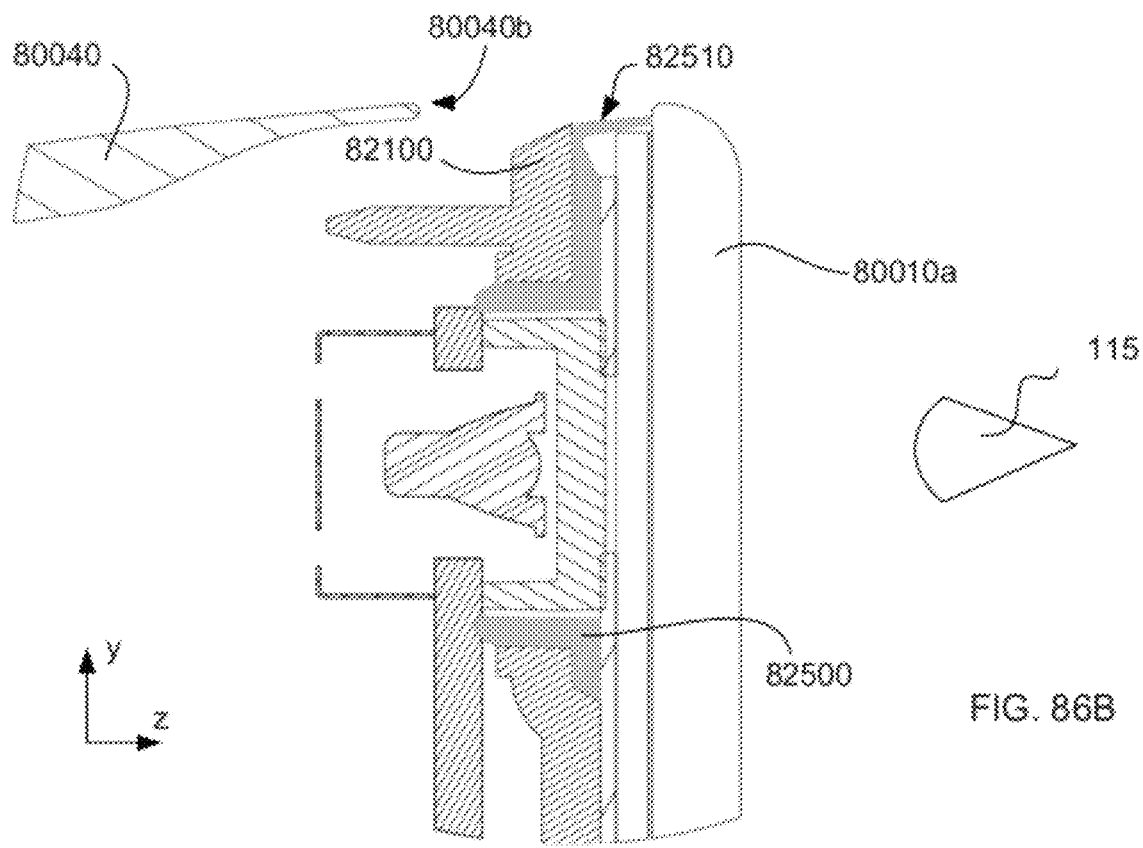
FIG. 86B provides a detailed illustration to a portion of the view of FIG. 86A, showing a position of components of the hybrid carrier with respect to the mirror element prior to mating the hybrid carrier to the housing shell.
Figure 86C:
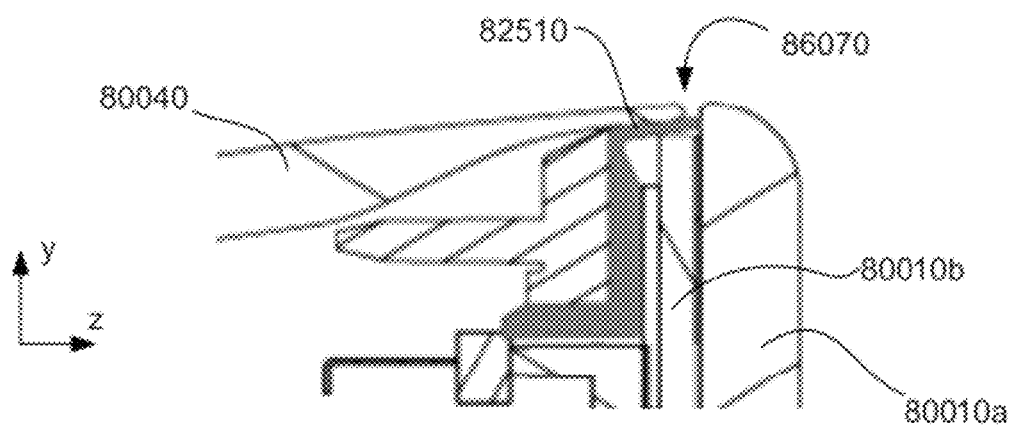
FIG. 86C provides an illustration to a portion of the view of FIG. 86A, showing a position of components of the hybrid carrier with respect to the mirror element after the mating of the hybrid carrier and the mirror element to the housing shell.

FIG. 86B illustrates, in more detail, a portion of FIG. 86A and shows that the annular rim 80040b of the housing shell 80020 is, optionally, rounded and devoid of edges. This feature facilitates the preservation of mechanical integrity of the elastic ring or skirt 82510 of the carrier 80020 after the housing shell 80040 is snapped onto or affixed to the subassembly 86020, as illustrated in FIG. 86C. In addition, the rounded rim 80040b does not form a "break-line" or "edge" in the appearance of the peripheral portion of the assembly when viewed from the front.

Referring again to FIG. 86B, in the assembled state the elastic ring or skirt 82510 that surrounds an edge surface of the mirror element 80010 (as shown, the edge surface of the second substrate 80010b) is pushed by a rim portion of the housing shell 80040 towards the edge portion of the mirror element 80010 and compressed between the housing shell and the edge portion, thereby "wedging" the edge of the mirror element 80010 and forming an interference fit gasket with respect to the rim portion of the housing shell 80040. Accordingly, the rim portion 80040b of the housing shell is adapted to provide a compression force, when assembled with the mirror element supported by the hybrid carrier 80020, generally in a radial direction toward the center of the second substrate 80010b of the mirror element 80010 from its edges. Tight interference fit between the mirror element and the rim portion of the housing shell keeps the mirror element from being pulled out of the housing shell in operation. When assembled together, the front substrate 80010a of the mirror element and the rim 80040b may optionally form a gap 86070 therebetween. When such gap is present, the elastic skirt 82510 can be observed through the gap 86070. Preferably, the elastic skirt portion 82510 is adapted to provide for the compression ratio of this skirt portion 82510 is from about 80 percent to about 90 percent. This can be ensured by choosing, in one case, the Shore A value of the material of the second portion 82500 to be on the order of 35 or so. Some examples of elastic materials appropriate for fabrication of a second portion 82500 of the hybrid carrier of the invention have been disclosed in Our Prior applications and, in particular, in U.S. Pat. No. 7,372,611 and U.S. Pat. No. 7,324,261 (in reference to elastic or elastomeric bezel).

The elastic cover around the edge of the second substrate 80010b formed by the skirt 82510 also ensures that no cracking or misalignment of either the housing shell 80040 or the edge of the mirror element occurs, due to differences in coefficients of thermal expansion (CTEs), as different temperature cycles. To this end, the amount of thermal expansion of the mirror element in a horizontal direction (along the x-axis) is not the same as in the vertical direction (along the y-axis) due to the difference in mirror dimensions. Accordingly, and in further reference to FIG. 82, the elastic ribs 82514 on the internal surface of the skirt or ring 82510 are adapted to compensate for difference in spatial expansions of the mirror element between the horizontal and vertical dimensions while preserving the damping and cushion between the housing shell 80040 and the mirror element 80010.

In further reference to FIGS. 80-85, when the elastic material is present across a significant portion of the carrier, the sometimes used foam adhesive tape affixing the carrier with the mounting element may no longer be required and can be substituted with a simple pressure-sensitive adhesive tape.

Figure 86D:
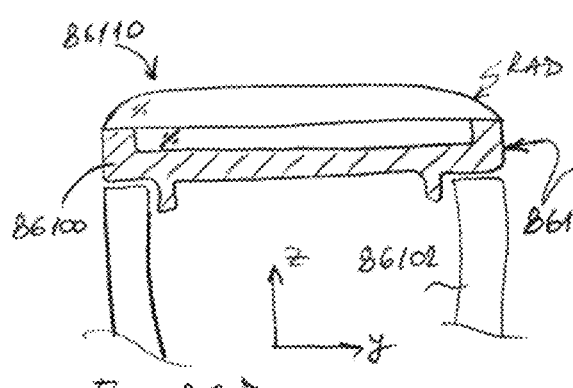
FIGS. 86D, 86E, 86F are diagrams illustrating the mating and/or cooperation of the mounting elements of the assembly.
Figure 86E:
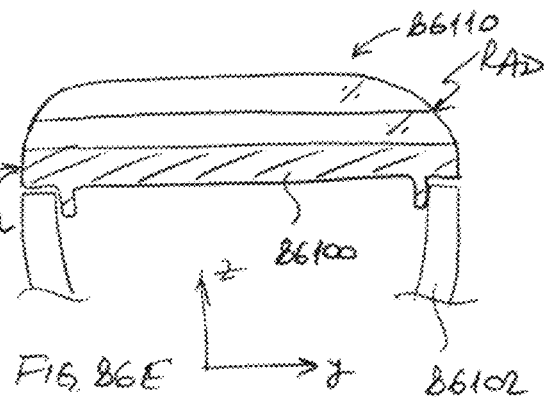
Figure 86F:
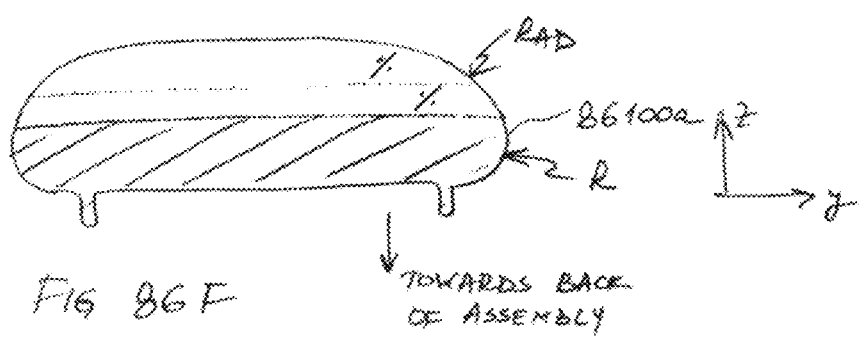

In related implementations, as shown in FIGS. 86D through 86F, a carrier component 86100, mated with the housing shell 86102, is made completely of elastic material that is stretchable and/or compressible sufficiently to eliminate stress (such as hoop stress) in the carrier and/or the mirror element due to temperature fluctuations and difference in corresponding CTEs. In FIG. 86D, the first substrate of the EC-based mirror element 86110 has a Rad-rounded edge and forms a ledge with respect to the second substrate. FIG. 86E shows an EC-based element both substrates of which have edges with matching Rad-rounded profiles. An outer surface 86110a can optionally have a curved profile, a radius R of which can optionally be equal to Rad. Optionally, the elastic carrier is slightly undersized, as compared to a portion of the mirror element with which it is in contact, and stretched to edges of the mirror element during assembly and lamination to the mirror element through the pressure sensitive adhesive.

Figure 87:
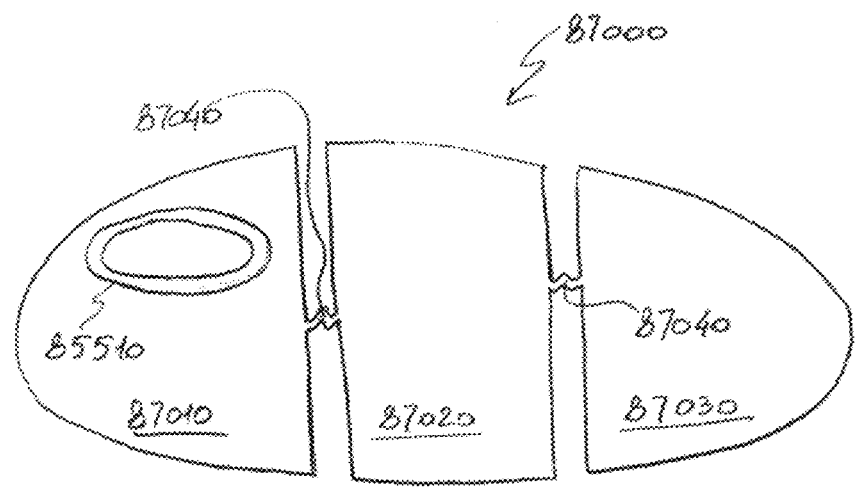
FIG. 87 is a front view of another embodiment of the hybrid carrier of the assembly.

To further address and compensate for possible mechanical shortcomings caused by differences in CTEs of the materials of the carrier, the housing shell, and the mirror element, an embodiment 87000 of the hybrid carrier shown in FIG. 87 may be generally configured to include several (at least two) rigid sub-portions such as sub-portions 87010, 87020, 87030 defining a common plane of the carrier 87000 and interconnected through or with one or more connecting elements 87040 configured to operate like stretchable and/or compressible springs or mechanical shock absorbers. Alternatively or in addition, the rigid sub-portions such as sub-portions elastic bridge(s) (not shown) that span a gap between the immediately neighboring rigid sub-portions 87010, 87020, 87030. Such structural arrangement of the hybrid carrier facilitates compression and/or expansion of the carrier in the xy-plane in response to thermal fluctuations.

Figure 88:
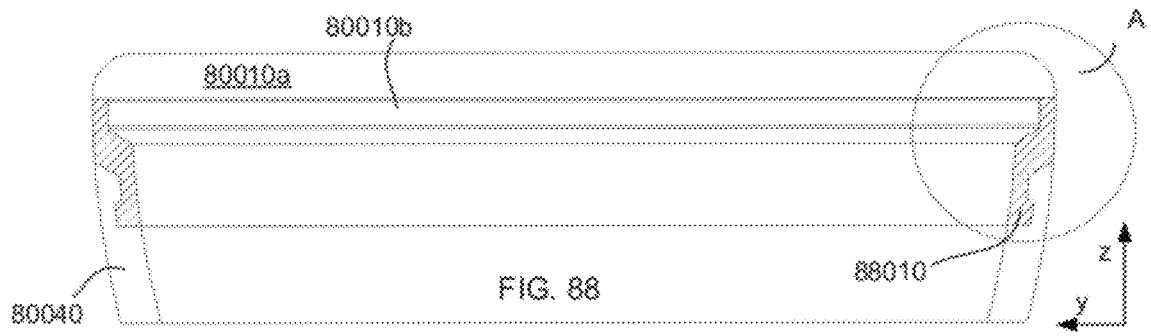
FIGS. 88, and 89A through 89E illustrate embodiments of structural cooperation between mounting elements and the mirror element of the assembly.
Figure 89A:
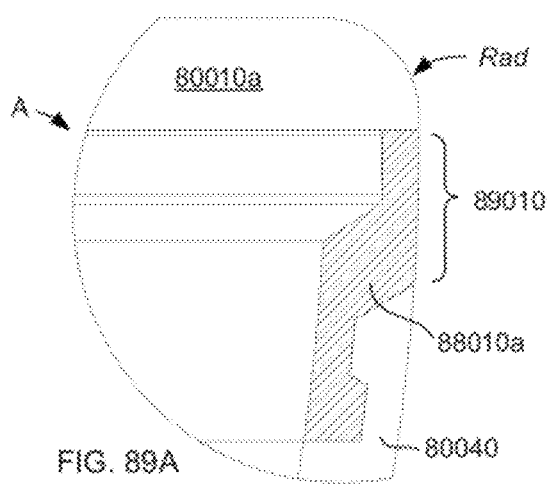
Figure 89B:
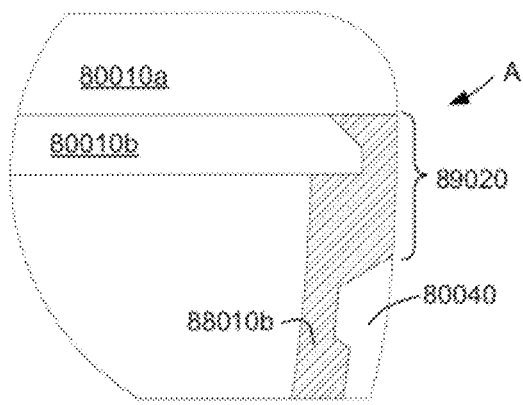
Figure 89C:
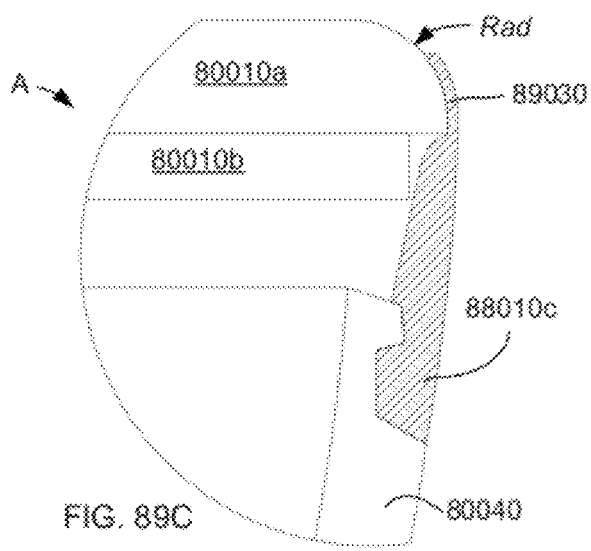
Figure 89D:
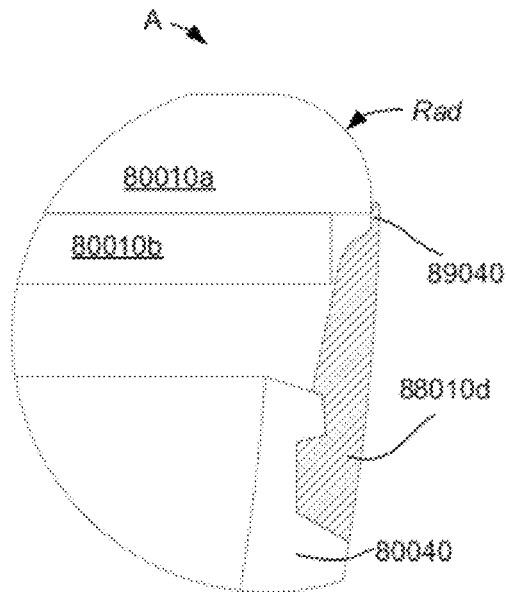
Figure 89E:
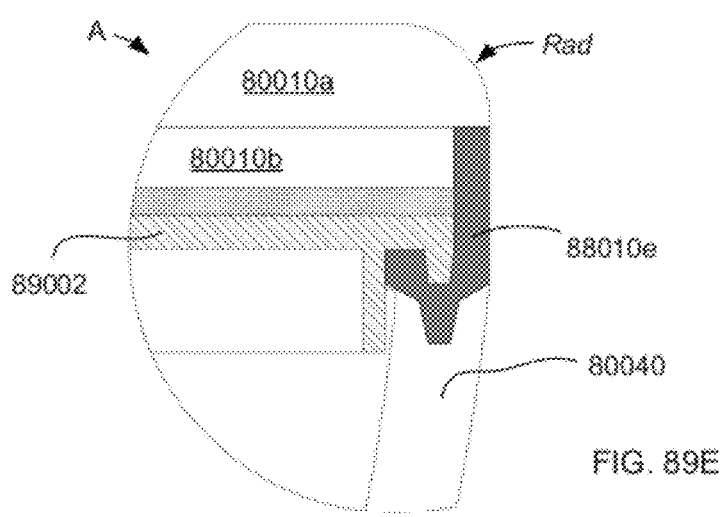

In a related embodiment, spatial cooperation and registration between the housing shell 80040 and the mirror element 80010 is structured with the use of a separate component 88010 as shown schematically in FIG. 88. For example, the component 88010 may be elastic and/or compressible include a ring of elastic material (optionally removably) affixed to the housing shell 80040 along the rim of the housing shell and/or inserted between the rim portion of the housing shell and an edge surface of the mirror element. Alternatively, the elastic component 88010 may include more than one individual components that are inserted between the housing shell and the mirror element. Several examples of elastic components 88010a, 88010b, 88010c, and 88010d are shown in magnified cross-sectional views of the corner A of the assembly of FIG. 88 in FIGS. 89(A-E). The registration between the housing shell 80040 and the elastic component(s) is arranged via snap features and/or snap-locks and/or through co-molding. The peripheral portion of the elastic component 88010a, 88010b, 88010c, 88010d, and 88010e is exposed to the view from the side of the assembly (see, for example, 89010, 89020). The components 88010c, and 88010d include elastic lips extending onto the Rad-rounded portion of the first substrate 80010a and, in a specific case, forming annular skirts surrounding the rounded annular portion of the first substrate. In a related embodiment, the outer surface of any of the elastic components 88010a, 88010b, 88010c, 88010d, and 88010e may include an outwardly curved budge concealing the edges of the substrates of the mirror element from being discernable from the front. While FIGS. 88 and 89(A-E) illustrate an EC-mirror element 88010 without a ledge between the first and second substrates 80010a, 80010b it is appreciated than any mirror element discussed in this application can be supported by and/or housed in with the combination of elastic and rigid housing elements as discussed. Moreover, any of the elastic parts discussed in reference to FIGS. 88, 89(A-E) optionally includes a metalized surface exposed to the outside of the assembly, which can be adapted as an electrically-conductive pad of a lock-out capacitive switch discussed elsewhere in this application. In a related embodiment, the separate component 88010 can include a dispensed epoxy and/or hot melt of a material applied after the mirror element and the housing shell have been cooperated with one another.

A shape of a housing shell (or cover) of a rearview assembly affects how the user perceives the assembly. In particular, a slimly or narrowly shaped housing shell causes the user to perceive that the assembly is light. weight of the assembly. For example, referring now to FIGS. 91A and 91B, two similarly-shaped embodiments of the rearview assembly are shown. Embodiments of FIGS. 91A, 91B differ only in degree to which the shape of the housing and mounting elements is modified, and both embodiments are indented to illustrate the following. In reference to FIGS. 91A and 91B, a particular shape of the mirror element and/or the details of the mechanical cooperation between the housing elements and the mirror element are of secondary importance. The housing shell or cover 91010 of the assembly 91014, shown in side view, is shaped to include a bulbous portion 91010a (bulging behind a mirror element 91020 in the central portion of the assembly 91014) preferably smoothly transitioning into a peripheral lip-like portion 91010b. The bulbous portion 91010a has an outer contour 91010c, is offset from an edge of the lip-like portion 91010b by a predetermined distance d and, optionally, has such an outer surface a tangent 91022 to which is inclined or tilted, γ, with respect to a tangent 91024 defined by the lip-like portion 91010b. As a result, when viewed by the driver under normal viewing conditions, the bulbous portion 91010a is not readily seen behind the lip-like portion 91010b, and a visual impression is formed that the assembly 91014 is thin and light.

Figure 91A:
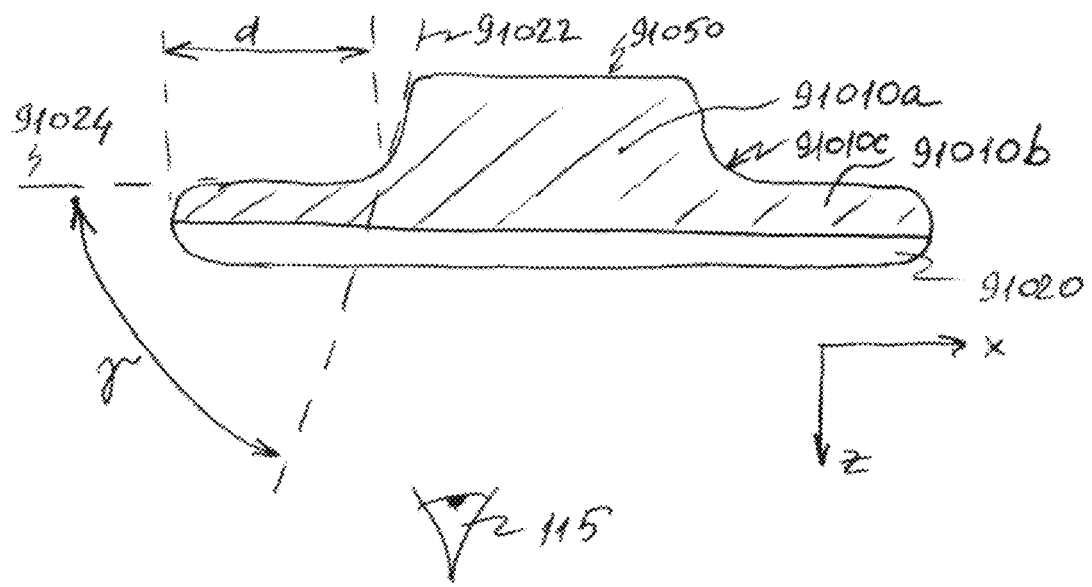
FIGS. 91A, 91B, and 91C are diagrams illustrating shape factor of housing of an embodiment of the invention.
Figure 91B:
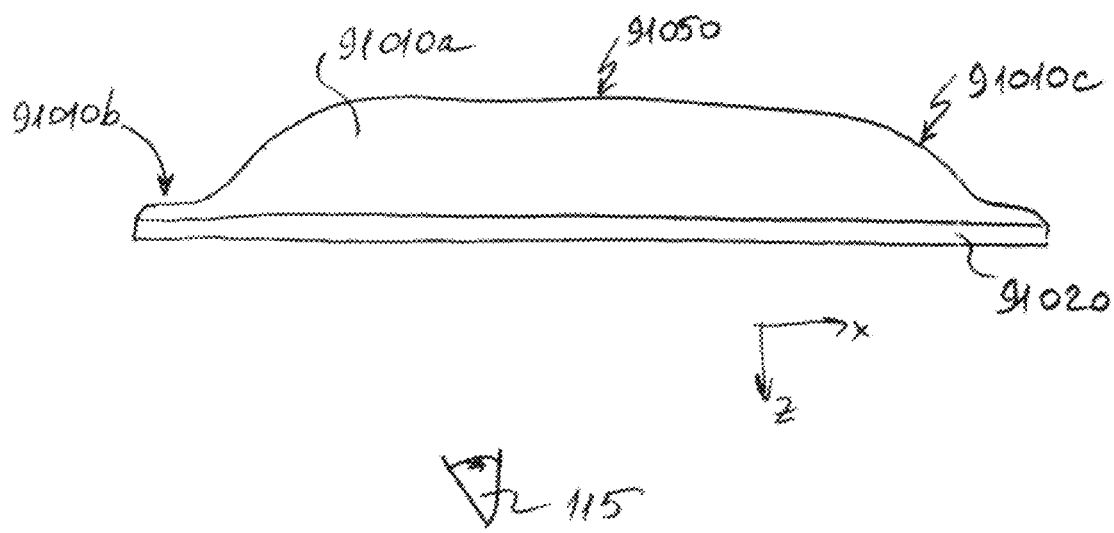
Figure 91C:
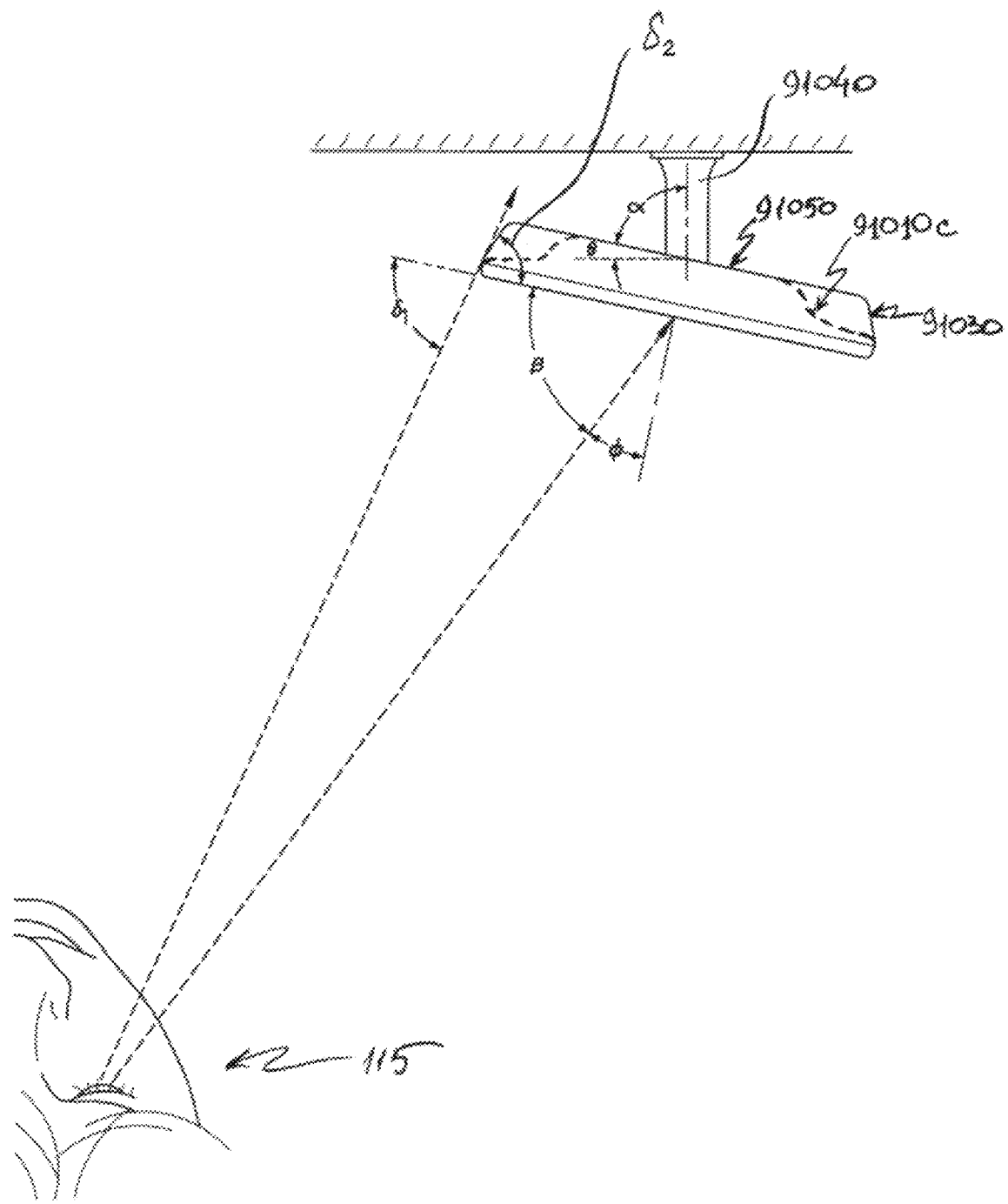

Additional illustration is provided in reference to FIG. 91C and in further reference to FIGS. 91A, 91B. In FIG. 91C, the contours of two assemblies are shown simultaneously and for comparison: a first assembly the housing elements of which are configured according to the principle of FIGS. 91A, 91B (shown in a dashed line 91010c), and a second another assembly with a housing shell having a (solid line) contour 91030. The assemblies are shown connected to the vehicle windshield such that the rearview assembly mount 91040 extends orthogonally from the windshield, when viewed from a top plan perspective. The assemblies are tilted at angle θ toward the driver 115. The angle θ may be anywhere from 12 degrees to 17 degrees. Thus, the complimentary angle of α, which is the angle from the longitudinal extent of the mount to the longitudinal extent of a rear wall of the housing is approximately 73 degrees to 78 degrees. The driver 115 of average proportions will view a midpoint of either the first or the second rearview assembly at an angle β, which is approximately 61 degrees to 66 degrees measured from the planar extent of the rearward viewing device 208 of the rearview assembly 200. Accordingly, the complimentary angle φ from the driver's line of sight to a line extending orthogonally to the front surface of either assembly is generally between 19 degrees and 24 degrees.

Referring again to FIG. 91C, and considering the assembly with a contour 91030, the angle $\delta_1$, which is the angle from the driver's line of sight to an outmost point of an assembly, will not generally exceed about 66 degrees. Likewise, the angle $\delta_2$ will also not generally exceed 66 degrees. Consequently, the peripheral portion of the assembly substantially conceals the housing shell of the rearview assembly from view by the driver. If the assembly of FIGS. 91A, 91B is used, such concealment is all by assured due the visual blocking of the bulbous portion 91010a by the lip-like portion 91010b. It is worth noting that geometrical parameters d and y of the embodiments of FIGS. 91A, 91B can be optionally chosen to ensure that the bulbous portion 91010a is also concealed by the lip portion 91010b as seen by the passenger.

Electrochromic Medium.

Preferably the chamber contains an electrochromic medium. Electrochromic medium is preferably capable of selectively attenuating light traveling therethrough and preferably has at least one solution-phase electrochromic material and preferably at least one additional electroactive material that may be solution-phase, surface-confined, or one that plates out onto a surface. However, the presently preferred media are solution-phase redox electrochromics, such as those disclosed in commonly assigned U.S. Pat. Nos. 4,902,108, 5,128,799, 5,278,693, 5,280,380, 5,282,077, 5,294,376, 5,336,448, 5,808,778 and 6,020,987; the entire disclosures of which are incorporated herein in their entireties by reference. If a solution-phase electrochromic medium is utilized, it may be inserted into the chamber through a sealable fill port through well-known techniques, such as vacuum backfilling and the like.

Electrochromic medium preferably includes electrochromic anodic and cathodic materials that can be grouped into the following categories:

(i) Single layer—the electrochromic medium is a single layer of material which may include small inhomogeneous regions and includes solution-phase devices where a material is contained in solution in the ionically conducting electrolyte and remains in solution in the electrolyte when electrochemically oxidized or reduced. U.S. Pat. Nos. 6,193,912; 6,188,505; 6,262,832; 6,129,507; 6,392,783; and 6,249,369 disclose anodic and cathodic materials that may be used in a single layer electrochromic medium, the entire disclosures of which are incorporated herein by reference. Solution-phase electroactive materials may be contained in the continuous solution phase of a cross-linked polymer matrix in accordance with the teachings of U.S. Pat. No. 5,928,572 or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

At least three electroactive materials, at least two of which are electrochromic, can be combined to give a pre-selected color as described in U.S. Pat. No. 6,020,987 the entire disclosure of which is incorporated herein by reference. This ability to select the color of the electrochromic medium is particularly advantageous when designing information displays with associated elements.

The anodic and cathodic materials can be combined or linked by a bridging unit as described in International Application No. PCT/WO97/EP498 entitled "ELECTROCHRO- MIC SYSTEM," the entire disclosure of which is incorporated herein by reference. It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862 entitled "ELECTROCHROMIC POLYMER SYSTEM," U.S. Pat. No. 6,002,511, or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

Also included is a medium where one or more materials in the medium undergoes a change in phase during the operation of the device, for example, a deposition system where a material contained in solution in the ionically conducting electrolyte which forms a layer, or partial layer on the electronically conducting electrode when electrochemically oxidized or reduced.

Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers.

It may be desirable to incorporate a gel into the electrochromic device as disclosed in commonly assigned U.S. Pat. No. 5,940,201, the entire disclosure of which is incorporated herein by reference.

In at least one embodiment, a rearview mirror assembly is provided with an electro-optic element having a substantially transparent seal. Examples of substantially transparent seals and methods of forming substantially transparent seals are provided in U.S. Pat. No. 5,790,298, the entire disclosure of which is included herein by reference.

In at least one embodiment, the rearview mirror assembly is provided with a bezel 6580 for protecting the associated seal from damaging light rays and to provide an aesthetically pleasing appearance. Examples of various bezels are disclosed in U.S. Pat. Nos. 5,448,397, 6,102,546, 6,195,194, 5,923,457, 6,238,898, 6,170,956 and 6,471,362, the disclosures of which are incorporated herein in their entireties by reference.

It should be understood that the above description and the accompanying figures are for illustrative purposes and should in no way be construed as limiting the invention to the particular embodiments shown and described. The embodiments described herein can employ, without limitation and in any combination, any additional features and elements taught in Our Prior applications, including features of housing covers and shells and other mounting elements, mechanical cooperation and integration among these mounting elements, thin-film coating configurations and multi-zone embodiments pertaining to transflective arrangements of the EC-element based or prismatic element based mirror system such as those taught in U.S. patent application Ser. No. 12/370,909; and including mirror systems and rearview assemblies with anisotropic polymer laminates such as those taught in U.S. patent application Ser. Nos. 12/496,620, 12/629,757, and 12/774,721.

Modifications of at least some of structural features of at least some of the elements of embodiments of the invention are anticipated and considered to be within the scope of the invention even if such modifications are not reflected in the present drawings. For example, at least one component of a mirror element or mirror system is optionally shaped to include a bevel, a rounded edge, and/or a seam. Such shaping profile, in a specific embodiment, is configured to improve the durability of the mirror element as compared to the element nor so shaped. In another embodiment, an edge of a substrate of the mirror element is shaped by beveling, seaming or rounding to be complementary to and/or congruent with and/or to mate with a surface of a mounting component that supports the mirror element in the assembly. A non-limiting example of such mirror element formatting is provided by FIG. 89B, in which an edge of the second substrate is beveled. However, generally any edge of the first or second substrates of a mirror element can be beveled, rounded, or seamed. Alternatively or in addition, an edge of a veneer affixed to the mirror element and discussed in reference to FIGS. 40-44 and 67, can be likewise shaped. Among the adhesive materials used to connect the mirror element to the carrier there are, for example, pressure-sensitive adhesives (such as 3M 430 acrylic adhesive or 3M 4492 transfer tape) and liquid adhesives (such as Dow 2520, Adhezion UR-4526A, ISR 70-08). The carrier may be treated, prior to use, to raise surface energy to a dyne surface energy level above about 40. Examples of such pre-treatment include plasma treatment (atmospheric, selected gases) and/or flame surface treatment provided by Enercon Industries and/or corona discharge provided by Thierry Corporation.

The invention claimed is:

1. A vehicular rearview assembly having a front, said assembly comprising
    a housing shell having inner and outer surfaces, a rim defining an aperture of the housing shell, and an inner volume,
    a mirror element having an edge,
    wherein said mirror element has a first surface unobstructingly observable from the front of the assembly, said first surface having an annular peripheral region having a curvature, said curvature defined by a curvature radius, wherein said curvature radius is at least 2.5 mm, and
    a mounting element configured to cooperate with said mirror element to support the mirror element in said aperture, the mounting element further configured to be mechanically engaged with the inner surface of the housing shell, the mounting element including:
        a plate portion made of a first material and substantially co-extensive with the mirror element, said plate portion having openings therethrough and an edge surface; and
        a skirt portion made of a first elastic material and associated with the plate portion along a perimeter thereof to define a band extending from the plate portion towards said mirror element, the band having a cross-sectional profile that provides flexibility such that, when the mounting element is mechanically engaged with the inner surface of the housing shell, the skirt portion is in contact with the inner surface of the housing shell and encircles at least a portion of the edge of the mirror element.

2. A vehicular rearview assembly according to claim 1, wherein said skirt portion is adapted to be compressed between the inner surface of the housing shell and the edge of the mirror element.

3. A vehicular rearview assembly according to claim 1, wherein said plate portion includes first and second sections and a gap between said first and second section, the gap being spanned with a spring element.

4. A vehicular rearview assembly according to claim 3, wherein the spring element comprises at least one of said first material and a second elastic material.

5. A vehicular rearview assembly according to claim 4, wherein said first elastic material and said second elastic material are the same.

6. A vehicular rearview assembly according to claim 1, wherein the plate portion includes an opening therethrough, and further comprising a first plug element made of a third elastic material, the first plug element molded to the plate portion to block at least a portion of said opening in the plate portion.

7. A vehicular rearview assembly according to claim 6, wherein said first elastic material and said third elastic material are the same, and wherein said first plug element is co-molded with said skirt element.

8. A vehicular rearview assembly according to claim 6, wherein said first plug element and said skirt element are connected with a bridge of elastic material.

9. A vehicular rearview assembly according to claim 6, wherein said first plug element defines a channel therethrough.

10. A vehicular rearview assembly according to claim 9, wherein said first plug element further includes a peripheral wall extending from the plate portion.

11. A vehicular rearview assembly according to claim 9, further comprising a source of light behind the plate portion as viewed from the front, said source of light adapted to transmit light through said channel in the first plug element towards the front of the assembly, wherein said peripheral wall is configured as a baffle for said transmitted light.

12. A vehicular rearview assembly according to claim 9, further comprising indicia disposed, in front of said first plug element, to be traversed by said transmitted light.

13. A vehicular rearview assembly according to claim 6, wherein said first plug element protrudes from the plate portion away from the mirror element.

14. A vehicular rearview assembly according to claim 13, further comprising a circuit board with electronic circuitry thereon disposed behind the mirror element in said assembly, wherein said first plug element is pressed against said circuit board to reduce mechanical vibrations of said circuit board in a course of operation of said assembly.

15. A vehicular rearview assembly according to claim 14, wherein said mounting element includes a snap element adapted to hold, in the assembly, the first plug element in a compressed relationship with respect to the circuit board.

16. A vehicular rearview assembly according to claim 1, wherein said edge surface of the plate portion defines a notch, in the plate portion, configured to accommodate a member electrically connecting the mirror element with an element disposed behind the plate portion.

17. A vehicular rearview assembly according to claim 1, wherein said skirt portion includes at least one rib on a side of the skirt portion which, in the assembly, faces the edge surface of the mirror element.

18. A vehicular rearview assembly according to claim 1, wherein said mirror element contains a first thin-film stack on a second surface thereof, the second surface located behind the first surface as viewed from the front, the first thin-film stack having an opaque optical thin-film ring of material disposed along a perimeter of said second surface and having a peripheral ring width.

19. A vehicular rearview assembly according to claim 18, wherein an orthogonal projection of said curved annular peripheral region onto the second surface defines a projected area having a projected width, said projected with being larger than said peripheral ring width.

20. A vehicular rearview assembly according to claim 18, wherein an orthogonal projection of said curved annular peripheral region onto the second surface defines a projected area that contains an area of said opaque optical thin-film ring of material.

21. A vehicular rearview assembly according to claim 1, wherein said mirror element includes an electrochromic (EC) element comprising
    a second substrate having third and fourth surfaces and an edge surface connecting third and fourth surfaces, the second substrate being smaller than and disposed in a parallel and spaced-apart relationships with respect to the first substrate such as
    (iii) to define a gap between the second and third surfaces;
    (iv) to define a transverse offset between the first and second substrates along at least a portion of perimeter of the EC mirror element, and
    (v) to conceal a perimeter of the second substrate behind the first substrate as viewed from the front, the second substrate carrying at least partially reflective coating on a surface thereof;
    a primary sealing material disposed affixing the first and second substrate together along the perimeter of the EC mirror element; and
    an EC medium in said gap.

22. A vehicular rearview assembly according to claim 21, wherein said at least a portion of the edge of the mirror element encircled by the skirt portion includes an edge of the second substrate.

23. A vehicular rearview assembly according to claim 1, further comprising a capacitive switch having a sensing electrode disposed behind or on said first substrate and adapted to be activated from the front.

24. A vehicular rearview assembly according to claim 1, further comprising an electronic circuitry disposed behind the mirror element in said assembly, and at least one auxiliary device associated with said assembly, wherein said at least one auxiliary device includes one or more of a source of light, an illumination assembly, a digital voice processing system, a power supply, a global positioning system, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a telecommunication system, a navigation aid, a lane departure warning system, an adaptive cruise control, a vision system, a rear vision system and a tunnel detection system.

25. A vehicular rearview assembly according to claim 24, further comprising a user interface (UI) operably connected to said electronic circuitry and containing indicia observable from the front of the assembly, said indicia corresponding to said least one auxiliary device associated with said assembly, wherein the electronic circuitry is operable to trigger, in response to an input applied to the UI, said at least one auxiliary device.

26. A vehicular rearview assembly according to claim 1, wherein the mirror element is affixed to the mounting element with adhesive material.

27. A vehicular rearview assembly having a front, said assembly comprising:
a housing shell having inner and outer surfaces, a rim defining an aperture of the housing shell, and an inner volume,
a mirror element having a first substrate defined by a first surface corresponding to the front of the assembly and a second surface opposite the first surface, the first surface unobstructingly observable from the front of the assembly, said first surface including an annular region, at a periphery thereof, said annular region having a curvature defined by a curvature radius, wherein said curvature radius includes a radius of at least 2.5 mm, said second surface containing thereon a first thin-film stack that includes an opaque optical thin-film ring of material disposed along a perimeter of said second surface and having a ring width;
a mounting element configured to cooperate with said mirror element to support the mirror element in said aperture, the mounting element further configured to be mechanically engaged with the inner surface of the housing shell;
electronic circuitry disposed behind the mirror element in said assembly; and
a user interface (UI) operably connected to said electronic circuitry and containing indicia observable from the front of the assembly, said indicia corresponding to at least one auxiliary device,
wherein the electronic circuitry is operable to trigger, in response to an input applied to the UI, said at least one auxiliary device; and
wherein an orthogonal projection of said curved annular region onto the second surface defines an annulus a width of which is larger than said ring width.

28. A vehicular rearview assembly according to claim 27, wherein said curvature radius include a radius that varies as a function of position across said annular peripheral region.

29. A vehicular rearview assembly according to claim 27, wherein a ratio of said ring width to said width of the annulus is at least about 0.6.

30. A vehicular rearview assembly according to claim 27, wherein a ratio of said ring width to said width of the annulus is at least about 0.75.

31. A vehicular rearview assembly according to claim 27, wherein a ratio of said ring width to said width of the annulus is at least about 0.9.

32. A vehicular rearview assembly according to claim 27, wherein said ring width is about 3.0 mm and said width of the annulus is about 3.5 mm.

33. A vehicular rearview assembly according to claim 27, wherein said at least one auxiliary device includes one or more of a source of light, an illumination assembly, a digital voice processing system, a power supply, a global positioning system, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a telecommunication system, a navigation aid, a lane departure warning system, an adaptive cruise control, a vision system, a rear vision system, and a tunnel detection system.

34. A vehicular rearview assembly according to claim 27, wherein said mirror element includes an electrochromic (EC) element comprising
a second substrate having third and fourth surfaces and an edge surface connecting third and fourth surfaces, the second substrate being smaller than and disposed in a parallel and spaced-apart relationships with respect to the first substrate such as
(vi) to define a gap between the second and third surfaces;
(vii) to define a transverse offset between the first and second substrates along at least a portion of perimeter of the EC mirror element, and
(viii) to conceal a perimeter of the second substrate behind the first substrate as viewed from the front, the second substrate carrying at least partially reflective coating on a surface thereof;
a primary sealing material disposed between the first and second substrates along the perimeter of the EC mirror element; and
an EC medium in said gap.

35. A vehicular rearview assembly according to claim 34, wherein said mounting element includes
a plate portion made of a first material and substantially co-extensive with the mirror element, said plate portion having openings therethrough and an edge surface; and
a skirt portion made of a first elastic material and associated with the plate portion along a perimeter thereof to define a band extending from the plate portion towards said mirror element, the band having a cross-sectional profile that provides flexibility such that, when the mounting element is mechanically engaged with the inner surface of the housing shell, the skirt portion is in contact with the inner surface of the housing shell and encircles at least a portion of the edge of at least one of the first and second substrates.

36. A vehicular rearview assembly according to claim 35, wherein said skirt portion is adapted to be compressed between the inner surface of the housing shell and the edge of at least one of he first and second substrates.

37. A vehicular rearview assembly according to claim 35, wherein the plate portion includes an opening therethrough, and further comprising a first plug element made of a third elastic material, the first plug element molded to the plate portion to block at least a portion of said opening in the plate portion.

38. A vehicular rearview assembly according to claim 37, wherein said first elastic material and third elastic material are the same, and wherein said first plug element is co-molded with said skirt element.

39. A vehicular rearview assembly according to claim 37, wherein said first plug element and said skirt element are connected with a bridge of elastic material.

40. A vehicular rearview assembly according to claim 37, wherein said first plug element defines a channel therethrough.

41. A vehicular rearview assembly according to claim 40, wherein said first plug element further includes a peripheral wall extending from the plate portion.

42. A vehicular rearview assembly according to claim 40, further comprising a source of light behind the plate portion as viewed from the front, said source of light transmitting light through said channel in the first plug element towards the front of the assembly, wherein said peripheral wall is configured as a baffle for said transmitted light.

43. A vehicular rearview assembly according to claim 40, further comprising indicia disposed in front of said first plug element to be traverse by said transmitted light.

44. A vehicular rearview assembly according to claim 37, wherein said first plug element protrudes from the plate portion away from the mirror element.

45. A vehicular rearview assembly according to claim 37, wherein said first plug element is pressed against said board to reduce mechanical vibrations of said circuit board in a course of operation of said assembly.

46. A vehicular rearview assembly according to claim 27, wherein said edge surface of the plate portion defines a notch in the plate portion configured to accommodate ma member electrically connecting the mirror element with an element disposed behind the plate portion.

47. A vehicular rearview assembly according to claim 27, wherein said skirt portion includes at least one rib on a side of the skirt portion which, in the assembly, faces the edge surface of the mirror element.

48. A vehicular rearview assembly according to claim 27, wherein said UI comprises a capacitive switch having a sensing electrode disposed behind or on said first substrate and adapted to be activated from the front.

49. A vehicular rearview assembly according to claim 27, wherein the mirror element is affixed to the mounting element with adhesive material.

50. A vehicular rearview assembly having a front and comprising:
   a housing shell having inner and outer surfaces, a rim defining an aperture of the housing shell, and an inner volume;
   an electrochromic (EC) element having
      first and second substrates defining a gap therebetween, the first substrate being larger than the second substrate and disposed in front of the second substrate to define a ledge with respect to the second substrate, the ledge extending along a perimeter of the EC element, the second substrate having an edge surface;
      first and second electrically-conductive layers disposed respectively on the first and second substrates to define corresponding electrodes of the EC element;
   an electrical bus comprising a conductive material adhered to an edge of a substrate of the EC element, said electrical bus having a thickness between about 0.5 micron and 1,000 microns and a resistance, along a length of the bus, less than about 5 Ohms, said electrical bus being electrically connected to said second electrically-conductive layer and a contact area corresponding to a surface of the second substrate that faces away from the front; and
   a circuit board with electronic circuitry thereon disposed behind the EC element, said electronic circuitry connected with an electrode of the EC element through said electrical bus,
   wherein said first substrate has a first surface unobstructingly observable from the front of the assembly and a second surface opposite to the first surface, said first surface having a curved annular peripheral region with a curvature defined by a curvature radius of at least 2.5 mm;
   wherein said first substrate contains a thin-films stack on a surface thereof, said first thin-film stack having an opaque thin-film ring of material disposed along a perimeter of said first substrate and having a ring width of no greater than about 5 mm; and
   wherein said EC element is affixed in said aperture of the housing shell.

51. A vehicular rearview assembly according to claim 50, further comprising a mounting element configured to cooperate with said EC element to support the mirror element in said aperture and to be mechanically engaged with the inner surface of the housing shell, the mounting element including
   a plate portion made of a first material and substantially co-extensive with the mirror element, said plate portion having openings therethrough and an edge surface; and
   a skirt portion made of a first elastic material and associated with the plate portion along a perimeter thereof to define a band extending from the plate portion towards said mirror element, the band having a cross-sectional profile that provides flexibility such that, when the mounting element is mechanically engaged with the inner surface of the housing shell, the skirt portion is in contact with the inner surface of the housing shell and encircles at least a portion of an edge of the EC element.

52. A vehicular rearview assembly according to claim 51, wherein said skirt portion is adapted to be compressed between the inner surface of the housing shell and said edge of the mirror element.

53. A vehicular rearview assembly according to claim 51, wherein the plate portion includes an opening therethrough, and further comprising a first plug element molded to the plate portion to block at least a portion of said opening and to protrude from the plate portion towards said circuit board, and wherein said mounting element includes a snap component adapted to hold the first plug element in a compressed relationship with respect to the circuit board.

54. A vehicular rearview assembly according to claim 51, wherein said electrical bus is electrically extended with an electrically-conductive member around the edge surface of the second substrate towards said contact area, and wherein said edge surface of the plate portion defines a notch, in the plate portion, adapted to accommodate said member.

55. A vehicular rearview assembly according to claim 50, wherein said electrical bus includes a first portion having a width and wrapping around the edge surface of the second substrate towards said second electrically-conductive layer, and a second portion having a length extending along the perimeter of the EC element in contact with an electrode of the EC element, said length of the second portion being larger than the width of the first portion.

56. A vehicular rearview assembly according to claim 50, wherein an orthogonal projection of said curved annular peripheral region onto the second surface defines an annulus having a width that is larger than said ring width.

57. A vehicular rearview assembly according to claim 50, further comprising at least one auxiliary device includes one or more of a source of light, an illumination assembly, a digital voice processing system, a power supply, a global positioning system, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a telecommunication system, a navigation aid, a lane departure warning system, an adaptive cruise control, a vision system, a rear vision system, and a tunnel detection system.

58. A vehicular rearview assembly according to claim 50, further comprising a capacitive switch having a sensing electrode disposed behind or on said first substrate and adapted to be activated from the front.

\* \* \* \* \*